(12) United States Patent
Lesandro et al.

(10) Patent No.: US 8,468,090 B2
(45) Date of Patent: Jun. 18, 2013

(54) ACCOUNT OPENING COMPUTER SYSTEM ARCHITECTURE AND PROCESS FOR IMPLEMENTING SAME

(75) Inventors: Ronald M. Lesandro, Hamburg, NY (US); Paris F. Roselli, Buffalo, NY (US); Michael J. Sullivan, Colden, NY (US); Darren P. Loveday, Waterlooville (GB); Michael R. Antognoli, Chicago, IL (US); John P. Flood, Bartlett, IL (US); Yilu He, Riverview, FL (US); Darrick R. Brooks, Valrico, FL (US); Srinivas Lakshman, Mexico City (MX); Richard A. Gemma, Chicago, IL (US); Trevor Johnson, Vancouver (CA); Sonu Gupta, Tampa, FL (US); Martin Hayes, Jersey City, NJ (US)

(73) Assignee: HSBC Technologies Inc., Jersey City, NJ (US)

( * ) Notice: Subject to any disclaimer, the term of this patent is extended or adjusted under 35 U.S.C. 154(b) by 40 days.

(21) Appl. No.: 13/293,957

(22) Filed: Nov. 10, 2011

(65) Prior Publication Data

US 2012/0054095 A1 Mar. 1, 2012

Related U.S. Application Data

(63) Continuation of application No. PCT/US2011/037143, filed on May 19, 2011.

(60) Provisional application No. 61/347,199, filed on May 21, 2010, provisional application No. 61/391,815, filed on Oct. 11, 2010, provisional application No. 61/405,398, filed on Oct. 21, 2010, provisional application No. 61/407,210, filed on Oct. 27, 2010, provisional application No. 61/435,000, filed on Jan. 21, 2011.

(51) Int. Cl.
*G06Q 40/00* (2012.01)

(52) U.S. Cl.
USPC .................................. 705/39; 705/35; 705/42

(58) Field of Classification Search
USPC .................... 705/35, 38–39, 42; 235/379–381
See application file for complete search history.

(56) References Cited

U.S. PATENT DOCUMENTS

| 5,866,889 | A | 2/1999 | Weiss |
| 6,021,397 | A | 2/2000 | Jones et al. |
| 6,131,810 | A | 10/2000 | Weiss |
| 6,199,077 | B1 | 3/2001 | Inala |
| 6,278,993 | B1 | 8/2001 | Kumar |
| 6,354,490 | B1 | 3/2002 | Weiss |

(Continued)

OTHER PUBLICATIONS

International Search Report and Written Opinion from International application No. PCT/US11/58014, issued Feb. 27, 2012.

(Continued)

*Primary Examiner* — Hani M Kazimi
(74) *Attorney, Agent, or Firm* — Stroock & Stroock & Lavan, LLP

(57) ABSTRACT

The present invention provides, in alternative embodiments, a computer architecture and/or computer implemented methods for account opening. In some embodiments, the invention provides an integrated, component-based technology platform in which globally standardized, business configurable account opening processes are separate and decoupled from the user interface screens and are directly manageable by business functionality and/or personnel. In various embodiments, the invention provides pause and resume, save and retrieve, cross-channel, metrics, audit tracking, data logging, and/or straight-through processing capabilities for account opening.

20 Claims, 89 Drawing Sheets

U.S. PATENT DOCUMENTS

| | | | |
|---|---|---|---|
| 6,412,073 B1 | 6/2002 | Rangan | |
| 6,567,850 B1 | 5/2003 | Freishtat | |
| 6,594,766 B2 | 7/2003 | Rangan | |
| 6,633,910 B1 | 10/2003 | Rajan | |
| 6,725,425 B1 | 4/2004 | Rajan | |
| 6,802,042 B2 | 10/2004 | Rangan | |
| 6,859,212 B2 | 2/2005 | Kumar | |
| 6,865,680 B1 | 3/2005 | Wu | |
| 6,867,789 B1 | 3/2005 | Allen | |
| 6,871,220 B1 | 3/2005 | Rajan | |
| 6,871,346 B1 | 3/2005 | Kumbalimutt et al. | |
| 7,013,310 B2 | 3/2006 | Messing | |
| 7,085,997 B1 | 8/2006 | Wu | |
| 7,178,096 B2 | 2/2007 | Rangan | |
| 7,200,804 B1 | 4/2007 | Khavari | |
| 7,203,845 B2 | 4/2007 | Sokolic | |
| 7,225,464 B2 | 5/2007 | Satyavolu | |
| 7,313,813 B2 | 12/2007 | Rangan | |
| 7,321,874 B2 | 1/2008 | Dilip | |
| 7,321,875 B2 | 1/2008 | Dilip | |
| 7,383,223 B1 | 6/2008 | Dilip | |
| 7,424,520 B2 | 9/2008 | Daswani | |
| 7,505,937 B2 | 3/2009 | Dilip | |
| 7,536,340 B2 | 5/2009 | Dheer | |
| 7,571,140 B2 | 8/2009 | Weichert et al. | |
| 7,577,598 B2 | 8/2009 | Rousseau | |
| 7,606,752 B2 | 10/2009 | Hazlehurst | |
| 7,620,580 B1 | 11/2009 | Rose et al. | |
| 7,644,023 B2 | 1/2010 | Kumar | |
| 7,657,761 B2 | 2/2010 | Sokolic | |
| 7,672,879 B1 | 3/2010 | Kumar | |
| 7,676,751 B2 | 3/2010 | Allen | |
| 7,685,525 B2 | 3/2010 | Kumar | |
| 7,729,283 B2 | 6/2010 | Ferguson | |
| 7,734,541 B2 | 6/2010 | Kumar | |
| 7,797,207 B1 | 9/2010 | Dilip | |
| 7,849,003 B2 | 12/2010 | Egnatios et al. | |
| 7,856,386 B2 | 12/2010 | Hazlehurst | |
| 7,856,453 B2 | 12/2010 | Malik | |
| 7,873,677 B2 | 1/2011 | Messing | |
| 7,925,579 B1 | 4/2011 | Flaxman et al. | |
| 7,933,819 B2 | 4/2011 | Dumas et al. | |
| 2001/0042785 A1 | 11/2001 | Walker et al. | |
| 2002/0091635 A1 | 7/2002 | Dilip | |
| 2002/0156720 A1 | 10/2002 | Chow | |
| 2002/0165745 A1 | 11/2002 | Greene et al. | |
| 2002/0165993 A1 | 11/2002 | Kramer | |
| 2003/0069780 A1 | 4/2003 | Hailwood et al. | |
| 2003/0101131 A1 | 5/2003 | Warren | |
| 2003/0135457 A1 | 7/2003 | Stewart | |
| 2003/0158928 A1 | 8/2003 | Knox et al. | |
| 2003/0225692 A1 | 12/2003 | Bosch | |
| 2003/0236728 A1 | 12/2003 | Sunderji | |
| 2004/0117302 A1 | 6/2004 | Weichert et al. | |
| 2004/0230516 A1 | 11/2004 | Crosthwaite | |
| 2005/0018249 A1 | 1/2005 | Miura et al. | |
| 2005/0144101 A1 | 6/2005 | Khandros | |
| 2005/0171833 A1 | 8/2005 | Jost et al. | |
| 2005/0187809 A1 | 8/2005 | Falkenhainer | |
| 2005/0246269 A1 | 11/2005 | Smith | |
| 2005/0262453 A1 | 11/2005 | Massasso | |
| 2006/0036954 A1 | 2/2006 | Satyadas et al. | |
| 2006/0116949 A1 | 6/2006 | Wehunt | |
| 2006/0143107 A1 | 6/2006 | Dumas et al. | |
| 2006/0195816 A1 | 8/2006 | Grandcolas et al. | |
| 2006/0230343 A1 | 10/2006 | Armandpour | |
| 2006/0253463 A1 | 11/2006 | Wu | |
| 2007/0022027 A1 | 1/2007 | Gupta | |
| 2007/0061254 A1 | 3/2007 | Blunck | |
| 2007/0067239 A1 | 3/2007 | Dheer | |
| 2007/0089047 A1 | 4/2007 | Joshi | |
| 2007/0130347 A1 | 6/2007 | Rangan | |
| 2007/0180380 A1 | 8/2007 | Khavari | |
| 2007/0244816 A1 | 10/2007 | Patni | |
| 2008/0080017 A1 | 4/2008 | Ishizuka et al. | |
| 2008/0082454 A1 | 4/2008 | Dilip | |
| 2008/0086403 A1 | 4/2008 | Dilip | |
| 2008/0086426 A1 | 4/2008 | Dilip | |
| 2008/0091591 A1 | 4/2008 | Egnatios | |
| 2008/0091593 A1 | 4/2008 | Egnatios | |
| 2008/0091600 A1 | 4/2008 | Egnatios | |
| 2008/0177848 A1 | 7/2008 | Wakhlu | |
| 2008/0189185 A1 | 8/2008 | Matsuo | |
| 2008/0208737 A1 | 8/2008 | Dilip | |
| 2008/0262901 A1 | 10/2008 | Banga et al. | |
| 2008/0275816 A1 | 11/2008 | Hazlehurst | |
| 2008/0288376 A1 | 11/2008 | Panthaki | |
| 2008/0288400 A1 | 11/2008 | Panthaki | |
| 2008/0301022 A1 | 12/2008 | Patel et al. | |
| 2008/0301023 A1 | 12/2008 | Patel | |
| 2008/0306846 A1 | 12/2008 | Ferguson | |
| 2009/0006582 A1 | 1/2009 | Daswani | |
| 2009/0024505 A1 | 1/2009 | Patel | |
| 2009/0030771 A1 | 1/2009 | Eder | |
| 2009/0048999 A1 | 2/2009 | Gupta et al. | |
| 2009/0112753 A1 | 4/2009 | Gupta et al. | |
| 2009/0234466 A1 | 9/2009 | Kunze | |
| 2009/0276359 A1 | 11/2009 | Panthaki | |
| 2010/0030687 A1 | 2/2010 | Panthaki | |
| 2010/0063896 A1 | 3/2010 | Rose | |
| 2010/0094878 A1 | 4/2010 | Soroca et al. | |
| 2010/0121677 A1 | 5/2010 | An et al. | |
| 2010/0205065 A1 | 8/2010 | Kumar | |
| 2010/0205079 A1 | 8/2010 | Ferguson | |
| 2010/0217662 A1 | 8/2010 | Ramer et al. | |
| 2010/0299286 A1 | 11/2010 | Dilip | |

OTHER PUBLICATIONS

International Search Report and Written Opinion from International application No. PCT/US11/55767, issued Mar. 7, 2012.

International Search Report and Written Opinion from International application No. PCT/US11/056839, issued Mar. 8, 2012.

International Search Report and Written Opinion from International application No. PCT/US12/22022, issued May 8, 2012.

WORK LIST FOR "USER'S NAME"

FRAUD QUEUE  WORK ITEM LIST
| WORK ITEM ID | APPLICATION ID | OPEN DATE | STATUS | ASSIGNED TO |
|---|---|---|---|---|
| 1234567890 | 22334455677 | 24TH JULY | OPEN | |
| 1234567890 | 22334455677 | 24TH JULY | WIP | JOHN SMITH |
| 1234567890 | 22334455678 | 24TH JULY | OPEN | |

WORK ITEM DETAILS
WORK ITEM ID            1234567890
APPLICATION ID          22334455677
REASON CODE DETAILS     63 - IDENTITY UNCONFIRMED
ADDITIONAL DETAILS      SSN NOT VALID FOR CUSTOMER NAME
USER ACTION DETAILS

WI RESOLUTION   SELECT BOX

[SUBMIT]

APPLICATION DETAILS
LIST OF WORK ITEMS RELATED TO SELECTED APPLICATION 1) 1234567891 --- (RESOLVED)
2) 1234567895 --- (OPEN)
3) 1234567896 --- (OPEN)

USER ACTION DETAILS

APPLICATION RESOLUTION SELECT BOX

[SUBMIT]

FIG. 59

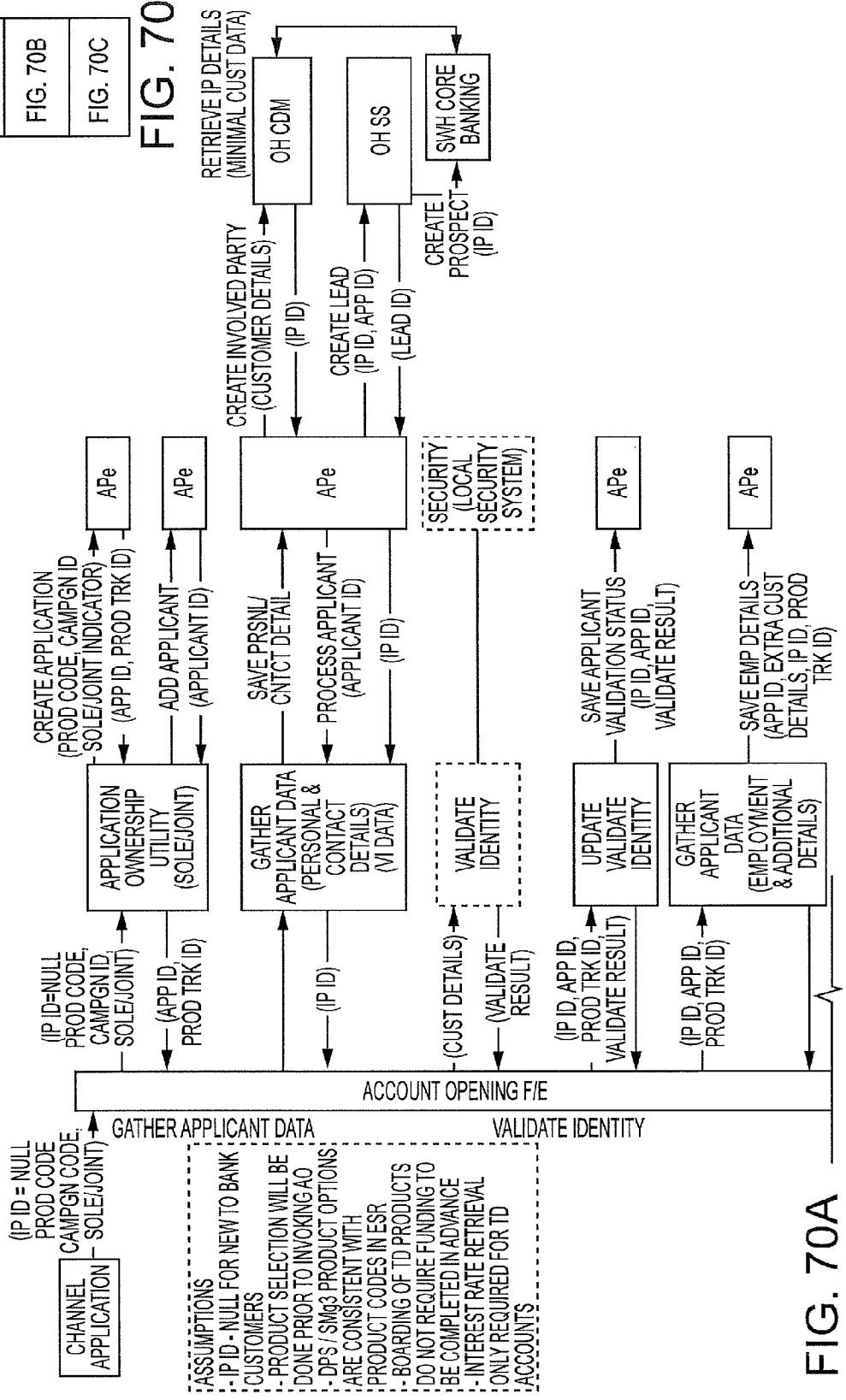

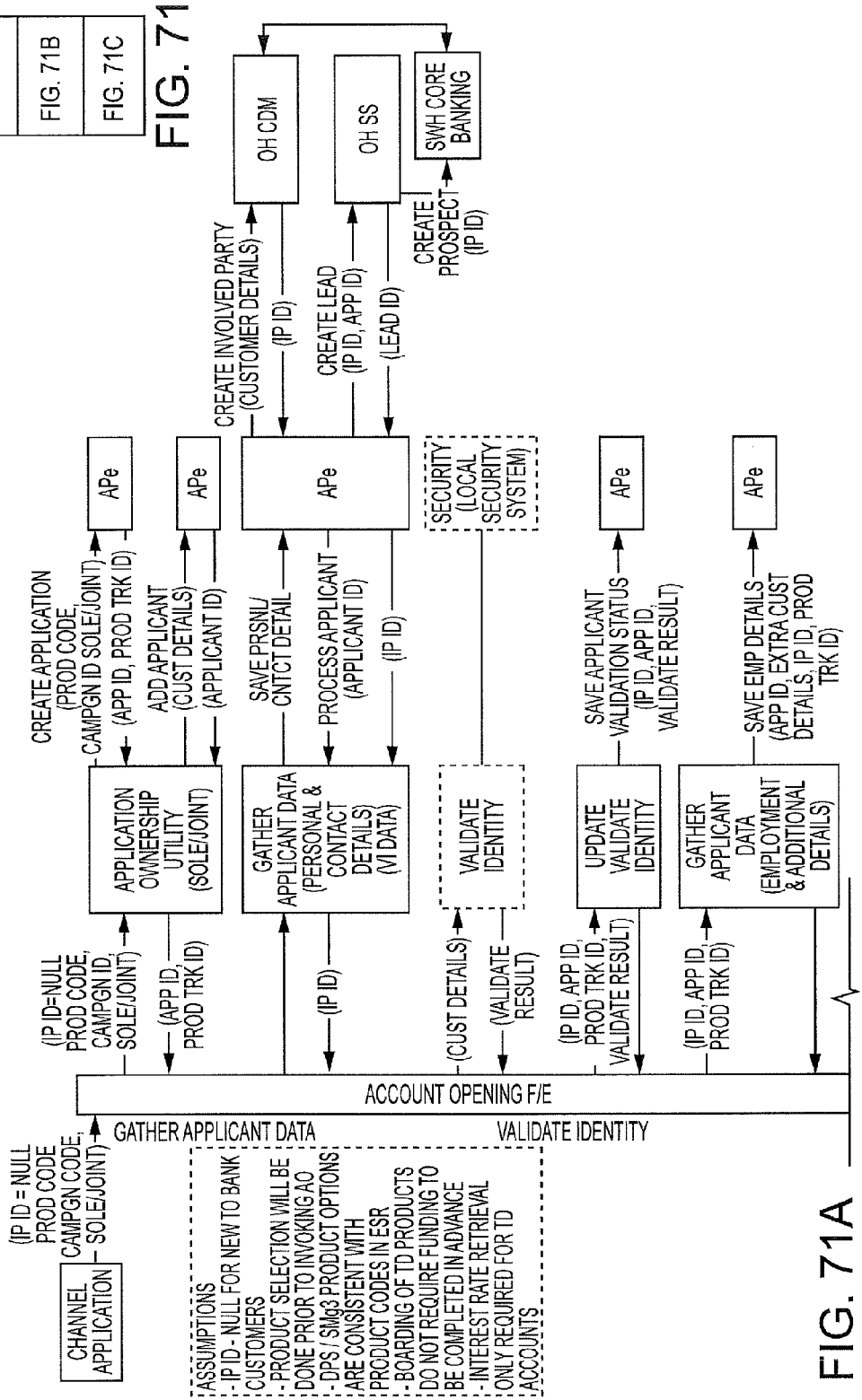

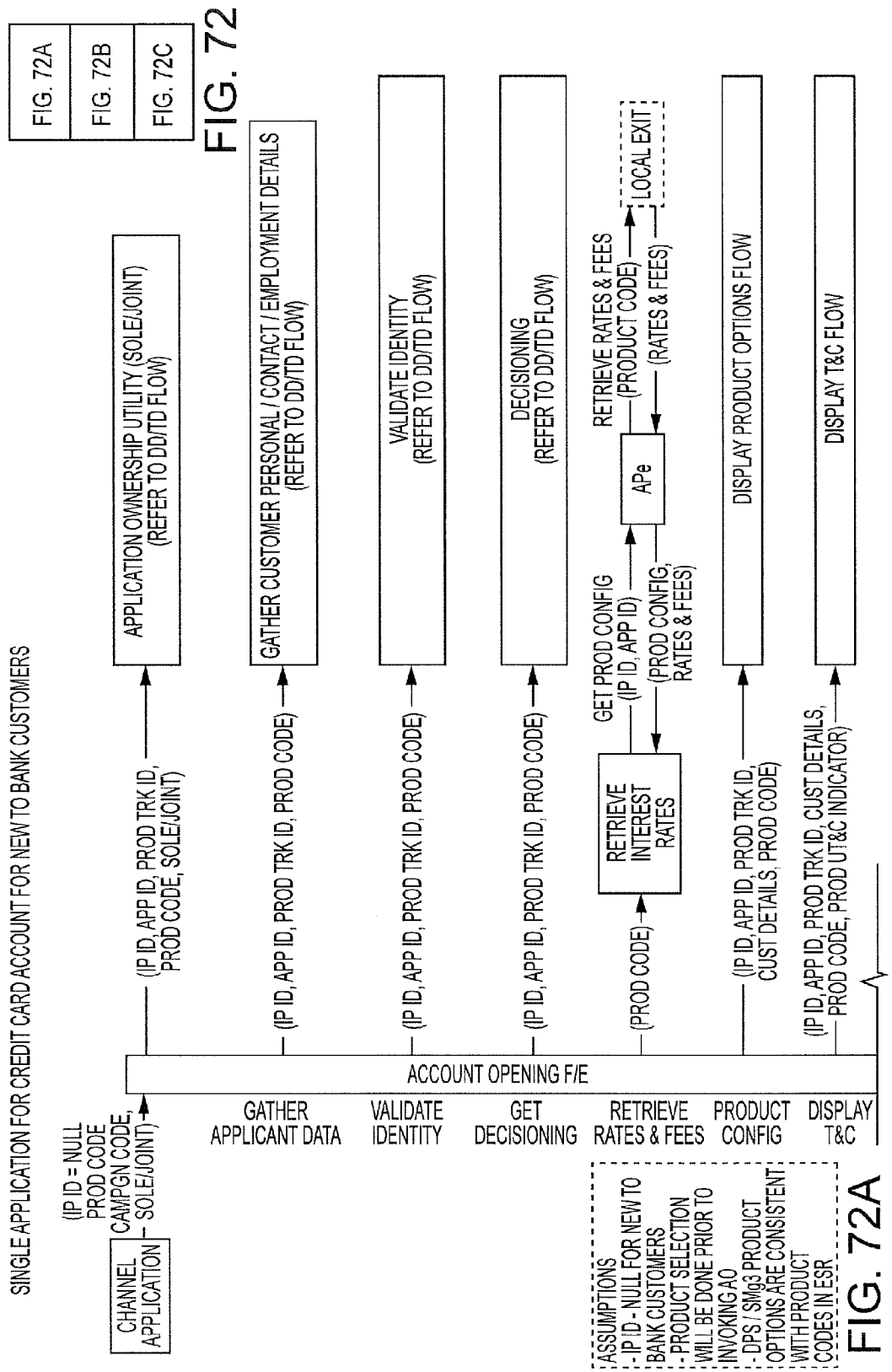

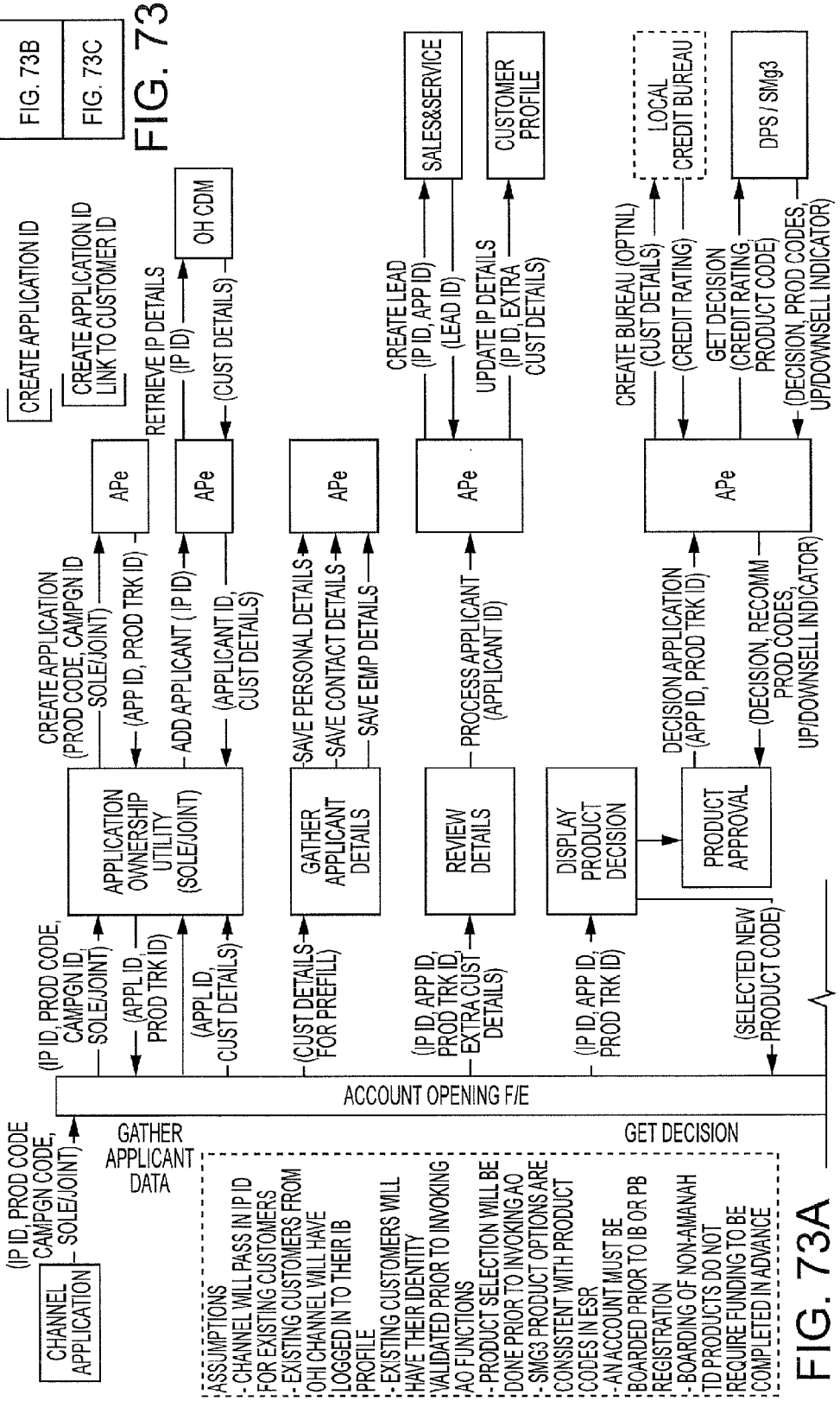

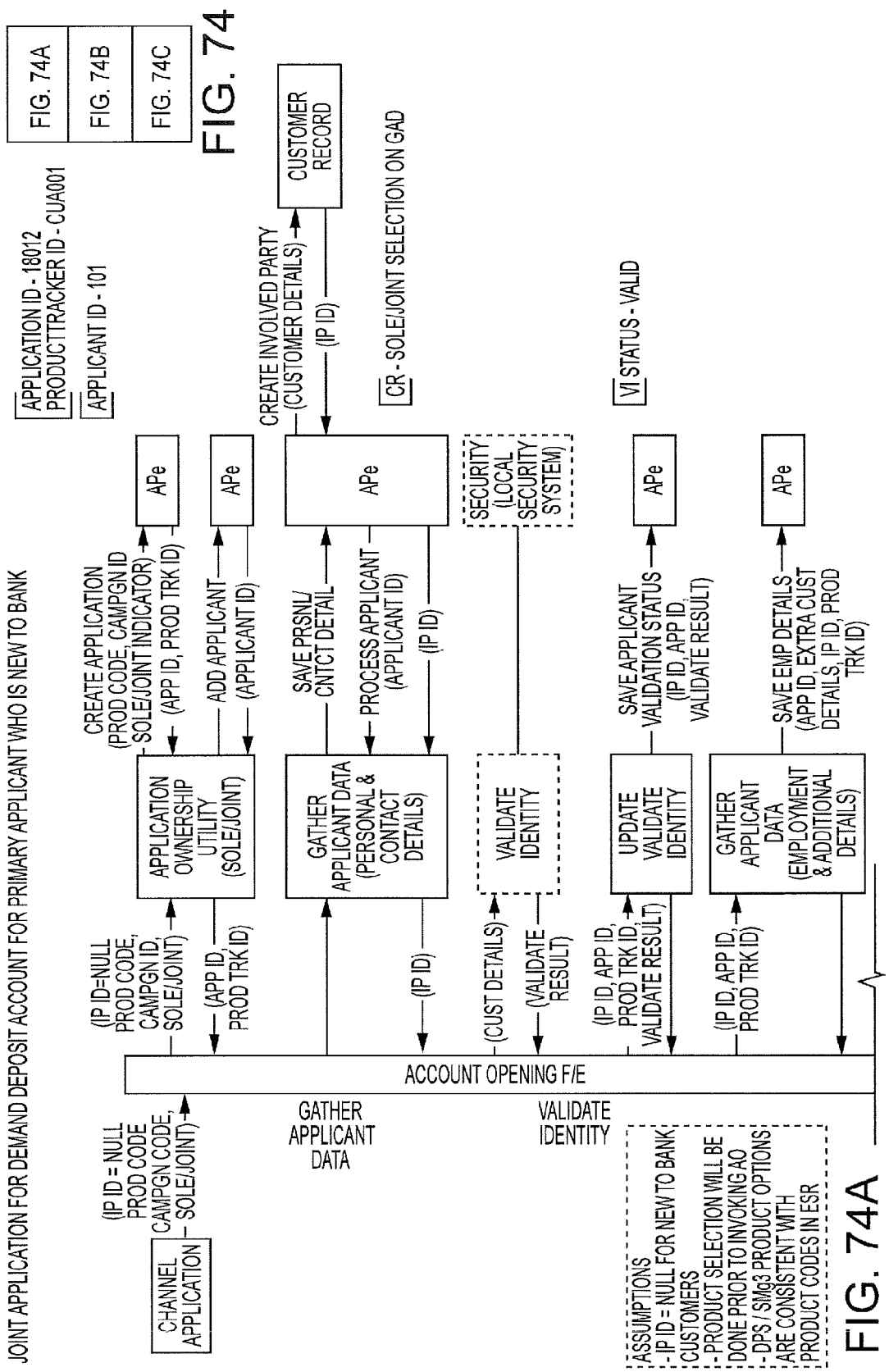

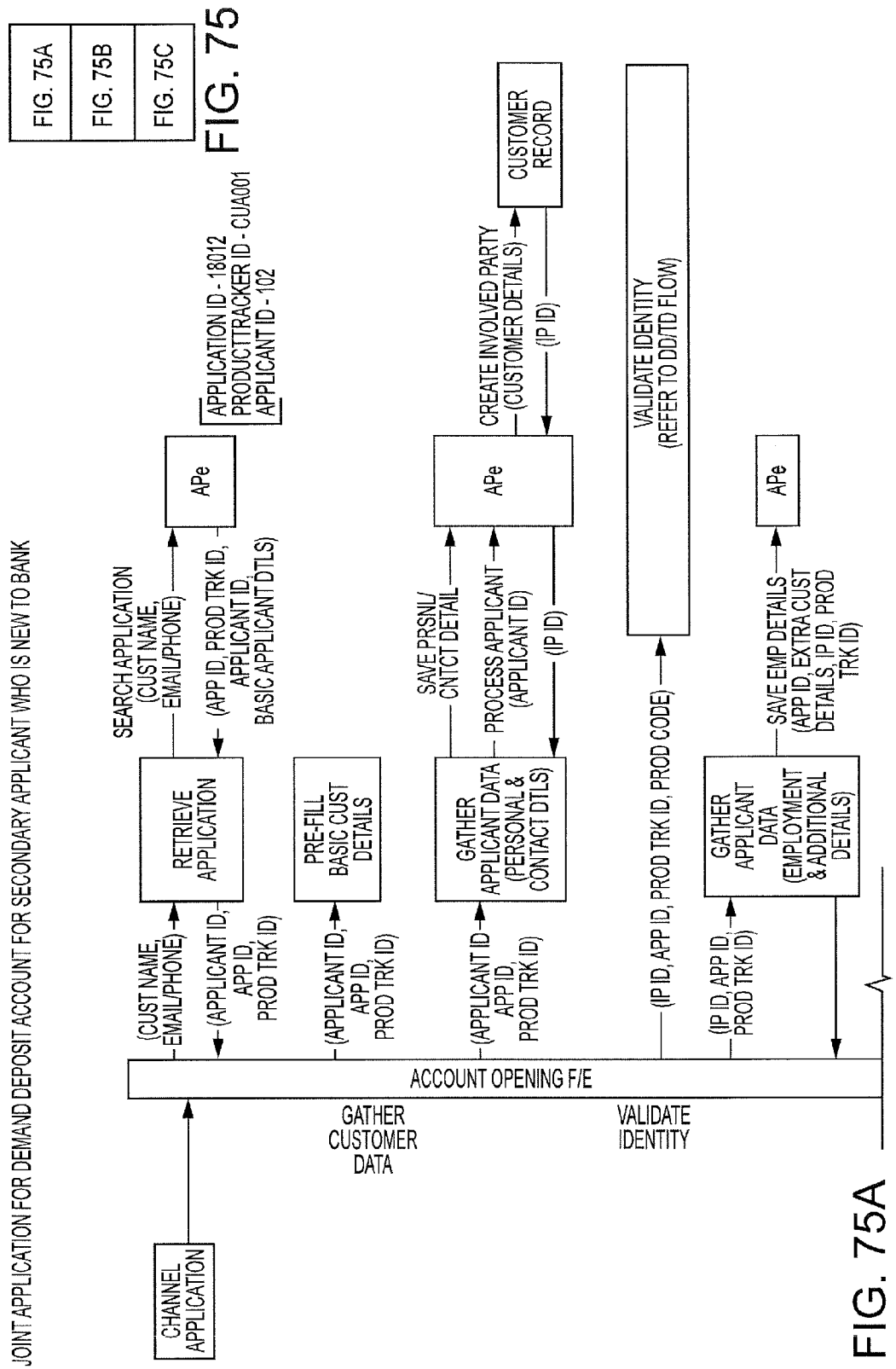

ACCOUNT OPENING COMPUTER SYSTEM ARCHITECTURE AND PROCESS FOR IMPLEMENTING SAME

RELATED APPLICATIONS

This application is a continuation of PCT Application No. PCT/US2011/037143, filed May 19, 2011, entitled "Account Opening Computer System Architecture and Process for Implementing Same," which claims the benefit of, and priority to, the following applications: U.S. Provisional Application No. 61/347,199, filed May 21, 2010, entitled "Account Opening Computer System Architecture and Process for Implementing Same"; U.S. Provisional Application No. 61/391,815, filed Oct. 11, 2010, entitled "Computer Architecture and Process for Application Processing Engine"; U.S. Provisional Application No. 61/405,398, filed Oct. 21, 2010, entitled "Account Opening Metrics"; U.S. Provisional Application No. 61/407,210, filed Oct. 27, 2010, entitled "Integrated Customer Communications Module (ICCM)"; and U.S. Provisional Application No. 61/435,000, filed Jan. 21, 2011, entitled "Account Opening Flow Configuration: Navigation Interceptor and Portlet Wiring." All of the above applications are incorporated herein by reference in their entirety.

BACKGROUND

While various electronic banking systems and methods have been described, they are often characterized by business rules that are hard-coded by into a single solution by information technology (IT), long lead times required to support business process changes, rules that cannot be reused, and frameworks that do not support 'test and learn' capabilities. Channels are managed separately, communications are based on organization (not customer) preferences, content is disparate across channels and countries, and there is heavy reliance on high-cost channels. Oftentimes, customers are not able to open accounts in call centers, cannot complete credit card applications in a single visit, and/or cannot start an application in one channel and finish it another. A variety of different processes are used to identify customers, and different sets of screens and systems are used for customer and staff users. There is not a consistent user experience. Only limited types accounts can be opened online, and in some cases, new customers cannot open accounts online at all.

Thus, there is a need in the art for systems and methods, for example for account opening, that support both flexibility and global consistency. Such systems and methods can address the above problems, standardizing processes for an enhanced customer experience and reducing need for IT support and other development resources.

SUMMARY

The present invention provides, in alternative embodiments, computer systems and computer implemented methods for account opening. Using an integrated, component-based technology platform, globally standardized, business configurable account opening processes are coded in the core separate/decoupled from the user interface screens and are manageable by business staff without IT intervention. The processes are preferably the same for all channels, and have save and retrieve/pause and resume capabilities for continuation on any channel. Channels are coordinated, and increased use of lower cost channels is supported.

The framework of the present invention provides flexibility for a business to move different components (groups of functional capabilities) within the process sequence. The framework also provides for customization capabilities to meet local and regional legislation/regulations as well as global business criteria. Rules are managed by the business, there is a greater response to business needs and shortened cycle times, rules and processes may be reused across products, functions, and geographies, and processes can be rapidly championed/challenged to optimize user experience. Thus, an organization's global footprint, economies of scale, and local expertise can all be leveraged for the benefit of customers globally.

In one aspect the invention provides a computer system architecture decoupling the user interface from an underlying computer executed process for opening an account for a customer. The computer system architecture includes a front end user interface platform capturing application data and including at least one business interface receiving local business specifications for at least one of application data elements and account opening processes performed by, and decoupled from, predetermined application specific core systems. The computer system also includes an application processing platform accessing configurable business rules and comprising an application processing engine performing straight-through processing of the application data including managing the validation of the user, managing the configuring of at least one product, managing the assembling of terms and conditions relevant to the at least one product selected, managing the decisioning of the application, and transmitting the processed application data.

The computer architecture further includes a customer communications module managing the generating and sending of customer communications documents; a queue management system supporting queues on the application data outside of the straight-through processing; a funding module comprising a payment processing engine executing at least one of an account funding instruction and a fee instruction.

The computer architecture still further includes a plurality of core systems comprising a customer data management system storing customer data, a decision engine decisioning the application, a cards product system supporting one or more card products, a core banking product system supporting deposit accounts, and a sales services system managing customer interactions, said plurality of core systems operatively communicating with said customer communications module via at least one core system interface protocol.

In another aspect, the invention provides an end-to-end component based global computer system architecture decoupling the user interface from an underlying computer executed process, comprising a globally consistent front end user interface platform capturing application data and including at least one processing module defining at least one of application data elements and process flow instructions responsive to and decoupled from predetermined application specific core systems; a globally consistent application processing platform accessing configurable business rules and comprising an application processing engine processing the application data including managing the validation of the user, managing the configuring of at least one product, managing the assembling of terms and conditions relevant to the at least one product selected, managing the decisioning of the application, and transmitting the processed application data; a globally consistent customer communications module managing the generating and sending of customer communications documents; a globally consistent queue management system supporting queues processes that utilize the application data; a globally consistent funding module comprising a payment processing engine executing at least one of an account funding instruction and a fee instruction; and a plurality of core systems comprising a customer data management system storing customer data, a decision engine decisioning the application, a cards product system supporting one or more card products, a core banking product system supporting deposit accounts, and a sales services system managing customer interactions, said plurality of core systems operatively communicating with said globally consistent customer communications module via at least one core system interface protocol.

In one or more embodiments, the front end user interface platform provides the same process flow instructions responsive to the predetermined application specific core systems for the life of the application.

In some embodiments, front end user interface platform is segmented into multiple portlets that are chained together to create a configurable journey with respect to a predetermined application of at least one of the application specific core systems.

In certain embodiments, front end user interface platform executes, in cooperation with said globally consistent application processing platform, one or more of the following use-cases, including: present product; request statements; request ATM card; maintain involved party; validate identity through third party systems; validate identity; accept terms and conditions; execute funding; retrieve and action decision; save application; retrieve application; search application; open account; activate account; archive application; and maintain application.

In some embodiments, the computer architecture further comprises user interfaces including components, content, and links. The components may be further broken down into data structures, layout including attributes, view components, links and validation rules for individual fields within the component. The content provides defined content, the links enable the user to perform actions, and the view components are deployable as the content. Thus, the front end user interface platform provides flexibility when interfacing with the user interface.

In some embodiments, the application processing platform including the application processing engine processes application data received from both internal and external sources, packages at least a part of the application data and transmits the packaged data to a decisioning system, and analyzes the application data to generate a set of decisions.

In further embodiments, the application processing platform including the application processing engine tracks the application processes, provides a status of all applications, and tracks historic activity.

In still further embodiments, application processing platform including the application processing engine executes one or more of the following processes: saves the applications each time the application processing engine is called; enables the applications to be retrieved using predetermined application data; enables a search operation to be initiated to search for existing applications to continue the application process; enables the suspending of the applications and restarting of the applications; and interfaces with the applications without being dependent on application specific interfaces.

In some embodiments, application processing platform controls the application processes, centrally tracks the application processes, centrally stores the application data, and interfaces with supporting systems and queue management.

In certain embodiments, the application processing platform centrally stores the application data including reference data comprising static values used by at least one of said plurality of core systems.

In certain embodiments application processing engine interacts with sub-system applications in their native form, without being dependent on application-specific interfaces.

In various embodiments, the application processing platform including the application processing engine performs at least one of the following functions comprising: duplicate data at point of application from one or more sub-systems to maintain an enduring application system of record; call other systems using fixed format messaging or service contracts; perform business configurable actions as part of a macro service operation; perform macro services based on one or more of entity ID, channel ID, product group ID, and business process ID; transmit an application ID, reason code, and entity ID to the queue management system; and initiate request to add one or more customer, account, or embosser records in the cards product system.

In some embodiments, the application processing platform including the application processing engine comprises one or more of the following capabilities: application and product breakdown; determine or designate statuses including at least one of up sell, down sell, and cross sell; bundle product applications; multi-product applications; multi-party applications; single applications; service configuration; entity extension; progress logging; support; reports; and system maintenance.

In certain embodiments, the application processing platform including the application processing engine automatically maintains the state of the application and products within the application; enables the application process to be paused and resumed; and enables the application to be saved and retrieved in the same or a different channel to continue the application process.

In certain embodiments, customer communications histories and pointers to application data including document ID, timestamp, and basic data elements are stored in the application processing platform, and templates are stored in a business development environment, for at least one of assembling and generating a customer communications document by the customer communications module.

In some embodiments, the computer architecture further comprises business processes separate from screens and manageable by business staff, said business processes and screens configurable by the business in any order.

In some embodiments, the computer architecture further comprises an automated agent running using background processes and interrogating systems enabling at least one of aging of applications off the global computer system and the queues, sending one or more customer communications, and escalating problems.

In some embodiments, the application processing engine further enables cross channel capability, enabling the application processes to be started, paused and restarted by a plurality of at least one of different users and processes.

In another aspect, the invention provides global computer system architecture decoupling the user interface from underlying business configurable computer executed processes, comprising a front end user interface platform capturing application data and providing a flexible and dynamic sequence of screens responsive to configurable business rules coded in the core separate from the screens and manageable by business staff; an application processing platform containing the configurable business rules and comprising an application processing engine controlling the application processes, centrally tracking the application processes, centrally storing the application data, and coordinating the interaction of a plurality of core supporting systems including a customer communications module generating, managing, and delivering customer communications documents based on the application data and business configurable templates; a customer data management system storing customer data; a cards product system supporting one or more card products; a core banking product system supporting deposit accounts; a sales services system managing customer interactions; and a decision engine decisioning the application, said plurality of core systems operatively communicating with the application processing platform via at least one core system interface protocol without being dependent on application specific interfaces; a queue management system supporting queues for exception processing; and a funding module comprising a payment processing engine executing at least one account funding, fee, or balance transfer instruction.

In yet another aspect, the invention provides a computer implemented method for opening an account for a customer and decoupling the user interface from an underlying computer executed process, comprising capturing application data and including at least one business interface receiving local business specifications for at least one of application data elements and account opening processes performed by, and decoupled from, predetermined application specific core systems; accessing configurable business rules and performing straight-through processing of the application data including managing the validation of the user, managing the configuring of at least one product, managing the assembling of terms and conditions relevant to the at least one product selected, managing the decisioning of the application, and transmitting the processed application data; managing, and storing customer communications documents; managing queues on the application data outside of the straight-through processing; executing at least one of an account funding instruction and a fee instruction; and storing customer data, decisioning the application, supporting one or more card products, supporting deposit accounts, managing customer interactions, and operatively communicating with the customer using at least one core system interface protocol.

BRIEF DESCRIPTION OF THE DRAWINGS

FIG. 8 illustrates an exemplary process for a new customer through an Internet Channel.

FIG. 9 illustrates an exemplary process for a new customer through a Branch/Call Center Channel.

FIG. 10 illustrates an exemplary process for an existing customer through an Internet Channel.

FIG. 11 illustrates an exemplary process for using hurdle questions.

FIG. 12 illustrates an exemplary process of Cross Sell/Up Sell/Down Sell opportunities.

FIGS. 23 and 24 are process diagrams showing exemplary Terms and Conditions scenarios when a wet signature is/is not required.

FIG. 25 is a process diagram showing exemplary Terms and Conditions scenarios for different customer channels.

FIGS. 57-59 are exemplary diagrams of Queue Management System (QMS) and Workflow Services (WFS) integration.

FIG. 70 is an exemplary end to end system interaction diagram of a single application for a demand deposit account for a new to bank customer.

FIG. 71 is an exemplary end to end system interaction diagram of a single application for a term deposit account for a new to bank customer.

FIG. 72 is an exemplary end to end system interaction diagram of a single application for a credit card account for a new to bank customer.

FIG. 73 is an exemplary end to end system interaction diagram of a single application for a demand deposit account for an existing bank customer.

FIG. 74 is an exemplary end to end system interaction diagram of a joint application for a demand deposit account where the primary applicant is a new to bank customer.

FIG. 75 is an exemplary end to end system interaction diagram of a joint application for a demand deposit account where the secondary applicant is a new to bank customer.

FIG. 76 is an exemplary end to end system interaction diagram illustrating account funding from a new external account.

FIG. 77 is an exemplary end to end system interaction diagram illustrating account funding from an internal account transfer.

DETAILED DESCRIPTION

Figure 1:
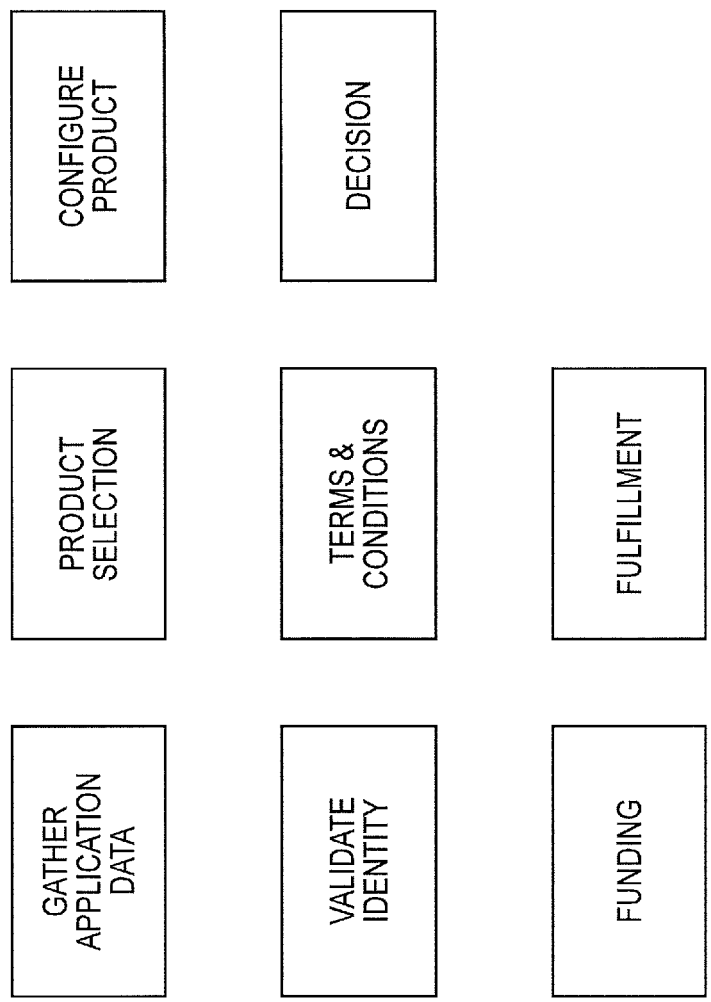
FIG. 1 shows an exemplary diagram of the Account Opening (AO) Milestones according to some embodiments of the invention.

Before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including equivalent constructions to those described herein insofar as they do not depart from the spirit and scope of the present invention.

For example, the specific sequence of the described process may be altered so that certain processes are conducted in parallel or independent, with other processes, to the extent that the processes are not dependent upon each other. Thus, the specific order of steps described herein is not to be considered implying a specific sequence of steps to perform the process. In alternative embodiments, one or more process steps may be implemented by a user assisted process and/or manually. Other alterations or modifications of the above processes are also contemplated. For example, further insubstantial approximations of the process and/or algorithms are also considered within the scope of the processes described herein.

In addition, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

OVERVIEW

The present invention provides, in alternative embodiments, computer systems and computer implemented methods for account opening. Specifically, various embodiments describing a computer system architecture for account opening, and methods of implementing that architecture, are provided.

The Account Opening system may advantageously be used to support multiple customer segments as well as staff users, including but not limited to the following: Personal Financial Services (PFS) and Retail Commercial Business (CMB) Customers; New and Existing Customers; Staff Channel Users (e.g., branch or call center staff); Internet Channel Users; and Management and Analytics (Metrics/Business Intelligence).

In some embodiments, the underlying technology platform supports the implementation of a common process while also supporting local variations. Preferably, the framework and/or architecture provides for customization capabilities to meet local and regional legislation/regulations without changing the spirit of the process. This framework allows for quick time to market of new products while enforcing policies and processes.

The systems and methods of the invention are simple and intuitive, guiding the customer to product information, through product applications, to fulfilment with ease, providing any guidance required along the journey, without the customer having to deviate from the application process. In some embodiments, the invention minimizes or eliminates the need for user manuals that new staff would normally use to learn about systems, as well as the need for referrals to staff to follow up manually.

Preferably, decisions to approve or reject product applications are made instantly. In some embodiments, the customer can open the product(s) they want on their first contact with the organization. In various embodiments, credit risk, fraud, and/or compliance rulers may be automated, with minimal or no manual intervention.

The invention supports Straight Through Processing (STP), streamlining processes and pursuing completion of all steps associated to an account opening session in the same "session." In some cases, new to bank customers can be boarded in less than 10 minutes, as opposed to 7-10 days, using existing methods/systems.

Herein, the terms business and entity are used interchangeably. A business or entity may be part of a larger organization. For example, a business or entity may be at a particular site of larger organization such as a bank, financial institution and/or other type of company or organization.

Examples herein refer mostly to finance; however the systems and methods of the invention may be used in other applications and/or fields.

In some embodiments, the computer system architecture supports multiple channels (staff and customer, with configurable differences), for example Internet, Branch, Call Center, and Kiosk, as well as multiple back-end systems of similar and/or different types. Differences between customer and staff applications for the same function are minimized, or preferably eliminated. For example, where the staff channel may require extra functionality, it may be controlled through entitlements, keeping the common functionality the same. In some embodiments the invention also advantageously supports cross-channel applications.

Preferably, the invention supports customer Self Service 24/7, allowing the customer to do business with the organization whenever they want to, and emphasizing the benefits and ease of using self-service channels ahead of staff channels. In some embodiments, features developed to enhance the customer self-service experience may, for example, also be used in the staff facing channels with minimal or, preferably, no change.

Preferably, the invention provides save and retrieve capabilities for continuation across any channel.

The architecture/framework supporting the processes of the invention provides flexibility to move different components within one or more process sequences. As defined by the business, components are groupings of functional capabilities, such as Order Check Book.

In some embodiments, the invention is green, thus reducing cost and environmental waste. In other words, the systems and methods of the invention, for example, do not require the customer to complete any paper-based applications, do not issue a paper-based welcome pack, empower the customer to download and save relevant product information, send information by e-mail, etc. 'Paperless' solutions are implemented where possible.

In some embodiments, the systems and methods support multiple products in multiple lines of business of an organization. For a financial organization, products may include, for example, Savings, Checking, Term Deposits, Overdraft, Credit Cards, Amanah (for Islamic banking), Bundled Products, Premier, Secure Card, and Select Credit. Non-limiting examples of lines of business include Personal Financial Services (PFS) and Retail Commercial Business (CMB). Auxiliary services may include, for example, Debit/ATM Card Ordering, Check Book Ordering, Funding of new Account, and Metrics/BI.

The customer can select options to include with 'base' products to enable customization and personalization of products. In some embodiments, the customer may be given the ability to select multiple products for opening in one instance.

The customer may be new or existing. The system is not required present a list of existing accounts when an existing customer proceeds to open a new account.

The customer may apply to open a sole or joint/multi-party account. The maximum number of joint applicants is preferably configurable based on the host system boundaries.

The Components of the invention provide a 'capability' or set of capabilities that businesses need to control or manage to operate their Target Business Model (TBM). These capabilities are not limited to a single product, customer segment or business. A component is highly configurable to meet multiple business needs and a wide variety of functions.

Components are characterized in that they: are built and deployed to a consistent design philosophy; have globally aligned usage; are of sufficient scope to be recognized by business and IT; operate in essence as a black box; can be improved independently of other components; and are governed by a design license process.

In one or more embodiments, components provided include: Orchestration (Common Processing Services CPS/Application Processing Engine APe), Metrics, Identity and Validation, Audit Capabilities, Communications, Queuing and Work Presentment, Decisioning, Front End Channel Framework, Entitlements, and Payments.

In some embodiments of the invention, the invention advantageously provides integrated systems and methods that give a business the opportunity to make their own changes/specifications to the account opening process and technology, without going to Information Technology (IT) for resources or deployments to support the changes. The ability for business users to manage on-screen, page, communications and system content to make updates or changes to verbiage and design new pages or screens without using IT programming resources is provided. This can enable greater response to business needs and shorter cycle times, as well as lower costs of development and deployments. Front end capabilities allow journeys to be assembled and tailored based, for example, on proposition, channel, and local variances (e.g., language preferences or regulatory and cultural requirements).

Using an integrated, component-based technology platform, globally standardized, business configurable account opening processes are coded in the core separate from (e.g., are decoupled from) the user interface screens and are manageable by business staff without IT intervention.

The systems and methods of the present invention, while described in the context of use with Account Opening (AO), may also be used by other areas, such as Account Servicing, and by other parts of the organization, such as Insurance, Lending, Private Bank, etc.

The invention works to standardize content and journeys across the organization while accommodating variances in local processes.

Standardization of solutions and the components that are used to support the solutions can significantly reduce the range of duplication in effort expended on a Group wide basis. Wherever possible, core components are re-used using configuration to support a wide range of propositions and services. Business rules and processes can be configured and shared across products, services, channels and geographies. This permits the definition of a process to take place once and be leveraged repeatedly.

Front End capabilities provide a flexible presentation layer of AO functions and components. The front end allows for tailored screens and content management to enable reuse and standardization. Preferred journeys may be created for different channels, products, and entities. By leveraging a common front-end, the organization can test, learn and share best practices among entities, saving costs by not reinventing the wheel. If business rules change, or the business wants to 'champion/challenge' a process, it can do so through a simple, business maintainable configuration that does not require recoding.

Success in one entity can be replicated in a cost effective manner quickly across a group using a single standard 'Foundation' set of AO technologies coupled with standard processes. In effect all are operating in the same way and so the incremental change is fully understood and can be measured and applied rapidly.

Where propositions and business processes are being updated, the design and qualities are held to a set of target design principles. These include multi-channel capabilities where the consumer is offered a joined up experience regardless of which channels they use to manage their relationship with the bank.

An additional aspect of flexibility of the present invention involves the support for local specific and/or custom data elements. The AO system provides the ability for business defined data elements to be passed to the AO system. These fields may be utilized by business or regulatory purposes that are not required at the global level. If an element is deemed to be globally applicable, it may added to the AO system.

In some embodiments, the flexibility of the present invention allows business users to move components around into favored flows, depending on the local business preferred conditions, with minimal turn-around time and without direct IT intervention.

In some embodiments, components may be delivered on a regional basis. Regional business teams may assemble the components to deliver a standard business process with the flexibility to adjust the flows based upon regional regulatory or cultural differences. This re-assembly, when coupled with out-of-box metrics, can enable rapid business optimization, which accelerates profit growth.

Each country or region can migrate to the complete AO system over a series of steps. This means that a country can take a sub-set of the features and processes and implement them alongside legacy solutions. Components should be built with little dependency on each other. This provides a reduced change investment while generating initial benefits.

In summary, the invention provides a set of business-designed common technology components that can support any business proposition requirement or customer experience. As work streams progress, more assets may added to the global business functions. Similarly, the global components may need enhancing to support new unique requirements as the work streams develop. The result is a set of configurable standard components and business functions that can be re-used for more and more purposes. World class processes, customer experience, customer service, and features can beneficially be achieved independently in each entity.

Milestones

The Account Opening process comprises one or more steps, also referred to herein as activities or milestones. As used herein, milestone is a term that is used to describe a distinct area of functionality within account opening. For instance, Gather Application Data is the milestone covering the functionality related to the gathering of all data required to support a customer application to open a new account. Within a given Milestone, the functionality may be further split into components.

The following eight AO Milestones capture the core exemplary capabilities provided by the Account Opening invention according to some embodiments. These milestones are shown schematically in FIG. 1.

Gather Application Data
  Gathering and capturing applicant's details
  Involves searching for customer data, invoking the creation of prospects where needed, as well as capturing application details
Validate Identity
  Verification of prospective or existing customers; may involve external systems
Decision
  Ability to interface with decisioning systems in order to review customer/product acquisitions
  Ability to approve/decline or underwrite customer/product acquisitions
Terms and Conditions
  Includes retrieval and presentment of Terms and Conditions and Disclosures, passive/non-passive acceptance of these articles, and communication (including printing) if required
Product Selection
  Selecting a product that the customer wishes to open
Configure Product
  Captures details required to configure selected products (as input to the fulfilment Milestone)
Funding
  The ability to fund the new account, either by internal or external sources, including cash, check, and credit card funding
Boarding and Fulfilment
  The process of boarding an account in the appropriate product system and generating the fulfilment materials for a new account, such as generating Internet Banking credentials, ordering OTP tokens, generating Telephone Banking credentials, ordering Debit cards, etc.

Preferably milestones may be arranged in any order and can be utilized in multiple flows. In practice, some milestones may have one or more entry criteria (e.g., a mandate that a specific event/state is achieved) that limit its ability to be moved within the process (e.g., a user cannot select product options until they've been offered product options). However, as long as the exit criteria for the preceding milestone and the entry criteria for moved milestone are met, it is a valid change.

A milestone may be satisfied either directly or may require a new business process to be initiated. This sub-flow may be synchronous or may be allowed to run in parallel.

Each milestone frames a discrete area of account opening functionality and within this, the milestones are further split into "components". The components are the more granular, lower level parts that enable the account opening process to run from end-to-end.

Components do not necessarily belong explicitly to a single milestone, as they are distinct services that perform functions that may happen in different parts of the process or maybe even in separate work streams outside of account opening.

In some embodiments, global configurable standard components and business functions may include one or more of: business configuration data, customer data, identity and validation, communications, audit capabilities, metrics, payments, queuing and work presentment, front-end channel framework, orchestration (CPS) decisioning, entitlements, and IT developer platform (e.g., R2 and Gold stacks).

In one aspect, the power of the component framework lies not in what the components do individually, but in how they can work together. For example, in the process flow to View and Accept Terms and Conditions, several components are assembled to create a process flow for customers to view and accept a newly changed or updated account agreement or policy agreement. Exemplary process flow steps may be as follows, with component invoked indicated in parentheses: Staff or customer clicks on 'Save Application' button during the middle of an AO journey (Front End); Save and Retrieve service is run (CPS/APe); Retrieval code is generated (CPS); Communication request is sent (CPS); Communication is delivered by email (Communications); Customer receives email and follows instructions to retrieve application, accessing saved application by entering code on screen (Front End); Customer authenticates (ID&V); Customer completes the process flow (CPS and Front End).

The milestones are the 'building blocks' of the account opening process, and they can be presented in whichever order the entity requires. The order may be different for each product or channel.

It is within the account opening milestones that these components are being identified, but their scope is not limited to account opening, as there may be a number of use opportunities identified elsewhere. For example, there is a component of AO called Order Check Book, which is considered a component of Configure Product. This function could also be used, for example, in account servicing, if an existing customer were to phone up and request a check book on an existing account. Another example is the Bank-to-Bank transfer function when funding a new account. This functionality could also be used, for example, in account servicing. Ability for re-use in other areas outside of account opening is a feature of these component functions.

A degree of flexibility is built into the positioning of the components in the account opening end-to-end process to allow different entities to arrange components into different flows, depending on local business practice/knowledge.

The flexibility of the application preferably allows Business users to move components around into favored flows, depending on the local Business preferred conditions. The milestones (steps) of a journey will usually be presented sequentially. However, preferably the invention provides an ability to access any milestone from any other milestone, enabling non-sequential navigation. The organization/entity has the ability to create the links and rules that take the user from milestone to milestone depending on user selection and/or user input.

In some embodiments, the invention provides for "Test and Learn" scenarios, whereby different approaches may be tested, for example to see which flow produces the best sales conversions/results, so that processes are fine-tuned to maximize potential sales.

If an issue is unresolved when the application is submitted, the application may be pended and enter the queuing process.

The following scenarios are some examples of the kind of flexibility that the invention provides. They are, however, just examples; many other permutations are possible. Preferably the Business is given the tools to allow them to maintain this flexibility themselves.

Figure 2:
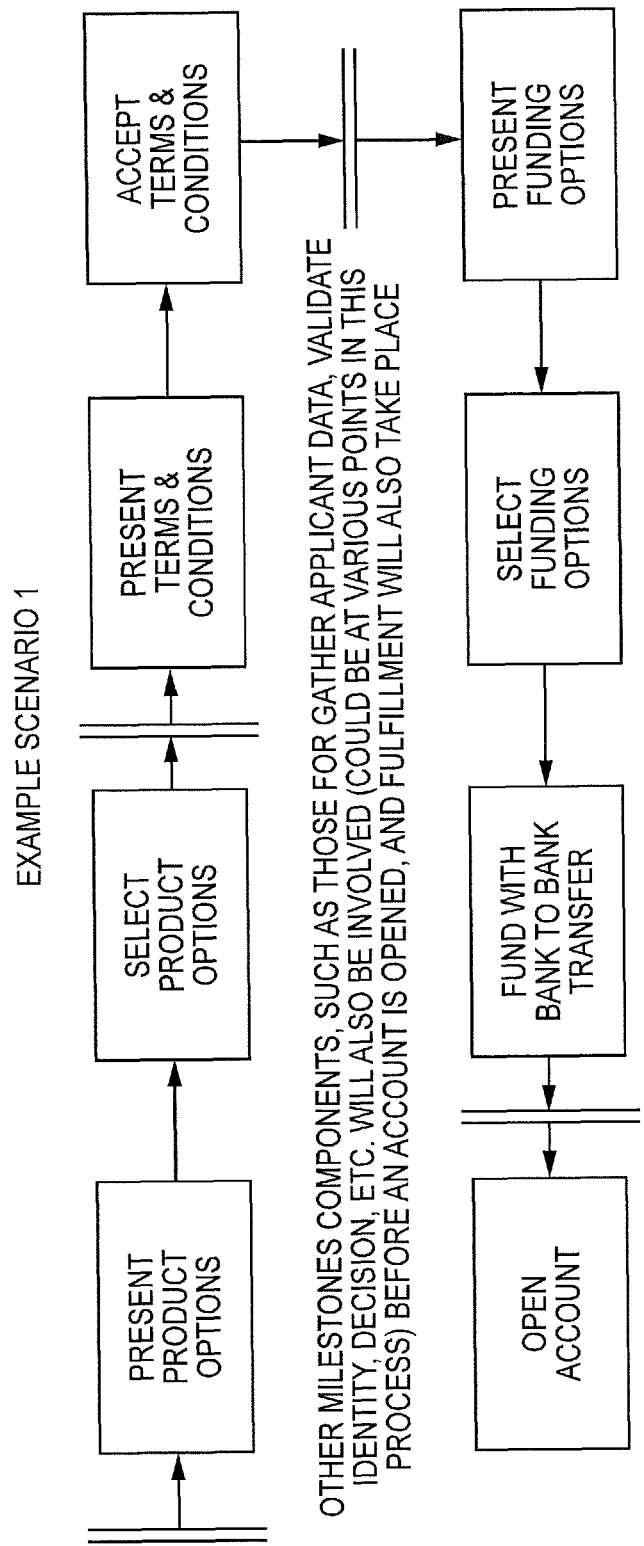
FIGS. 2-4 show exemplary scenarios for the account opening process according to some embodiments, illustrating the flexibility provided by the invention.

Example Scenario 1: This example, shown schematically in FIG. 2, depicts part of an account opening process rather than the whole process from beginning end, just to give an example of the concepts of components being discussed. In other words, part of a process is presented as an example to show, in comparison to later scenarios, the flexibility of the AO process. For instance, Example Scenario 1 does not show any components in relation to the Decision milestone. In FIG. 2, the following steps are shown:

Product options are offered to the user

The user selects the product options

Terms and Conditions will be displayed to the user

The user accepts the terms and conditions

Funding options are offered to the user

The user selects funding options (e.g. Bank to Bank Transfer)

The user records the bank to bank transfer details

The account is opened

In addition to the above steps, other actions may occur in each scenario (e.g., Gather Applicant Data, Validate ID, Decision and Fulfilment-related actions), but to keep the diagrams simpler and in order to explain the concept, the actions have been limited to those listed for comparison purposes.

Figure 3:
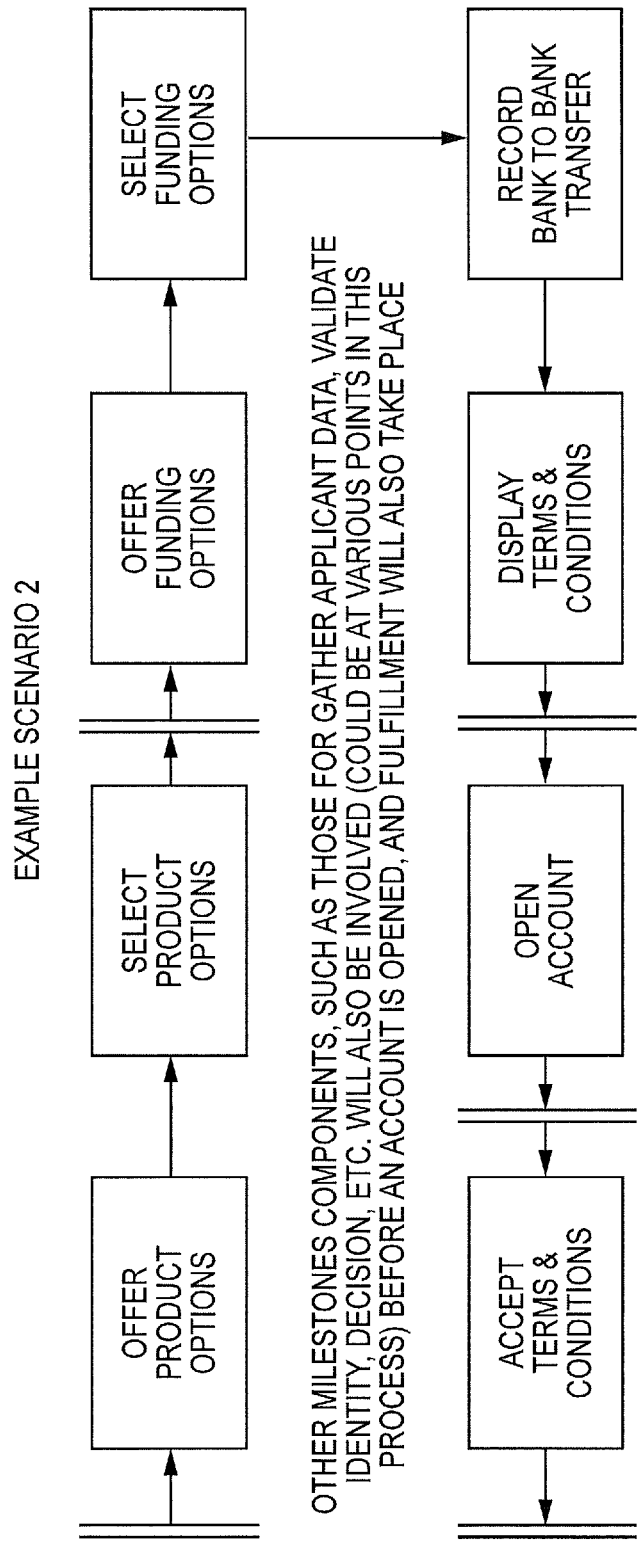

Example Scenario 2: An entity somewhere else in the group might have a local practice, regulation or they may just wish to test a different flow that means they wish to change the order of these components. This could lead to the first scenario being altered, for example as shown in FIG. 3. In this scenario, a number of components have been moved and changed position in the flow but it still allows an account to be opened successfully. So the new flow becomes:

Product options are offered to the user

The user selects the product options

Funding options are offered to the user

The user selects funding options (e.g. Bank to Bank Transfer)

The user records the bank to bank transfer details

Terms and Conditions will be displayed to the user

The account is opened

The user accepts the terms and conditions (this could come after the account is opened in the case where a business line is using passive acceptance of T&C's. For instance, the customer using the account for the first time could have been presented to the user in the Display Terms and Conditions component as indicating acceptance of the T&C's)

This degree of flexibility allows the business to test different scenarios to understand the impact they have on the sales process, which in turn allows them to modify the flow, for example to enhance the customer experience and maximize sales conversions.

Figure 4:
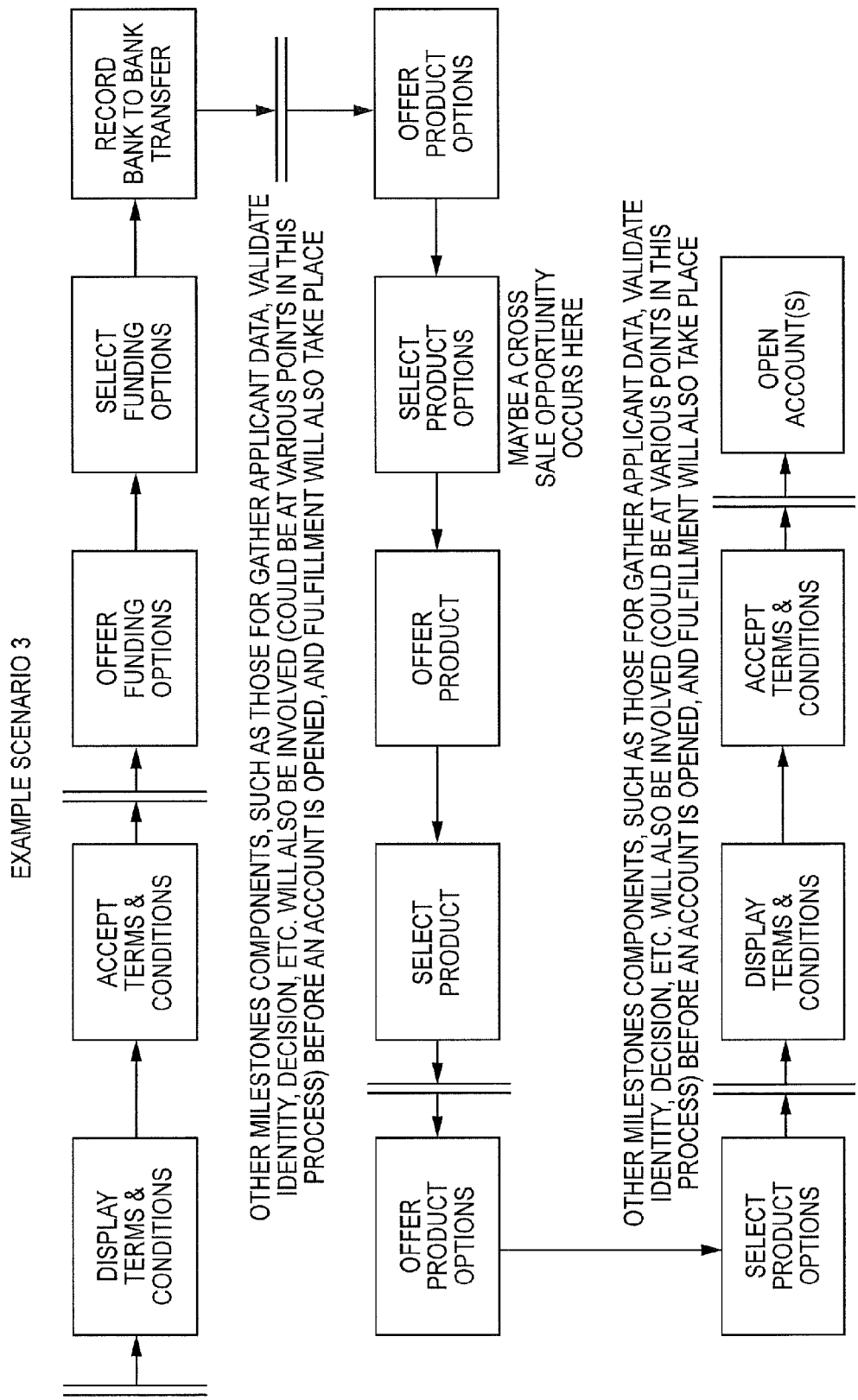

In addition, in some embodiments, it is also possible for a component to appear more than once in the same flow. For instance, after a decision is made on a product, a cross sale opportunity may occur and the customer is given the option to select (and configure) other products. As shown in Example Scenario 3 (FIG. 4), in this example the flow up to the first Open Account is the same as for the example scenario shown in FIG. 2. At this point a cross sale opportunity may have occurred and further products are offered to the user. So, some of the components appear in the flow again after the cross sale is identified. Another product is offered and selected, this has product options offered and selected, there may be additional terms and conditions that apply to the new product which have to be displayed and accepted before the second account is opened.

Cross sell opportunities may occur in various locations within the account opening process. The maximum number of cross sell options provided during a single session are preferably definable by the business.

There is no set flow to the account opening proposition and there are potentially many scenarios for customer journeys possible. The business can assemble the components in any order and re-use them in other areas besides account opening.

Figure 5:
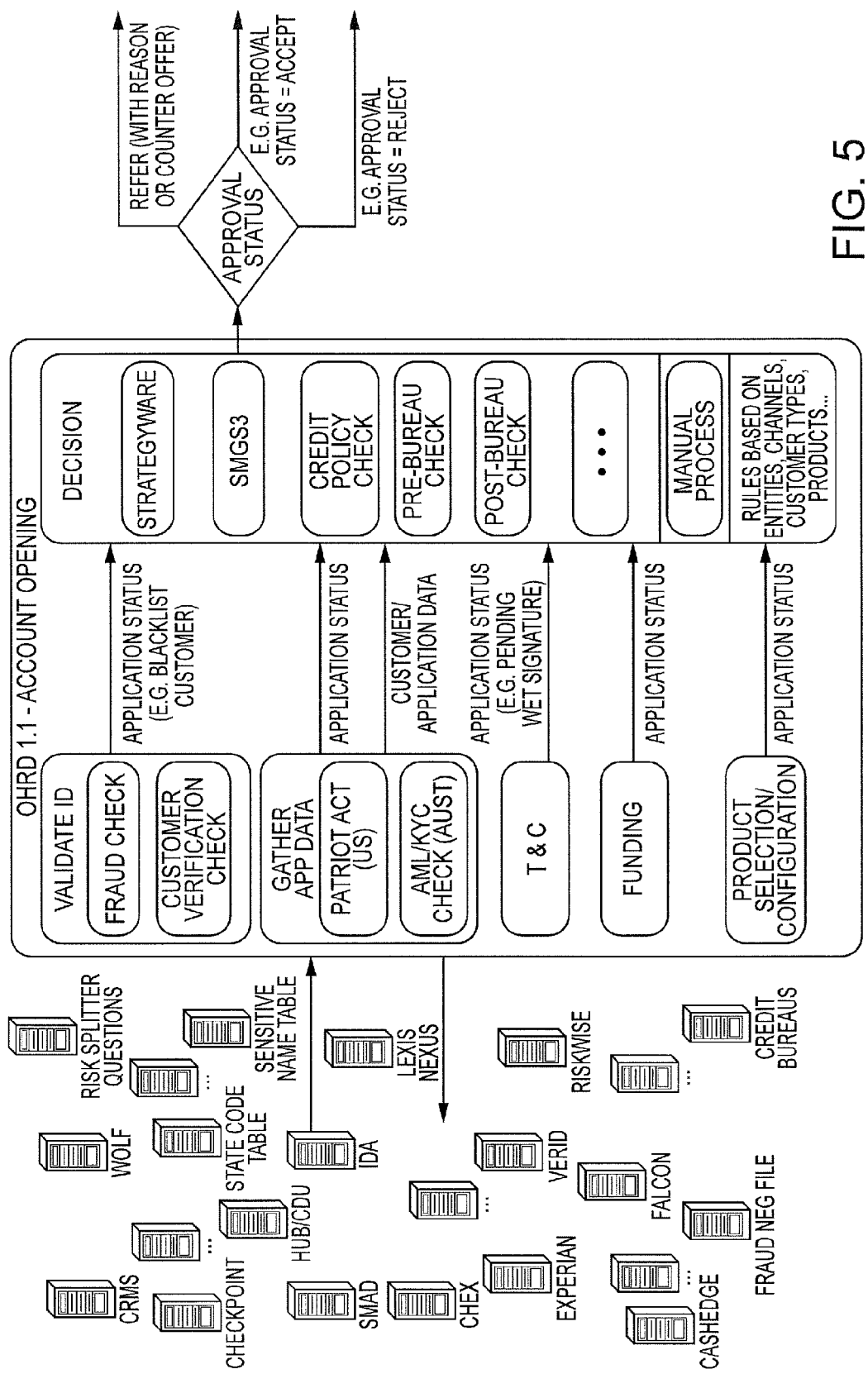
FIG. 5 shows a schematic of exemplary milestones and how they can, in some embodiments, use various external resources to interface with different applications.

As shown schematically in FIG. 5, many different external systems can provide input for the Account Opening milestones.

Architecture

Figure 6:
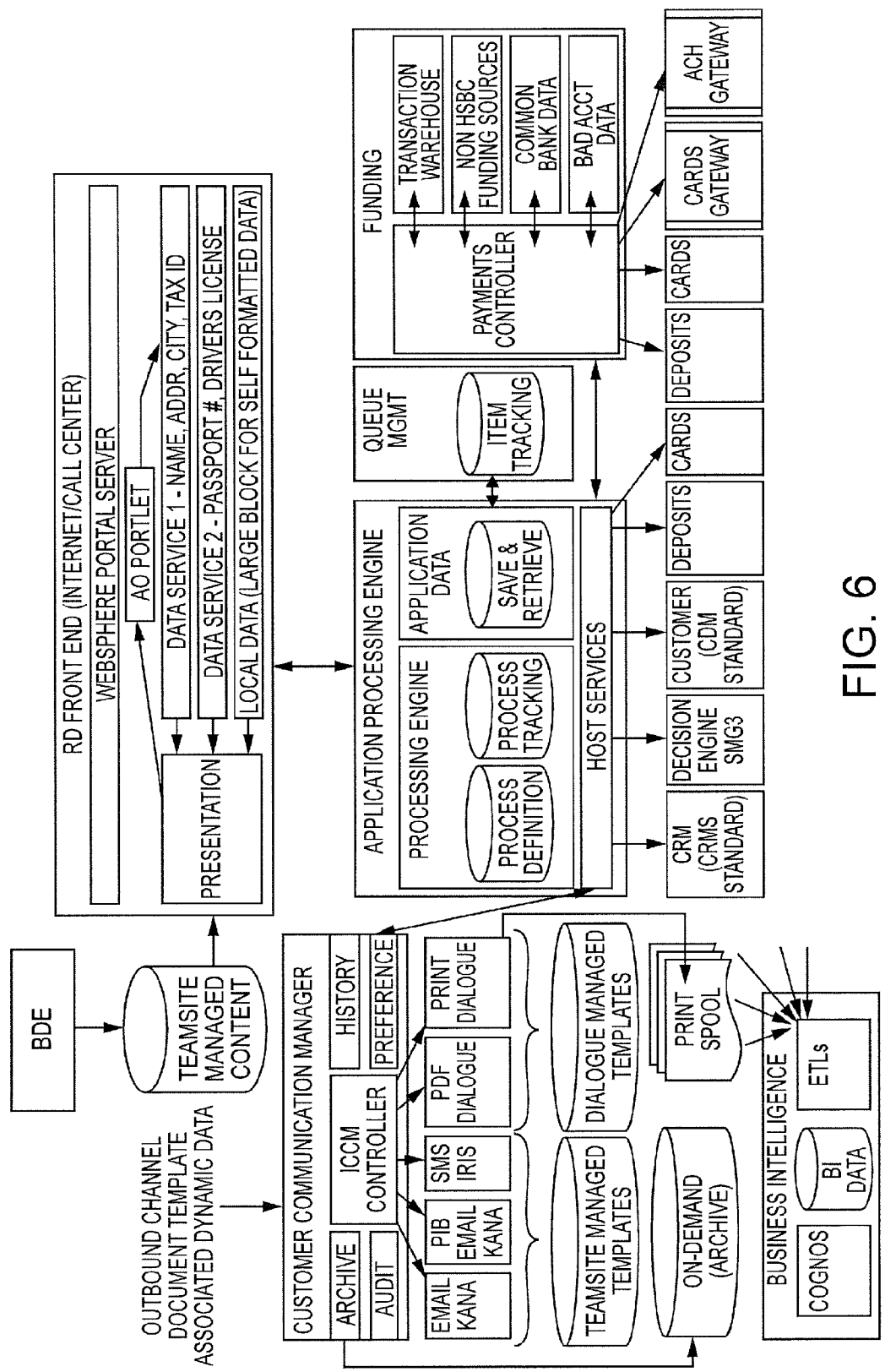
FIG. 6 shows the architecture of an exemplary embodiment of the Account Opening System.

In some embodiments, there are six core technical components that provide the technical foundation for the invention, shown schematically in FIG. 6 and described below. However, the core technical components are not limited to the number and functions described below.

Exemplary use cases of the Account Opening system include, but are not limited to: present product; request statements; request ATM card; maintain involved party; validate identity (internally or through third party systems); accept terms and conditions; execute funding; retrieve and action decision; save application; retrieve application; search application; open account; activate account; archive application; and maintain application.

Front End. The Account Opening front end (FE or F/E) leverages the capabilities provided by the system, including a portal server, and Business Development Environment (BDE). The BDE is an environment where the businesses manage/control changes to processes and technology without requiring IT support. The business has the flexibility to manage on-screen, page, communications, and system content to make updates or changes to verbiage and design new pages or screens, etc. Due to the low risk nature of these changes, business control of the change is accepted.

In some embodiments, the front end includes the use of an industry standard User Interface component model, a new framework for orchestrating page flows, and the leverage of a native Websphere Portal Server (WPS) capabilities for macro-entitlements and connecting portlets. In instances where native WP capabilities are leveraged, the system is preferably configured so as not to be bound to a particular vendor or portal release. In this instance, entitlements do not require any coding but rather leverage out of the box capability that is resident in such a tool. Portlets that are constructed to be orchestrated by the business can sit beside any other portal content.

The front-end orchestration framework is intended to work closely with a Composite Service. The Application Process engine (APe) is an instance of a Composite Service that implements the Account Opening business process. The combination of the front-end orchestration framework and APe works in conjunction to satisfy the overarching business process with the FE providing the Human Interaction elements of the business flow and APe implementing the systematic elements of the business process as well as providing the state management of the overall process.

The system provides a mechanism for defining multiple flows. It also provides a mechanism for tracking metrics regarding the human interaction. This information is captured (e.g., by Webtrends) and fed into the Business Intelligence (BI) environment.

During interactions with the APe, the FE can save the state of the human interaction. Once a journey has been started for a given application, APe will retain the state and if the process is resumed in another channel, the framework can pick up where the customer left off.

The content and fields as well as the flow of the pages are business configurable and align with the APe configuration.

Application Processing Engine. The Application Processing Engine (APe) or Common Processing Service (CPS) is an instance of a Composite Service that implements the Account Opening business process. The Composite Service works in conjunction with the front-end (FE) orchestration framework to provide support for business process orchestration.

In some embodiments, APe manages the Account Opening process from the initiation of all application through boarding of the account and in some instances post-boarding processes such as funding an account. Thus, throughout the lifecycle, APe maintains the state of the application, the state of the AO process and maintains metrics that are fed to the Business Intelligence (BI) system.

In some embodiments, APe determines the Macro Business Service operations required to open-an account, and executes any number of sub-services to fulfill each Macro Service operation. APe is preferably the system of record for the application data, and knows the status and steps involved in processing the application. Preferably, the flow of the business process is business configurable and aligns with the FE configuration.

Integrated Customer Communications Manager. In some embodiments, to streamline communications with the customer and facilitate migration to lower cost channels, the Integrated Customer Communications Manager (ICCM) acts as a layer between an application system and the communication systems.

The ICCM communications manager comprises, for example, a request listener, a controller and a message broker. In some embodiments, ICCM manages requests for document creation by sending them to multi-channel communications systems for composition and delivery. Delivery channels supported by ICCM for Account Opening may include, but are not limited to, print, email, secure email, SMS, and PDF/HTML for internet.

Document templates may be managed using BDE-based content repositories. Business users can manage communications content directly through repository changes.

In some embodiments, customer communication histories are maintained and optionally combined with a central Contact History database. As with the other components, metrics are preferably captured and stored within the Business Intelligence (BI) environment.

Metrics and Business Intelligence. A core concept of Account Opening is the implementation of a comprehensive metrics environment, tracking metrics regarding the human interaction. The data collected may provide the business with insight into a number of areas, for example, consumer behavior and program effectiveness, and may provide empirical measurement of activity. To achieve this, the BI systems are used, for example data feeds to BI and Webtrends, capturing customer experience activities.

In some embodiments, to increase the amount of Account Opening that is "out-of-the-box", BI may define data feeds specific for AO, as well as the necessary reports to review this data. One purpose for the AO specific feed is to allow the Account Opening metrics to be utilized by a site that does not yet have a full BI solution in place. Local entities currently may have varying data structures and Management Intelligence (MI) solutions that would negatively impact the ability to easily plug in AO related BI details.

In preferred embodiments, metrics capabilities support the optimization of marketing, sales, process, and performance by capturing data at all points of an end to end journey, and providing a single version of truth for distribution metrics globally. Metrics can align to commercial success benchmarks (CSBs) and business transformation key performance indicators (KPIs) for benefit tracking.

Funding. Preferably, the invention increases the amount of straight-through-processing (STP) and increases activation rates for new accounts. To facilitate this objective, the invention provides functionality for capturing funding instructions. For example, in some embodiments, the AO process has a step to fund the accounts from existing customer accounts in local and foreign currencies. External transfers and bookable foreign exchange rates may also be part of the AO functionality. This payment functionality preferably extends to support all servicing payment functions post account opening.

Queue Management. Preferably, the invention minimizes or eliminates exception processes in which a customer cannot reach the end of their application journey at first contact. If a customer encounters an issue during their application journey, preferably they can still continue, for example, with immediate assistance from a staff channel, a temporary save of the application, progression to fulfilment with restrictions, etc. However, there may be instances in the AO process where there is a need to more closely scrutinize an application or an applicant. Thus in some embodiments of the invention, when applications are flagged for additional review, they are viewed through the Queue Management System (QMS).

Preferably, the creation of queues and the rules for populating them are configurable. In some embodiments, all management of user groups, queues and work assignments internally with QMS are defined by QMS.

In some embodiments, the AO system supports the ability to 'plug into' any existing host system. All business/validation rules that exist in the back end (BE) systems are preferably not replicated on the front end (FE); however, exceptions may be made in cases where the Business Design Team feels that specific business/validation rules should exist on the FE.

Milestone Specifications

Product Selection

In some embodiments, the customer is provided with a list of relevant products based on preferences/needs, and receives a selection of one or multiple products for account opening. The list of products may be a full list of products or may incorporate, for example, an external application to filter options based on hurdle questions and/or an external CRM (Customer Relationship Management) capability that feeds into the AO application. A filter can be applied in order to retrieve specific product(s) offered to a customer during a marketing campaign.

The system provides the ability to offer relevant products to the customer with the outcome to be the selection of one or multiple appropriate products to begin the application process. When a product is selected, the details of that product should be carried forward to the application process.

The system also supports the facility to cross sell or up sell products to the customer. This involves the presentment of additional offers identified via a decisioning engine during a cross sell/up sell/down sell based on a set of pre-defined criteria (e.g., credit scoring).

'Presentment' and 'Selection' of one or many products/services available for opening, and the ability to add products, are supported. Selected product details may be carried forward to the application process.

Input may be included from various sales tools (e.g., product selector, individual solutions, hurdle questions, marketing campaign offers) which identify products for offer.

The system preferably provides sole and joint options, and different entity types for commercial customers (e.g., Sole Proprietary, Partnership, Limited).

The system supports the ability to capture metrics on all areas within the Account Opening process to facilitate 'test and learn' tactics.

The system also provides the ability to 'Save and Retrieve' selected product(s).

Pre-conditions to Product Selection may include: Gather Application Data (Application data can be gathered before a product is selected his information can be used, e.g., to generate cross sell/up sell opportunities), Validate Identity, T&C (T&C can be viewed up front by a customer), and Decision (product selection can be an output of Decision).

Post-conditions to Product Selection may include Gather Application Data (product selection can occur prior to the capturing of application data; it is an input to the format of the application form), Validate Identity, T&C, Activate Account (an account can only be opened once at least one product is selected), Decision (product selection can be an input into Decision), Configure Product (product selection is an input into Configure Product; at least one product must be selection/implied), Funding, and Fulfilment.

Figure 7:
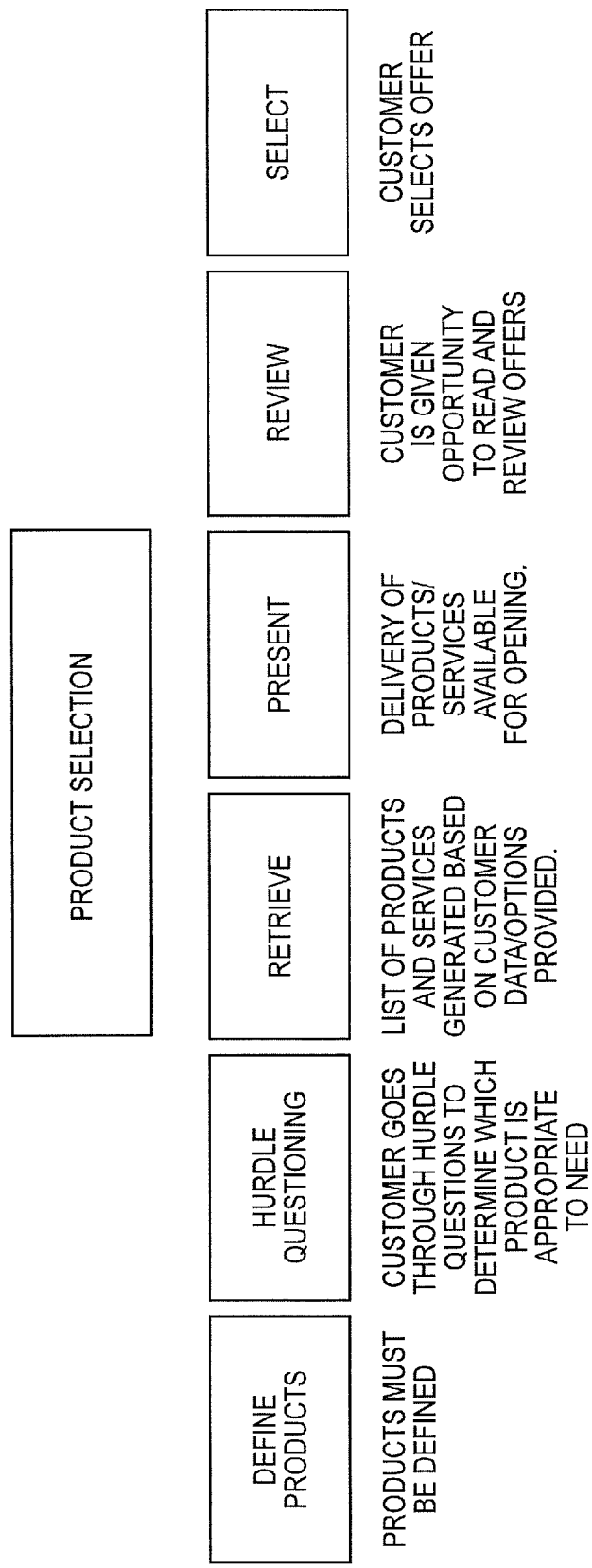
FIG. 7 illustrates the components of the Product Selection milestone according to some embodiments.

FIG. 7 illustrates the components of the Product Selection milestone according to some embodiments.

Product Presentment. Product Presentment represents the process whereby qualified products are displayed to the user for selection. Products supported for account opening may include, but are not limited to, Savings, Checking, Term Deposits, Credit Cards. Additional products may include Amanah (for Islamic banking), Bundled Products, Premier, Secure Card, Select Credit.

As used herein, a secure card is a credit card that is backed by a savings account used as collateral on the credit available with the card. In some embodiments, in order to open a secured card, the customer must already have a savings account with the bank. If the customer does not already have a savings account, they may be required to open one.

As used herein, Select Credit refers to a line of credit used as overdraft protection on an account. It is considered an attribute of an account even though it is a standalone product (e.g., overdraft protection on a checking account).

Entities may have existing variants of each of these broad categories of products (each having their own product type) and currencies supported (e.g. Savings for Residents, Savings for Non-Residents etc.). Entities have the flexibility to maintain products and related supported currencies, offered at their local sites, that use this account opening process.

In some embodiments, the following generic core products appear for selection: Statement Savings Account, Current Account, Term Deposit (Interim Interest supported), Term Deposit (Cumulative), Credit Cards. In some entities, Term Deposit products may fall under the broader umbrella of Savings. As used herein, a Term Deposit is a fixed term account for a specified period, where interest is paid at the end of the term. The customer may have various options for the funds at the end of the term regarding both the principal and/or the interest.

The AO system may or may not support the ability for the user/customer to 'bundle' products 'on the fly' (i.e. select/deselect products for the bundle). However, in some embodiments, the AO system supports the ability to select multiple products for opening in one instance. In some embodiments, there may be preferential rate pricing/benefits offered to the customer if more than one product is selected within the multi product scenarios. For example, customer may be presented and proceed to select both a Savings and Checking product. Although both may be treated as individual products within the account opening flow, a customer may receive a preferential rate based on their selection. In some embodiments, the system may also support consolidation of accounts (e.g., grouping two installment loans into one).

The entity can define which products are available, for example, by channel, customer group, customer type, currency, and/or entitlements.

In some embodiments, the system supports the presentment and selection of a 'bundled' product. As used herein, a 'bundled' product is a set of pre-grouped products as defined within the product system (host). Although a bundled product includes more than one product, it is preferably presented (and treated) as one product within the AO system.

Certain bundled products (e.g., a 'Smart Money Account'/ SMA, a combination of a savings account with overdraft and a term deposit) may not appear as a single 'product type' on the host system but may be processed and considered as a package of products. The AO system can support bundled products that are single product types and/or are packages of products.

In some embodiments, for a joint application for a bundled product where the bundle consists, for example, of savings, checking, and credit card products, all products in the bundle apply to both parties in the relationship. In the case of the credit card product, the primary applicant may 'own' the card by default and the secondary applicant may be assigned to the card as an authorized user.

Inputs. There may be multiple inputs into each milestone.
For example, inputs into the product selection may include inputs from one or more public websites, hurdle questions, marketing campaign offers, cross sell, and/or needs analysis tools. In some embodiments, pre-sales activities may be included as inputs. An entity may optionally elect to filter the list of products to present based on one or more inputs.

Input via Public Website may, in some embodiments, be as follows: The customer enters the bank's public website, reviews product information and proceeds to make a selection. Existing customers can log into the system using their interne banking credentials and proceed to select an account for opening. In some embodiments, they may be directed straight to the application page via multiple entry points (MEPS) from a brochureware site post logon.

Hurdle Questions refer to a process whereby customer is asked a set of questions in order to identify a product match. Input to hurdle questioning comprises answers to a pre-defined set of questions (e.g., 'Would you like a credit card that offers loyalty benefits?') and the output is a set of criteria to help refine the marketing process.

Marketing Campaign Offers refer to pre-defined product(s) offered to a customer via a special promotion code or campaign.

Cross Sell refers to data captured throughout the account opening process (or available for existing customers) that can be used to identify products available for selection or additional products for offer. An example of cross sell for credit cards is the Universal Product Selector, whereby a customer captures basic information and a set of products are returned for selection based on pre-defined criteria such as credit worthiness.

Needs Analysis Tool refers to a user-completed needs analysis using a sales tool (e.g., product calculator, comparator). The result of this analysis may be used as input into the Account Opening process.

In some embodiments, products available for selection are based on a set of customer criteria such as age, income, etc. For example, conditions of the account may be presented up front to the customer (e.g., a message stating that you must be 18 years of age to open this account). Validation can, for example, be included on the 'date of birth' field within 'Gather Application Data' (e.g., age >18).

The input to the Product Selection milestone is a list of one or multiple products. In some embodiments, this list may be automatically generated based on predetermined criteria.

For example, the customer may proceed to answer a number of hurdle questions based on needs/preferences. Once the questions have been answered, a list of one or multiple products is identified and used as an input into the product selection process. In some embodiments, an external application filters options based on the answers to hurdle questions.

The system provides the ability for the business to define/update product(s) available for selection by the customer and/or staff. In other words, the list of products that is presented to the user is maintainable by the Business.

In some embodiments, the system passes through the product selected and its attributes along with all information derived during the needs analysis so that the customer does not have to re-capture this information during gather applicant data. For example, if a customer is required to enter a name, age and income in a needs analysis tool, this information is not be required to be re-entered during the 'Gather Application Data' step of the account opening process. This information pre-fills automatically.

In some embodiments, staff members may have the ability to view a list of products and/or search from products. The selection of a product launches the appropriate account opening process.

In some embodiments, the system supports capture of a promotion ("promo") code, which may drive rates, additional offers and other account opening related activities. The promo code may be passed through the entire AO process so that it can be stored on host against the new account opened. When a promo code has been entered by the user, the system preferably allows that user to view the details of that promotional offer (e.g., including select product attributes such as rate, etc.).

Capture of the promotion code can occur, for example, in one of the following two ways: (1) Customer inputs promo code during the account opening process. Validation preferably exists to ensure that a valid code is being entered and relates to that particular product (applicable for all channels). The entity may define whether or not to display an error message/warning or not where an invalid/incorrect code has been entered. The entity also may define the customer journey thereafter (e.g., just display a warning message and allow the customer to continue, or other action); or (2) Customer selects banner ad and promo code is passed through to the account opening process.

Presentment. Presentment is the process whereby products are available for display to a user (e.g., customer, branch or call center staff) for selection. Preferably, the system supports presentment of one or multiple products in one instance (including sole and joint products).

Presentment may be, for example, via a product "list." Alternatively, presentment may be via a banner ad on the public website, which the customer selects and is taken directly to the 'Application form' for data capture, thereby bypassing the presentment of a product listing. The system may also support verbal communication of the products to a customer within the branch/call center channel.

The system preferably supports the display of an unlimited number of products. In some embodiments, in addition to products, the following fields are available for selection: Country Group Member, Branch Code and currency. Product presentment may be filtered based on Country/Group member, channel, customer segmentation and currency. The business may also configure which fields should display/be hidden at entity and channel level. For example, an entity may or may not wish to allow an Internet and/or staff user to select a branch during an application.

During the joint application opening process, the system preferably displays the product selected by the primary applicant to the secondary applicant. In some embodiments, the secondary applicant is not given the option to add additional products or modify the current selection as it applies to the joint account. The secondary applicant may proceed to open additional accounts if additional products are presented for selection (e.g., cross sell, product configuration). In some embodiments, additional products only apply to the sole secondary applicant and do not form part of the joint relationship. (i.e., the second applicant cannot open another joint account as part of this application). This same logic can be applied to related parties for commercial customers.

Cross Sell/Up Sell/Down Sell. Preferably, the system is flexible such that it can determine, based on configurable business rules, appropriate products for the customer based on data it has available at that time. This may be done by Cross Sell/Up Sell/Down Sell.

In some embodiments, the original product selected is an input to cross sell/up sell/down sell. The system then supports the selection of additional products presented to a customer based on a cross sell/up sell/down sell.

In Cross Sell, the system may, for example, offer a different product line to the one currently being applied for (e.g. offering a credit card to someone who is applying for a checking account, or insurance to someone who is applying for a credit card). In Up Sell the system may, for example, offer a better version of the product the customer originally applied for e.g. if customer is applying for a standard credit card maybe they are entitled to a gold or platinum card. In Down Sell the system may, for example, offer a different product in the same line if the customer is not eligible for the product they originally applied for (e.g., offering a basic checking account instead of a Money Movement checking account. If customer does not qualify for a checking account, the customer can be offered an alternative savings account).

In some embodiments, analysis of the data and determining of which products can be offered fall under the scope of a Sales Solutions team, and the products available for selection fall within the scope of AO. That is, Product Selection is the recipient of the cross sell/up sell/down sell opportunities derived from a decisioning engine.

Product Review. In the Product Review process, the Customer reviews the available options before making a selection. In a multi product scenario, the details for each of the products presented may be available for review by the customer prior to selection For example, the customer selects 'apply now' from the checking product page. The products available for selection are presented to the customer. The customer reviews the available options before making a selection. If the customer is not satisfied with the products presented, the customer may choose to 'exit' the account opening process.

If a product offered to the customer is a bundled product, the details of the bundle (e.g., products available within the bundle) are displayed and available for review by the customer. For example, a site may have defined a product bundle (pre-defined product package—e.g., Student Package) to include a Savings and Credit Card. Once this product has been selected by a user, there may be a need to present the details of the product bundle to the user for review (e.g., details of the savings/credit card included in the bundle).

Products are preferably reviewed online by the customer except, for example, where a Branch or Call Center representative verbally communicates them to the customer. If a customer is not satisfied with the products presented, the customer may choose to 'exit' the account opening process.

In some embodiments, in a joint application scenario, the exit activity step is not available to the secondary applicant. The secondary applicant only has the ability to view product details (read only) once product selection has been completed by the primary applicant.

For example, the primary applicant may begin the joint application by selecting a 'current account' checking product for opening. The primary applicant completes the application process. When the secondary applicant proceeds to complete the process, the product selected by the primary applicant for joint account opening displays as read only. The secondary applicant does not have the ability to modify or select additional products for the joint relationship. However, both the primary and secondary applicants may have the option to open additional sole accounts as needed. This same logic can be applied to related parties for commercial customers.

Product Selection. In the Product Selection process customer selects a product for opening. Once a customer has received the details for each of the products presented, the customer may proceed to select one or multiple products for opening. In addition to product selection, the user may, for example, have the option to select the Country, Group member, branch code and/or currency. The display and fields for selection are configurable by channel and entity. The selection of the account currency is preferably a separate selection to the product selection.

An entity may, for example, define certain default values for the various product attributes on Group host systems, based on a combination of Product Types, Customer Classification, Currency, Market Sector, etc.

The entity has the ability to configure the product options in product selection, by channel (e.g., as some of the Group System products may not be offered across all channels). For entities which do not want to display the same products to all channels, the system may optionally support the ability to 'hide' products. For example, an entity may not want to offer 'direct' products in a Branch environment.

In some embodiments, at least one product must be selected in order for the customer to proceed with the account opening process. This rule may be applicable for the first account opened with the AO process and not apply, for example, during a cross sell opportunity.

In some embodiments, a user is allowed to override a product offered for selection. This override may, in some embodiments, be managed via hurdle questions or other pre-sales tools which reside outside of the Account Opening process.

The system supports selection of one or multiple products in one instance. For example, Scenario 1: Customer A may select to open a sole savings account Scenario 2: Customer B may opt to open a savings and credit card account in one instance Scenario 3: Customers A and B may opt to open a joint savings and joint checking account The system also supports the selection of multi customer/multi product options in one instance. For example, Customer A and Customer B may wish to open a joint account. In the process, Customer A (primary applicant) is given the option to select additional sole and joint products for Customer A and/or additional joint accounts with Customer B. The combination could include: (1) Joint Checking Account for customer A and B, (2) Sole Savings Accounts for customer A and (3) Sole Checking Account for customer A. In some embodiments, selection of sole products by the primary applicant for the secondary applicant during a joint application is not a supported process.

The system provides the option for a customer to modify their selection (select/de-select products). For example, the customer may proceed to select a Savings product only, but upon further review may decide that they would prefer to open a Savings and Credit Card product.

If only one product is available for selection, the customer may or may not be required to select the option. This may be based on the configuration of the customer journey. The customer may bypass the 'product selection' milestone altogether and proceed to 'gather applicant data'.

The system supports multiple selections of one product type. For example, if the system displays both Passbook Savings and Current Account for product selection, the user is able to specify the quantity of accounts they would like to open (e.g., '2' Passbook Savings accounts). These accounts can either be the same or different currencies. The business has the flexibility to limit the maximum number of accounts that the customer selects. In addition, they can only allow a customer to open one if so desired (e.g., by not displaying a 'number box' next to the product).

For Branch/Call Center scenarios, the Customer Service Representative CSR or Call Center Representative may proceed to select the option on behalf of the customer. The customer may, for example, verbally agree to proceed with the account opening of the selected product.

In some embodiments, in a joint application scenario, this activity step is not available to the secondary applicant. The secondary applicant only has the ability to view product details (read only) once product selection has been completed by the primary applicant. The secondary applicant will not have the ability to modify or select additional products for the joint relationship. Both the primary and secondary applicants may have the option to open additional sole accounts as needed. This same logic can be applied to related parties for commercial customers.

For term deposit accounts, the customer is preferably able to view at some point in the process the interest rate applicable to a particular currency, term and amount. The entity can define where this is in the process, and such information may, for example, be pulled from a local back office system. Applicable rates may be displayed, for example, based on the customer type (for existing customers)—e.g., Staff and Premier. The same recognition of customer segment applies for other account types as well. In addition, product features, tariff, etc. may be available for the user to view.

The business can configure whether the selection of Country, Group member, branch code and currency resides within the product selection milestone or the Configure Product milestone.

Once a product has been selected, the system preferably supports the 'Save and Retrieve' of the selected item. If a customer proceeds to 'save' their selection, the product(s) selected may be associated with the existing customer profile.

Flow Charts. The following flow diagrams illustrate a user's interaction with the 'Product Selection' milestone. In some embodiments, activities leading up to the selection of the 'Apply Now' functionality are outside the scope of the AO system, but remain as inputs to the Product Selection milestone. In the diagrams, ' . . . ' refers to additional AO components such as Present Application, Product Selection, etc.

'Present Product' may not apply depending on how the customer journey is configured. For example, the customer selects one product and the product presentment step is bypassed altogether. The customer may be presented directly with the application form for capture of customer data. Alternatively, 'Present Product' may apply depending on how the customer journey is configured. For example, the customer selects <apply now> for a 'current account' checking product and the system presents a list of products for selection.

Preferably, the system supports the (1) the capture of a promo code or (2) the passing of a promo code throughout the account opening process based on the selection of a banner advertisement.

In some embodiments, a list of products is passed based on a pre-defined set of business rules defined within a CRM/sales engine (e.g., individual solutions).

Figure 8:
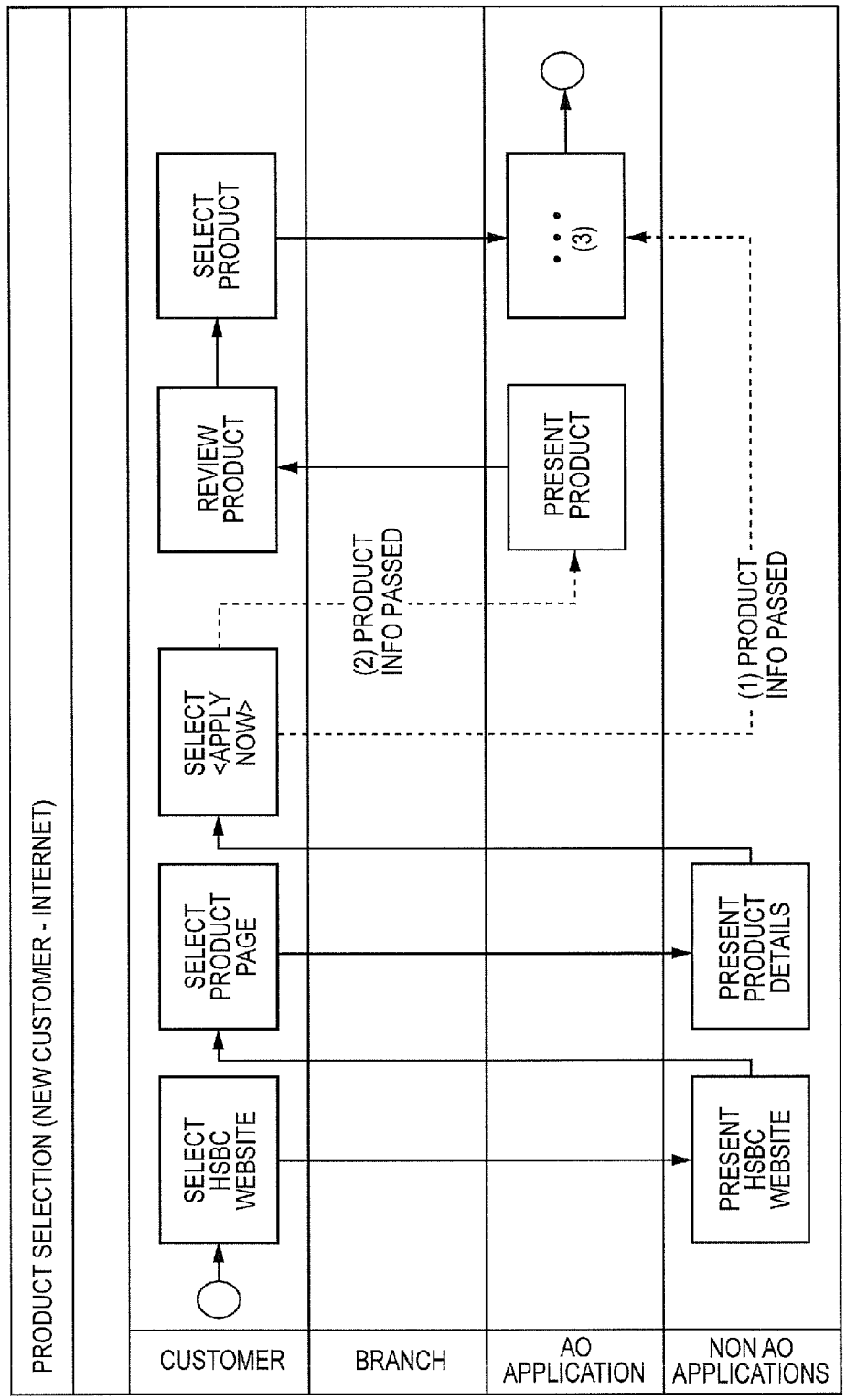
FIGS. 8-12 are flow diagrams showing exemplary user interaction processes within the Product Selection milestone.
Figure 9:
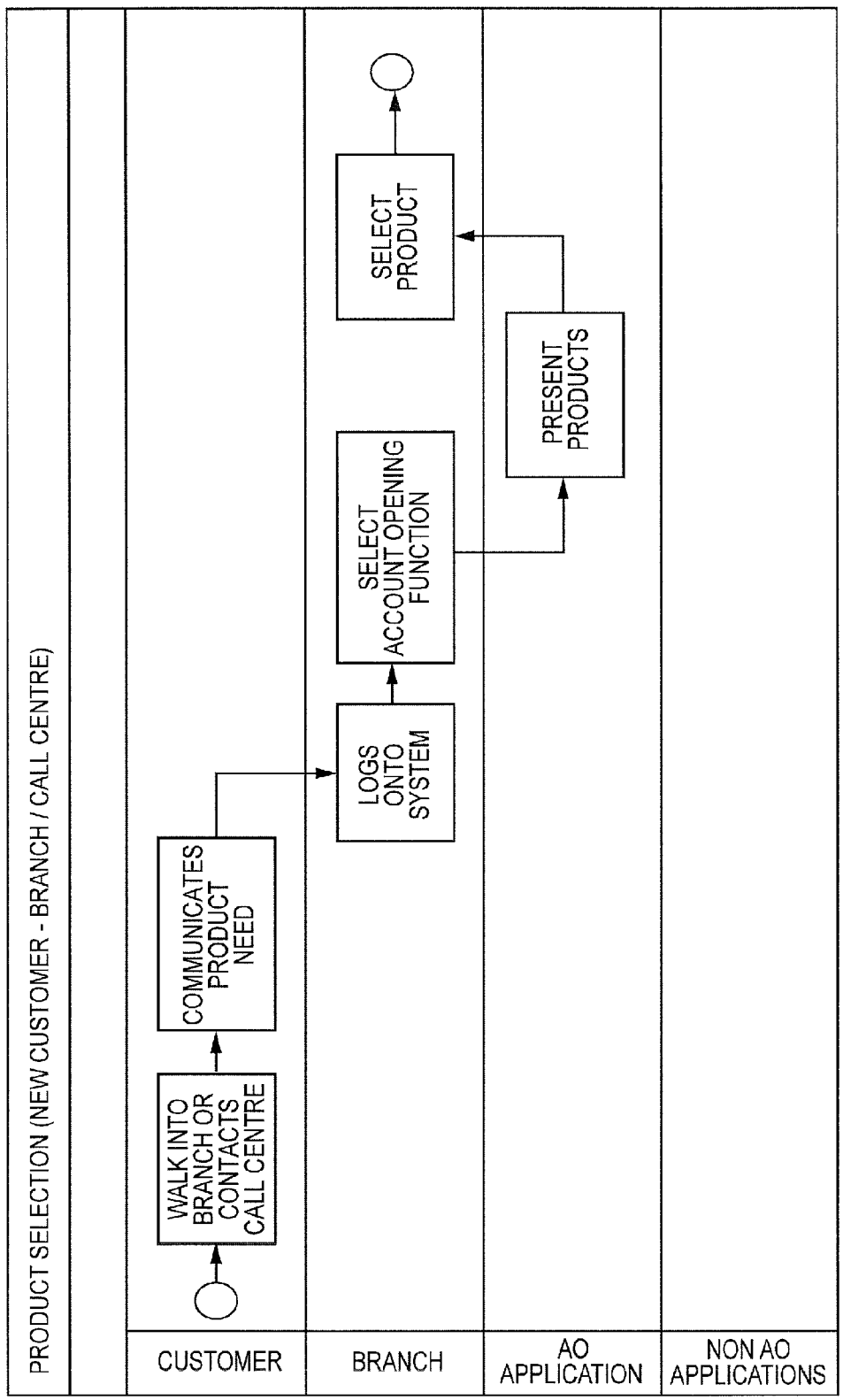

Flow A: FIG. 8 illustrates an example flow for a new customer through an Internet Channel. FIG. 9 illustrates an example flow for a new customer through a Branch/Call Center Channel.

Figure 10:
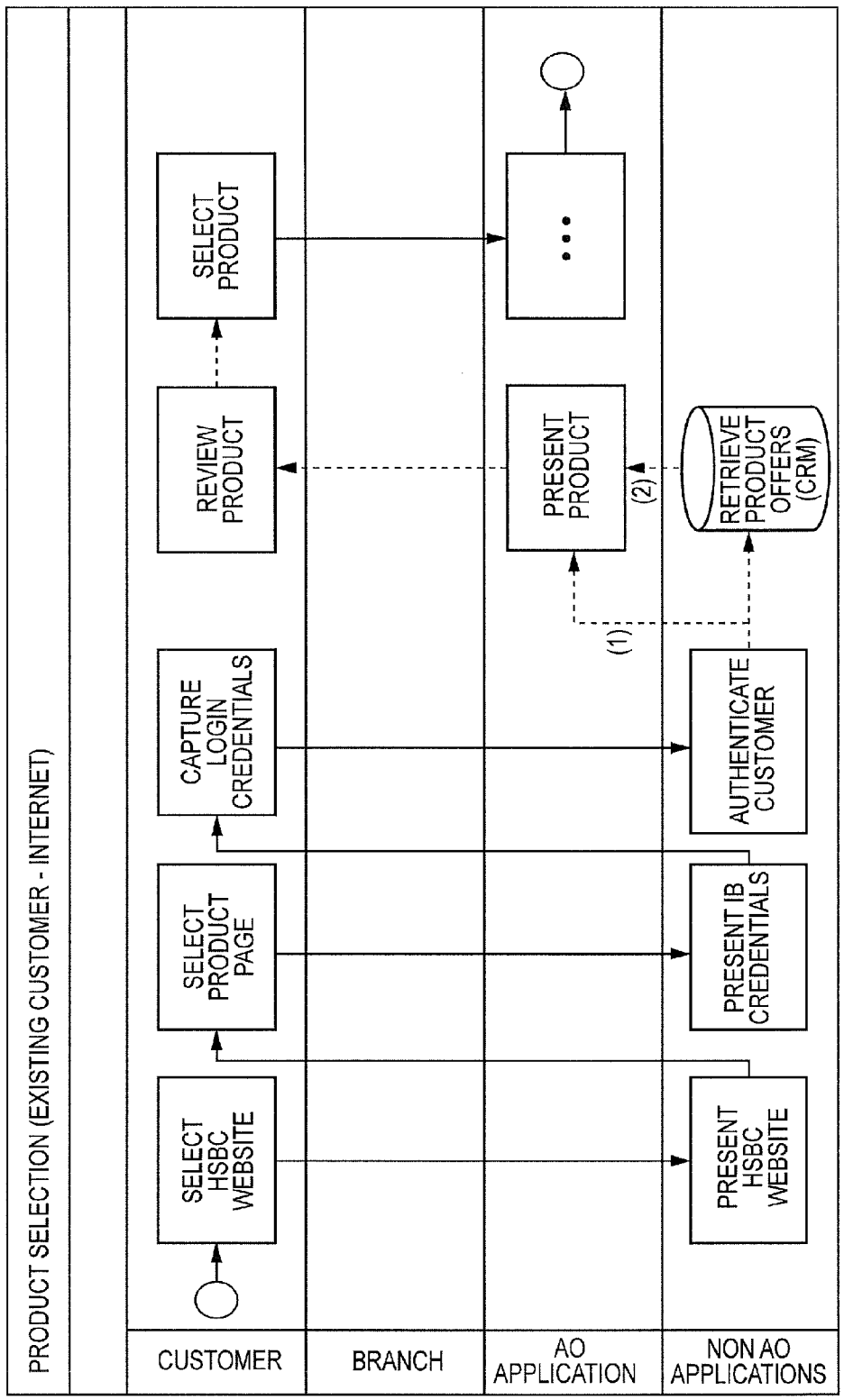

Flow B: FIG. 10 illustrates an example flow for an existing customer through an Internet Channel.

Figure 11:
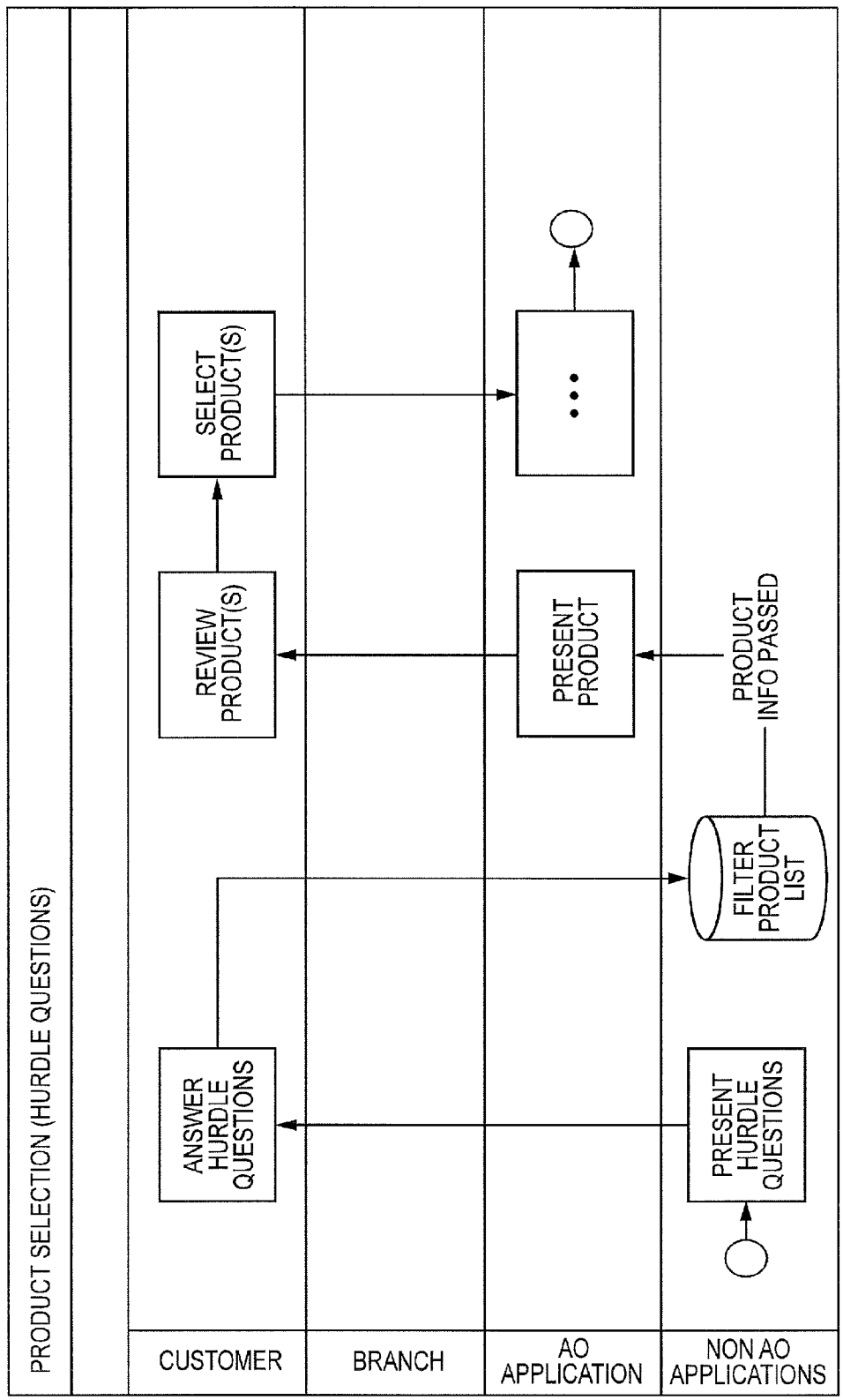

Flow C: FIG. 11 illustrates how a user may be presented with a set of hurdle questions. A list of qualified products are identified and presented to the customer for selection. The customer answers a set of questions, which leads to a refined list of products based on customer needs/preferences. The product list is presented to the customer.

Figure 12:
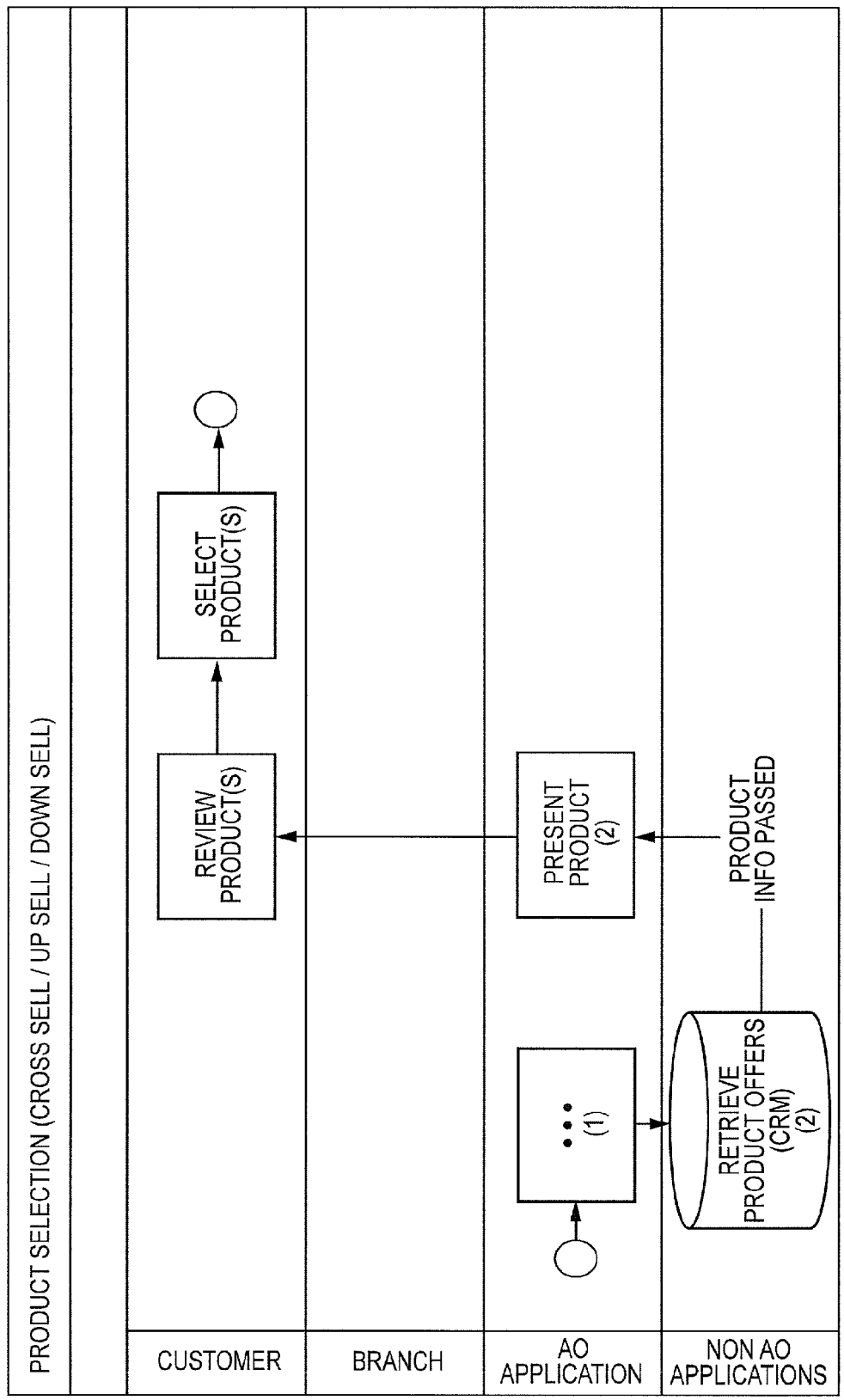

Flow D: The flow diagram in FIG. 12 demonstrates Cross Sell/Up Sell/Down Sell opportunities.

Entitlements. Preferably, the system supports the same set of products across all channels (staff and customers) and there is no variance in process flow (screens) for different channels (e.g., branch vs. customer). Where a channel (e.g., Branch) wishes to support additional products, these may be managed through existing legacy systems.

In some embodiments, the system may allow entities to restrict the opening of an account for select products. For example, User A may have the ability to open Demand Deposit products only (e.g., Savings/Checking) while User B only supports the opening of Credit Card products.

Multiproduct. The system provides the user the ability to apply for more than one product at the start of the application.

In some embodiments, when applying for multiple products, the decision page provides the ability for a user to deselect products. If all products are deselected and the user continues the process is considered as abandoned.

The system presents the decision for each product and any associated offers that pertain to each product. In some embodiments, upon customer selection of an alternate offer or up-sell or down-sell, the system will re-present the decision showing the offer in place of the originally selected product (plus all the original products applied for). If a product was dropped, the product may be displayed along with a message stating that this product was dropped and will not be processed.

The system also provides the ability to attach a product. For example, in the case of product A requiring product B (e.g., Secure Card), when applying for product A the user may be given the ability to select from existing any/all product B. If no product B is available for that user then one will be added to the application (the application continues as a Bundled Product).

An application that contains more than one product may, in some embodiments, receive one reference number for the whole application form.

Retrieving a saved application form preferably presents the last page that a customer viewed. All products selected on that application form may be continued (except dropped products).

The system provides the user with the ability to drop a product. In some embodiments, data for a dropped product is saved upon selection of save. When a user retrieves an application, any and all dropped products are not part of the application. The deleted product information is preferably maintained in the application data store for internal review, audit, etc.

In preferred embodiments, the entity can configure (without IT intervention) the documentation that is available for retrieval and printing. In some embodiments, there is one document for all products (entire application). In alternative embodiments, there may be one document for each product.

During a multiproduct application, the user may select for each product whether to open the account as a joint or as a sole, per existing joint/sole product eligibility. In some embodiments, although the applications can be submitted individually (e.g., by product), the 'decisioning' is completed prior to this. In preferred embodiments, the decision is completed for all products at once.

Figure 13:
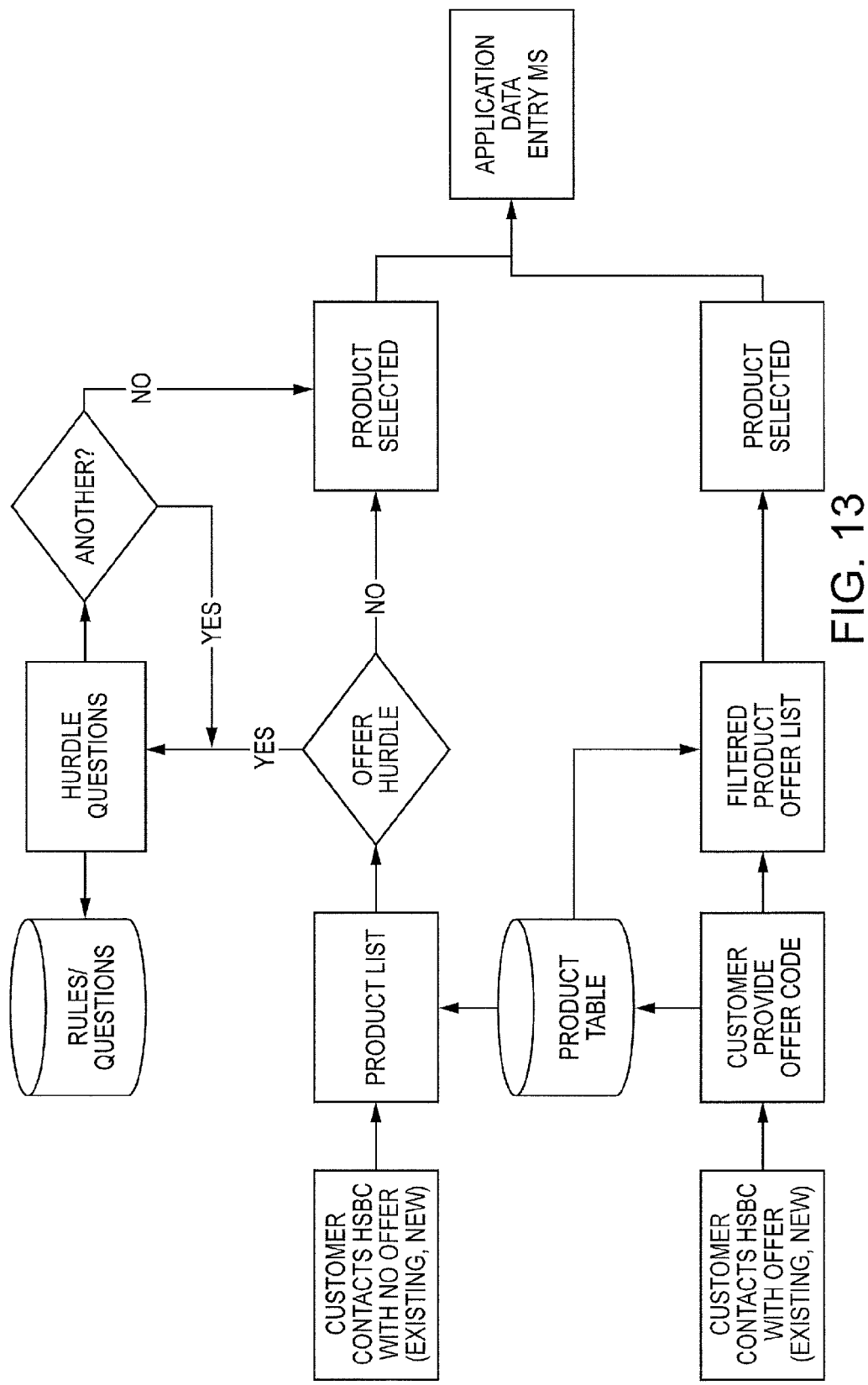
FIG. 13 shows an overview of an exemplary process of activities within the Product Selection milestone.

FIG. 13 illustrates an overview of an exemplary process flow of activities within the Product Selection milestone, but does not imply any flow between milestones.

Gather Application Data

Gather Application Data is the process by which data is captured to fulfill the opening of an account. The data required may vary depending, for example on the product, customer type, region/country, etc. The data to be gathered may, for example, be broadly categorized into: (a) Involved Party data required for application; and (b) Product specific data. Sufficient information is captured to make an appropriate decision to open a product and meet regulatory requirements. The entity will determine the minimum amount of information required for AO.

Data groupings may include, but are not limited to: Personal details (name, date of birth); Contact details (address, e-mail, phone); Occupation details (employment status, employer name); Assets and Income details (annual salary, monthly rent and mortgage); Preference details (language, address to send mail); and Other details.

Information displayed to a user may vary depending, for example, on product, customer type, country, etc. For example, for Savings, personal and contact details may be displayed, whereas for Checking contact and demographic details are displayed.

One aspect of this milestone is the ability for the customer to open accounts with as little information as possible, and avoiding entering information twice. Preferably, as little information as possible is asked for, and only once; the system preferably re-uses data the business has on existing customers. At the same time, the business needs to ensure that sufficient information is captured to make appropriate decisions to open a product and meet regulatory requirements. Preferably, the invention also provides the ability to capture metrics on all areas within the Account Opening process to facilitate 'test and learn' tactics.

Pre-conditions to the Gather Application Data milestone may be: Product Selection (a product can be selected before or after data capture), Validate Identity (branch customers may present a piece of identification before applicant information is captured), and T&C (T&C can be viewed up front by a customer).

Post-conditions to the Gather Application Data milestone may be: Product Selection (once sufficient data has been captured, the system may display a list of qualified products based on the customer's needs), Validate Identity, T&C, and Decision (hard dependency; must occur after).

Figure 14:
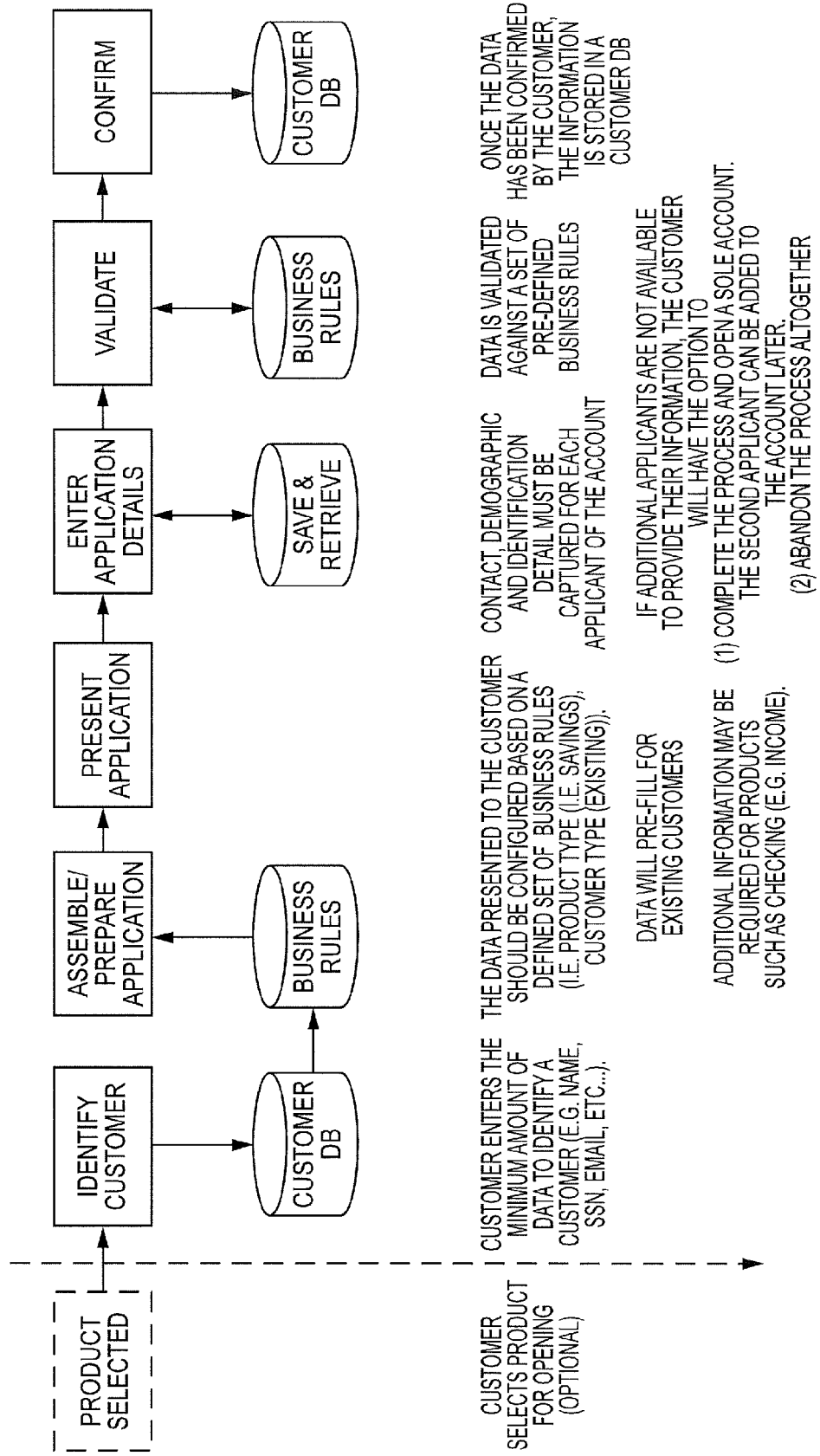
FIG. 14 illustrates the components of the Gather Application Data milestone according to some embodiments.

FIG. 14 shows a high-level process flow, depicting one way in which Gather Application data is envisaged to work from end to end.

In some embodiments, the Gather Application Data process includes one or more of the following functionalities: Involved Party Search for Staff users; Capture Prospect Profile/Product data; Display Involved Party details; Create Involved Party; Confirm/Modify Application details; Metrics and Analytics; and Dynamic Display of a particular application/field based on the product selection (e.g., if a customer selects a credit card, X application will be displayed. If a customer then selects another product at the end of the process only the additional fields will be displayed that are applicable for the additional product).

In some embodiments, this process may also include Save and Retrieve, Internet Profile Validation, and/or Create Prospect Profile (e.g., appropriate blacklist/watch list checks optionally carried out during account opening or post booking).

Preferably, Branch/Maintenance staff view the same set of Gather Application Data account opening screens as the customer. However, in some embodiments, the Branch channel may, for example, have a more extensive customer search feature, or other variation.

In the case of a joint account, if only enough detail is available for one applicant, sole account may be opened, abandoned, or saved, according to the customer's choice. The system supports the addition of a sole applicant to an existing sole account for a new joint relationship, as well as cross group member account opening (e.g., insurance). More than two applicants may join into an account owning relationship (configurable by the region). In some embodiments, the invention supports multi-language data capture.

When an existing customer is logging on, the customer segment/type is preferably identified (e.g., Staff, Premier, etc.), to ensure that the new account picks up the correct status/interest rate types, segmentation code, etc. For Term deposits, Staff and Premier customers may, for example, receive a higher interest rate, and in such cases, any interest rates displayed to the customer should be as per the rates stored in the local entity back office system for those customer types.

Identify Involved Party. This is the process whereby an Involved Party (individual that has a relationship with the bank) is confirmed as a new or existing customer of the bank (e.g., Does the bank have an information record for this applicant?). This may involve, for example, a search for a customer record in the bank systems. In some embodiments, this includes the ability to search for Involved Party profiles (e.g., Customers, Prospects, Authorized Signers, Owner/Principals, etc.).

The process of identifying an Involved Party may vary from channel to channel. In the case of the staff assisted channel, for example, identification may be performed through a series of questions that indicate the Involved Party's profile record, if it exists. In the case of self-assisted channel and for existing customers, identification can be achieved through an Identity and Validation (ID&V) framework. For some entities, an Involved Party may not have a pre-existing relationship with the bank.

Staff Channel. In some embodiments, the involved party search is for Staff users only (e.g., Branch or Call Center). If the member of staff is either face to face or on the phone with the customer, they can perform a search for the required profile.

In some embodiments, staff users can search for a customer profile based on one or more of the search criteria listed in Table 1.

TABLE 1

| Field Name | Description |
| --- | --- |
| Status | Includes Profile status, e.g. Open, Closed, All |
| Relationship | Includes the various types of Involved Parties, e.g. Customer, Prospect, Authorized User, Authorized Signatory, Owner/Principal. |
| Product | The classification or category of a group of retail banking products such as Savings, Checking, Instalment Loan, Insurance, etc. |
| Account Number | Account number of customer to be searched |
| SSN/TIN/NI | Tax identification number of customer to be searched |
| Date of Birth | Customer's Date of Birth |
| First Name | First Name |
| Middle Name | Middle Name |
| Last Name | Last Name |
| Company Name | Name of the Company |
| Street Name | Street of customer's address |
| City | City of customer's address |
| Zip/Postal Code | Zip code/Postal Code relating to the customer's address |
| Country | Name of a country where a customer resides - associated with customer address |

Additional Search Criteria may be added, for example, from a predefined list of available Data Fields. The business can configure according to their requirements/preferences.

If only one matching record is located in the system, it may be displayed for further analysis. If multiple matching records are located in the system, they may all be displayed as a search result list. The user can then select one on the list and proceed to display the complete profile.

In some embodiments, the Search Result list includes the information listed in Table 2. As above, search result fields may be added. The business preferably configures this as per their requirements.

TABLE 2

| Field Name | Description |
| --- | --- |
| Name | Name of Involved Party |
| Address | Address of Involved Party |
| SSN/TIN/NI | SSN/TIN/NI of Involved Party (NI = National Insurance Number) |
| Relationships | Type of relationship the Involved Party has with the bank (Customer, Prospect, etc.) |

Online Channel. When a user logs-in online with credentials, the system preferably retrieves his/her profile after performing an internal search of the customer's information. If the user does not have credentials, the system may assume it is a new customer and request the user to input all the necessary information.

In some cases, a customer may not enter his/her credentials despite being an existing customer with the bank. For this reason, the bank preferably performs a duplicate check in the background to eliminate possible duplicate profiles in the system. This duplicate check may be carried out in all channels, whenever customer credentials are not entered.

In some embodiments, for CMB profiles, only related parties (e.g, director, owner) are able to search for company profiles and associated individual profiles with the company. 'Users' may not search for company profiles.

Display Involved Party Information. An Involved Party (Individual or a Business) may have several different relationships with the bank. The type of relationship(s) that one has with the bank may dictate the data to be displayed.

Exemplary relationships include the following. (a) Customer: This may, for example, be an Individual or Business with accounts that are currently opened and/or accounts that have been closed. (b) Prospect: This may be an Individual or Business which does not currently hold (or has not formerly held) any accounts with the Bank, but whose partial or complete information exists in the systems. Can also be named "Lead". (c) Authorized Signatory: These may be Individuals who have been authorized by another to act on the authorizer's behalf Authorized Signers may include Powers of Attorney, Authorized Signers for Business (non-Consumer) accounts, and anyone acting in a fiduciary capacity (e.g., Trustees, Administrators, etc.). (d) Owner/Principal: These are Individuals who are either an Owner or Principal associated with a Business customer.

Figure 15:
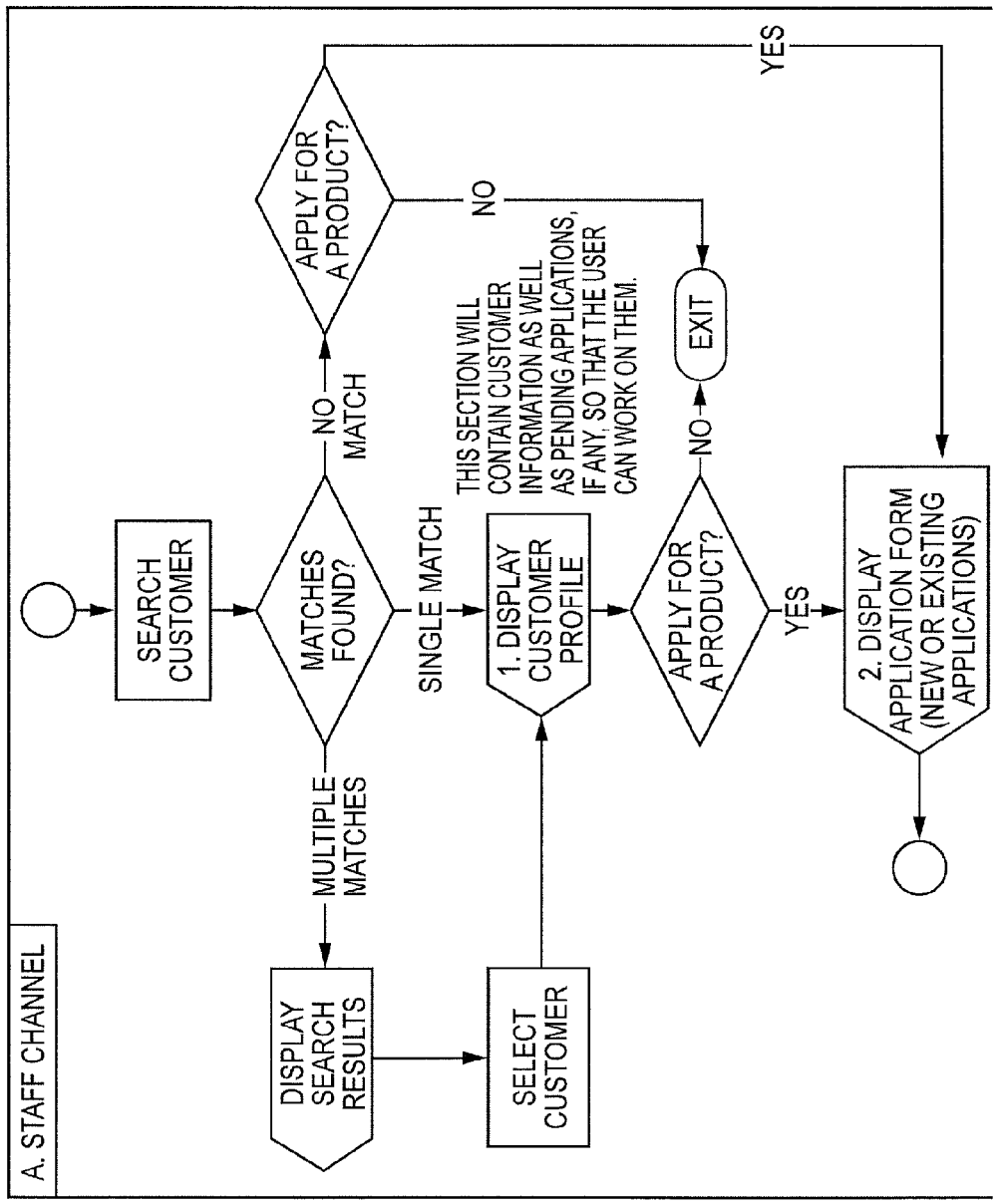
FIGS. 15 and 16 are flow diagrams showing exemplary Gather Application Data scenarios (staff and online channels, respectively) in which customer information can be displayed as customer profile and/or as part of the application form.
Figure 16:
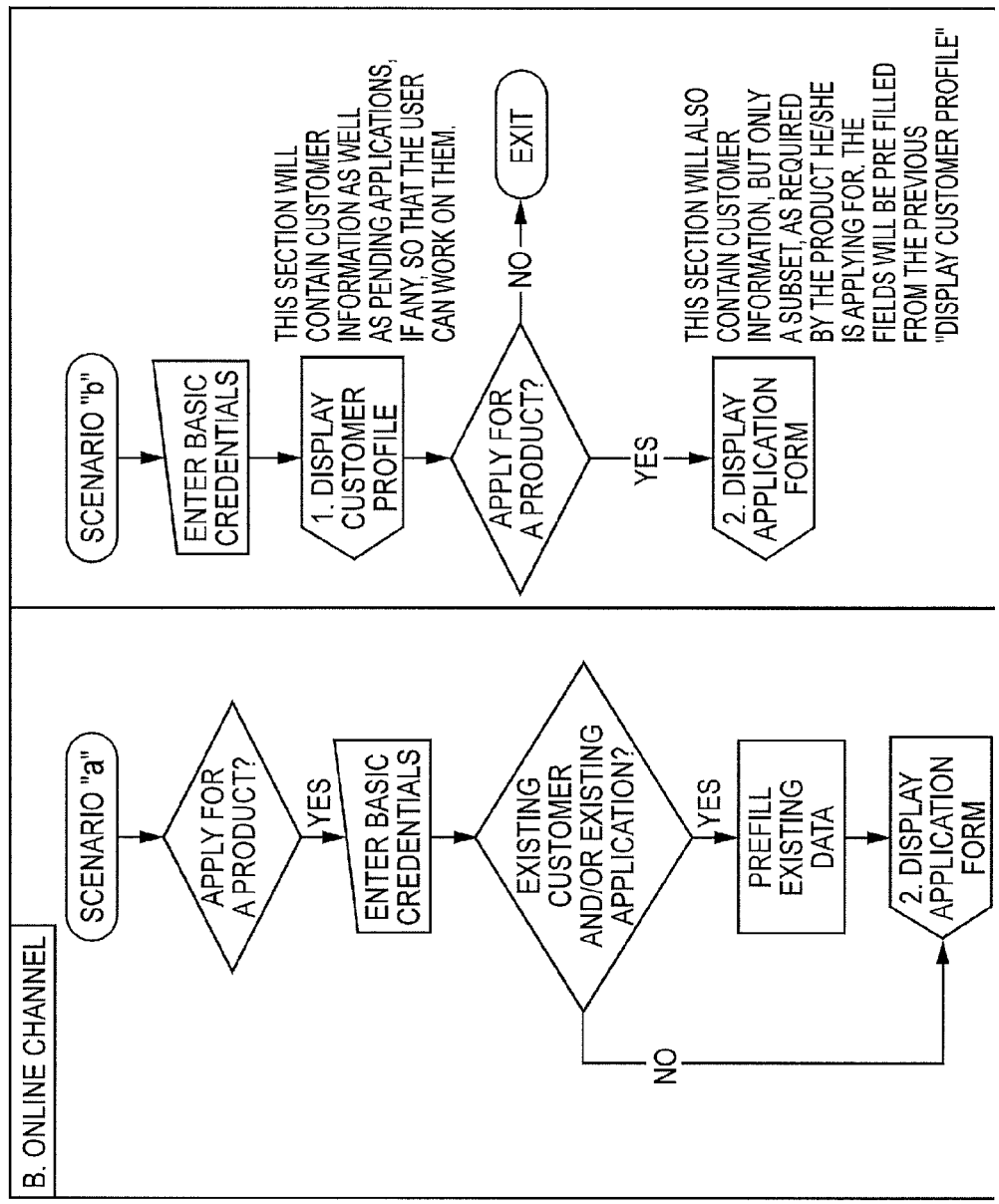

In some embodiments, there are two instances where Involved Party Information can be displayed. For example, in the diagrams in FIGS. 15 and 16: 1. Display Customer Profile—This is a basic view of an existing customer profile, with search results returning some basic customer data (e.g., name, address, DOB). This view may include Application/Account Details (e.g., pending applications, if any, so that the user can work on them); 2. Display Application Form (new or existing applications, during the AO process)—This section also contains customer information, but in some embodiments contains only a subset of customer information, as required by the product he/she is applying for. Preferably the fields are pre-filled from the previous case 1 (Display Customer Profile).

For case 1 (Display Customer Profile), the data displayed is configurable by the business. The available data may be configured, for example, based on the Country, Channel and Customer Type, Relationship, etc. In some embodiments, basic demographic information that is included for PFS customers includes one or more of the following:
  Title
  Other Title
  First Name
  Middle Names
  Last Name
  Maiden Name
  Date Of Birth
  Gender
  Marital Status
  Tax ID Number
  Nationality
  Country and Place Of Birth
  Country of Residence
  Residential Status
  Permanent Residential Address
  Correspondence Address Basic demographic information that may be included for CMB customers includes:
  Business Name
  Entity Type
  Business Registration Number
  Date of Incorporation
  Country of Incorporation
  Name of Parent Company
  Business Registered Address
  Correspondence Address
  Contact Person
  Contact Phone Number
  Contact Address For case 2 (Display Customer Information as part of the Application Form) as well, the customer data displayed as part of the application is determined by the business (configurable). However, this data may depend also on the product selected for the account opening process. Preferably, whatever is displayed to the user is editable (and is entity configurable).

Assemble Application. This section describes the process of composing and assembling one application as per the criteria and rules defined for each product type and customer type. The process includes defining the rules in advance, as well as the real-time construction of the virtual application form subject to the product and the customer.

Preferably, the Business configures in advance the rules and criteria considered to prepare and assemble the application form that will be presented to the customer/user. This will provide flexibility and speed and ease of maintenance to the different regions/countries.

Some data may only be displayed to Staff and not the online customer (e.g., charges data, customer complaints, etc.). The application is dependent on the customer type and product; however, the fields displayed may be different to customers and staff users.

Involved Party Information. If the customer exists in the bank systems, his/her latest information may be retrieved from the systems to update the information on the application. If it is a saved application, the information may be overwritten with any newer profile information. If the customer has provided some information during a session, this information is preferably carried forward to the application. For example, a customer may have entered basic information to request an insurance quotation. After that he/she clicks "Apply" and any data entered for the quotation is automatically pre-populated on the application form. If the Customer Profile does not exist, the system may capture any customer data field requested by the entity (configurable). If it is a joint account and if it is an existing banking relationship, information of all the related customers may be retrieved. The list of names is made available to the user for selection. For a CMB customer, information from the owners/principals may be collected and linked to the CMB profile.

Product Information. Depending on the criteria identified and the customer's initial input or selection, the application contains the necessary product data elements that need to be collected.

Present Application. Once the Product Arrangement/application for a specific product and customer has been assembled, it is presented to the customer/user in order to validate its content or to request additional required information. The application displayed may vary by customer type and/or product, but preferably not by channel (however, the fields displayed may be different for customers and staff users).

As mentioned previously, any information that already exists in the systems or that has been captured during the session can be pre-populated in the screen. The User/Customer is not requested to enter this information again. If the customer is applying for multiple products simultaneously, the system preferably displays the application in a sequential order. Any data that has been captured for one product and applies to a second product is not required to be captured again.

Figure 17:
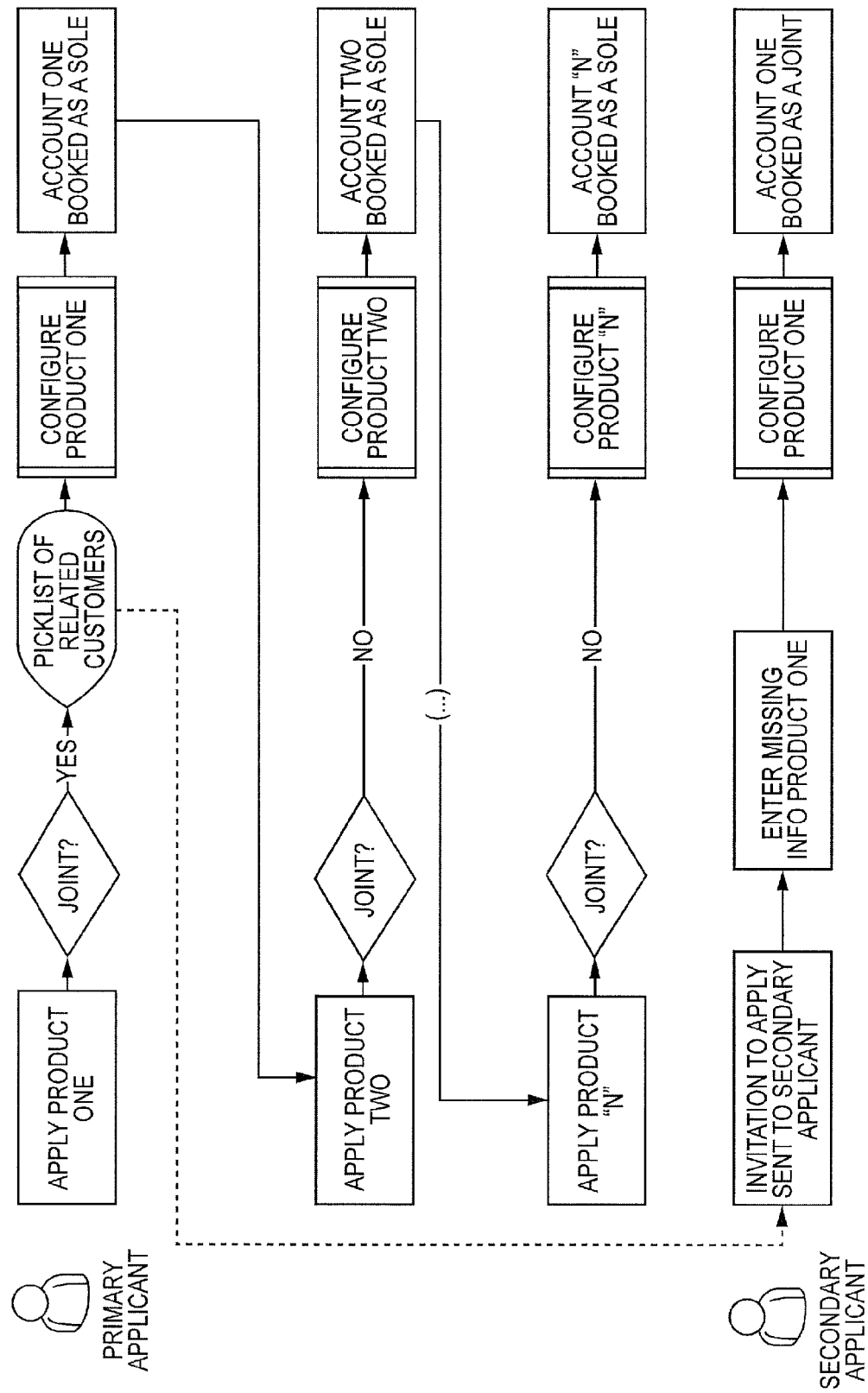
FIG. 17 is a diagram showing one example of how a multiple product joint application can be processed.

FIG. 17 is a diagram showing one example of how a Multiple Product Application can be processed. It also shows how the Joint Application will work.

In the case of multiple product applications, the system preferably processes each product application independently and in sequential order. In some embodiments, the decisioning may be performed together, and the product configuration and (optionally) funding may be performed sequentially. The user enters information on the first product, follows to configure this product, and sends the information. Once this first application has been completed, the second product application will begin.

For a joint application, information from the primary applicant may be displayed and requested first. For existing relationships, the system may provide with the list of related customers to the primary applicant. These may be selected later on as the joint applicants. A request is then sent to the secondary applicant(s) to get their input data. Preferably, only that data that has not been captured before is requested. Primary-entered application details should be prefilled (e.g., address for account). The secondary applicant(s) may choose an alternate channel to respond.

In the case where the secondary applicant is available immediately (e.g., call center or branch), the user (staff) may select to display the secondary applicant's information immediately once he/she is finished with the primary applicant. Again, only that data which has not been captured before is requested, and primary-entered application details should be prefilled (e.g., address for account).

For saved applications, the system preferably displays the last page where the customer stopped the process during the last session.

Enter Application (Product Arrangement) Details. This is the process whereby the customer provides relevant information. Certain predetermined formatting validations related to standardization of fields (e.g., address, date, email, phone number, etc.) are entity configurable and may be performed automatically. Once the application is displayed on the screen, the customer/user will need to enter those fields that are deemed mandatory for the Account Opening to proceed. These rules (what is mandatory and what is optional) are preferably configurable and can vary site by site.

Validate. At the end of each page the system preferably performs a validation of the information captured, to confirm all the required information has been entered and in the correct way. The data that is collected from the customer/user may, for example, be validated against a set of pre-defined business rules and field level validations (configured by the business). If the data is missing or has been incorrectly entered, the system will display the corresponding errors. High risk customers may be prompted to provide additional information, based on business rules/local specifications.

Certain product/country specific rules may interrupt the account opening process and prevent the applicant continuing with the application if the data input invalidates the application. For example, after entering the Date of Birth the system might identify the applicant is not old enough to apply (e.g., a minor applying for a credit card or investment account). In these instances, validation may be achieved through page/field level checks put in place by the business and may be dependent on the order the milestones are presented to the customer.

Identification type is preferably localized to the entities' specific identification types. Entities can define what is a valid type of identification. Fields preferably have validation at the local entity level (e.g., if drivers license has 6 characters in Canada, the system validates on 6 in Canada, even though some entities have more). Where entity provides two or more validate identity options to the user, the user may have to complete only one. In this case, validation is carried out on the current option selected, regardless of whether data has been entered in any or all of the other options. Preferably, only the data entered on the selected option is stored/updated.

As with the case of a PFS Joint Account, the CMB Application data might be captured in separate stages and not necessarily completed at once (e.g., if not all the owner or director information is available at the same time). As with the Joint Accounts, the information on the CMB customer and the Owner/Principals may be captured sequentially (e.g., User starts by entering the company's information. Once the company's information is completed, and if the owner/principal is available to provide his/her information, the user will proceed with the first owner/principal, and so on). The system may, in some embodiments, require all the owners/directors information to be completed before proceeding with the application.

The customer/user can decide to leave the application process at any time. The customer/user can decide to either save the data for later retrieval, or just cancel the application completely. In some embodiments, the system may trigger certain abandonment services. For example, the Communications module may send a reminder to the customer that the application is pending and all the activities and context information may be tracked in detail.

In some embodiments, certain information may be captured as multiple instances into one single application (e.g., Customer Addresses, Identification Documents, Owner/Principals, etc.). For Customer Addresses, for example, the ability to add more than one address is definable by the local entity, as is the type of address (e.g., mail, email, etc.). The entity may also define the maximum number of addresses a customer can add per address type and in total (in accordance with any host system restrictions). The customer may also provide more than one identification document, one CMB customer can contain one or more Owner/Principals, etc.

Once the information from the applicant(s) has been collected, the user can proceed to confirm and submit the information in order to request the account and the customer creation (if new customer). In some embodiments, this process proceeds as follows:

Confirm. Customer/staff makes sure that the information provided is correct and has been accurately captured. He/She then proceeds to re-confirm the desire to apply for the product. If necessary, the customer can modify the provided information.

If the customer considers that he/she has entered all the available information, he/she can proceed to submit the application. This means the customer has completed filling in the data and this data will be validated. The Account Opening system will confirm that everything is completed and trigger an engine to send out a confirmation notice.

Once an application has been displayed to the user (customer or staff), the data that has been collected can be stored in the system for further decisioning. In the case of new customers, new profile creation may also take place.

In the case of new applicant, once a predetermined minimum set of information (e.g., Name and Contact Details) has been captured correctly, a profile may be created. In the case of an existing prospect, once all the information has been captured correctly, the Prospect Profile may be converted into a Customer Profile. When creating a CMB Customer Profile, information is collected, for example, on Owners, Directors, Authorized Users, etc. as well. These profiles may be created at the same time as the CMB customers, but in some embodiments may be created as separate profiles linked to the CMB customer (e.g., so that these profiles are available for search, etc.). If Authorized Signatories or Authorized User fields are requested as part of the Product Configuration, these may be created as independent profiles as well, but linked to the specific Account.

During the process of application creation or maintenance the user may update relevant primary or linked profile information. Once the user confirms the provided information, the original profile may be overwritten with the newest information.

In some embodiments, the system provides maintenance functionality for one or more of the following types of profiles: Primary Customer, Subsequent Customer(s), Authorized Signatory, Authorized User, and Owner/Principal.

Validate Identity

Validate Identity is the process of determining that the customer is, beyond doubt, the person they say they are in their application, and applies to both new and existing customers. The bank provides for a balance between ease-of-use versus control, in order to enable customers to do business online without compromising internal risk standards and to accomplish a competitive account opening process. The Entity may pick from a set of pre-defined validation options.

Information should be obtained when opening an account which meets the following criteria:

For a new customer the bank must establish beyond doubt the identity of the customer (e.g., using a Passport or ID Card) and confirm their address. In the case of CMB clients, in addition to identifying and confirming address of the owners/directors/authorized signatories, the bank may also need additional information depending on the legal entity and local regulations (e.g., Certificate of Incorporation or Board Resolution).

For new and existing customers the bank may require additional information to establish how they will use the account (e.g., expected turnover). This may assist, for example, in detecting suspicious activity in a timely manner, complying with applicable laws and regulations, minimizing the risk that the Bank will be used for illicit activities, and protecting the bank's reputation.

For existing customers the bank needs to authenticate their bona fide when the customer contacts them to request a new product, dependent on channel (e.g., PIN, TAC Telephone Access Code, or ID&V).

The first two bullets above collectively refer to a KYC (Know Your Customer) process existent in the banking industry. In some embodiments, the first step in the KYC process is to identify and consider the particular KYC requirements associated with the delivery channel used by the customer during the application process. The manner in which the customer approaches the Bank to establish an account is an important determinant for the KYC information collection process and the type of due diligence performed on the prospective customer. The piece of KYC that relates to capturing additional Customer Information is included under the Gather Application Data milestone. The piece of KYC that relates to performing a Documentary Verification or a Third Party System Validation is covered in this milestone as part of the Manual and Automated Validation options.

Figure 18:
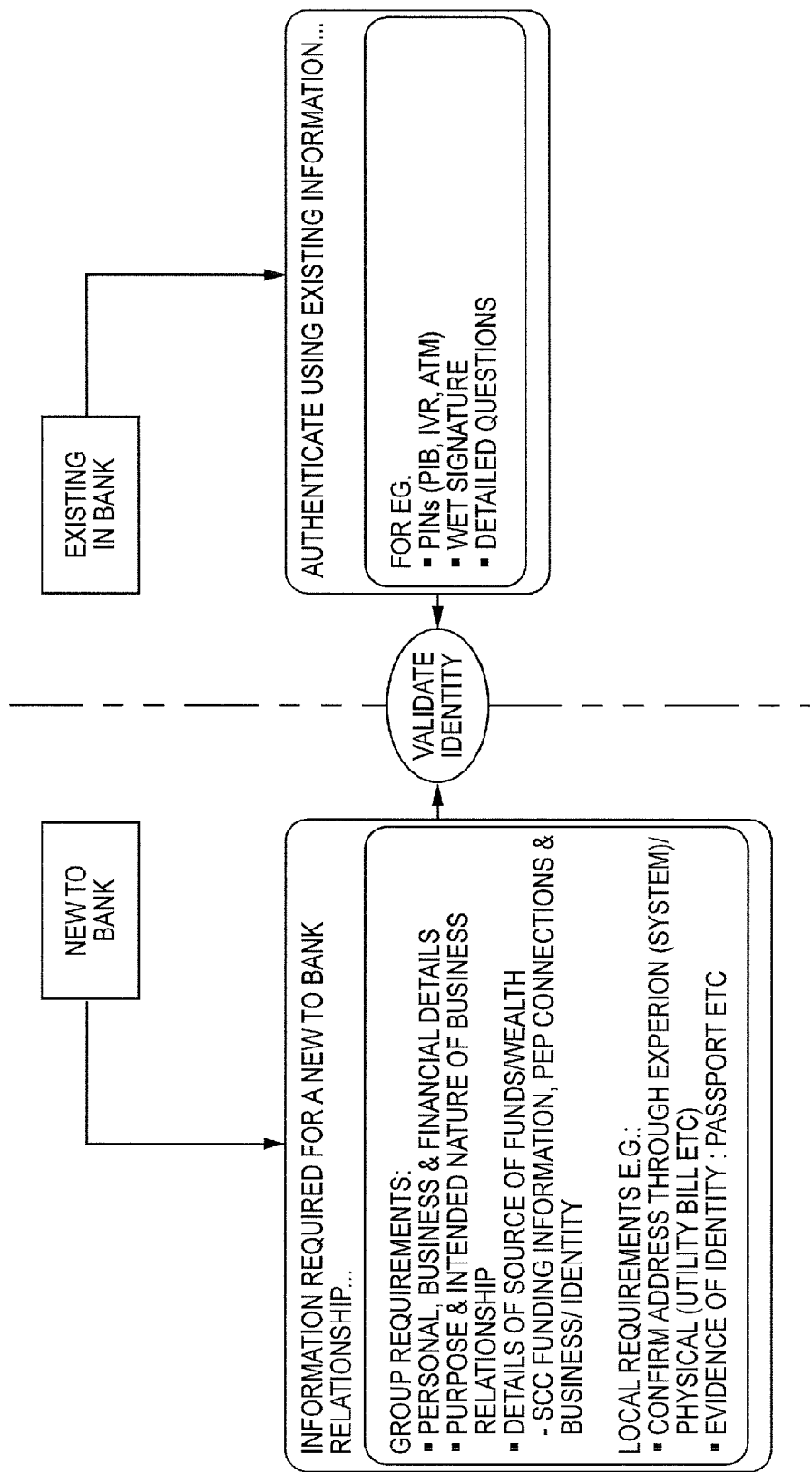
FIG. 18 is a diagram showing exemplary requirements to validate identity for new versus existing customers.

FIG. 18 is a schematic diagram showing exemplary requirements for New to Bank versus Existing in Bank Validation. Validation of both new and existing customers is supported.

Preferably, Validate Identity does not rely on the presentment of physical documentation. Eliminating this requirement removes at least one barrier to account opening, and may result in a higher volume of applications processed because the 'log jam' of manual process is eliminated. This increases the likelihood that accounts are opened correctly in the first place, using accurate, up to date data—enabling a better risk decision and also minimizing resource-heavy repair processes post-account opening. Fake documents would no longer present a problem because documents are not used, and the need for physical storing and scanning of documents would be eliminated.

In some embodiments, the system provides interaction points with local, automated, third party identity validation systems (e.g., Equifax, Experian) or external databases (other national databases, utility companies, insurance companies, etc.). Manual identity validation processes (and means of updating application status when completed offline) may also be supported. Use of PIN, TAC or ID&V credentials may authenticate a user (CMB and PFS). Validation by credit card (check that customer is entitled to use the card), challenge SMS, employment (check with employer), outbound call (check with telephone database), biometrics, and other means is also possible.

The means of identification validation will vary based on local regulatory requirements. Each entity may define specific (or global) requirements for validation of identity based on customer type, product and channel (of application). The account opening business rules engine defines what can be validated and how. For example, for a new customer applying for a checking account via the internet may be required to present a valid, original government issued ID in person at a branch, whereas a new customer applying for a savings account via the internet may be validated using an automated validation process (e.g., VerID, CashEdge) based on bureau data or validated through funding (e.g., nominal money transfer).

In some embodiments, Cross Group (domestic and international) and Cross Channel Validation is supported. As used herein, "Group" means within a local implementation (e.g., country) the different entities/propositions that exist, and the possibility for validations that are required amongst these entities/propositions. Again, the ability to capture metrics on all areas within the Account Opening process to facilitate 'test and learn' tactics is supported.

In some embodiments, this milestone does not include, for example, assessing customer's credit worthiness or qualifying them for a product (this preferably belongs to the Decision milestone), Fulfilment process to confirm Validation (exit to offline process), Validation by Funding, Merchant/White label accounts, Cross Border validation, or Duplicate application validation.

In some embodiments, Validate Identity and Application Approval are distinct and independent business processes. One exception, for example, may be U.S. Cards, where decisioning and validation are typically performed as one single batch. An application can be completed in a different channel from the one it was originated in.

Pre-conditions to the Validate Identity milestone may include: Gather Application Data (assumes some or all customer data has been captured; in some embodiments, this milestone may be a hard dependency for new to bank customers), Decision (product application may have been pre-approved), Product Configuration (customer may have completed product configuration), and Terms and Conditions (customer may have been presented with terms and conditions).

Post-conditions to Validate Identity may be: Decision, Terms and Conditions, Activate Account (in some embodiments, account cannot be activated until customer identity is validated), and Gather Applicant Data (sufficient data may have been captured to complete validation of identification, but further information may be required to make product offer/approve application).

Figure 19:
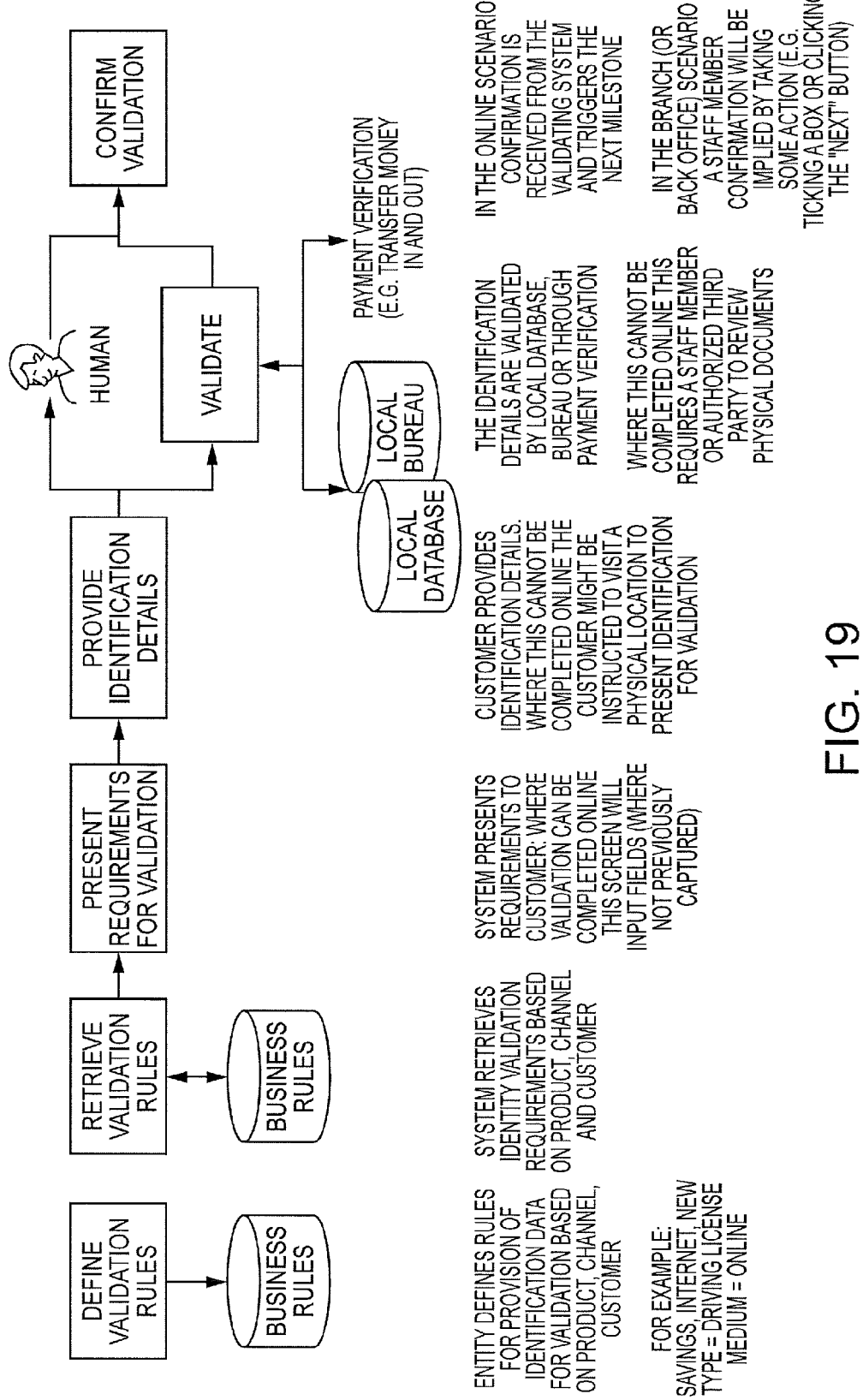
FIG. 19 illustrates exemplary components of the Validate Identity milestone.
Figure 20:
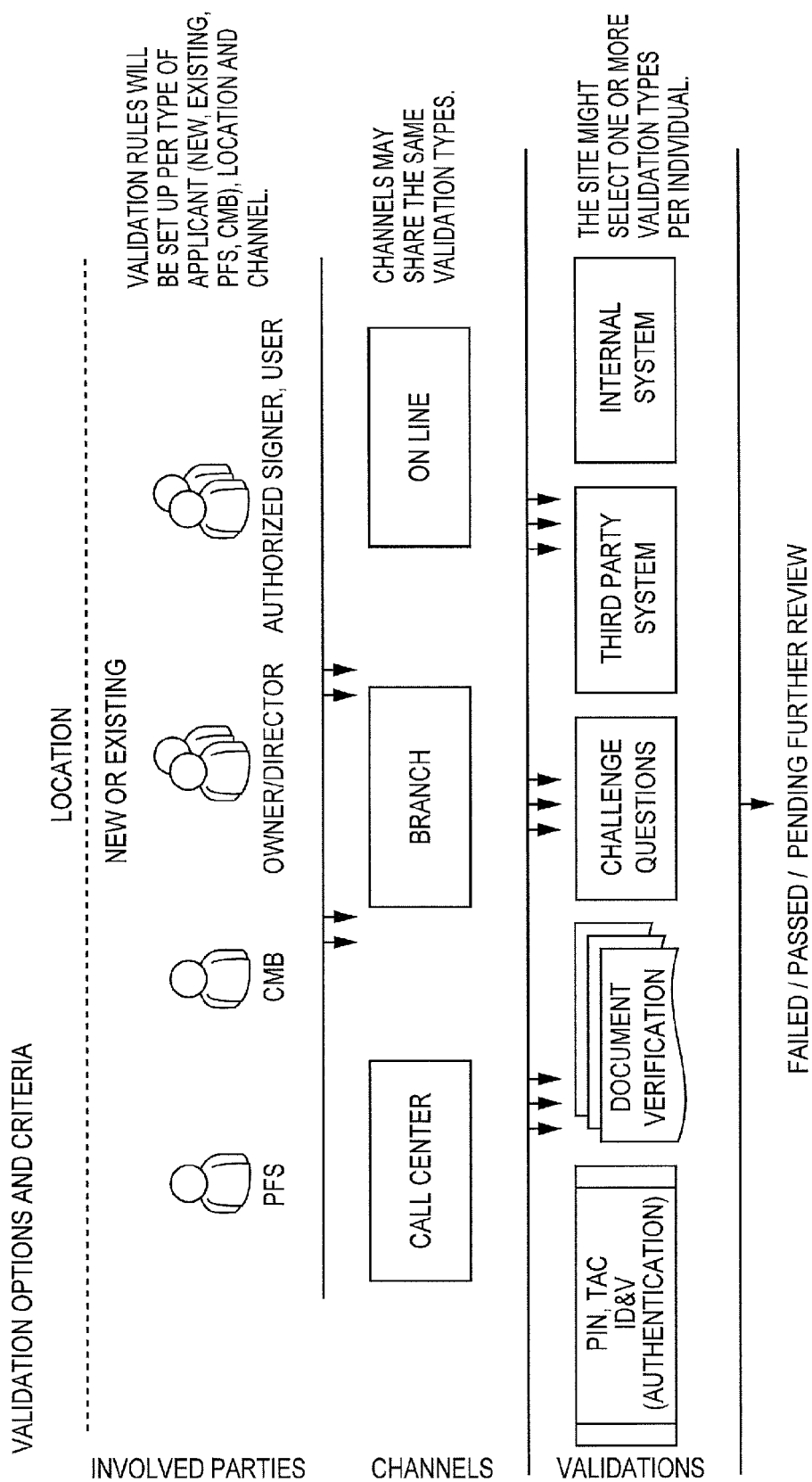
FIG. 20 shows a diagram of the various levels of configuration available for validation.

FIG. 19 shows a schematic of the various steps involved in the Validation of Identity. FIG. 20 shows a schematic of the various levels of configuration available for ID Validation.

Define Validation Rules. The means of Identity Validation may vary per country or region based on local regulatory requirements. This section describes the various choices available to the entities, as well as the requirements to set up these validations as per their specific needs.

Preferably, local entities set up their own identity validation requirements which conform to local regulations and available validation tools. They may, for example, determine what information and/or actions are necessary in order to validate a customer's identity depending on what customer type (new/existing) or customer group (CMB/PFS) is involved in the Account Opening process, as well as the channel. Some validations may be performed real time, allowing for STP, while others may require more time to be completed and may demand manual processing.

There is preferably a set of available, pre-defined Validation options as detailed in the previous section (Authentication, Document Verification, Challenge Questions, Third Party and Internal Systems). The entity may orchestrate these options and configure them depending on their specific scenarios. This configuration is business maintainable, so that the rules can be easily added, changed or removed without any further need for system development. Validation can be fully/partially automated (e.g., as in the case of Authentication through credentials) and manual (e.g., as in the case where verbal quiz questions or documentary verification is required).

The Business may configure for a given criteria, what the valid options or methods of customer identity validations are. In some embodiments, the criteria to determine the validation rules are (1) Customer type: Validation may differ, for example, if it is an existing customer vs. a new customer, or depending on whether it is a PFS or CMB case; (2) Channel: Certain validation solutions may only be required if the customer is applying online. Staff facing validations may be done, for example, through document checks as well as reusing online solutions, if applicable; and (3) Validation Status: Validation can return different statuses as output, for example: 'Failed', 'Passed' or 'Pending Further Review.' In certain cases where one type of validation has failed or has returned a doubtful response, the system may perform a second type of validation. For example, if a third party system validation fails, the customer may be requested to send his/her documents via mail (Cascade validation). The validation statutes can be thought of as a hierarchy—the Application status encompasses the Milestone status as well as the validation status, and the Milestone status encompasses the validation status as well. In other words, as a hierarchy, Application Status→Milestone Status→Validation Status. Given this, Validation Status makes up the Milestone and Application Status, and the Milestone Status makes up the Application Status.

In some embodiments, the system provides a user friendly tool for the Business Users to configure these rules. Preferably, any of the data fields available during Account Opening, will be available to use in setting validation rules as this may take place during the application process, or post-booking. For example, if dealing with verbal questionnaires, the entity can select the fields/questions they want to include as part of the validation of existing customers. If dealing with external systems, the entity can define the data that is required to be sent to the third party or internal system of their choice. The business may store the information that resulted from the automated validations for future reference. The system preferably allows them to define the fields they will store as a result of an interaction with a specific external system. If dealing with documentary verification, the entity may define locally the required documents that are considered Acceptable Identification Documentation. The user should be able to store in the system the information presented during a documentary verification (information on the ID provided, e.g. number, expiry date, issue date, etc.). The fields available to store are preferably configurable by the business.

In some embodiments, the system includes "Cascading" Validation Rules. For example, if one rule is evaluated false, then another validation rule is attempted in sequence.

The Business may configure the actions to take once the results from Validation of Identity are available. These actions are related to sending indications to specific queues depending on the validation codes received.

To support different scenarios (e.g., entity cannot validate a previous address that is an overseas one, or the customer does not have a previous address), the 'Identity validation' portion of the system is preferably flexible enough for entities to allow the customer either to select one of X options for additional validation (or, e.g., customer has to validate using all options if an entity requires). Where there is only one option, or the customer cannot validate with any of the options, they should be able to click on option on this page and as such the application is sent to the referral work queue.

Where validation fails, the entity can configure the reason for failure (e.g., either generic or a specific error message).

Product type may or may not be a determining factor for the validation of the customer identity.

The entity can configure whether appropriate checking (including whitelist, blacklist, watchlist, etc.) will be performed for each of the joint and primary and secondary applicants, authorized users, and guarantors.

Apply Validation Rules. In this process, the system retrieves the rules for the specific scenario and triggers the corresponding action(s).

Whenever an individual or multiple individuals apply for a new product, through any channel, the system processes the information available and cross references it against the validation rules that have been defined to determine the method of validation. Integration Points may be established depending on the validation criteria configured. For example, an entity may have selected automated validation through Experian, hence, an exit point to Experian is provided. More than one Validation Option can be performed for one single applicant.

In some embodiments, this process is as follows. In order for the system to identify the required validation option, it first recognizes the given scenario. For example: Is it an online or staff facing situation? Is this an existing customer or a new customer? Is this a CMB or a PFS customer? Has the customer been rejected in a previous validation and is trying again?

Depending on the validation option(s) set up for that specific scenario the system requests a predetermined minimal set of information up front. For example, for PFS: Name, Date of Birth, Address, Identification Number (TIN/SSN, Passport, etc.); or for CMB: Name, Address, Identification Number (Business Registration Number, TIN, etc.). Once the system has identified the scenario and the corresponding predefined options, it triggers the next steps of the validation.

Where possible and where local regulatory requirements allow it, automated identity validation is performed. Automated or Semi Automated Validations may include authentication through credentials, Third Party Systems, and/or Internal Systems. In some embodiments, for automated Identity Authentication, the system identifies a customer by means of credentials (e.g., ID&V, PIN, TAC, etc.). Automated Validation may also be achieved through integration with external systems (including systems that may be external to the AO system, but still part of the Bank systems). These systems preferably feed back to the AO system with the status of the validation process.

In some embodiments, the Account Opening system allows for integration with different local validation systems (e.g., VerID, CashEdge, Equifax, etc.) and/or existing systems (e.g., blacklists, CDU, etc.). These validation systems are exemplary knowledge-based authentication third party systems that provide real-time confirmation of customer identities. They are interactive solutions that present a series of challenge questions utilizing relevant facts on the individual obtained by scanning billions of public records. Once the customer has responded to the questions, the validation system delivers a confirmation of identity within seconds, without requiring any prior relationship with the customer.

The system has the ability to react to the outputs from other decision systems according to the business rules defined by the entity, making a final decision or carrying out the next step. It is expected that the third party and internal systems will provide a result that will either satisfy, not satisfy, or pend the milestone. The returned output may be stored with the application/profile/history for later reference. In some embodiments, the validation statuses are only visible to staff users.

In some embodiments, one or more manual validations—performed by a person with none (or almost none) system intervention—may be performed instead of or in addition to automated validations. Types of Manual Validation include Verbal Quizzes, Documentary Verification, and Enhanced Due Diligence.

Verbal Quizzes may be used to validate the existing customer's identity by presenting a standard list of questions approved by compliance. These questions are typically read to customers by staff and not used online. The staff captures the customer's answers and compares them with the information existent in the bank systems. In some embodiments, the Verbal Quizzes relate to customer information captured in advance that sits under the Customer's profile.

For Documentary Verification, for example, the bank staff may examine and verify identification to determine the true identity of all customers/application requesting the Bank's services. In some embodiments, this process may be closely related to the Bank's AML (anti-money laundering)/KYC process. The list of documents required to check may vary depending on the product and customer. Preferably, each entity determines the required Acceptable Identification Documentation by scenario. The list of required documentation is presented to the customer or user. The staff user obtains a printed form of identification, collects critical information from the ID, and where necessary has it entered in the account opening system (where it is preferably maintained as part of the customer's profile). For the printing of the application form summary, entities have the flexibility to be able to add an area for signature(s) (e.g., the application could be the signature card if necessary). This functionality is available for online, branch and call center channels.

Enhanced Due Diligence is a process for identifying, understanding, and monitoring with greater scrutiny those customers that may present a heightened risk of money laundering, terrorist financing, or other illicit activities. If a customer has been identified as an SCC (Special Category of Client—e.g. public officials or connected persons, companies offering financial services, companies involved in military production, casinos, etc.) during the "Gather Application Data" process, the validation of the identity might involve more stringent requirements, including, for example, senior management approval or obtaining a greater understanding of information and/or documentary verification. The application system may flag the application for further review (workflow) or may serve the applicant additional questions, or both, for example.

Confirm Validation. In some embodiments, this final step is not apparent to the customer, as he/she does not need to know the results of the validation itself. However, internally, having performed a successful validation confirms that the account can be safely activated. In the case of Automated validations, this step refers to internal processes that trigger the next steps based on the culmination of the Applicant's Identity Validation. In the case of Manual validations, this step requires a person's intervention to update the status of the validation milestone. Successful validation will then confirm the milestone has been met and the account can be opened.

In some embodiments, the results of the validation processes detail whether the milestone was 1) satisfied, 2) not satisfied or 3) pend. The system may take actions based on the details received (e.g., Codes from a Third Party System), and send indications to the proper department (e.g., queues to Fraud).

If the Validation is pending as a result of any of the previous steps, the system preferably update the status of the application and send a note to the communications module to follow up with the customer with the appropriate instructions on how to complete this milestone. Where there are multiple milestones outstanding, the business can configure how such cases are handled (e.g., they can decide whether or not any communication is combined or the communications are sent separately). This is configurable at product and/or milestone level. For example, changes to milestones, application decision results, applicant validation results, funding execution, fulfilment, etc. may all have triggers built in so local entities can use these activities (or not) to initiate a message to be sent.

In some embodiments, the application does not need to be pended if the validation has not been completed. The customer can continue the Account Opening journey. The account can potentially be booked but not activated (depending on the entity's choice).

In some embodiments, once the validation has been performed the system will not allow the user to modify those fields that were used for validation purposes. In case of documentary verification and assuming receipt of appropriate documentation, as discussed above, a staff user may be able to update the status of the validation manually. The ability to update the status manually may be controlled by entitlements.

For existing customers, successful authentication (ID&V, TAC, PIN, etc.) can satisfy the validate ID milestone. Where a customer has to be validated manually, staff have the ability to capture such information as part of the application (can capture that for example they have seen the ID and can record the actual ID number). They also have the ability to capture information relating to the ID (e.g., issue date, ID type, expiration date, ID number, etc.).

Terms and Conditions

Terms and Conditions is the process of presenting the customer the terms and conditions related to the account that he/she is opening. This process involves the retrieval and presentment of Terms and Conditions and Disclosures, in multi-language where applicable. This process should be simple, quick, easy to understand, and easy for the customer to accept.

The description below refers to the customer self service channel. Where variations exist for other channels, they are noted.

In some embodiments, Terms and Conditions are static, and held externally to the Account Opening System. In other embodiments, the Account Opening System may dynamically generate Terms and Conditions, which may vary according to product selection, configuration and customer segment.

Acceptance of Terms and Conditions may be passive or non-passive (Online/Verbal/Wet Signature). Assuming passive acceptance (e.g., first transaction is taken as acceptance of T&C) is deemed acceptable, automated means of indicating acceptance, and recording that acceptance, are not applicable.

In some embodiments, the Terms and Conditions milestone is deemed complete when the customer has been presented/referred to the Terms and Conditions and his/her acceptance has been recorded for non passive acceptance. Entities which require a signature may be provided an exit point which may pend the overall application.

In some embodiments, the system provides for printing of T&C and Disclosures (e.g., via the browser), requests to email/mail/fax copy of T&C (e.g., exit point to Communications module), and/or audit logging (e.g., recording the date/channel when T&C was accepted and when T&C was distributed, for passive/non-passive options). For example, data may be kept for a prescribed period as to the date and time the customer accepted the T&C, which product T&C and version the acceptance related to, and/or a central copy of the T&Cs may be held, so that at any given time, anyone can determine the exact T&C that was in operation at the date and time the customer accepted them.

In some embodiments, the system may also provide for "stitching" of T&C or disclosures, storage repository (e.g., storage of customer acceptance for specific period of time) and retrieval of archived T&C, ability to view log details (e.g., when the T&C was emailed to the customer), imaging of wet signed paper T&C documents, usage of an signature electronic pad into the T&C Milestone, personalized T&C presentation for CMB customers, content management of terms and conditions agreements as well as other appropriate disclosures, and/or presentation of terms and conditions outside of AO process.

If the terms and conditions contain product specific information, the Product Selection milestone may be a mandatory pre-requisite for that particular T&C and its related disclosures.

The degree to which the process can be fully automated may be subject to local regulatory requirements.

Figure 21:
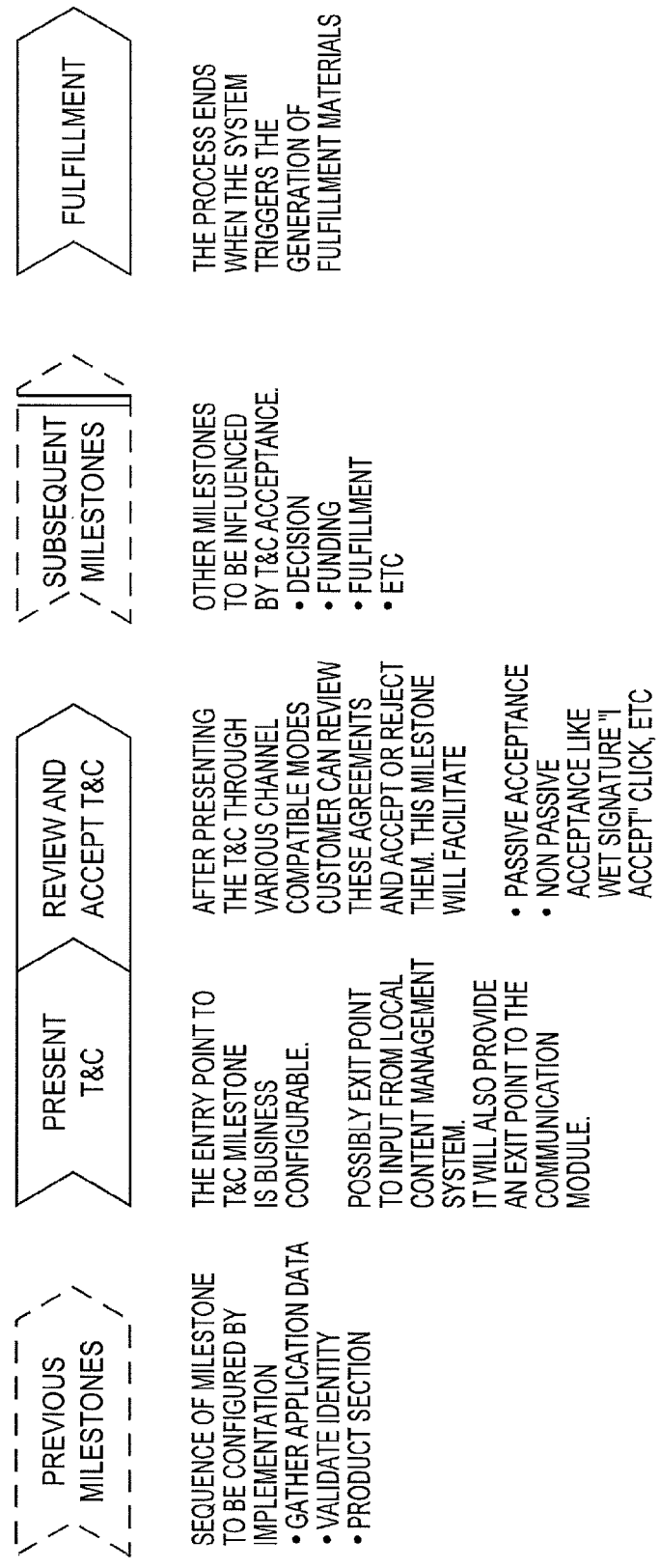
FIG. 21 illustrates exemplary components of the Terms and Conditions milestone in an exemplary relationship to other account opening milestones.
Figure 22:
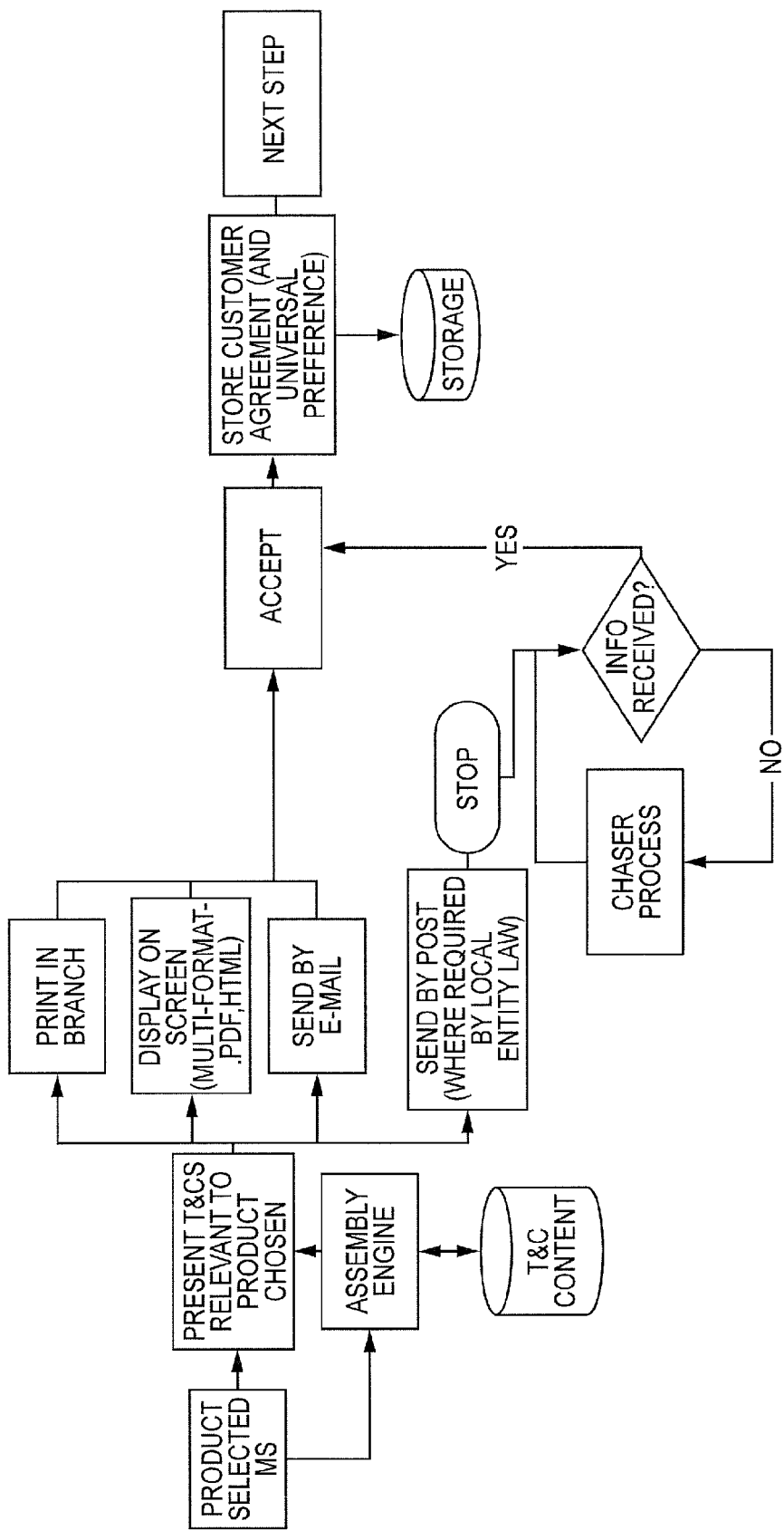
FIG. 22 shows an overview of an exemplary process of activities within the Terms and Conditions milestone.

FIG. 21 shows an overview of T&C in an exemplary relationship to other AO Milestones. The Terms and Conditions milestone can reside at any point within the Account Opening flow. For illustration purposes, consider the following two scenarios.

Scenario 1: A non-customer goes to the public website and follows links which take him to "Apply for Savings online". He enters the AO process of collect applicant information, etc. Once the customer enters all the necessary application data and selects to continue, the system presents the appropriate terms and conditions agreements. In this first scenario, Product Selection and Gather Application Data milestones occurred before the T&C milestone. The other milestones like Funding and Decision will occur depending upon the application status achieved after completion of T&C milestone.

Scenario 2: An existing customer follows links which take him to "Apply for Savings online." He can directly decide to review the T&C conditions. In this scenario, the Product Selection milestone happened before T&C milestone. The other milestones like Gather Application Data, Funding, Decision, etc. will happen if the customer decides to continue with the account opening process.

Certain subsequent milestones may be influenced by the Terms and Conditions milestone. For example, Funding details may be captured before Terms and Conditions are accepted but it may be that the Funding instructions cannot be executed until after the Terms and Conditions have been accepted.

At different times during the process, exit points to external systems/engines may be provided, for example for input to the Terms and Conditions presentation. For example, this milestone may provide exit points to other systems like the communication module to send the agreements on email/mail/fax upon the requests from the customer.

Preferably, this milestone functions to present the customer with an appropriate Terms and Conditions agreement related to the entity as well as product(s) the customer selected. By collecting the input from this milestone, the system may decide whether the application is eligible for activation and, at the very end, send fulfilment requests.

In some embodiments, the process steps within the Terms and Conditions milestone are as follows: (a) Assemble (retrieve) Terms and Conditions (e.g., generate Terms and Conditions of a product offer based on product and customer. If customer has previously accepted Universal Terms and Conditions this process may not be invoked); (b) Present Terms and Conditions (e.g., present or deliver Terms and Conditions to the customer with instructions for indicated (non)acceptance); (c) Review Terms and Conditions (e.g., provide customer with the opportunity and means to review Terms and Conditions and make an informed decision on whether to proceed); and (d) Accept Terms and Conditions (e.g., customer confirms (non)acceptance of Terms and Conditions).

In some embodiments, Terms and Conditions are product specific and may vary significantly from product to product. Certain add-on options/features (e.g., overdrafts) may generate additional Terms and Conditions.

In some embodiments, Universal Terms and Conditions may be provided, which can eliminate the need to present and agree Terms and Conditions to existing customers applying for new products. Certain exceptions may apply (e.g., lending terms, 'white label' cards such as department store credit cards, etc.)

Present Terms and Conditions/Disclosures. In some embodiments, the process for presenting the terms and conditions/disclosures to the customer or user is as follows. Each entity may have its own terms and conditions, in its own language. There are no system specific requirements for T&C or disclosures.

There are various types of T&Cs/disclosures which can be presented to the user. For example, (a) Consolidated T&C: Refers to a master agreement with the bank (e.g. "I contract you to be my bank, pull a credit bureau, etc."); and (b) Other T&Cs and Disclosures: Product specific documents which may or may not require a signature from the customer.

Preferably, the system generates the consolidated Terms and Conditions; however, some entities may not have the consolidated Terms and Conditions in place. The system is configurable to provide the option of product specific Terms and Conditions for such entities.

In some embodiments, processes related to the ongoing creation, maintenance and amendment of the content of the Terms and Conditions agreement as well as the relevant disclosures are handled by integration to a content management solution (e.g., through a database, server, etc.). In other words, in some embodiments, the local Content Management System preferably manages all the disclosures as well as terms and conditions agreements and there is not any runtime stitching of disclosures within the AO system. Irrespective of the level, the system simply pulls all the appropriate terms and conditions documents (including necessary disclosures) configured for the respective entity and presents them to the customer or user. This is accomplished via an 'Integration Point' in the Content Management System. The local entities are responsible for updating the T&C content to accommodate the new products as and when required. The content management system preferably handles multilingual Terms and Conditions and their respective character bytes.

In some embodiments, the system merges static and dynamic data and presents this information to the user/customer in the form of a T&C or disclosure statement. The AO system may, for example, be responsible for retrieving rates and fees, where applicable, and passing this information to the communications module. The AO system may also be the recipient of the output from the request to the 'comms' module.

The Terms and Conditions may be available in other ways outside of the Account Opening process (e.g., Post booking—On Customer Profile, public website, etc.).

The system supports presentment of the T&C/Disclosures at various points within the account opening process (in some embodiments, consolidated T&Cs are only presented once, but product level T&Cs are available for each product). The system also supports presentment of a static T&C/disclosure (the T&C/Disclosure may be retrieved from a Content Management solution such as a database, server, webpage, etc. and may include additional information such as rates and fees), receipt of a pre-assembled T&C (including dynamic rates and fees) for presentment to the customer, and/or presentment of T&Cs/Disclosures in multiple languages (including double byte characters).

In some embodiments, the Terms and Conditions process for new and existing customers is the same, except, for example, where a Consolidated agreement has previously been accepted. If a customer has already signed a Consolidated agreement, he/she may not be presented with another again when applying for a new product, if that same consolidated agreement also covers the subsequent product(s) being applied for.

The Terms and Conditions documents are available to generate in various forms (e.g., PDF, HTML, audio format, large print, Braille, etc.) as per the local specifications. The Terms and Conditions document content for a particular entity may, in some embodiments, be static over a period. The entity specific Terms and Conditions content management is preferably performed locally.

The system supports the ability to present product specific terms and conditions disclosures, for example where a Consolidated agreement is not applicable or allowed by local regulatory environments (e.g., balance transfer terms and conditions disclosures related to Funding milestone—the system is configurable to display the terms and conditions before or after executing the balance transfer request as per the requirement of local business compliance regulations).

This extends to the scenario where there may be product options related to a chosen product that attracts different terms and conditions to the underlying product. For example a checking account may have its own terms and conditions, but if an overdraft is added, there may be a separate terms and conditions required for the overdraft. The system supports the presentation of both sets of the terms and conditions for scenarios such as this.

When new products are added by the local entities, the system supports the ability of the entities to produce new terms and conditions in the content management solution employed and to be able to link them to the account application process.

Within each entity (e.g., country), the system can present appropriate T&Cs based on the customer/user's location (e.g., the customer may be presented with different T&Cs depending on where they are attempting to open an account—"upstate" vs. "downstate," etc.).

If the terms and conditions contain product specific information, then the Product Selection milestone may become a mandatory pre-requisite to the Terms and Conditions milestone.

The entity can configure (business without IT intervention) for each product whether the Terms and Conditions are to be accepted passively (no user input selection is required) or whether there must be an active acceptance of Terms and Conditions.

The Terms and Conditions may change based on the configuration of the product. The selection of configuration options may enable/disable entity-defined sections of the Terms and Conditions.

Review Terms and Conditions/Disclosures. In this step, the customer is given the opportunity to read and review the Terms and Conditions along with other applicable disclosures presented to him.

The customer may request the Terms and Conditions as well as Disclosures by various different communication methods (e.g., e-mail, mail, download from website, print from website, fax, etc.). If the terms and conditions/disclosures are requested by an outbound communication method (e.g., not from website by customer), then a request may be issued to the Communications Module to issue the terms and conditions/disclosures by the method requested. For example, a mail request may be sent (e.g., by an email or queue) to the common communication module and/or fulfilment office depending on local entities' specifications. A user may also choose to email the terms and conditions to an email address. For an existing customer or for a new customer who has completed the "Enter Applicant Data" milestone, the email may be pre-filled, with the ability to change the email. The user may verify if that is the correct email; if so, the user may send a request to the common communication module via appropriate system options. The user may then receive a confirmation note that an email is sent, and be re-routed to the original "brief description" page. If the customer is new and has not fulfilled the "Enter Applicant Data" milestone, the entry may be blank, allowing the user to fill in the data. The terms and conditions are preferably provided in Portable Document Format (PDF). Faxing may also be used to deliver terms and conditions to the customer (e.g., via integration point with the common communication module also for these communication modes). The system also supports Customer Self Service—for example, users may print via the Internet browser and/or Adobe print options.

In some embodiments, the communications module generates "Chasers" to remind the customer to submit a pending document. Once a consolidated T&C acceptance is sent back by customer, the acceptance may be logged so that the system will not ask for the consolidated T&C acceptance in the future from the same customer, if they apply for a product that also uses the same consolidated T&C.

Metrics may be recorded of occurrences during this process to see how users are using the system during the terms and conditions phase. Metrics may include, for example, logging of chasers sent (including date/time), ageing details from when terms and conditions were sent to when they were accepted, how many people exit during the terms and conditions page, how long they spent on the page viewing the terms and conditions, etc.

The system provides the option to present the product specific terms and conditions as well as disclosures wherever required. In some embodiments, the system allows a user to print a T&C Disclosure (in a printer friendly way) in order to capture wet signature. Scanning and archiving of the wet signed paper documentation may or may not be supported.

Preferably, the system keeps the history of all T&C communication. Business representatives may view this communication history outside of the account opening module for any future reference or query from the customer (e.g., as part of a customer contact history function associated to the customer profile).

In some embodiments, if a joint customer requests the terms and conditions, then they are issued by the communication method requested or are available to download or print from the public website. The primary account holder does not receive a copy of the joint account holder's terms and conditions. For joint applications, the entity may configure (business without IT intervention) for each product whether or not only the Joint first applicant must accept Terms and Conditions or whether all joint applicants must accept Terms and Conditions.

The system supports the ability for Staff users to email the Terms and Conditions from the in-progress application to the customer. This emailing preferably uses the email address provided on the application form and may be configured by an entity to take place automatically. Staff users may also send to a print workflow the Terms and Conditions and/or any documentation related to the application from the in-progress application. This may be mailed to the customer using the address provided on the application form.

Accept Terms and Conditions/Disclosures. Once the Terms and Conditions are presented to the customer, the customer has the ability to "accept" the terms and conditions through various applicable modes. Where passive acceptance is not applicable, this may be achieved by: Allowing the user an on-screen option to indicate acceptance of the terms and conditions for interne and branch channels; Signing if a wet signature is needed; or Verbal confirmation and/or mail/email out. Where passive acceptance is supported, formal acceptance may occur outside of the account opening process (e.g., the Customer could be deemed to have accepted the terms and conditions upon completion of first banking or credit card transaction, or if indication of non-acceptance has not been received within a prescribed period), and the System skips the step of active acceptance (e.g., via interaction on a webpage, wet signature, or verbal acceptance) and continues with completing the milestone.

Customer Channel: Customers may be either be given an on-screen option to indicate their acceptance of the terms and conditions for non passive acceptance. If passive acceptance is being used, the customer does not have to do anything on-screen, as the terms and conditions will be accepted later when the customer carries out the action that means passive acceptance has taken place.

Staff Channel: There may be differing scenarios depending on the channel (call center or branch) involved. For a call center, for example, the terms and conditions may be read out to the customer and a verbal acceptance may be requested. Alternatively, the terms and conditions may be physically sent to the customer and the customer will have to return them with an indication of acceptance. For branch, again the customer will have to indicate in some way that they accept the terms and conditions. The branch staff may, for example, be able to turn the screen around and ask the customer to choose the acceptance option, or they may print the terms and conditions for the customer to sign. The specific practice is preferably determined by local practice and regulatory environments and how the customer journeys are configured by the local entity. Passive and non-passive acceptance may also be decided by each entity. Passive or non-passive acceptance choice may be by product. For example, an entity could have a mixture of products, some with passive and some with non-passive acceptance allowed.

The system facilitates the cross channel usage by the customer to complete the T&C milestone. The system may record the history of various channels used by the customer to complete the T&C milestone.

The system provides the ability to choose the acceptance mode for a specific entity. That is, the system can be configured to allow passive or non-passive acceptance as per the need of a specific entity. The ability to pend an application while awaiting acceptance of T&C is also supported.

For a joint application, each applicant may need to sign/accept his/her own T&C document. For CMB customers, multiple individuals (e.g., partners, director) may need to sign/accept the T&C in a company capacity.

The system preferably records the version of a Consolidated Agreement and other terms and conditions that have been accepted. The date, time and version details of the accepted terms and conditions are logged and stored and available to retrieve at a later date so it is clear when a customer has accepted the terms and conditions and what they were. Some disclosures may be only for the sake of customer information, and do not need to be accepted. This step may involve keeping a central copy of each terms and conditions version so the correct one can be referred to when required. Preferably all required additional information is captured by the customer/user prior to 'accepting' the conditions.

The system should allow the user enough time to review and accept the terms and conditions without causing the user session to time out and expire before the action has been completed. Warnings may be provided if the session is at risk of expiring. In some embodiments, the user may be requested to indicate on-screen whether they want the session to remain open, and the time period to expiry will begin again if the customer indicates that they do wish the session to remain open.

In some embodiments, the system may, for example, track and record the time for which the T&C agreement is open for Customer review. This information may also be used for the metrics for Account Opening. As part of the overall AO process, there may be a timeout session (e.g., a pop window asking if the customer wants to continue the session). In some embodiments, there may be a separate timeout session as part of T&C's (e.g., so it can be configured for longer). These periods are configurable at the channel level. Time limits are preferably a Business maintainable parameter. On the online channel, where the customer selects to end the session, if they haven't already done so, they may be asked if they want to save the application.

Figure 23:
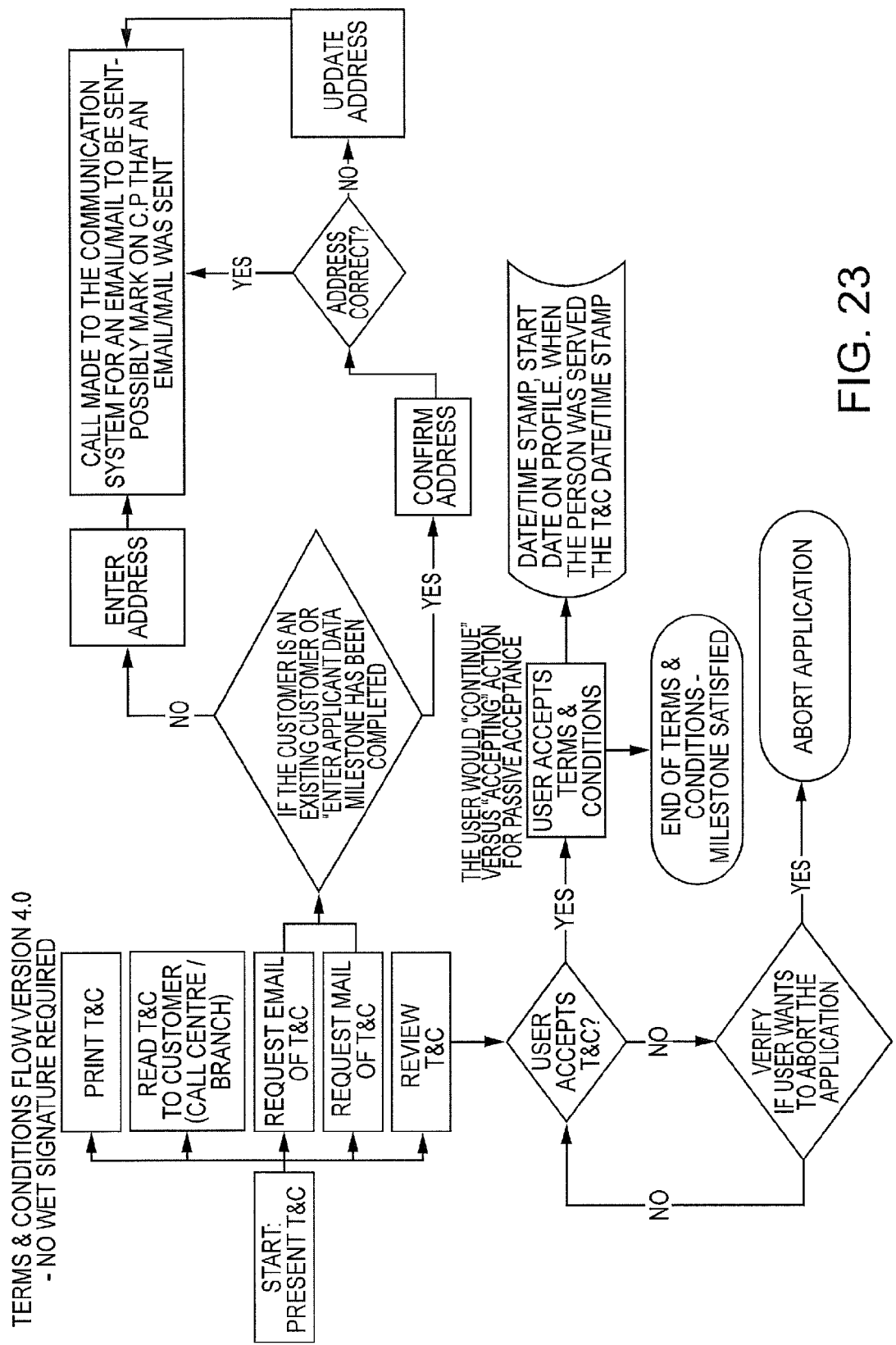
FIGS. 23-25 illustrate exemplary user interactions with the system for Terms and Conditions.
Figure 24:
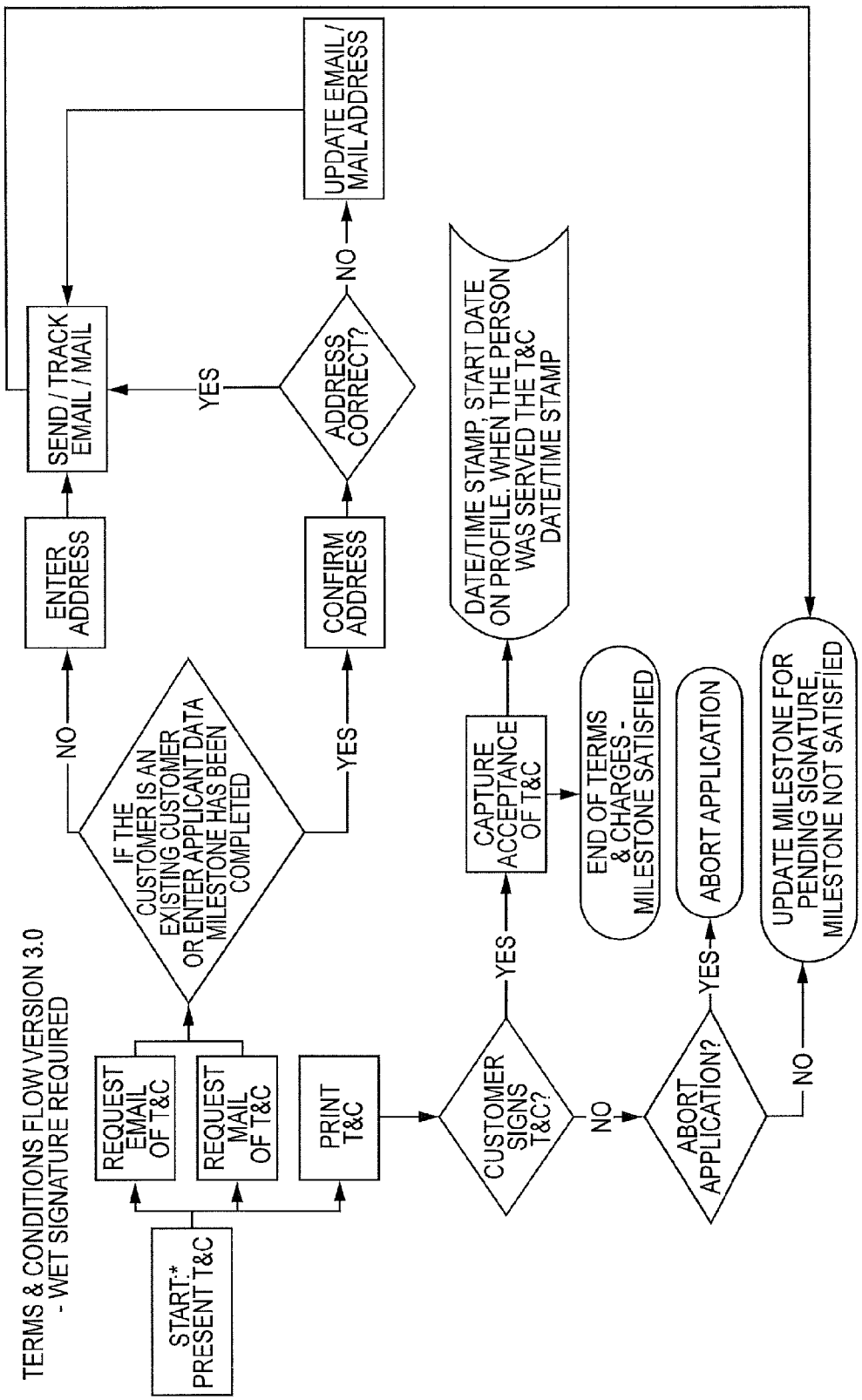
Figure 25:
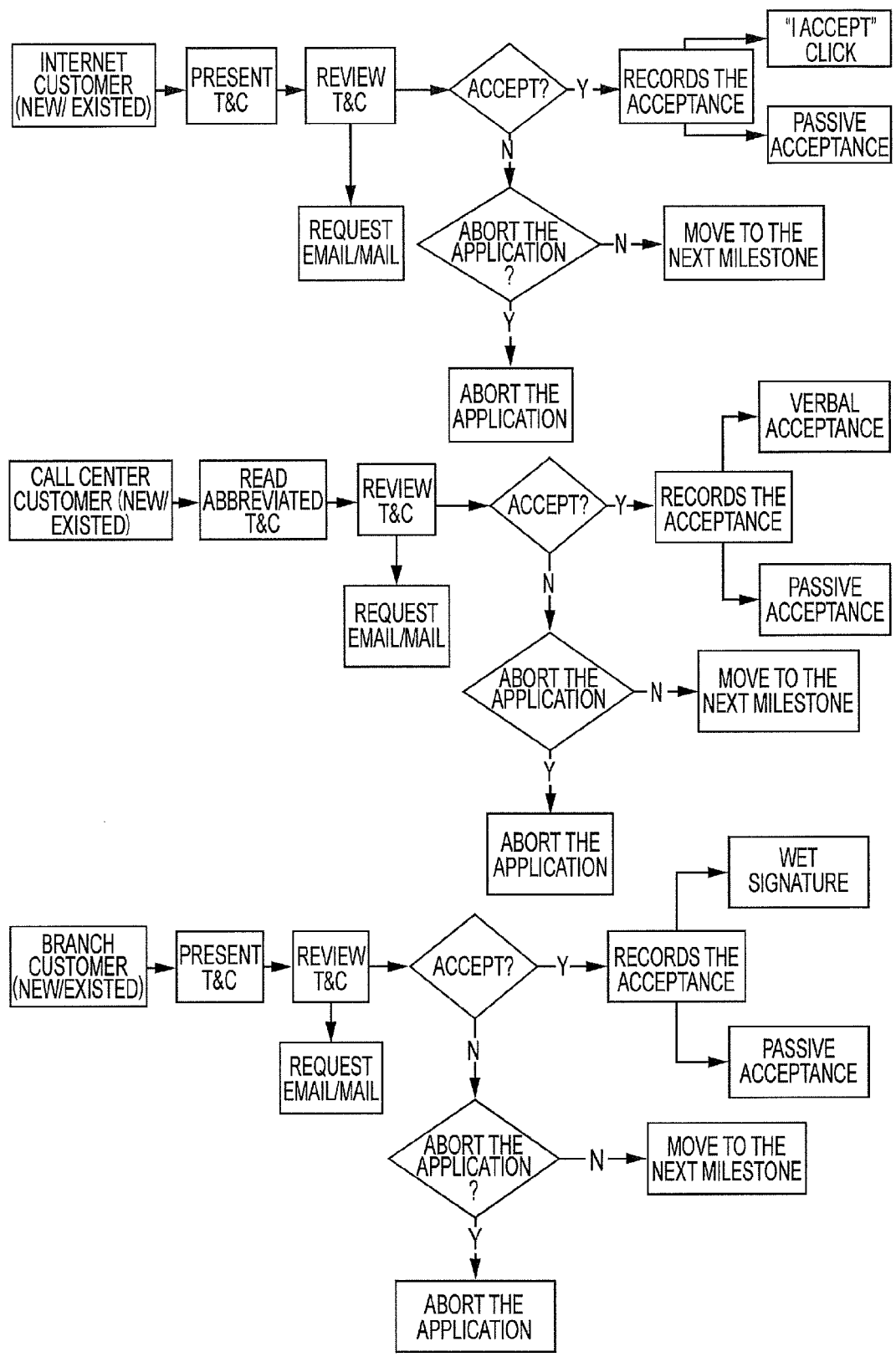

The diagrams in FIGS. 23 and 24 illustrate an exemplary user's interaction with the system, in scenarios where a wet signature is/is not required. FIG. 25 is a flow diagram showing exemplary terms and conditions scenarios for different customer channels. These are just some of the example scenarios that can exist, but there are more possible.

Display ISF Investment Agreements. As used herein, ISF refers to a banking proposition that is consistent with Islamic law and guided by Islamic economics. This proposition is in use by Middle East and Gulf region entities, as well as Malaysia. This is the process to display ISF investment agreement documents for acceptance when a customer opens an ISF Commodity based investment account. Exemplary ISF Investment Agreement Documents include Murabaha Investment Agreement (MIA), Purchase Power of Attorney (PPA), and Sale Power of Attorney (SPA).

Preferably all documents are displayed once when opening an ISF Commodity based investment account for the first time. Individual documents may be redisplayed for acceptance when opening an ISF Commodity based investment account if any change is made to the documents. Sale Power of Attorney may be redisplayed for acceptance if the previously selected agent is no longer valid. Records of each version and date of accepted by the customer are preferably retained for the life of each customer record. If/when the customer record is deleted, records pertaining to these forms may also be purged. All versions of documents are preferably retained for future possible inquiry.

Decision

This section describes the functionality of the Account Opening Decision milestone. This milestone is a single piece of the account opening jigsaw that works in conjunction with the other milestones defined for account opening. Decision is the process of determining if a customer is qualified for the product(s) applied for based on business rules and strategies.

In some embodiments, Decision is the final outcome of a series of decisions made throughout the Account Opening process, some of which may optionally be made by other decision systems that reside outside of Account Opening system). A final decision may be the result of the deployment of business rules and strategies at various entry and call points, collectively referred to as sub-decisions.

At its most general level, the Decision process determines whether the applicant receives the product he requested, is denied the requested product, is offered another product as an alternative option, or in its place, or is referred for manual review.

Preferably, a final decision of Approve or Decline may be obtained via automation with minimal need for a Refer decision resulting in queue management. As with the other milestones, Decision complies with local regulations and supports the ability to capture metrics on all areas within the Account Opening process to facilitate 'test and learn' tactics.

The description below refers to the customer self service channel. Where variations exist for other channels, they are noted.

At this point, all customer and account data required to make a decision should be completed and available. Decisions are preferably automated and may be fulfilled by core and local decision support systems, based on local business rules. However, in some cases, the degree to which the process is fully automated may be constrained by local regulatory requirements and decision systems or technical solutions.

In some embodiments, the Account Opening system may interface to various decision support systems (e.g., SMG3 or DFS decision engine). For example, the system has the ability to interface with third parties and local decisioning systems for information/data to be utilized in sub-decisioning business rules (e.g., interface to credit bureau report with ability to bring data back for decisioning). In some embodiments, the Account Opening system may feed data to other decisioning systems to make the decision. The Account Opening system then receives the final decision as a response from these decisioning systems, actions it, and communicates the end result to the users. Optimization and standardization of credit/lending decision requirements may be determined at a broader level. The Account Opening system has the ability to react to the outputs from other decision systems according to the business rules defined by the entity and consequently carry out the next step.

The decision engine can handle a variety a variety of different data formats in its input and output interface. It can handle a single data blocks (source) or multiple data blocks (sources).

In some embodiments, decisioning capabilities may include a Duplicate Customer Check. As part of regional matched ID processes, for example, SMG3 can assess all partial and full matches for all NAB applicants, and based on business rules, can output referral for manual review. In other embodiments, decisioning capabilities may include a Duplicate Application Check. SMG3 can assess all potential matches of applications extracted from a WIP table, and based on business rules within SMG3, can either deny current application or output for manual review.

In some embodiments, decisions related to Validate Identification and Product Selection are not included in this milestone. In some embodiments, the account opening system itself does not house/hold responsibility for the decision logic (e.g., the business rules required for the decision making process)—this logic may reside outside the system.

In some embodiments, the Decision Activities are as follows. "Define local entity decision system and output" refers to the process by which the system determines (based on business rules established within the account opening system) when, if and for what product a query to a Decision system is required. The system supports a means of managing with the account opening system what Decision Systems need to be called based on various elements (like Product Selected). "Retrieve and Action" refers to the process of retrieving a decision, returning the result to the account opening system, and determining whether the decision milestone has been fulfilled (final decision) or further decisioning action is required. The area of decisioning may include Credit Checking, Fraud Checking and/or other local regulations. "Multiple Decisions" refers to the fact that decisions occur multiple times in the AO process. The AO system preferably supports the decision-making process in a modular fashion, for example where the local decision system could be called multiple times for one application. The following scenarios are examples that may require multiple decisions within one AO process: (a) Multiple decisions may be required for credit, fraud, up-sell/down-sell before a final decision is reached; (b) In a 'refer' scenario, re-decisioning may be required upon a pending process is completed. "Final Decision" refers to the ability of the AO system to translate the final decision from the local decision system and communicate it to the applicant(s). The message details, format, and method may be maintainable by the business. This step may have interdependencies with the Fulfilment Milestone requirements and the Integrated Customer Communications Module requirements. "Milestone Status" refers to the process of determining the milestone status based on the output of a final decision.

Figure 26:
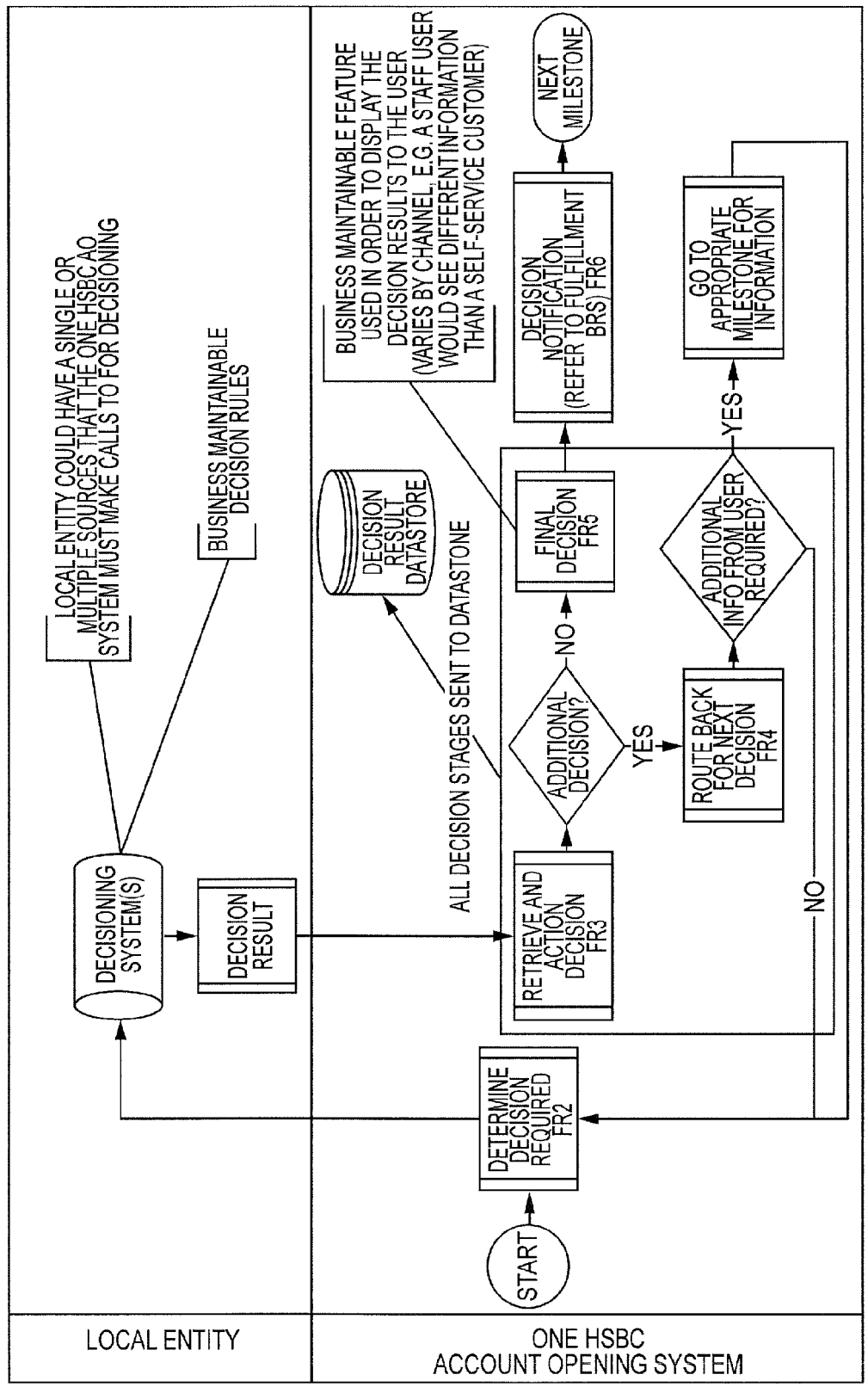
FIG. 26 shows an exemplary diagram overview of the Decision process.

FIG. 26 shows a schematic overview of the Decision process, according to some embodiments. Additional details on the Decision Activities are below.

Define Local Entity Decision System and Output. This activity may be in place for one or more of: Sole and Joint Applications; Applications by new or existing customers; Applications for Savings, Checking, Credit Card and Term Deposit and Overdraft/Line of Credit accounts; Applications received through Internet, Branch/Staff or Call Center Channels; and Applications for PFS or Retail CMB.

Figure 27:
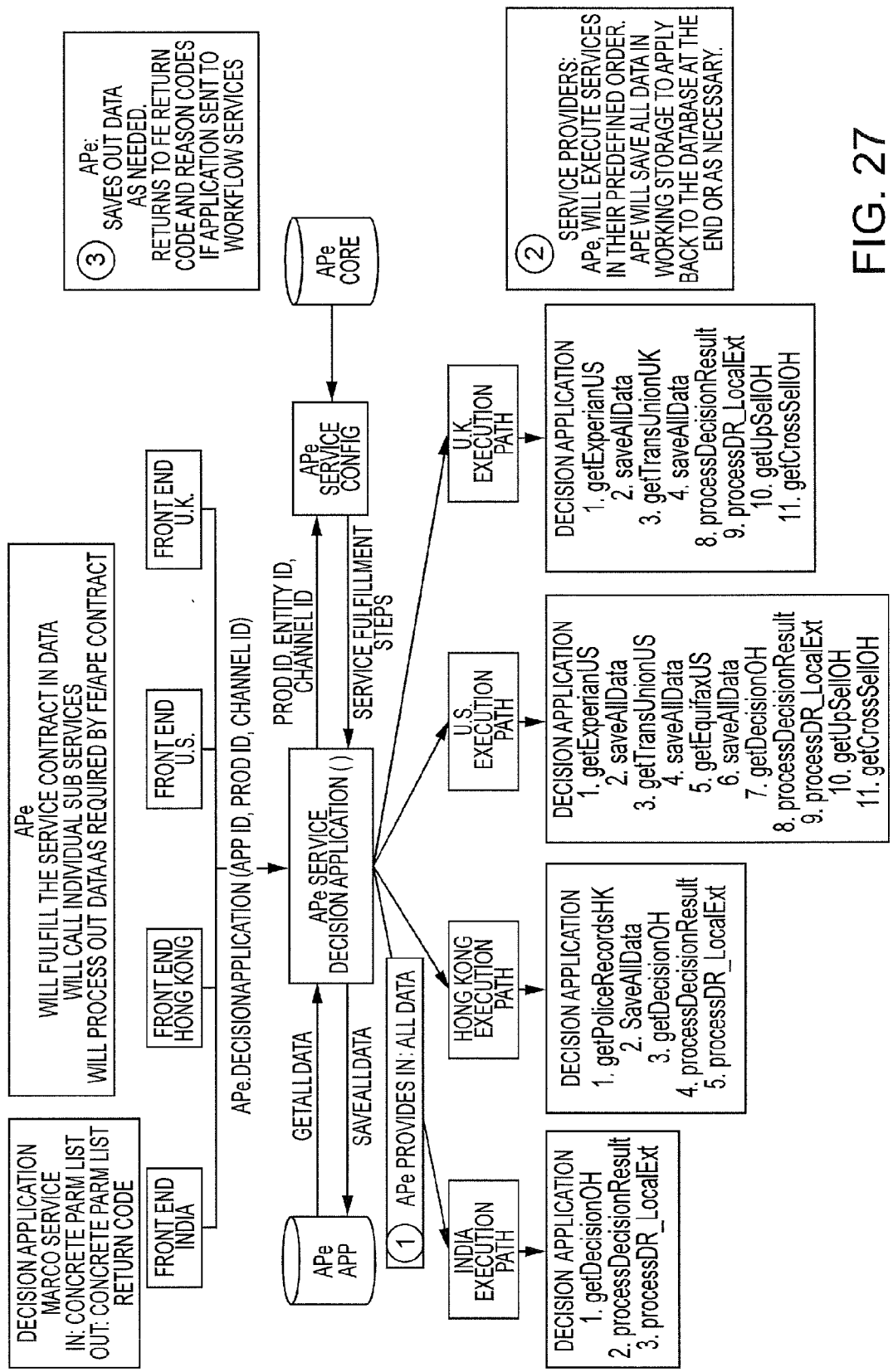
FIG. 27 is a diagram showing exemplary local entity decision systems.

In some embodiments, there are entity-specific decision requirements, including supporting decision systems and input and outputs. The system allows entities to define the source of decision systems and other activities (e.g., the output of these decision systems) required to decision a product application based on the products, channels, entities and other business rules (e.g., SMG3, ChexSystems, etc.). The Account Opening system preferably provides an integration point to the decision system that is aligned with the Bank's standards (e.g., SMG3). Entities adopting any local decision system that is not Bank standard may require additional implementation activities to integrate with AO system. FIG. 27 is a is a diagram showing exemplary local entity decision systems.

The system supports automated, partially automated, and manual decision processes. For example, Decisions may be completely automated if an application is approved or declined in real time. Decisions may be partially automated where a decision system cannot complete a decision and the decision is referred for some kind of follow-up action(s). Manual decisions may be completed offline, for example when an application is submitted but subject to review by a staff member at a later time.

The information required to make a decision may vary by entity and by decision system. In some embodiments, this information is captured in other Account Opening milestones, for example Gather Application Data and Product Selection/Configuration, and constitutes the input to this activity. The system may also, alternatively or in addition, provide input to the decision system based on the data captured in other Account Opening milestones.

The system has the ability to provide to a user a decision based on the inputs of the user and the business rules, including, for example: Watch List checking (terrorists and money launderers, etc.); Black List checking (credit problems, arrears, write offs, bankrupts, etc.); and White List checking (positive repayment history on credit agreements, etc.). The decision and checking may be performed on sole applicants, joint applicants, and/or authorized users. The business is able to configure which checks are completed for various involved parties, as well as whether these checks are done in AO or outside of AO. The list may include other checks in addition to the ones mentioned above (i.e., the list is not exhaustive), provided local systems can support them.

Retrieve and Action Decision. The system supports a means of retrieving a decision for an application. The output of these decision systems may vary by entity and by decision system. The system also provides a means for an entity to define the next step required to react to the decision output. The options may include, for example, continuing with the decision process or arriving at the final decision.

In some embodiments, the output of the final decision is classified with one of the following statuses:

Accept: The customer is qualified for the product applied for. Account Opening system preferably retrieves the reason for an application being accepted.

Reject: The customer is not qualified for the product applied for. Account Opening system preferably retrieves the reason of an application being rejected. Where a product is declined, either real-time or offline, a closed lead may be automatically created for that product (e.g., to ensure that the customer isn't 'marketed' for this product).

Refer: The system has not yet determined if a customer is qualified for the product applied for since further information is required to reach a final decision. Account Opening system preferably retrieves the reason of an application being referred.

In various embodiments, exemplary decisioning capabilities are as follows:

Credit decision: Approved/Denied—Utilizing credit risk assessment strategies built within SMG3, and data passed into SMG3 from internal and external sources (e.g., bureau data), SMG3 makes an automated approved/denied decision. This can include decisioning multi-product/multi-party applications.

Credit decision: Pending—Where an initial approved/denied decision cannot be output during first call to decision engine, SMG3 can output a pending decision and reason code, which is mapped into a QMS work item. SMG3 can also de-duplicate reason codes following a re-decision (e.g., if output once, do not output the same reason again).

Credit decision: Up-sell/Down-sell—Similar to credit decision, using strategies built within SMG3, where the applicant/s qualify, SMG3 can output an up-sell on the product applied for. If applicant/s do not qualify for the product applied for, SMG3 can output a down-sell offer on either the product or attribute of the product.

Cross-Sell Decision—As part of the credit assessment for the product applied for, SMG3 can also output details of other products that the applicant/s may also qualify for.

A staff member/system administrator with correct entitlements may be able to override the decision of each product within the application presented during the application, and the application status itself. For example, if a "reject" or "refer" decision is returned, then the staff member/system administrator can change the decision to "accepted" for each product and/or the application overall. The changes may be made on an individual milestone or the application status as a whole.

Multiple Decisions. In some embodiments, the system supports scenarios wherein the decision system returns a decision, but it is not the final decision. The Account Opening system may, for example, take the appropriate next steps then return back to the local decision system for the next decision. This process may be iterative in nature and continue until reaching the final decision, as identified by the local decision system.

Final Decision. This section describes the distinct set of activities required to action a final decision. The final decision marks the conclusion of the decision milestone.

The system provides the ability for entities to define and maintain the means and content of the final decision communicated to the applicant. All decision result information can be stored on the system for future reference and retrieval. The storage time for such information is configurable by the local entities.

Based on local Account Opening process rules and the entity's defined customer journey, the system may do one or more of the following: communicate the decision to the user in real time (for example, via a message on screen), or trigger a communication activity through another channel (for example, email).

Milestone Status. The results of the decision process detail whether this milestone is 1) satisfied, 2) not satisfied or 3) pending. In some embodiments, the decision milestone status is satisfied when the decision is approve or decline; the decision milestone status is not satisfied when the decision making process is not started or incomplete. The decision milestone status is pending when there are outstanding processes to be completed such as a refer decision.

Configure Product

Product Configuration is the process by which a customer selects (or declines) and personalizes optional product features, services and associated products or options. At least one product should be selected before the product options are offered. Within this milestone, the term 'option' is used to describe product features, services and associated products that may be optionally selected (or declined) and personalized by a customer.

In some embodiments, a core set of product options includes the following. Product Options not listed may be specified and deployed by each regional implementation.

Internet Banking
Phone Banking
ATM/Debit Card
Contact Preference
Account Nickname
Statement Options
Dispensing Note
Order and Personalize Check Book for Checking Account
Overdraft Protection
Maturity Instructions for Term Deposits
SMS/EMAIL and Alert Services
Product Pricing.
Correspondence Address
Designate Relationship Manager
Standing instruction for inbound flow of funds (for both Deposit and Credit Cards)
Signing Instructions.
Reward programs Enrollment
Credit Protection
Plastic choice card design
Secondary cardholders
Currencies for multi-currency product In some embodiments, the customer is provided with a list of product options, services, and associated products from which the customer selects (or declines) and personalizes the main product previously selected. The system preferably provides the ability to offer relevant product options to the customer for strengthening the customer-bank relationship. As described for other milestones, the system has the ability to capture metrics on all areas within the AO process to facilitate 'test and learn' tactics.

In some embodiments, the business view is the status of the account (whether or not it has actually been booked/activated) and has no bearing on whether or not products can be configured. The milestone is to set up products during the account opening process. There is preferably no after-AO process unless specifically stated (e.g., online reset or offline reset upon first login after AO).

In some embodiments, in the joint process, product level options may be configured by the primary applicant while customer level options may be configured by each applicant.

Product Options may be dependent, for example, on entity, customer type (new or existing), channel, and/or product. However, Business logic/rules that govern which options should be offered based on a given product may be defined by local entity. In some embodiments, Business specifications do not include any governance rules around how to assemble the different journeys; assembly is solely business-configurable. The degree to which each product option is fully deployed or applicable may be constrained by local business practices.

The business has the ability to add/delete product attributes without an IT release. Once created/deleted, the business has the capability to establish rules for the display of the attribute (e.g., based on product, CRM/Sales engine results, products/services already held, etc.).

In some embodiments, Product Selection is an input in to Configure Product.

In some embodiments, the same set of product options is available to staff and to the customers.

Each "Product Option" provides specific functionality and is a piece that can be re-used across different modules or sub-systems. For example, Order Check Book could be re-used by a product like Select Credit, and ATM/Debit Card could be re-used when servicing/maintaining accounts, etc.

The AO system is preferably host agnostic and supports the ability to 'plug into' any existing banking host system. Business/validation rules that exist in the back-end systems may or may not be replicated on the FE.

Figure 28:
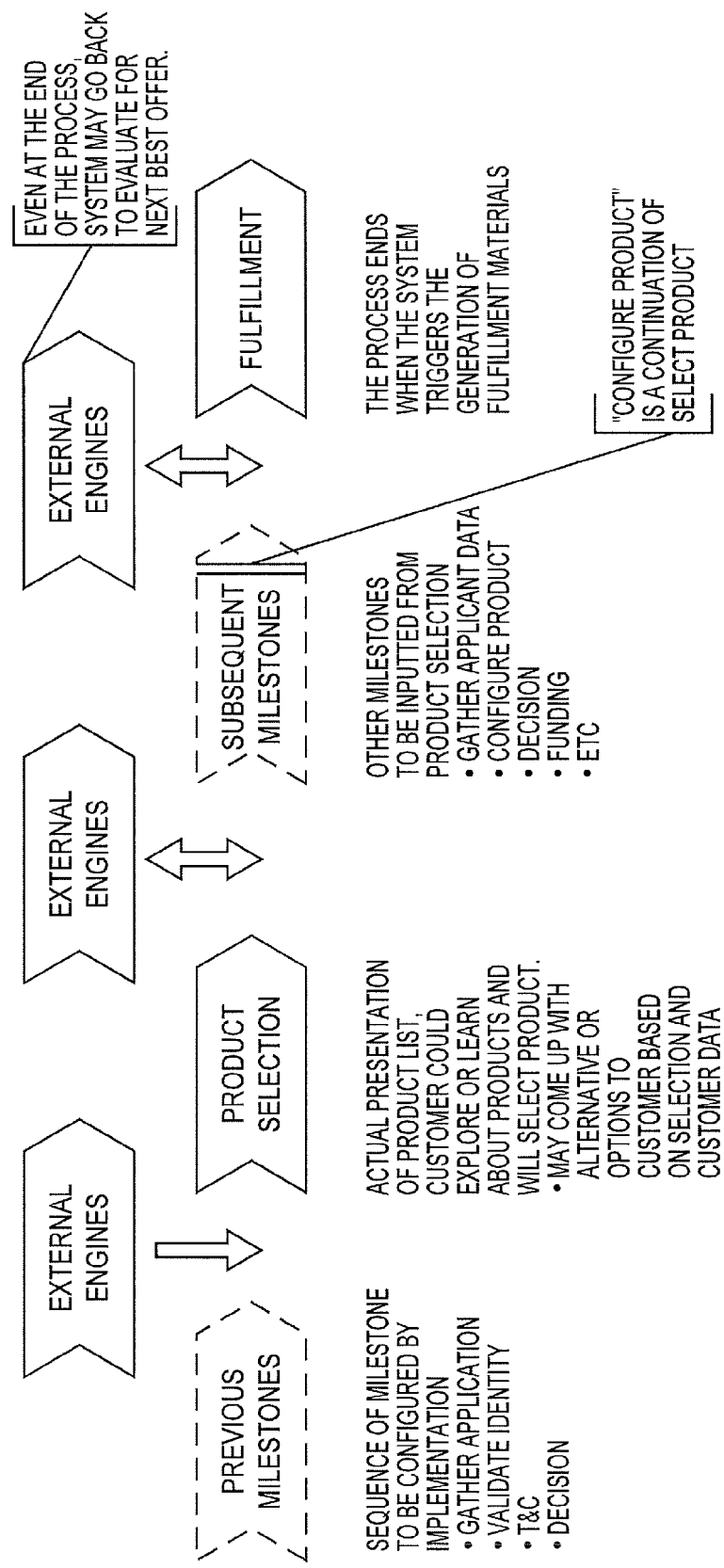
FIG. 28 is an exemplary illustration of the relationship of the Configure Product and Product Selection milestones, and how they optionally interact with other milestones.

The diagram in FIG. 28 shows one way in which the Configure Product and Product Selection Milestones may relate and how they could interact with other Milestones. There is a Strong Dependency between Product Selection and Configure Product. Basically the Product Options to offer are directly dependent on the product previously selected. The business has the capability to configure the products to be offered and the set of product options available for each product. In some embodiments, an integration point may be provided to an analysis/sales engine (possibly a CRM or sales engine or cross sales) for determining the possible or most adequate product options to offer (including cross sell). After Product Selection has been completed and before the Configure Product milestone, some other milestone could have been "performed," and then after Configure Product some other milestone could take place. FIG. 28 is only an example of a possible Journey.

Figure 29:
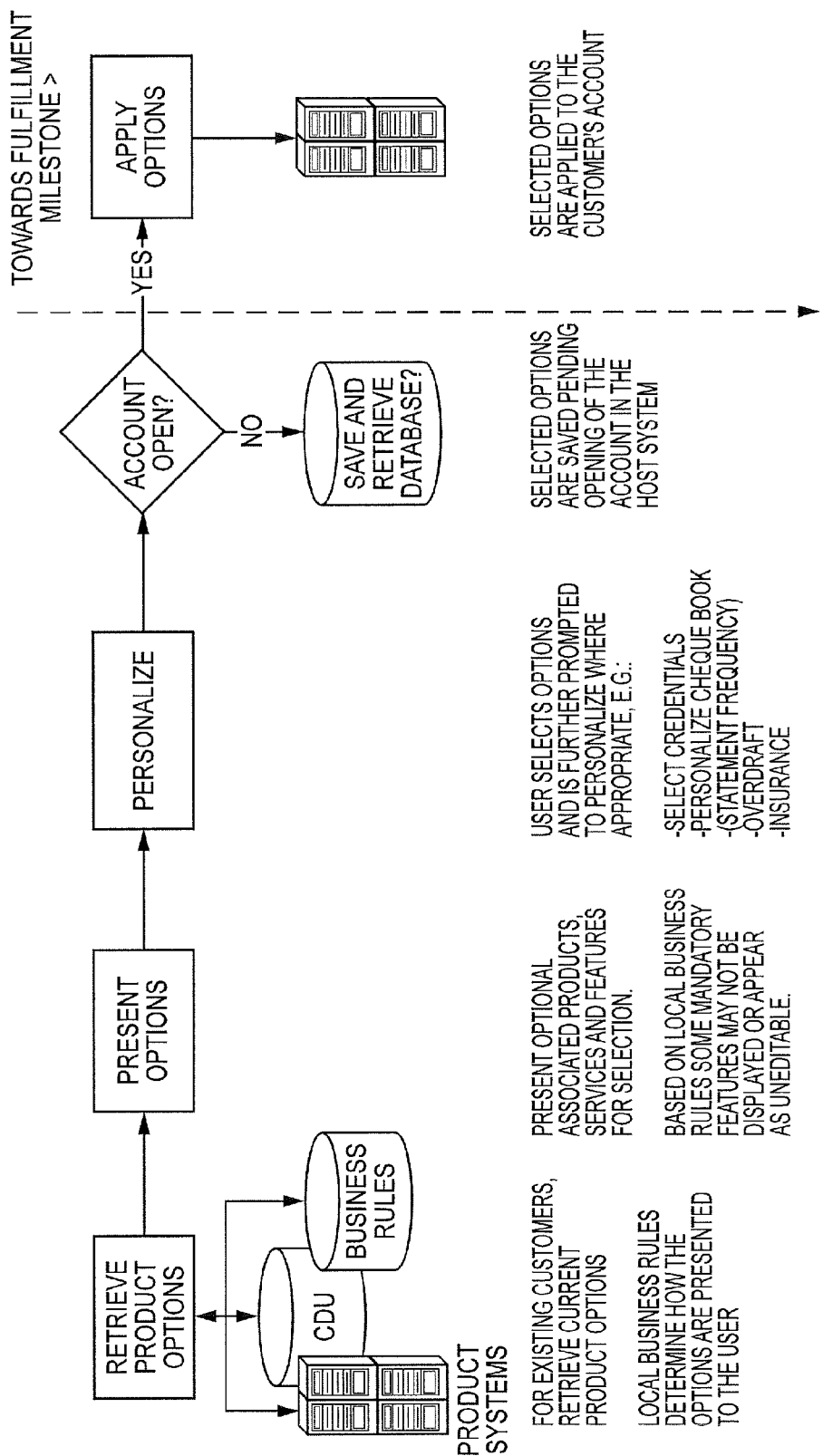
FIG. 29 illustrates the components of the Configure Product milestone according to some embodiments.

FIG. 29 shows an overview of the Product Configuration process, which is described in more detail below.

Available Product Options. This section describes the different means the system provides for determining what product options will be available during the account opening process. An integration point to a decisioning/sales engine may or may not be provided.

The system can present to the customer different product options that are applicable to the core product selected according to either Fixed Product Options or Variable Product options.

Fixed Product Options are those that are "strongly" attached to a product when defining the Customer Experience and are preferably always presented the same way. Within this group the system provides the ability for the entity to determine mandatory product options (these options are attached to the product by default and the customer has no choice for deselecting/selecting) and "optional" product options (these options are presented, possibly pre-selected, but the customer can opt to select/de-select them; examples include Internet Banking, Contact Preferences and Statements type).

Variable Product options are those defined to be determined by integrating with an analysis/sales tool by which, based on configurable business rules, based on the existing customer information and data available at that time, the system evaluates and decides the best product option to present to customer. For example, for a situation where one customer is applying for a checking account, the system is configured in a way that for checking accounts it evaluates what type Overdraft Product is the best offer for the customer. After performing the analysis the system may present to the customer: "You qualify for an Overdraft Gold product, would you like to apply for it?" For a different customer, the overdraft option presented may be "Bronze Overdraft" based on the analysis performed. Another example may be offering an ATM/Debit card; the system is configured to evaluate what type of ATM/Debit Card would be best for the customer and to present the appropriate ATM/Debit Card as an option to select.

Present Available Options. This section describes how the system may present various options to the customer for further personalization. In some embodiments, the system presents the product options as specified on the "Available Product Options" section above.

In some embodiments, product options are presented already "pre-selected." Pre-selection may be: (a) Pre-Defined by the use of the business rules managed through the AO system (e.g., using a content management tool); or (b) Driven by analyzing current status of existing options, basically at applicant level (e.g., Internet Banking could be presented as "selected" because the customer already has PIB).

The presentation of product options attributes may be based on various business definitions such as: Default Values; Data Entry Type (Toggle buttons, checkboxes, date field, etc.); Mandatory Attributes; Embedded Validation Rule; etc. Product Options include Product Level options and Applicant Level options.

The system may present the product options in the order and/or sequence as they were specified or designed when the various "Customer Journeys" were configured by the business. The proposed user/customer experience may be provided based on the user experience framework. The customer can select whether or not that specific product option is attached to the product being opened, except, for example, in cases where options are mandatory or pre-selected by the primary applicant.

Preferably, the system presents the product options that are applicable to the core product selected itself (e.g., checking, savings, credit card) and requests them just once per application during the primary applicant processing. In some embodiments, they may be shown as a default to the secondary applicant. These options are "Product Level" Options, and are applicable for single and joint applications.

For joint applications, the system may present product options that are applicable for each "applicant" of one application and request them once per applicant. These options are "Applicant Level" Options. For example, the Internet Banking product options may be presented to each applicant of one application as they are Applicant Level options.

For a Bundle Product such as Student Package (including Savings and Credit Card products), Product Options applicable may include: Internet Banking; ATM/Debit Card; Account Nickname; Credit Protection; Rewards Program; Standing Instructions. The system may present the product options just once as this is a bundle product and "bundle products" are treated by the AO system as one single product. In the scenario that a bundle product is for a joint account, the requirements specified for Single and Joint applicants still apply.

When multiple products are being processed, the system supports the capture of product options associated to each core product. Multiple products are preferably processed one at a time. For "Applicant level" product options, the system may pre-fill data fields with the previous inputs.

The system can pre-fill any data field that would be captured during the Configure Product milestone with the data that has been obtained previously. For example, for the Statement option, the system may pre-fill the email address with the one captured before. For Correspondence Address, the system may pre-fill data fields with customer address if it doesn't exist previously.

Personalize. This section describes how the customer selects (or declines) the product options presented and then personalizes them.

The customer indicates the product options that he wants attached to the account being opened. The user experience and interaction with the system preferably follow those guidelines proposed by the user experience framework. For each product option selected, the customer may be presented with data for entry or for review if that data already exists. Where applicable and configured for that, capturing Credentials may be performed during the account opening process. As used herein, 'No Fulfilment applicable' means that no 'material' will be sent to the customer.

The system provides the customer the ability to select/de-select a product option. The system enables the capture of additional data fields (or re-use of existing data) for one product option once the option has been selected by the customer. Selection mode input may be designed and determined by the user experience framework.

The business may determine what data attributes presented to the customer will require an "update" on the local system. For example, in some embodiments, an email address is required. The system may present and allow the customer to update this field used for the account. The business may indicate that the value entered on this address will update the customer profile.

For joint applications, the system may provide to each account owner or applicant the ability to personalize his/her own set of options. For those product options applicable at product level, the system may present these product options to the first applicant to "personalize" them.

The system provides the capability for defining dependency rules between product options, application attributes, and/or customer profile attributes to be evaluated during the account opening process. For example, a customer who has opted for not having internet access may not be able to opt for e-statements.

Applicant Level Options. The following section lists four Applicant Level Options and specifications. Preferably, these options are presented to each applicant.

1. Internet Banking: Internet banking allows customers conduct their banking online. This product option may be applicable to both personal customers (PFS) and commercial customers (CMB).

For existing customers, the system may provide the ability for the customer to show any other existing accounts that the customer has and indicate whether or not the account(s) is/are linked to the Internet Banking Access. The system may allow to link/de-link any of these Presented accounts to internet banking. For accounts opened via internet (or any channel), the accounts may be added to the profile instantly and be viewable and transactable via any channel. De-select may be possible at any time.

For example: An existing customer has one checking card with internet access. This same customer enters the process of opening a saving account and when prompted for internet access he/she deselects the internet access option (meaning he/she does not want this option). Therefore he/she has one checking account which he/she can "see" on-line and one savings account which he/she cannot see online. Later, the same customer begins opening a credit card. This time the customer selects for having internet access for viewing this new "credit card" on-line. Now the system shows to the customer that he/she has a checking account which is accessible online and a savings account which is not accessible online.

In some embodiments, credentials (User ID, Passwords and/or PINs) must be requested and set during the account opening process as part of the Configure Product milestone. The applicant may select his/her preferred credentials vs. being served credentials. This refers to alternate credentials (e.g., debit card/PIN) instead of username and password.

There may be variations on the process depending on the channel and local capability. For example, Credential Establishment may be performed on the channel where the account opening is taking place whereas Credential Delivery may be fulfilled through a different channel. Underlying systems may restrict the delivery of the credentials. Table 3 describes credential establishment by different channels. All provide real-time Internet Banking Credential creation and immediate access to services by customer.

TABLE 3

| Applying Channel | Credential Establishment |
|---|---|
| Internet | Online - Credentials may be set by customer online in real-time. The system may require partial establishment of credentials with delivery of token through mail or in branch. |
| Call Center | Staff Assisted - applicant may tell staff to create part of his credential and the other part will be delivered via another channel (e.g., email, SMS, IVR) Automated (IVR)- Credentials may be set by customer using the IVR or else they may be provided temporary credentials to use to go online and create permanent credentials. |
| Branch | Staff Assisted - applicant may tell staff to create part of his credential and the other part will be delivered via another channel (e.g., email, SMS, IVR, secure print) |

In some embodiments, the function or service for setting up credentials is not built as part of the Account Opening system; rather, the AO system leverages this from local systems. In some embodiments, for existing customers with existing internet banking access, the system may not provide the option for establishing his/her internet Credentials during the account opening session.

In some embodiments, for example for CMB, the system provides the ability to designate authorized users and to set their credentials on the session.

In some embodiments, the system provides new-to-bank customers the ability to create Customer Authentication Module (CAM) credentials and register for Internet Banking during the AO process if the application is approved (Staff and Internet channels, including within the Staff/Call Center environment). At the end of the process the user is logged in. The new customer may be required to complete CAM reset credentials upon first login after the AO process. At the end of the Account Opening process if the account has not been opened the user may be presented the status of the application. At the end of the process if the account has been opened but not yet activated the user may have limited internet banking access (e.g., account summary with pending account visible showing pending balance).

The selection of "Register for Internet Banking" within the Account Opening process supports yes and no for all channels.

2. Phone Banking: Telephone banking is a service provided by a financial institution which allows its customers to perform transactions over the telephone. This product option is applicable to both personal customers (PFS) and commercial customers (CMB).

For existing customers, the system provides the ability for the customer to present any other existing accounts that the customer has and indicate whether or not the account(s) is/are linked to the Phone Access. The system may allow to link/de-link any of these Presented accounts to phone banking Accounts opened via the phone can be auto-linked to the customer profile instantly and be viewable and transactable via any channel. For accounts opened via other channels, accounts may also be added to the profile instantly. In some embodiments, credentials (User ID, Passwords and/or PINs) must requested and be set during the account opening process as part of the Configure Product milestone.

Real-time creation of Phone Banking Credentials and immediate access to services by customer are provided. Credential establishment for Phone Banking is as given above in Table 3.

3. Debit/ATM Card: Debit and ATM cards are issued by banks, for example, to give to the customer flexibility in the way they perform some financial transactions and the way they can make purchases. This product option is applicable to both personal customers (PFS) and commercial customers (CMB). The core functionality the system provides is to allow the customer (each applicant) to select/indicate whether or not he/she wants a card.

In some embodiments, the system may allow to link new accounts being opened during the session to the card that the customer has selected (either the new one or existing one). The system may analyze the customer information for determining existence of previous Debit/ATM cards and prompt the customer for the option of re-using/linking the new account to one of them or getting a new one.

For a face-to-face channel, when the customer has chosen to be issued a new card, the system may provide the ability to use a pre-embossed card. This pre-embossed card has already a card number on it that the system will provide the ability to capture for associating it to the new account just being opened.

The limit of accounts that may be linked to a Debit/ATM card Business maintainable.

In some embodiments, credentials (User ID, Passwords and/or PINs) must requested and be set during the account opening process as part of the Configure Product milestone. In some embodiments, system capabilities for ATM/debit card issuance/PIN generation capabilities are irrespective of originating channel of the application.

An existing customer can, for example, link an existing debit card to a new account, or get a new card dedicated to the new account. Types of accounts that are supported for this linking process are business configurable. For multi-product applications the customer may select to link to an existing card, by each product, or request a new card. In addition, all the products as part of a multiproduct can be linked to one newly ordered card.

4. Contact Preferences: The system supports the capture, during the Configure Product milestone, of some of the customer contact preferences. Core contact preferences may include: Marketing solicitation (customers can choose how to be marketed, e.g., by mail, post, telephone, mobile message or secure e-message; this option may also be referred to as "Opt in/Opt Out to Marketing"); Preferred Contact Times (customers can indicate the best time, day and channel when they want to be contacted by the bank); and Language Preference. For existing customers that previously set this option, the system may retrieve the existing value for the customer and display it for the customer to update.

Product Level Options. The following section lists 17 exemplary Product Level Options and specifications.

In some embodiments, only the primary applicant is able to maintain the product level options (in the case of joint accounts). The second party can only update user level configuration.

There may be integration point to external/local systems and entities for some options.

The configure section is flexible enough for the business to decide if they want to offer products that are a subset of another product (e.g., e-statements and PIB) as two separate products. In such scenarios a customer may be displayed an error message advising that this service is only applicable if they select X service. There is preferably a core set of options per product.

The business is able to configure error messages/warnings relevant to the selection/non-selection of certain product level options. For example, if a customer does not select e-statements as part of PIB, the business may want to display a warning message saying that if they want to continue/opt for paper statements, there will be a charge for this.

The entities may also choose to default some options for certain products if required (e.g., read only information). In addition, it may be that entities want to support a specific customer journey; for the online channel, for example, there may only be a 'Yes' option for internet banking. The default/preferred options as defined by the business may be different for staff channels.

1. Account Nickname: In some embodiments, the 'Account Nickname' is a very personal name that the customer will be able to associate to his/her account. The setting up of the nickname recognition preferably applies to all channels. Local entity systems may determine how this displayed/retrieved by channel post account opening. Where a customer selects the nickname option, as soon as the customer enters PIB at the end of the process, such a nickname is displayed for the relevant account. This information is preferably updated accordingly in the local back office system screen. The business may specify the valid characters, minimum and maximum number of characters in line with their host system.

Nickname may be applicable to both PFS and CMB, and specific to the user logging on. It is also preferably configurable per customer segment. A personal nickname may be based on a combination of the of internet profile and account (e.g., for joint accounts Customer A can have a nickname for account X. Customer B could choose a different nickname for that same joint account).

2. Statement Options: Statements are account activity reports sent to the customer for them to verify and ratify all transactions that an account has had in a period. This option may also include "Statement Suppression" capabilities.

In some embodiments, the e-statement indicator is checked by default for all product types (defaults configurable by entity). The user may uncheck the e-statement indicator on the internet, branch and call center applications. This would imply that a paper statement is to be generated. In some embodiments, if an e-statement is requested, an internet banking indicator is mandatory.

Preferably, users are allowed across each channel to indicate the Statement Frequency. The values displayed in the list may be configurable to match the values in the underlying host systems that apply to that product. For example, for Savings and Current Accounts, the Statement Frequency values are in the "PD" Standing Data Table within Core Banking—this is the 'Periodicity' standing data table on SWH Core Banking and provides an example of where existing values can be found for sites that use SWH Core Banking systems. Such a table is preferably entity configurable.

Routine changes to statement preferences (e.g., despatch code, frequency) that have not been collected at the time of account opening may be serviced through other systems.

3. Dispensing Note: A 'Dispensing Notice' is a declaration used for joint accounts only and gives customers the option to waive their right to receiving statements. It gives the authority for only one customer to receive statements for the joint account (e.g., party 1 would receive a monthly statement, party 2 would not receive anything).

Composite Statements list all accounts/products (Sole or Joint) held in the name of the individual customer, in a single statement. The 'Dispensing Note' feature may not apply in case of account level statements for Joint Accounts; sites may provide an option to customer to use composite statements as an alternate.

4. Order Check Book: Check Book is a book of checks issued to holders of certain type of account, typically checking accounts. In some cases, local check book order capabilities may be used.

5. Maturity Instructions: At the time of opening a term deposit account, the system may provide the option of capturing instructions to follow when the deposit matures. This is configurable by entity, based on what is currently supported on host systems. Options include, for example:

1. No maturity instruction. Deposit will be rolled over automatically, principal plus interest. The customer should not necessarily be forced to selection this option, but should be made aware on screen that if they do not select one of the following options this option will be the default.
2. Deposit principal will automatically be rolled over and the interest paid separately (including account where this can be transferred). This will occur at every maturity unless changed.
3. Both the principal and interest will be uplifted by to the customer on maturity (including accounts where proceeds can be transferred).
4. Customer can select to either add or withdraw a specified amount to a specified account (internal account only). It should be entity definable as to whether this instruction occurs at every maturity or only the next one.

For options 2 and 3, the accounts and methods to which an entity can transfer should be entity-definable.

After the customer has completed the maturity options above, the customer can review all the details relating to the term deposit (e.g., interest rate, amount, maturity date, maturity instructions etc.) This may come after the funding (configurable by the business). In some embodiments, where this is a joint application, the second party may be given an option to accept or decline the maturity instructions (but not change). If they are declined, the account is not opened and various existing processes may apply.

6. Overdraft/Line of Credit: Overdraft/Line of Credit is offered by banks to customers with a view to protect the customer's reputation. Sometimes it may be that a customer inadvertently issue a check for an amount in excess of the balance standing to the credit of his/her account. This refers to the PLOC product (Personal line of Credit product).

In these cases, the system may allow the customer to choose a credit card or a line of credit (select credit) as an overdraft account. The system may require a disclosure to be read when this product option is not selected by the customer. In some embodiments, the products offered may be based on sales/CRM actions based on data entered by the applicant.

7. SMS/EMAIL and Alerts: This product option refers to the service the bank provides to its customer for sending SMS/EMAIL messages and/or Alerts for some events happening around their accounts and/or some personal preferences. In some embodiments, the customer has to have registered/be a PIB customer for this service in order for them to be able to amend/delete the alerts.

8. Product Pricing: It may be a practice in some regions to have the customers haggle for higher interest rates for their placements (e.g., with a member of staff). In absence of a Group Relationship Pricing module, the following may apply.

Pricing of products (product related fees, balance/activity related charges, etc.) can be set up in the underlying product controls on host systems. There may be an ability to provide default interest and exchange rates, applicable to the customer based on their segmentation/classification/product type/currency, etc. There may also be defaults for pricing of channel related services (e.g., Service charge for phone/internet, Bundle pricing on the internet, etc.).

For Credit/Debit Interest Rates, preferential interest rates may be applicable based on the host definitions (controls) for the underlying products (e.g., Savings, Checking, Term Deposits) in the local entity, based on the customer (e.g., Class, Market Sector, product type, currency, etc. in the case of Core Banking). These preferential rates can be invoked in any interest rate display or at the time of fulfilment of the product opening, across channels.

Regarding Exchange Rates, preferential exchange rate spread (by currency) may be applicable to specific customers based on the host definitions (controls) for the underlying customer, defined in the local entity. This exchange rate spread can be invoked in any interest rate display or at the time of fulfilment of the product opening, across channels.

Overrides to Interest Rate or Exchange Rates other than defaulted values (but within parameterized limits), via the Staff Channel may be allowed. Where a product system does not support pricing overrides, this option should not be available within the user journey for that entity. In some embodiments, changes to interest rates/exchange rates, post fulfilment of account opening are not supported by the AO system.

Each relationship manager depending on his/her rank may have special rate limits that he/she can give to a customer. In some embodiments, the higher the rank of the relationship manager, the higher the rate deviation that can be given.

In some embodiments, the system allows overwriting of rates and pricing during the account opening process. These rates and prices are those obtained from the underlying/local business engine. Ability for overwriting may be controlled by entitlements and the system may capture audit trial data for tracing this type of overwrite.

In some embodiments, the rate and pricing offered may be based on sales/CRM actions based on data entered by the applicant and the customer information itself 9. Correspondence Address: Each applicant can set an address to which his/her correspondence is mailed for the specific product being opened. This may be in addition to the mailing address that a customer may already have. For existing customers, this address preferably defaults to the existing mailing address if any. The system may provide the ability to modify this address if needed.

10. Designate Relationship Manager: In some regions a distinct Relationship Manager (RM) may be assigned to two different accounts of the same customer. This option is flexible enough to allow the entities to display this as per the local needs. For example, for an existing customer, entities may choose to display the existing RM as a read only option. For a new customer, once they have determined the branch the customer wishes to hold their account at, the entity may default an RM (depending on criteria provided by the customer such as income, etc.) and just display the full details to the customer. Sites may also allow new customers to be able to select from a list of RMs.

11. Standing instructions: In some embodiments, the option may be provided to the customer for paying his/her credit card balance in full, just the minimum payment, or a percentage of the balance each month. The customer is also asked to select the account that the money is debited from. Each month thereafter, the amount is automatically debited from the account selected for their credit card. This Option may also be referred to as a "Full, Minimum or Percentage payment" or "Regular payment."

12. Signing Instructions: This refers to the process for designating people (and collecting their personal data) who are authorized for "signing" and/or "acting" on behalf of the account owner and the different instructions and limits around them.

13. Rewards Programs: Various rewards programs may be offered (depending on the type of product), such as Cash Back and Cash or Fly (Multiple choice). This Option may also be referred as "Business Card Reward Options" (CMB).

14. Credit Protection: This refers to repayment protection available on credit cards to protect against accidents, sickness, unemployment and death.

15. Plastic choice card design: This is the option for selecting the type of card.

16. Secondary Cardholders and Additional Cardholders: In some embodiments, the customer is presented with the option of designating cardholders. Additional personal data may be required for each cardholder. Both primary and secondary cardholder may have the option for receiving his/her own PIN during the session or by mail. This Option may also be referred as "Additional Card", "Authorized Users," or "Sub-accounts for commercial cards."

In some embodiments, for credit cards, the system allows to designate one secondary cardholder and a number of additional cardholders. The number of additional cardholders is preferably configurable. The system may request establishing/capturing card PIN credentials for the different cardholders during the account opening process as part of the Configure Product milestone.

17. Currency selection for multi-currency product: In some embodiments, for a multi-currency product, the user is presented with a list of currencies for selection to be opened.

The Business entity can configure the list of currencies available for selection.

Generally, the system provides flexibility regarding the core set of data fields for modifying core data field attributes as per local/regional requirements (e.g., Change field label, field size for display, validations, etc.). In some embodiments, there may additional flexibility provided to cater for data that is not included in the core set of data fields but is required by the specific region. For example: an Entity wants to begin collecting one new field associated to one product or product option. The system supports the ability of the business to do this without requiring coding and participation from technology services. In other words, any addition to the set of fields and/or products/product options available can be ready for going live immediately after the entities define them.

When creating new or managing existing data attributes, the system provides the capability to set rules to determine what products attributes to offer for which product and to whom they are offered at a local level. For example, rules may consider the following: Product selected; Data in Application (including results from CRM/sales/decisioning earlier in the app process); Current Customer Information; CRM/Sales engine results for the specific attribute (e.g., overdraft option will be a credit card vs. line of credit based inputs); and/or Defined dependencies among options (e.g., can't have statements without a PIB account).

Funding

This section describes the functional specifications of the Account opening Funding milestone. At this milestone, the system captures instructions to bring in funds, for example to a new deposit account (or balance transfer for credit card or loans/mortgages, etc.).

Funding may be through Internet, Branch, Call Center, Self Service Machines (Kiosk and ATM), etc. Funding through Self Service Machines (Kiosk and ATM) may occur when the Account Opening application is made available through these machines. In some embodiments, funds arriving from a channel different from the channel that the account is being opened (e.g., an account is opened in the Internet channel, and then a check to fund the account is deposited through the ATM/Kiosk channel) are handled by the business outside the AO system.

This funding description applies to New and Existing customers, and Sole and Joint Accounts. Applicable CMB and PFS products may include Savings, Checking (Current), Term Deposit and Credit Cards (including secure cards), as well as foreign currency savings, checking and term deposits. Funding may be through Cash, Check (Cheque), Cards, Internal transfer (including sweeps) and/or External Domestic transfer.

In some embodiments, future dated funding is supported. This refers to the pending completion funding execution prerequisites for the instruction or arrival of the check to the bank. In some embodiments, the system also supports funding involving foreign currency exchange and funding by automatic transfer and direct deposit.

Features such as Designing a Payment Engine; Funding for other Lending products (excluding Credit card); Anti money laundering check; Merchant/white label accounts; Setting up of the Automatic Transfer and Direct deposit instruction; Switching service; and/or International transfers may or may not be supported.

In the context of funding, a Kiosk is a station hosting the Internet application.

Product, Customer and Channel information may available as inputs to Funding from other milestones. Fees information may be available as input from the elect product, configure product and decisioning milestones.

Preferably, each funding instruction consists of one funding purpose tied to a number of funding options for user's selection.

Funding options may vary by Customer Type (new or existing), Channel and Product and funding purposes, but a core set of options are supported within the Account Opening (AO) system (e.g., Internal Transfer, External Transfer, Debit Card, Credit Card, etc.).

An open, active account may not always be required to capture a funding instruction. A funding instruction can be captured without the account number being generated and activated. The execution can be completed either before the account is generated, together with account generation, or after the account is generated, depending on the purpose of the funding instruction and the product being opened.

The User may select a funding option for each product within a bundled application. Funding for bundled product or multi product opening is preferably handled serially. In some embodiments, each product within a bundled product or multi-product opening has its own product level funding milestone status.

For cross currency transactions, the user may to enter an amount as either an 'amount to debit' or an 'amount to credit' (currency of the new account).

In some embodiments, each product being opened within the application may be required to set up zero, one, or more than one funding instructions, as configured by the business. Each funding instruction has its own funding instruction status.

The product level funding milestone is considered complete when all the funding instructions for the product has reached the business configurable respective status that contributes to the successful completion of the product level funding milestone. The account opening funding milestone is considered completed when the account opening application has been approved and all product level funding milestones have been completed.

In some embodiments, funding instructions can be changed prior to the completion of the funding milestone and subject to whether the application is open to changes for various account opening scenarios (e.g., joint/sole/new/existing/product/CMB/Channel/joint secondary).

The system provides the business the flexibility to configure which fields are made available for input or display only, and which may vary among various account opening scenarios. Account opening scenarios may vary by channel, product and/or customer information (PFS or CMB, New or Existing, Sole or Joint $1^{st}$ or Joint $2^{nd}$ applicant, etc.).

The degree to which the funding process is fully automated may be governed by local regulatory requirements and system capabilities. The time taken to process a funding request may be dependent on the external Interfaces.

In general, Funding refers to a process of adding funds to an account. Herein, the term funding means to add funds to a deposit account, collect fees and Transfer balance. The objective is to bring funds in as quickly as possible (minimally to provide the perception the funds are on their way, if not really here) to meet the customer's goal to access money as early as possible and the bank's aim to begin generating interest income.

In some embodiments, Funding is a distinct functionality within the End to End account opening process. It relates to the collection of data required to fund the account. The Funding milestone works in conjunction with other milestones to complete the account opening process. Funding functionality is flexible enough to move around within the account opening flow depending on local business practice/knowledge, to the extent that capture of the funding instruction and execution of the funding instruction can be carried out separately.

Funding is also reusable as an independent service for other work streams, meaning that all components of the funding process, from the presentation of options to the execution of the funding instruction, are reusable. For example, the payment work stream could use the Internal Transfer component to carry out day to day transfers. Credit Card components could be used for bill payment.

Figure 30:
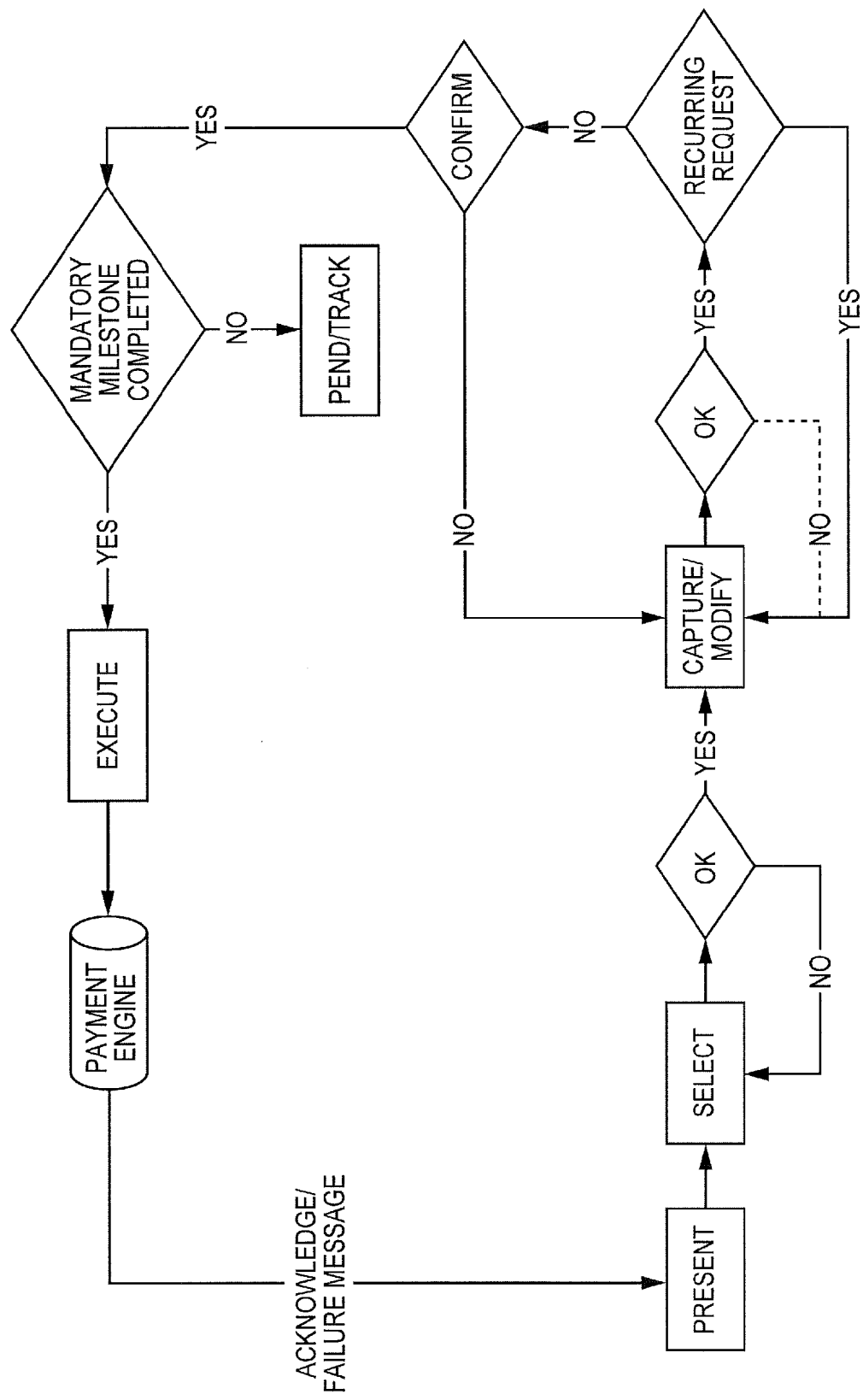
FIG. 30 is a diagram illustrating the Funding process according to some embodiments of the invention.

FIG. 30 is a diagram illustrating the Funding process according to some embodiments of the invention. The Funding milestone may be divided into 5 steps: Present, Select, Capture, Confirm and Execute. These steps are detailed further below.

Present options. This is the process whereby funding options are presented to the customer for selection. In some embodiments, the system provides the business with the ability to configure the funding options for various funding purposes within an account opening scenarios.

Whether funding is offered is configurable by the business by funding purpose per product per customer journey. For example, when building the customer journey for a 'current account' checking product, an entity may decide to offer deposit by check and internal transfer as the only funding options. However, for a savings account customer journey, an entity may decide to offer deposit by cash, deposit by check, and internal transfer as the funding options. The business decides whether to present previously used funding sources that match with the available funding options available for selection. In addition, the business also decides at product level whether or not the second party to a joint application can add funds. Funding instructions for multiple products are preferably available for re-use once the funding is set up for the first time.

The system can present zero, or one or more funding instructions for capture per product, as configured by the business. Each funding instruction corresponds to a funding purpose.

In some embodiments, each funding instruction is associated with a product that is being opened. For the case of opening a bundled product, the funding instruction for the fees may be associated to the bundled product level.

If there are multiple kinds of fees that need to be collected for the product being opened, they may be treated as separate funding instructions.

The system preferably presents one or more funding options for selection per funding instruction.

The system also preferably presents previously used funding sources having funding options applicable to the funding instruction for selection. Applicable funding sources captured through account servicing may also be made available for selection.

In some embodiments, for joint customer scenarios, the system may present funding options to the primary applicant, but may or may not present funding options to subsequent applicants. For example, A and B could fund from their individual accounts with another institution for the newly opened joint account with the bank.

For multi-product scenarios, the system supports the presentment of funding options for each of the products selected, each of which may require the capture of more than one funding instruction for a different purpose. For example, if the user has chosen a Savings and Checking product, system may present the funding options separately for each of the products.

Funding options may be presented at more than one point within the Funding process. Funding instruction capturing may be presented any point through the AO journey. Preferably, customers are allowed to change the funding option at any point during the AO process.

For each funding instruction configured for each product, the business can configure whether funding is mandatory and whether it can be skipped. For example, the business may specify that for credit cards funding the annual fees and processing fees cannot be skipped, but balance transfer can be skipped. The system is able to respond to what business has configured, and decide whether or not to give an option to the user to fund offline (e.g., skip funding).

The presentment of funding options for selection only applies if there are two or more funding options being offered, or if there are two or more applicable previously used funding sources offered for selection. If there are no previously used funding sources and only one funding option is applicable, the funding instruction captured for the only option may be presented directly.

If funding is not offered for a product, the funding milestone for the product is may be considered complete once the account opening application has been approved.

By "Funding options can be presented at more than one point within the funding process", it is meant that, in some embodiments, setting up of funding instructions is only presented at one point within an account opening scenario per product, and users will be allowed to change the funding option selection during the capture of the funding instruction. It does not mean that funding options can be presented at one point for a certain purpose (e.g., collect annual fees) within an account opening scenario, and then funding options are presented again at a second point for the same purpose and for the same product within the same account opening scenario.

For certain products (e.g., credit cards), the business can define multiple presentment of funding options, where each presentment corresponds to funding for one purpose. For example: one set of funding options for paying annual fees; a second set of funding options for paying processing fees; option to capture details for a balance transfer; a fourth set of funding options for funding a secure card.

Select an option. This is the process whereby the system allows user the ability to make selection. The User selects the funding option most suitable to them. The User has multiple funding options to select from. User may also select from a previously used funding source for the instruction.

Whether the user can fund offline is configurable by the business by funding purpose per product per customer journey.

The system provides the user with the ability to select the desired funding option from one or multiple options and from previously used applicable funding sources.

In some embodiments, the User can only select one option or one previously used funding source per funding instruction. In some embodiments, multiple funding options or funding source selection are not supported. For example, the User cannot choose Cash and Check as funding options for same product.

Preferably, the system provides users with the ability to modify their selection any time before confirmation.

In some embodiments, if funding is not mandatory for the funding instruction and the user decides to fund offline, then the funding instruction status is considered processed once the account opening application has been approved.

If no funding instruction is set up for the product (either funding not required, all user selected fund offline for all funding instructions for the product), then the funding milestone for the product may be considered complete once the account opening application has been approved.

The system is able to respond to what the business has configured, and decide whether to give an option to user to fund offline for each funding instruction within the various account opening scenarios.

Capture information. Once the user has selected a funding option or a previously used funding source, the system captures the information required to complete the transaction. The system may display the values previously captured if the user selected a previously used funding source.

Where the new account is for an existing customer that is debiting an internal account and the transfer can be immediate (e.g., within foreign currency cut-off times), a foreign exchange rate may be displayed (along with the amount to debit and the amount to credit as mentioned above) to the user for review, where the debit and credit currency are different. The business can configure whether the exchange rate should be quoted directly or indirectly. The user may be given the option of accepting or declining this exchange rate before completing the process.

Where a transfer with a foreign exchange (FEX) cannot be completed as it is after FEX cut off times, an appropriate business configurable message may be displayed to the customer and the transaction can be stored in the local entity back office system, and generated on the next working day (during FEX open times) at the prevailing rate.

Where a transfer with a foreign exchange cannot be completed as it is from a third party, an appropriate message may be displayed to the customer advising the same. This message and the previous (and any such) message can be different and are preferably entity business definable.

Although the above refers to foreign exchange, it should be noted that transfers can also take place between the same currency.

For opening new term deposit accounts, the term duration, indicative term interest rate and indicative term maturity date together with its term currency and amount are preferably displayed to the customer. The customer may then be given the option of accepting or declining this exchange rate before completing the process.

In some embodiments, the system obtains the customer, channel, and product information from previous milestones. For example, Customer name and Product name may be pre filled and the system must capture only the rest of the information. The system may obtain the fees that need to be collected from the select product, configure product and the decision milestones. Preferably, there is minimum additional data capture.

Funding limits (min, max) and data fields are business maintainable. There may be separate limit entitlements for funding and moving monies. Funding limits can vary and may be configurable by business by funding purpose, funding option, product, and/or customer journey. Where host systems already store minimum balances (e.g., Term Deposits), entities do not need to re-define such limits; validation exists once the customer enters the funding amount. Funding limits is a separate configuration to payment limits.

The business is also able to configure the number of balance transfers from competitors that are allowed for various account opening scenarios, and also the maximum total amount of credit card balance transfers allowed within various account opening scenarios. For example, in the UK, the customer may be given the option to switch up to three of their existing competitor balances to the bank. Amount and number of competitors is configurable by product and user journey. The balance transfer details may be captured per competitor's card within an account opening scenario. The allowed balance transfer amount may vary by product.

In some embodiments, the system may enable future dated funding, meaning that the funding execution may be held due to pending completion of funding or application execution pre-requisites. The instruction is captured now, but execution can take place on a future date. However, in some cases, users are not allowed to specify a future date for when the funding execution is to take place.

Where an account type has a minimum balance requirement and the customer is carrying out a foreign exchange (that is not immediate), if they selected an 'amount to debit', the system may look to the hosts' 'indicative' exchange rates to ensure that the amount will meet the minimum balance requirements. If not, an appropriate business configurable error message may be displayed to the customer. If the actual amount to credit does not reach the minimum balance, such a case may be handled outside of AO.

The business has the option of displaying a recurring step that allows the funding account to establish recurring transfers (at the time of funding, not subsequent to funding). This is also a servicing component that may be available for re-use.

For funding for multi-currency accounts, the user is preferably allowed to select the currency (crediting currency) where the funds are to go within the list of currencies the user selected in the product configuration milestone. The funding (debiting) currencies are preferably in line with the funding option the user selected.

In some embodiments, the system may display currency exchange information (rate, debit/credit amount) for indication before confirmation whenever the funding instruction capture involves currency exchange. Funding limits for checking may be enforced whenever currency exchange is involved. The exchange rate is preferably sourced from host or external interfaces (and can be shared and incorporated into the account servicing work stream).

The business can configure whether customer re-authentication is required by funding option per funding instruction for various account opening journey scenarios. The business can also configure the amount threshold that re-authentication is required. In some embodiments, re-authentication is required once only for the whole Account Opening application submission. Re-authentication can be by-passed, for example, if the user did not select any funding option that requires re-authentication.

The details captured within the funding instructions may be saved if the application has not been submitted.

Confirm instruction. Once a user has captured the data, they must confirm the instruction to complete the transaction. In some embodiments, once the user the confirms the instruction, the system provides the user an acknowledgement. The funding instruction is executed upon completion of funding execution pre-requisites. Confirming the instruction will trigger the execution of the instruction if all funding execution pre-requisites are completed, or the system will wait for the completion of funding execution pre-requisites.

Once data is captured the system preferably provides the user the option to Confirm or Modify. The User may either confirm the instructions or modify the instruction where possible. On confirmation the instruction is submitted and pended for execution.

The submitted instructions may then be executed to complete the funding. If processed in real time, the system may give acknowledgement to the customer that the transaction is complete. If an instruction is awaiting execution, the system may send acknowledgement that funding instructions have been captured and confirmed by the customer. In some embodiments, this stage is fully automated.

In some embodiments, Account Number and account balance may be validated prior to confirmation of the instruction (e.g., for Internal Transfer, Credit Card, and Debit Card).

The business can configure whether obtaining the debit authorization mandate (for external transfers) or pre-approval (for credit card or debit card) needs to be performed as part of the validation prior to confirmation, or whether it can be carried out as part of funding execution.

Once a funding instruction is confirmed and validated successfully, the fund source details captured may be made available for selection for setting up subsequent funding instructions within Account Opening, and also made available for selection for subsequent movement of money within Account Servicing.

An entity can configure, depending on the product and channel, whether or not a user has to 'review' and confirm the details of an account (e.g., in the case of Term Deposit accounts).

Execute instruction. Executing instruction is the process of providing the output to the external interface to carry out the transfer of funds and collect the acknowledgement to be communicated to the user. This component keeps track as to whether the funding execution pre-requisites are completed and whether the account is generated and activated. For executing the instruction, the capture of instruction must be completed.

The business can configure when the instruction is to be executed by funding option for each instruction for each product within an AO journey. The execute funding instruction component decides whether funding execution can start based on business configuration and other milestone statuses and AO status.

A funding instruction for a product can be executed, for example, at one of the following business configurable stages within the account opening process. This configuration constitutes the funding execution pre-requisite for the funding instruction.

Right after the funding instruction is captured
Account Opening application submitted and approved, but no accounts have been opened yet
Account Opening application submitted and approved, and before the account for the funding instruction is opened
Account opened but not active
Account opened and active
Together with actual opening of the account For funding a secure card, a savings account (either existing or newly opened) may be linked to the card when the funding execution takes place.

The instruction to collect fee may be executed without the new account being opened.

In some embodiments, an account within an application may be opened on the completion of the following:

All mandatory milestones like Gather application data, Validate Identify, Decision, Terms and Conditions are completed
All funding instructions that have to be executed either 1) Right after the funding instruction is captured; 2) Account Opening application submitted and approved; or 3) Before the account is opened are completed successfully If the debit authorization mandate (for external transfers) or pre-approval (for credit card or debit card) has not been obtained as part of the funding instruction validation process, they are preferably obtained as part of the funding instruction execution.

For opening new Term Deposit accounts, the actual term interest rate and term start and maturity date may be booked at the time when the account is actually opened.

The business entity can configure (business without IT intervention) at what point a zero-balance account application is considered "active" (e.g., after KYC/validate ID has been passed, but before funding execution).

The business entity can also configure (business without IT intervention) at what point a balance-required account application is considered "active" (e.g., after funds have been applied to the account).

Whenever the funding execution involves currency exchange, the business configured funding limit (min, max) for the funding option used for the funding purpose in the instruction is preferably checked against using the actual exchange rate for the execution of the funding instruction.

For funding execution that takes place right away, if the funding instruction fails, the user is preferably provided with a business definable failure message and also the ability to fund using some other funding option right away. In some embodiments, for execution of other funding instructions, once the funding execution request is fired-off, no more changing of funding instruction/option is allowed. The customer is preferably notified with a business definable failure message and also the ability to fund using some other funding option through account servicing.

In case of future date funding the execution will take effect on completion of the funding execution pre-requisites or the arrival of check.

In case the customer sends a check for funding for multi-product, bundled product, or for multiple purposes, the splitting of the amount towards funding for different products and fees may be handled manually.

In case a successfully executed funding instruction has to be reversed (e.g., customer cancels application, etc.), the system provides the capability for carrying out the reversal (if, e.g., such capability is not available through account servicing). The funds are returned to the funding source they originated from.

This component preferably obtains other milestone statuses as input, and may determine, for example, the account opening application status, and whether each of the new accounts have been generated and whether they are active. This component may use these statuses obtained to determine when the funding instruction execution is to take place.

For future dated funding execution, execution should take effect on the completion of funding execution pre-requisites or arrival of the check to the bank.

For Card products, account being active refers to the case where a credit card account has been generated and activated (activated here refers to the credit card account, not the credit card itself).

Preferably, the funding option or funding instruction can be changed as long as the respective funding execution has not started. A submitted application can be retrieved and changes are preferably allowed to be made to the application.

Funding Options. This section describes the details and data needed for the available funding options. The funding options are options available for funding the deposit account, funding the savings account linked to secure card, and collection of initial fees.

1. Cash as funding option: Cash may be either paid to the teller or deposited using a self service machine (Kiosk or ATM). Cross channel cash funding execution is not required; cash may be taken at the point where the AO application is made (One-stop fulfilment).

The system gathers necessary data for the Cash funding instruction. For example, the customer may be sitting with a CSR and would like to make a cash deposit. The customer provides the cash to the CSR, and the CSR captures details of the instruction and takes the cash to the teller for deposit.

In some embodiments, funding through Cash is only allowed upon Account activation.

In some embodiments, the account opening system may be integrated with the teller system. Instructions captured via Branch/Call Center may be sent for execution without re-entry of the funding instruction into legacy systems.

In some embodiments, the system displays the cash balance with status pending, and the status changes to "available" upon actual cash entry processed by the teller. The business may define what fields are displayed/captured/editable and which ones are mandatory.

In some embodiments, the following information is captured for the Cash option: Customer Name (Name of the customer whose account is being opened); Fund Account number—(Account number to be funded); and Amount (Funding Amount).

System support of funding of cash through Teller, Self Service Machines (Kiosk and ATM) means that the Account Opening application is made available through these channels, and customers may deposit the cash through these channels right away. In some cases, funds arriving from a channel different from the channel that the account is being opened (e.g., account opened in the Internet channel, and then the check deposited through the ATM/Kiosk channel, or account opened in the Internet channel, and then the cash deposited through the ATM/Kiosk channel) may be handled by the business outside the AO system (e.g., by some existing process).

If a customer is not funding according to what they have specified (e.g., specified through the online channel to fund $100.00 by check, but end up funding $50.00 cash through branch), the funding may be handled by the business outside the AO system (e.g., by some existing process). It is business maintainable as to whether staff should mark the product level funding milestone status completed in this case (subject to completion of other funding instructions for the product). This maintenance is only required if the business configured funding milestone is not marked completed upon successful capture of the funding instruction using cash.

The cash balance (with pending status) can be passed along to other existing legacy systems and reflected upon inquiry, until the point where the funds are realized and the balance becomes available.

In some embodiments, when staff indicate a product level funding milestone status as completed, all balances pending for funding (e.g., cash balance, check balance) cease. Only the true account balance is reflected subsequently.

2. Check as funding option: A physical Check may be deposited with a branch, sent through the mail or deposited using a self service machine (Kiosk or ATM). The Check details (e.g., Initial Deposit amount) may be collected by a back-office when the physical check arrives. In some embodiments, if "check" is selected as funding option through the branch channel, then it is integrated so that staff do not need to re-capture the check details through legacy systems. Preferably, appropriate fields for capturing check details are provided, which may vary among the channels. The business is able to configurable the check details to be collected across different channels. If the check arrives through other means, then the check details may be captured through existing processes.

In some embodiments, the system may display the check balance with status pending, and the status will change to "available" upon actual realization of check through clearing process. Until then a zero balance will be maintained in the account.

Funding of check through Teller, Self Service Machines (Kiosk and ATM) means that the Account Opening application is made available through these channels, and the customer may deposit the check through these channels right away. Funds arriving from a channel different from the channel that the account is being opened (e.g., account opened in the Internet channel, and then the check deposited through the ATM/Kiosk channel) may be handled by the business using existing functionality.

If a customer is not funding according to what they have specified (e.g., specified through the online channel to fund $100.00 by check, but end up funding $50.00 cash through branch), the funding may be handled by the business using existing functionality. It is business maintainable as to whether staff should mark the product level funding milestone status completed in this case (subject to completion of other funding instructions for the product). This maintenance is only required if the business configured funding milestone is not marked completed upon successful capture of the funding instruction using check.

If an account is opened with check as funding option selected, and the check subsequently arrives at the bank (e.g., via ATM, mail, branch, etc.), the check details may be captured through processes within account servicing or existing processes.

To make the check as funding option consistent with the cash as funding option, the account opening system may be integrated with the teller system, meaning that there is no need for the staff to re-capture the Check Deposit transaction through other existing legacy systems. Fields relevant to the details of the check are preferably made available for capturing, and such fields may vary among various account opening scenarios.

The check balance (with pending status) may be passed along to other existing legacy systems and reflected upon inquiry, until a point where the funds are cleared and realized and the balance becomes available.

When staff indicates a product level funding milestone status as completed, all balances pending for funding (e.g., cash balance, check balance) should cease. Only the true account balance is reflected subsequently.

3. Credit Card as funding option: The system collects the necessary card details and executes the instruction on completion of the pre-requisites for funding execution. The Credit Card details may be collected if they are readily available with the user. Credit Card as funding option may be applicable to depositing funds, or for balance transfers.

The business is able to configure whether obtaining credit card pre-approval (if applicable) is to be carried out as part of funding instruction validation, or whether it is to be carried out as part of funding instruction execution.

Due to sensitive information associated with a credit card and regulations that these information cannot be stored in the systems, the business can configure whether funding by credit card has to be executed right away after the information is captured per AO journey.

If the Credit Card is declined (either obtaining pre-approval or during the actual execution), the user may be notified of the failure, and may be given the ability to amend the card details, choose another funding option, or provide another credit card.

In some embodiments, election of Credit Card as funding option may be treated as cash advance (from card limit) or a normal transfer (when the credit card is in credit).

In some embodiments, one or more pieces of the following information are captured for the Card option. Where information is already available it will preferably not be captured again. This is not an exhaustive list and may vary by entity.

1. Customer Name—Name of the customer whose account is being opened
2. Fund Account number—Account number to be funded
3. Bank Credit Card number (for balance transfer only)—The card number to which balance is transferred
4. Amount—Funding Amount or balance transfer amount
5. Effective date—Date of executing the instruction
6. Card Number—The card used for funding the account or where the balance is transferred from
7. Type of Card—Visa, MasterCard, or Others
8. Card Expiry date—The date card expires
9. Institution Name (balance transfer only)—Name of the Institution from which balance is transferred
10. Institution address (balance transfer only)—Address of the Institution from which balance is transferred 11. CVV code—Card Security code
12. First Name—Customer First name on the Card
13. Last Name—Customer Last Name on the Card
14. Billing Address—Card billing address
15. Card start date—Card valid from this date (captured for local entity only)

"Card Account Number" refers to the Card Number where the funds come from, or where the balance transfer is to be effected from. For the case of balance transfer, it refers to credit cards issued by other financial institutions, or other non Bank-branded credit cards. "Bank Credit Card number" refers to the new card in the account opening process, which may be defaulted/derived by the system and does not require capture by the user.

If credit card information is not readily available, the user can save the application (provided that the application has not yet been submitted), and return to it later when information becomes available.

4. Debit Card as funding option: The system collects the necessary card details and executes the instruction on completion of mandatory milestones. The Debit Card details are collected if they are readily available with the user.

The business is able to configure whether obtaining debit card pre-approval (if applicable) is to be carried out as part of funding instruction validation, or whether it is to be carried out as part of funding instruction execution.

Due to sensitive information associated with a debit card and regulations that these information cannot be stored in the systems, the business can configure whether funding by debit card has to be executed right away after the information is captured per AO journey.

If the Debit Card is declined (either obtaining pre-approval or during the actual execution), the user may be notified of the failure, and may be given the ability to amend the card details or choose another funding option.

In some embodiments, one or more pieces of the following information are captured for the Debit Card option. Where information is already available it will preferably not be captured again. This is not an exhaustive list and may vary by entity.

1. Customer Name—Name of the customer whose account is being opened
2. Fund Account number—Account number to be funded
3. Amount—Funding Amount
4. Effective date—Date of executing the instruction
5. Card Number—The card used for funding the account
6. Type of Card—Visa, MasterCard, etc.
7. Card Expiry date—The date card expires
8. CVV code—Card Security code
9. Card start date—Card valid from this date (captured for local entity only)
10. Card Issue number—Number of times the card is issued If debit card information is not readily available, the user can save the application (provided that the application has not yet been submitted), and return to it later when information becomes available.

5. Internal Transfer as funding option: Transfer of funds within the Institution is referred to as Internal Transfer. The system collects the necessary account details and executes the instruction on completion of funding execution pre-requisites.

In some embodiments, internal transfer may be available only to existing customer with any business defined eligible accounts. Eligible accounts refer to those that are debitable within the user's entitlement limits. The business is able to configure which types of accounts (e.g., Savings, Checking, etc.) and currencies may be made eligible for various account opening scenarios.

In some embodiments, only debitable accounts are displayed. The list of accounts to be displayed may be filtered based on account type (e.g., savings accounts, current accounts, term deposits, etc.) and account currency. The drop-down may display full account details including number, type (or nickname) and currency. In addition, in some embodiments, there is a 'check balance' function. The format of this function is entity definable (e.g., as to whether to display ledger or available balance, and any overdraft facility).

The business has the ability to configure the account currency options allowed in the debitable account list selection for setting up an internal transfer, for example:
Local Currency (on shore currency)
New account currency
Local currency and new account currency
Any currency as supported by the local entity (including local currency and new account currency)

The business is also able to configure the transfer limits (min and max) and funding sources for various account opening scenarios.

The system has the ability to check and validate the customer's account balance before executing the instruction. Checks to be included may include available funds, account status, inhibits (special instructions), and/or limit utilization. For sites that can define limits for different transfer types, this may be regarded as an 'in house linked account transfer.'

Customer balance is preferably displayed for each potential funding. It is up to business flexibility as to which fields to display/capture/edit and which ones are mandatory.

In some embodiments, one or more pieces of the following information are captured for Internal Transfer option. Where information is already available it will preferably not be captured again. This is not an exhaustive list and may vary by entity.

1. Customer Name—Name of the customer whose account is being opened
2. Fund Account number—Account number to be funded
3. Amount—Funding Amount
4. Effective date—Date of executing the instruction
5. Account to be Debited—Customer's existing account with Bank from where funds will be collected
6. Type of Account—(e.g., Savings or Checking) for display only as part of debiting account information 6. Sweep as funding option: A sweep account is an account set up at a bank or other financial institution where the funds are automatically managed between a primary and secondary account. Customers can choose to have a 'sweep' from their current account to a nominated savings account once a month, on a specified date. Sweeps can be set up through different channels and the instruction to set up the sweep captured.

In some embodiments, sweeps are available only to existing customers with eligible accounts. Eligible accounts refer to those that are debitable within the users entitlement limits. The business may configure which types of accounts (e.g., Savings, Checking, etc.) and currencies may be made eligible for various account opening scenarios.

In some embodiments, only debitable accounts are displayed. The list of accounts to be displayed may be filtered based on account type (e.g., savings accounts, current accounts, term deposits, etc.) and account currency. The drop-down may display full account details including number, type (or nickname) and currency. In addition, there may be a 'check balance' function. The format of this function is entity definable.

The business is able to configure one of the following exemplary account currency options allowed in the debitable account list selection for setting up a sweep:
Local Currency (on shore currency)
New account currency
Local currency and new account currency
Any currency as supported by the local entity (including local currency and new account currency)

Sweep limit min/max are preferably business maintainable.

The system has the ability to check and validate customer's account balance every time before executing the sweep instruction. Checks to be included may include available funds, account status, inhibits (special instructions), and/or limit utilization. For sites that can define limits for different transfer types, this may be regarded as an 'in house linked account transfer.' This checking and subsequent maintenance may rely on an account sweeps module when the sweep instruction is executed each time (the sweeps module may exist in both AO and servicing).

Customer balance is preferably displayed for each potential funding account. It is y up to business flexibility as to which fields to display/capture/edit and which ones are mandatory The following data are preferably supplied to set up a sweep:
Account number to sweep from
Account number to sweep to
Date of sweep
Minimum balance to maintain in the current account
Minimum amount to transfer In some embodiments, sweeps can only be setup between two internal accounts within the Bank entity.

Even though it is mentioned that sweeps can take place once a month on a specified date, the business may require more flexibility on the sweep frequency options being offered. It is left up to business to configure what sweep frequency options (e.g., daily, fixed day of week, biweekly, fixed day of month, end-of-month, quarterly, etc.) to offer for various account opening scenarios.

In some embodiments, maintenance of sweeps after they are set up through account opening are not handled by the AO system. In some embodiments, for example, sweep maintenances may be handled in the servicing work-stream.

7. External Transfer as funding option: Transfer of funds from another Institution is referred to as External Transfer. In some embodiments, only local external transfer (e.g., within the country) is supported. An authorization to debit customer's account with another institution may be required to be obtained. The business is able to configure whether obtaining debit authorization is to be carried out as part of funding instruction validation, or whether it is to be carried out as part of funding instruction execution. In some embodiments, CDM will store internal bank and card accounts, and PPE will host third-party bank and card accounts.

The currencies in which the funding has to be effected are also preferably business maintainable. The currencies allowed for selection may be different from the currency that the new product is being opened.

The account with the other institution may be verified prior to execution (business configurable as to whether verification takes place). This verification can be performed, for example, with the aid of online verification or trial deposit. In some embodiments, the system may be integrated with an external system to carry out the account verification.

In some embodiments, verification is performed as part of obtaining the debit authorization mandate. If the user selected an existing external account as funding source, and a valid debit authorization mandate is already in place, by default the debit authorization mandate can be reused for effecting the funding execution. There is no need to obtain a new mandate for such cases. However, the business has the option to configure that a new debit authorization mandate is required.

The system communicates to the user whether the Account verification was Successful or Unsuccessful. Alternatively, a user may fund from an external source by use of the funding by debit card funding option.

In some embodiments, one or more pieces of the following information are captured for External Transfer option. Where information is already available will not be captured again.

Customer Name—Name of the customer for whom the account is being opened
Fund Account number—Account number which requires to be funded
Amount—Funding Amount
Effective date—Date of executing the instruction
Account Number—Account with other institution
Account type—Savings or Checking account
Name of the Institution—Name of the Institution from which funds have to be collected
Address of the Institution—Address of the Institution from which funds have to be collected
ABA Routing Number—Routing number of the Institution from which funds have to be collected 8. Apply to New Account as funding option: Debiting from the new account being opened is referred to as "Apply to New Account." For credit cards, the account in this case refers to the credit card account. In some embodiments, this funding option is only applicable for the collection of fees. The business is able to configure whether to allow this funding option per kind of fees to be collected per product within various AO journey scenarios.

9. Skip Funding as funding option: Skip funding (e.g., open with a zero balance) allows the user to fund the account at a later stage after the new account is being opened. Where skip funding is selected, users should be able to fund the account through processes available from account servicing or through existing business processes. The business is able to configure whether to allow this funding option per funding instruction per product within various AO journey scenarios. In certain regards, this may be viewed as a business capability rather than a customer option.

Funding purpose. Funding purpose refers to where the funds collected will go. Each funding instruction has a business configurable funding purpose tied to it. In some embodiments, the available funding purposes include: Balance Transfer; Collect Fees; Deposit Funds.

1. Balance Transfer: Balance transfer is the act of transferring debt from one account to another. The account can be a banking (e.g. loan, mortgage) or a credit card account.

Balance transfer for banking accounts may only allow External Transfer as funding option. Balance transfer for credit cards may only allow Credit Card as funding option. The business can configure whether balance transfer is allowed from Bank branded and non-Bank branded credit cards.

The business can configure the maximum number of accounts or institutions in which balance transfer can be setup for a new account. Balance transfer from each account or institution may be treated as a separate funding instruction when it comes to funding execution and funding status update.

The business also configures the limit (min, max) in which the balance transfer has to be effected per product for various account opening scenarios.

Initially the system may capture the balance transfer instruction, but the execution may happen before or after the account activation, as configured by the business.

The balance transferred may be applied to the new account or credit card that is opened.

Any constraints in using balance transfers (e.g., three times maximum within a six-month period) for a new account may, in some embodiments, be handled as part of account servicing.

2. Collect Initial Fees: A customer opening an account may be required to pay up-front fees such as an Annual fee, Processing fee, and/or Application processing fee. Fees may be applicable to any banking products or credit cards.

The system preferably initiates the collection of a fee only if the fee was not collected earlier or the customer is not eligible for fee waiver.

Annual Fee—This is a fee charged on an annual basis by the credit card issuer to the cardholder to help cover the cost of maintaining the cardholder's account. The system provides the ability to bill the customer's new credit card account directly or collect from an existing Bank account, debit card, or credit card.

Processing Fee—All fees surrounding credit cards can be termed as processing fees. For example, application fees, set-up fees, gateway access fees, statement fees, fixed transaction fees, etc. The system provides the ability to bill the customer's new credit card account directly or collect using one of the funding options.

The business can configure multiple funding instructions for collecting different kinds of fees, and specify which funding options are to be offered for each kind of fee per product for various account opening scenarios.

The business is also able to configure the kind of fees together with an Income/Expenditure (I/E) account entry or an I/E account number which the fees collected will be credited to. The business can configure a different I/E account entry or account number for different kinds of fees collected per product for various account opening scenarios.

The business can further configure whether different kinds of fees and their details are overridable per product for various account opening scenarios (and channels).

The following exemplary information may be configured by the business for each kind of fee that can be collected:

Kind of fees—The kind of fees to be collected (e.g. annual fees, processing fees, subscription fees, etc.)

I/E entry or account—The Income/Expenditure account that the fees will be credited to Periodicity—The frequency that the fee has to be collected (e.g., one time, monthly, yearly, etc.)

The business can configure whether to collect the different kinds of fees together or separately for various account opening scenarios. If the fees are to be collected together, the business is also allowed to configure an Income/Expenditure (I/E) account entry or account number for the fees to be credited to.

Regarding what fees are applicable, and the amount for each kind of fee, and whether fees have been collected and if the customer is eligible for fee waiver, these preferably come from a combination of product information and the local entity's back-end system (decisioning) on the fees for the product that the applicant has applied for. In some embodiments, these details are fed into the funding milestone to facilitate the capture of the funding instructions for the collection of fees.

3. Deposit Funds: Funds can be deposited to savings, checking, term deposit, and credit card accounts while the new account is being opened.

The business can configure which funding options are to be offered for depositing funds per product for various account opening scenarios. The business can also define the deposit funds limit per funding option per product for various account opening scenarios.

The funds collected may be deposited to the new account being opened. In the case of secure credit card, the funds may effectively be deposited into the savings account that backs the credit card. The savings account is preferably already linked or newly created at the time that the deposit funds funding instruction is executed.

Funding Status and Notification. This section describes the process of notifying the funding status to the User. In some embodiments, the account opening system monitors the status of the funding activities and send notices via the communication module to the customer. This status notifies the user, for example when account opening is pending on account of capture of funding instruction. The business can configure multiple funding pages for different purposes.

For funding instructions that involve currency exchange and are not executed and completed immediately (e.g., instruction submitted after currency cutoff, pending funds arriving from third party sources), entities are able to auto-generate an advice to the customer advising of the FEX rate. An entity has the flexibility as part of the communications module to be able to generate an advice to the customer by their preferred (or any) contact method.

For each funding instruction, the system maintains a status at every stage of the funding process and can notify the customer of the current status. The system may, in some embodiments, notify via the communication module using the customer preference for communication. The system may display the funding amount and current status of the instruction until the funding process is completed. The business has the ability to configure which funding instruction status requires notification to customer for each of the funding options within a funding instruction for various AO journeys.

The following are examples of possible funding instruction statuses:

Funding Pending—Waiting for some other aspect of account opening (like T&C receipt) to be completed, but instructions were captured and pending for execution Funding In progress—When capture of funding instruction is completed successfully and execution of funding instruction is initiated but not completed Funding Processed—When funding is processed successfully and balance is reflected Funding unsuccessful—When execution of funding instruction fails In some embodiments, each product within the account opening application has its own product level funding milestone status. The product level funding milestone status is marked complete if the funding instructions associated with the product have attained the business configured funding instruction status, which may vary by the funding option the user selected.

The following are exemplary valid funding instruction statuses that a funding instruction can attain in order to contribute to the completion of the product level funding milestone: Funding Pending (instruction captured and validated, but pending for execution); Funding in progress (instruction sent for execution and is in progress); or Funding processed (instruction successfully processed and balance reflected).

In some embodiments, overall funding status for an application is considered complete only if all the product level funding milestone statuses within the application are considered complete.

When funding is required for a product, the product level funding milestone may appear on a "step tracker" for applications of that product. The milestone will be available to users to complete. When funding is disabled, completion of the capturing of the funding milestone is not required and will not be displayed to users or on the step tracker when users apply for that product.

In some embodiments, the status will be used to notify the user when account opening is pending on capture of funding instruction, but not pending on execution of funding instruction.

The business is able to configure the number of days after which to notify the customer that the account has remained at a zero balance after it has been opened. The business can also configure after how many more days the account will be automatically closed if it is still not funded. The customer is preferably notified of the funding purpose, funding option selected, amount, and funding due date in such cases.

When the customer is notified of the successful completion of a funding instruction execution, the actual exchange rate used (if any) may be communicated as part of the notification.

Funding status may be updated to completed if the user chooses to fund offline for the funding instruction. The customer may or may not be notified in such cases.

When staff maintains a product level funding milestone status to completed, all balances pending for funding (e.g. cash balance, check balance) will cease. Only the true account balance will be reflected subsequently.

Automatic transfer is a process of setting up regular, recurring transfers, of fixed amounts that happen at specified intervals from another institution. An account with another institution must be verified prior to execution. Automatic transfers may or not be supported by the system during funding of the account.

Direct Deposit may or may not be supported by the system for funding an account. Direct Deposit is a process of having regular payments, such as salary and government benefits checks credited directly to an individual's bank account. The system captures the request for direct deposit, which may satisfy the funding milestone, even though monies may not be immediately deposited. The account has a zero balance until the first direct deposit is credited to the account.

Switching service is the process of switching banking relationships from one institution to another. The system may or may not support switching service of Automatic transfer and direct deposit from the previous bank. In some embodiments, the switching option may be available to customer only if a Savings or Checking (Current) account is being opened. Since switching service only applies to customers with existing Checking (Current) accounts with another bank, certain information may be already collected from the customer (see Gather Application Data). In some embodiments, the system may capture instructions to transfer direct deposit and automatic transfer from the former bank and automatically transfer on to the new account, without the customer having to sign and return a paper Transfer Authority Form.

Fulfilment

Fulfilment is the process whereby the system triggers the generation and delivery of fulfilment materials. Depending of the type of account opened and how it was configured (by selecting/accepting additional products and services), the system may send requests to other entities, systems, and/or applications to start the process for assembling and delivering account associated materials (e.g., by Email, Mail, SMS, Printing, etc.).

Providing information and documentation other than in paper (paperless) is preferred. However, the default delivery channel for the fulfilment items depends on the entity, channel, and product configuration. These rules are preferably defined within the customer journey configuration.

For a new customer, as the account holding branch would have been selected prior to this milestone, where a customer is choosing the branch options as a delivery channel for certain items, the previously selected branch should be preselected, but can be changed. If it is changed it should not affect their original branch selection. Where it is changed, a warning message can be displayed to the customer advising them they have selected to collect X at a branch different from the one they specified their account to be held at. For existing customers, branch details may be defaulted, but can be changed if required (configurable by entity). For certain sites, branch details may be configured in different countries. For the branch channel, information is preferably defaulted.

The degree to which the fulfilment process is fully automated may be constrained by local regulatory requirements. Some customization may be required by region, as this milestone interacts with third party applications and systems. The system provides the local entity the flexibility to set up the pre-conditions for initiation of fulfilment, based on the local customer journey.

In some embodiments, the following milestones are recommended to be completed prior to fulfilment: Validate Identity, Configure Product, and Terms and Conditions.

In some embodiments, the account must be activated before fulfilment can be initiated.

In some embodiments, the system provides instant and fast fulfilment. Preferably, the customer receives immediate confirmation that arrangements regarding his/her account have been set (for example, e-statements, T&C distributed) and/or that other entities have started processing his/her account request and material will be mailed shortly (e.g., plastic cards for debit/credit cards). The sooner the arrangement is fulfilled, the sooner the customer will be able to use any of the access instruments associated with his/her account (PIB, Cards, TAC).

Two activity steps are described within the Fulfilment milestone: (1) Initiate Request: The process whereby a fulfilment request is generated/initiated. Requests may be sent to various systems (e.g., host, third party vendors) for processing of materials; and (2) Deliver Fulfilment Materials: The process whereby fulfilment materials (e.g., credit card (plastic), secured PIN (mail), etc.). are delivered to the customer (e.g., online, SMS, email, in branch, etc.). Other/additional activity steps are possible.

Initiate Fulfilment. Once the details of the request have been captured from the appropriate milestones in the account opening process a fulfilment request can be initiated. Fulfilment can be achieved, for example, by sending a request to a third party facility, internal facility, or the Communications Module to complete the process.

As used herein, fulfilment means instantly fulfilled upon request, unless specifically stated otherwise. In some cases there may be pending processes to be completed while the fulfilment item is initiated (e.g., T&C could be sent to the customer while the bank is waiting for a wet signature).

Fulfilment may be required in one or more of the following instances: Personal or Business Internet Banking (PIB, BIB); Phone Banking (PB); Debit Card/ATM card (mailed and instant); Credit Card (mailed and instant); Check Book; Terms and Conditions; Welcome Package; Decision Notification; Dispensing notice. A summary of exemplary fulfilment items and available delivery channels is given in Table 4.

In addition to the entities having the flexibility of deciding which channel is offered to the customer, at the product level, for both the initiate and deliver stages, the entity is also able to dynamically display a warning message and/or an additional field for that selection. For example, if a customer selects the 'delivery by courier' option, an entity may want to warn the customer that there is a charge for this delivery

TABLE 4

| Fulfilment Area | Fulfilment items | Delivery method | | | | | | | |
|---|---|---|---|---|---|---|---|---|---|
| | | Instant | Mail | Courier | Fax | Branch | IVR/VRU | Email | SMS |
| Internet Banking (PIB, BIB) | Generate PIB/BIB Credential | X | X | X | | X | X | X | X |
| | OTP Token | X | X | X | | X | | | |
| Phone Banking (PB) | Generate PB Credential | X | X | X | | X | X | X | X |
| Debit/ATM Card | Generate Debit/ATM Card Plastic | X (pre-embossed debit card) | X | X | | X | | | |
| | Generate Debit/ATM Card PIN | X (on screen and keypad) | X | X | | X | | X | X |
| Credit Card | Generate Credit Card Plastic | X (From Mexico: pre-embossed credit card) | X | X | | X | | | |
| | Generate Credit Card PIN | X (on screen and keypad) | X | X | | X | X | X | X |
| | Balance transfer: Generate confirmation letter | X (on screen) | X | X | X | X | | X | X |
| Check Book | Generate Check Book | | X | X | | X | | | |
| Terms and Conditions | Generate T&C | X (online) | X | X | X | X | | X | X |
| Welcome Package | Generate welcome Letter | X (online) | X | X | X | X | | X | X |
| Decision | Notify customer of the approval status | X (online) | X | X | X | X | | X | X |
| Dispensing notice | Generate Dispensing notice | X | X | X | X | X | | X | X |

Deliver Fulfilment Materials. This is the process whereby fulfilment materials listed above such as check books, credit cards, and debit cards are delivered to the customer via a specific delivery channel.

The following is a list of exemplary delivery channels that may be applicable for each fulfilment material: Instant—Online in real time (e.g., on screen, downloadable file, applicant can select their credentials); Mail; Courier; Fax; Branch; IVR Interactive Voice Response or VRU Voice Response Unit; Email; or SMS Short Message Service.

The delivery channel is preferably configured by sites based on the suggested customer journey for that site. The business can configure the delivery channels for a specific fulfilment material. For example, T&C could be displayed instantly on the screen and mailed to the customer.

Although the system offers all delivery channels to be configured by site, the system is preferably paperless, so in some embodiments will always try to offer a different alternative to provide information and documentation other than in paper.

method and it will be debited to their account later. This feature is preferably configurable by particular item (e.g., an entity can charge for the delivery of a welcome pack by a particular channel, but not for a secure token). It may be that an entity requires proof that the customer accepted these conditions, so the solutions for accepting the terms and conditions are preferably usable here as well, to ensure that the customer accepts before processing with that delivery option.

Internet Banking (IB). Initiate Fulfilment—Generate Internet Banking Credential. In some embodiments, Internet Banking credential generation is fulfilled within Product Configuration. Users have already captured the need to generate a new IB credential. The system supports credential generation for both personal and commercial customers for PIB and BIB.

Deliver Fulfilment Material—Internet Banking Credentials. The system provides the user with the ability to select from the following delivery channels:

Instant: Users will generate the credentials instantly on the screen. This should apply in instances where the applicant is able to create his own credential real time.

Mail: Users will be able to receive a paper copy of the temporary credentials delivered to the mailing address. The mailing address should follow the one that is captured from Product Configuration/Gather Application Data.

Courier: Users will be able to receive a paper copy of the temporary credentials delivered to the mailing address. The mailing address should follow the one that is captured from Product Configuration/Gather Application Data.

Branch: The system will generate a request to other systems for the temporary credentials generation (i.e. integration point) at or delivered to a branch. The branch location may be captured from Product Configuration/Gather Application Data.

Email: Users will receive an email that indicates the temporary credentials.

SMS: Users will receive an SMS that indicates the temporary credentials.

IVR: Users would be confirmed by the IVR system to after generating an Internet banking PIN. This is only applicable at a call center environment. Local entity IVR systems support the functionality of a customer being able to listen to their internet banking PIN for a first time (and subsequently).

Initiate Fulfilment—OTP Token. OTP token is a security fulfilment item for personal/business customers for internet banking product. In some embodiments, users have already captured the need to generate an OTP token within Product Configuration.

Preferably, the system supports both manual and straight-through processes to generate an OTP token. For manual generation, the system should indicate on the system that an OTP token is required for the customer. Staff will then fulfill this item manually. For straight-through generation, where possible, the system should provide an integration point to the entity's token generation system.

Where an entity has defined the credentials/items that can be collected at a branch, selecting this option may, for example, display a list of branches in that entity. The display is preferably definable by the business, with the flexibility to allow the customer to select a city first and then a branch (e.g., selection of X city displays only the branches in that city). For new customers, their pre-selected branch may be defaulted (but can be changed). For existing customers, their existing branch may be defaulted but can be changed (the option to change branch and/or country is preferably configurable at entity level). Entities can also define at channel level if they wish this branch selection option to be displayed.

Deliver Fulfilment Material—OTP Token. The system provides the user with the ability to select from the following delivery channels:

By Mail: Users will be able to receive the OTP token delivered to the mailing address. The mailing address should follow the one that is captured in Gather Application Data By Courier: Users will be able to receive the OTP token delivered to the mailing address. The mailing address should follow the one that is captured in Gather Application Data Branch: Users will collect/be presented with the OTP token at a branch.

In some embodiments, any communication (e.g. email, courier, mail, SMS, IVR, printing, etc.) is handled by the communication module.

For certain areas such as the United States, credentials (User Name and Password) may be fulfilled via two different delivery channels (e.g., the customer may select their user name but receive their password in the mail).

For any of the delivery channels, fulfilment may be fully automated, and there will be no manual intervention required for such communications (i.e., for any material as part of fulfilment).

The outcome of the ID&V milestone may impact the Audit/IT security requirement for Internet Banking credentials.

Phone Banking. Initiate Fulfilment—Generate Phone Banking Credentials. In some embodiments, Phone Banking credential generation is fulfilled within Product Configuration. Users have already captured the need to generate a new PB credential.

Deliver Fulfilment Material—Phone Banking Credentials. The system provides the user with the ability to select from the following delivery channels:

Instant: Users will generate the credentials instantly on the screen. This should apply in instances where the applicant is able to create his own credential real time.

Mail: Users will be able to receive a paper copy of the temporary credential delivered to the mailing address/or a letter to request the customer to call to set up the PB credentials. The mailing address should follow the one that is captured from Product Configuration/Gather Application Data.

Courier: Users will be able to receive a paper copy of the credential delivered to the mailing address/or a letter to request the customer to call to set up the PB credentials. The mailing address should follow the one that is captured from Product Configuration/Gather Application Data.

Branch: The system will generate a request to other systems for the temporary credentials generation (i.e. integration point) at or delivered to a branch. The branch location is captured from Product Configuration/Gather Application Data.

Email: Users will receive an email that indicates the temporary credentials/instruction to request the customer call to set up the PB credentials.

SMS: Users will receive an SMS that indicates the temporary credentials/instruction to request the customer call to set up the PB credentials.

IVR: Users would be confirmed by the IVR system to after generating a Phone banking PIN. This is only applicable at a call center environment Debit/ATM Card. Initiate Fulfilment—Generate Debit/ATM Card Plastic. In some embodiments, users have already captured the need to generate a (or more for joint customers) new Debit/ATM card within Product Configuration. The system may provide an integration point to the entity's Debit/ATM card generation system. Debit/ATM cards may be generated with or without activation of the account.

Deliver Fulfilment Material—Debit/ATM Card Plastic. The system provides the user with the ability to select the following delivery channels:

Instant: Pre-embossed Debit/ATM card plastics are delivered to the customers. This is applicable in a branch environment only. It is therefore up to an entity as to whether this is supported or not.

Mail: Users will be able to receive the Debit/ATM card plastic delivered to the mailing address. The mailing address should follow that captured from Product Configuration/Gather Application Data.

Courier: Users will be able to receive the Debit/ATM card plastic delivered to the mailing address. The mailing address should follow that captured from Product Configuration/Gather Application Data.

Branch: The system will generate a request to other systems for the Plastic to be delivered to a branch. The branch location is captured from Product Configuration/Gather Application Data.

Initiate Fulfilment—Generate Debit/ATM Card PIN. In some embodiments, debit/ATM Card PIN generation is fulfilled within Product Configuration. Users have already captured the need to generate a new Debit/ATM Card PIN as a request type.

Deliver Fulfilment Material—Debit/ATM Card PIN. The system provides the user with the ability to select the following delivery channels:

Instant: Users will select the PIN instantly in a branch. They could also receive a PIN if it is auto-generated instantly.

Mail: Users will be able to receive a paper copy of the PIN delivered to the mailing address. The mailing address should follow that captured from Product Configuration/Gather Application Data.

Courier: Users will be able to receive a paper copy of the PIN delivered to the mailing address. The mailing address should follow that captured from Product Configuration/Gather Application Data.

Branch: The system will generate a request to other systems for the PIN generation (e.g., integration point) at or delivered to a branch. The branch location is captured from Product Configuration/Gather Application Data.

Email: Users will receive an email that indicates the PIN.

d SMS: Users will receive an SMS that indicates the PIN.

Definitions of a debit card and an ATM card may vary from site to site. Herein, a debit card is used for a checking product whereas ATM card is used for a saving product. For India, for example, an ATM card may allow the customer to perform any ATM functions (e.g., withdraw cash/deposit). A debit card may allow customers to perform all ATM functions, in addition to point of sales transaction.

The generation of a Debit/ATM Card Plastic Card may or may not require an account number, depending on local implementation. All pending processes may or may not be required to be completed for this fulfilment.

In some embodiments, for the issuing of debit and credit cards, where the customer has selected the same delivery method for both the card and the PIB, the card and the PIN are sent separately.

Credit Card. Initiate Fulfilment—Generate Credit Card Plastic. In some embodiments, users have already captured the need to generate a new credit card within Product Configuration. The system may provide an integration point to the entity's credit card generation system. Credit cards may be generated with or without activation. The credit card fulfilment supports the generation of multiple plastic cards in a single account opening process (e.g., if requested for items such as secondary cardholders or authorized users). It also supports the necessary account numbers required for that account type (e.g., commercial accounts can have multiple account numbers assigned and corresponding plastics to be generated and sent out).

Deliver Fulfilment Material—Credit Card Plastic. The system provides the user with the ability to select the following delivery channels:

Instant: Pre-embossed Credit card plastics are delivered to the customers. This is applicable in a branch environment only.

Mail: Users will be able to receive the credit card plastic delivered to the mailing address. The mailing address should follow the one that is captured from Product Configuration/Gather Application Data.

Courier: Users will be able to receive the credit card plastic delivered to the mailing address. The mailing address should follow the one that is captured from Product Configuration/Gather Application Data.

Branch: Users will collect the credit card plastic at a branch. The branch location is captured from Product Configuration/Gather Application Data.

Initiate Fulfilment—Generate Credit Card PIN. Credit Card PIN generation is fulfilled within Product Configuration. In some embodiments, users have already captured the need to generate a new Credit Card PIN as a request type.

Deliver Fulfilment Material—Credit Card PIN. The system provides the user with the ability to select the following delivery channels:

Instant: Users will select the PIN instantly in a branch.

Mail: Users will be able to receive a paper copy of the PIN delivered to the mailing address. The mailing address should follow the one that is captured from Product Configuration/Gather Application Data.

Courier: Users will be able to receive a paper copy of the PIN delivered to the mailing address. The mailing address should follow that captured from Product Configuration/Gather Application Data.

Branch: The system will generate a request to other systems for the PIN generation (e.g., integration point) at or delivered to a branch. The branch location is captured from Product Configuration/Gather Application Data.

Email: Users will receive an email that indicates the PIN.

SMS: Users will receive a SMS that indicates the PIN.

IVR: Users would be confirmed by the IVR system to after generating an credit card PIN. This is only applicable at a call center environment. In U.S., this can be requested through the Activation VRU.

Initiate Fulfilment—Balance Transfer. A confirmation letter/message for Balance Transfer may be required to indicate the number of days the balance will be transferred. Users may have already selected this option within Product Configuration.

Deliver Fulfilment Material—Balance Transfer. The system provides the user with the ability to select the following delivery channels:

Instant: Users will be able to read the confirmation message online on screen.

Mail: Users will be able to receive a paper copy of the confirmation letter delivered to the mailing address. The mailing address should follow the one that is captured from Product Configuration/Gather Application Data.

Courier: Users will be able to receive a paper copy of the confirmation letter delivered to the mailing address. The mailing address should follow the one that is captured from Product Configuration/Gather Application Data.

Fax: Users will be able to receive a fax copy of the confirmation letter to their fax number. The fax number should follow the one that is captured from Product Configuration/Gather Application Data.

Branch: Users will collect/be presented with the confirmation letter at a branch. The branch location is captured from Product Configuration/Gather Application Data.

Email: Users will receive an email that indicates the confirmation of the balance transfer.

SMS: Users will receive a SMS that indicates the confirmation of the balance transfer.

Merchant Private Label and co-brand Credit Cards may or may not be supported.

For certain countries such as the United States (U.S.), a credit card may be sent out without activation. In countries such as Europe, CHIP and PIN technology is used, therefore cards can be sent out active because they cannot be utilized until a separate PIN comes in the mail.

The generation of a Credit Card Plastic may or may not require an account number, depending on local implementation. All pending processes may or may not required to be completed for this fulfilment.

The card plastic supports embossing specifications as provided by the business, portfolio or as mandated by partnership or association agreements (e.g., fourth line embossing for Business Name).

The limit on the credit card has preferably been pre-defined.

In cases where processing is not real-time, the issuer will receive confirmation of approximately how long processing will take. The user will receive another communication once the processing has been completed.

For the issuance of debit and credit cards, where the customer has selected the same delivery method for both the card and the PIN, the card and the PIN are preferably sent separately.

Balance Transfer (Cash Express): In some embodiments, a check may be generated as part of the balance transfer. The check may be delivered in the same way as a check book.

> Check Book. Initiate Fulfilment—Generate Check Book. In some embodiments, users have already captured the need to request a new check book within Product Configuration. The system may provide an integration point to the entity's Check book and or Credit Book generation system.
>
> Deliver Fulfilment Material—Generate Check Book. The system provides the user with the ability to select the following delivery channels:
>
> Mail: Users will be able to receive the check book delivered to the mailing address. The mailing address should follow the one that is captured from Product Configuration/Gather Application Data.
>
> Courier: Users will be able to receive the check book delivered to the mailing address. The mailing address should follow the one that is captured from Product Configuration/Gather Application Data.
>
> Branch collection: Users will collect the check book at a branch. The branch location is captured from Product Configuration/Gather Application Data.

The generation of a check book may or may not require all pending processes to be completed, depending on local implementation.

> Terms and Conditions (T&C). Initiate Fulfilment—Terms and Conditions. Terms and Conditions/rates and tariffs fulfilment may be triggered by users who are ready to accept the agreement of the account/product being opened. The fulfilment materials preferably include all required documents related to T&C.
>
> Deliver Fulfilment Materials—Terms and Conditions. The system provides options for the users to select the delivery channel of a the T&C materials from the following:
>
> Instant: T&C information is required to be displayed on the screen/downloadable file. Users are required to read and agree with the T&C/Rates and Tariffs on the screen.
>
> Mail: Users will be able to receive the T&C/Rates and Tariffs delivered to the mailing address. The mailing address should follow the one that is captured in Gather Application Data.
>
> Courier: Users will be able to receive the T&C/Rates and Tariffs delivered to the mailing address. The mailing address should follow the one that is captured in Gather Application Data.
>
> Fax: Users will be able to receive a fax copy of the T&C/Rates and Tariffs to their fax number. The fax number should follow the one that is captured from Product Configuration/Gather Application Data.
>
> Branch: Users will collect/be presented with the T&C/Rates and Tariffs at a branch. Users may be required to read and agree with the T&C/Rates and Tariffs.
>
> Email: Users will be able to receive an email with the instruction to retrieve T&C/Rates and Tariffs information or an attachment of the T&C.

In some embodiments, the forms/templates are defined within the communication module.

T&C preferably includes Credit Protection, Identity Protection Plus and Credit Keeper information if selected from product configuration, Rewards or any other product requiring terms and conditions.

> Welcome Package. Initiate Fulfilment—Welcome Package. In some embodiments, the system may generate a welcome package based on the product type and/or customer type. The welcome package is configurable by the entity. The fulfilment materials may include all required documents related to Welcome Package. The items within the welcome package are configurable by the entity. Examples of the items within a welcome package include: Welcome letter (generated, for example, based on the product type, customer type and/or if OTP token is required) and Promotional/Welcome gift.

A gift may be initiated from a promotion or account opening (e.g., a bottle of wine). This is preferably captured during Product Configuration/Gather Application Data.

The system preferably supports both manual and automated processes to generate a promotional/welcome gift. For Manual generation, the system should indicate that the customer is qualified for a promotional/welcome gift. Staff will then fulfill this item manually. For Straight-through generation, where possible, the system should provide an integration point to the entity's gift generation system.

> Deliver Fulfilment Materials—Welcome package. The system provides options for the users to select the delivery channel of the welcome package from the following:
>
> Instant: Welcome Package is required to be displayed on the screen/downloadable file.
>
> Mail: Users will be able to receive the Welcome Package delivered to the mailing address. The mailing address should follow the one that is captured in Gather Application Data.
>
> Courier: Users will be able to receive the Welcome Package delivered to the mailing address. The mailing address should follow the one that is captured in Gather Application Data.
>
> Fax: Users will be able to receive a fax copy of the Welcome package to their fax number. The fax number should follow the one that is captured from Product Configuration/Gather Application Data.
>
> Branch: Users will collect/be presented with the Welcome Package at a branch.
>
> Email: Users will be able to receive an email with the instruction to retrieve Welcome Package information or an attachment of the Welcome Package.
>
> Deliver Fulfilment Materials—Promotional/Welcome gift. The system provides options for the users to select the delivery channel of a promotional/welcome gift from the following:

Instant: Where possible, the gift is required to be displayed on the screen (e.g., a coupon/discount).

Mail: Users will be able to receive the gift delivered to the mailing address. The mailing address should follow the one that is captured in Gather Application Data.

Courier: Users will be able to receive the gift delivered to the mailing address. The mailing address should follow the one that is captured in Gather Application Data.

Fax: Where possible, users will be able to receive a gift fax to their fax number (e.g., a coupon/discount). The fax number should follow that captured from Product Configuration/Gather Application Data.

Branch: Users will collect/be presented with the gift at a branch.

Email: Users will be able to receive an email with the instruction to receive the gift or an attachment.

SMS: Users will receive a SMS that indicates the instruction to receive the gift.

The nature of the gift may vary depending on the promotion and product. This is configured by the entity.

For certain countries such as Brazil, for PFS and SME (small/medium enterprise) new checking accounts may be sent a Welcome Kit and for SME (only) a welcome gift may also be sent. The Welcome Kit (Letter) may be generated by the checking account system.

The forms/templates are preferably defined within the communication module. In some embodiments, for example for printed materials, forms/templates may be defined within the local entity.

For certain countries such as the U.S., the Welcome letter may include Credit Protection, Identity Protection Plus, and/or Credit Keeper information if selected from product configuration.

A branch/third party vendor may receive an advice to issue a welcome package, for example after a particular 'trigger' by the customer/staff member (in some embodiments, this only applies to postal options). Entities are able to define at which stage the welcome pack is sent (e.g., after all milestones are completed or just certain ones) and this is configurable at channel level.

Decision Notification. Initiate Fulfilment—Decision Notification. In some embodiments, the system may generate a notification based on the final decision on the application. The notification could be in a form of a letter or a message on the screen. It should indicate the number of days required for processing or the declined reason if the application is declined.

Deliver Fulfilment Material—Decision Status Notification. The system provides options for the users to select the delivery channel for notification of the application decision status from the following:

Instant: The final decision of the application is required to be displayed on the screen/downloadable file.

Mail: Users will be able to receive the notification letter delivered to the mailing address. The mailing address should follow the one that is captured in Gather Application Data.

Courier: Users will be able to receive the notification letter delivered to the mailing address. The mailing address should follow the one that is captured in Gather Application Data.

Fax: Users will be able to receive a fax copy of the notification letter to their fax number. The fax number should follow the one that is captured from Product Configuration/Gather Application Data.

Branch: Users will collect/be presented with the notification letter at a branch.

Email: Users will be able to receive an email with the instruction to retrieve application status, an attachment, or the application decision.

SMS: Users will receive a SMS that indicates the application status.

For the decision notification, an entity may decide to add telephone as a delivery channel (e.g., where an application has been referred and the customer would like receive a telephone call instead of waiting for another method of delivery).

Where a customer has selected the branch as the delivery for channel for a decision notification, the selected branch may receive the letter (or other notification) from another area, along with some form of notification that the customer will be collecting the letter/item.

The forms/templates may be defined within the communication module, or within the local entities' systems.

Dispensing Notice. Initiate Fulfilment—Generate Dispensing Notice. In some embodiments, users have already captured the need to request a dispensing notice within Product Configuration.

Deliver Fulfilment Material—Dispensing Notice. The system provides options for the users to select the delivery channel of the dispensing notice from the following:

Instant: Dispensing notice is required to be displayed on the screen/downloadable file. The users are required to read and agree with the dispensing notice on the screen.

Mail: Users will be able to receive the dispensing notice delivered to the mailing address. The users are required to read and sign the notice and return to the bank. The mailing address should follow the one that is captured in Gather Application Data.

Courier: Users will be able to receive the dispensing notice delivered to the mailing address. The users are required to read and sign the notice and return to the bank. The mailing address should follow the one that is captured in Gather Application Data.

Fax: Users will be able to receive a fax copy of the dispensing notice to their fax number. The users are required to read and sign the notice and return to the bank. The fax number should follow the one that is captured from Product Configuration/Gather Application Data.

Branch: Users will collect/be presented with the dispensing notice at a branch. The users are required to read and sign the notice and return to the bank.

Email: Users will be able to receive an email with the instruction to retrieve dispensing notice or an attachment.

In some embodiments, dispensing notice is only applicable for joint accounts. Dispensing Notice forms/templates are preferably defined within the communication module.

Stationery Items. In some embodiments, the system may also support fulfilment of requests for stationery items (e.g., from within Product Configuration). Examples of stationary items include, but are not limited to, check book covers, card wallets, and pre-paid envelopes. These items are all configured by the sites, and may have a delivery method of Mail, Courier, or Branch.

Fulfilment Status Tracking. The system provides application status functionality. The system can also retrieve the progress and status of a fulfilment item from other systems which may be responsible for producing and delivering the items.

The system may indicate the progress and status to the users as far as the system can ascertain (e.g., check book will be delivered in 5 business days). In some embodiments, the system may tie this back to the communication module for periodic status updates via email if the email address is available for the customer.

End-to-End Specifications

Content Maintenance

In addition to the component flexibility described above, there are other areas where the Business can preferably control the account opening process. One such area is the content that appears on screen during the user journey, depending on product selected and customer segment. The content may include the account opening application form itself and the static system content. These are split into two areas, page level controls and process level controls.

Page level controls may include, for example, but are not limited to:
- Ability to show and hide fields within the application form, including dependency rules with other fields (e.g. Show this field If that field is completed or If that field="Yes", etc.).
- Ability to set field default values
- Ability to make fields mandatory or optional, preferably with the ability to change this status conditionally based on entry into other fields
- Ability to make fields editable or read only
- Ability to set field validation rules (from defined rules, e.g. only accept numeric characters, date fields, decimal format, etc.)
- Ability to create cross field/form validation, preferably through Business controlled rules
- Ability to pre-fill data into the application where it is already held in our systems. This data may or may not be displayed to the customer during the application process, depending on local entity requirements. For example, for existing customers, there may be a "One Click Buy" option where they take one action that can immediately open an account without any data being displayed to them, but where that data has been retrieved and pre-filled into the underlying application behind the scenes, whereas another entity might wish to display all the data to the customer
- Ability to make field label changes
- Ability to change the order of data fields (or data groups/portlets)
- Ability to support multiple currencies
- Ability to use pre-defined validation formats (including data formats)
- Ability to support tags, scripts and reporting for web analytics
- Ability to determine the look and feel of the application (including importing graphics, static text, HTML, support for cascading style sheets CSS, background color, tables, fonts, styles, etc.)
- Ability to select which validation rules apply to a field. Validation rules may include, for example:
  - Number format, max/min length validation for numeric fields
  - Text format (alphabets, alpha-numeric, etc.), min/max length validation for text fields
  - Date type and format validations for date fields
  - Predefined format validations (email, phone number, etc)
  - More than one validation may be added to a field.
- Ability to define whether or not additional fields display, where a customer has selected a particular option from a dropdown, this field could contain predefined dropdowns, or not display a particular fields
- Ability to be able to create (without IT intervention) multiple steps within a milestone
- Ability to design the layout, look and feel, content, and selectable options. The entity also has the ability to preview the design before submitting it to the live environment
- Ability to import an existing webpage/form/HTML prototype into the application form designer
- Ability to export forms and files from the application form designer into a compressed format for archival
- The ability to display a step tracker at a chosen location on an application form. The steps presented can accurately represent the milestones and, upon entity configuration of multiple steps within milestones (without IT intervention), the steps within the milestones. A milestone may comprise of multiple steps, some of which are separated by intervening milestones. For example, Personal Details (name, address) followed by Product Selection followed by additional details (e.g. Employment details) as three separate steps. If a step is skipped, it is to be considered complete (if allowed as part of that product e.g. funding).
- Error messages—Flexible tool designer should allow the entity to define/edit custom error messages for individual data/form fields without any IT support. Flexibility tool designer should also allow business users to configure the display of validation messages as desired.
- The business user should be able to add new data fields (e.g., date, numeric, selection data type, text), based on the input fields required to be present on the form. Apart from the type, the business user should be able to define the properties such as default value, max/min length, and format for the new data fields.
- Expression builder utility for business users to create a validation using multiple fields (cross field validation) and to define a validation rule (create conditional statements) for more than one data fields (multiple data fields)
- Ability to embed media files into application forms
- Ability to link to a document held on the entity's systems
- Ability to allow a customer to add additional field(s) as and when necessary. For example, the customer only has to enter one phone number as mandatory but can add others if applicable.
- An entity can create an external link Upon selection of that link a configurable (without IT intervention) warning message can appear. The options to continue and cancel are offered and the names are configurable by the entity (without IT intervention). The warning may be displayed on the page (after selection of the link), as an interstitial page, or as a pop-up—this is configurable by the entity (without IT intervention).
- Validation of input—The following field validation may occur when the field has lost focus ("In-line validation"): character validity checking, field length and cross-field validation with prior fields that are related. This should not happen pre-emptively (on as-yet-uncompleted fields). Errors found should be presented on the page immediately next to the field, without refreshing the page. On submission of the application or when moving from one page to the next the following validation should take place ("page validation"): check for mandatory fields, complete cross field validation, and applicable host validation. Errors should be presented next to the appropriate field(s) and also in a list form at the top of the page Ability to display a help tip on selection or mouseover (entity configurable without IT intervention)

Ability to customize the ID&V screens per journey

Ability to be able to create calculator functions in the form

Ability to configure an email sending facility through an application form. The application should be able connect to the COMMS module. Business should be able to configure a form control (button/link, next/submit/save action) that can trigger an email to the specified email ID Externalization of business maintainable content/content management/NLS. In addition the business should be able to maintain the externalized contents Configure options—The entity must be able to define (business without IT intervention) the "configure options" that are presented to an applicant at the product (e.g., add line of credit to account) and customer (e.g., contact preferences) levels. The selection of "Register for Internet Banking" within the Account Opening process must support yes and no for both channels. The champion journey will present the "yes" option only for the Internet channel. The staff channel will present "yes" and "no"

Ability to support Postal Code (or similar, such as ZIP code) validation via a third party service. When possible the automatic completion of addresses should be supported Ability to present Account Opening in multiple "look and feels" to support multiple propositions (i.e. Premier, Direct, PFS, CMB, and others). The Staff and Internet channels may require different look and feels per proposition within same entity The 'Vanity URL' displayed in the wireframes for PIB access must be entity configurable. This is a line of entity definable text that displays a non-clickable URL. The information is intended for a call center agent to read out to the customer Spelling can be localized by entities (e.g., Centre versus Center)

The page level error messages should include all block and field level errors. In addition, where a field has been entered incorrectly as well as the indication that there is a problem i.e. X or red highlight, the appropriate error message should be displayed as well (e.g., when the customer exits the field they should not have to click an action button to see the message).

Dynamic Content—The ability to create dynamic content, based on attributes of the function, product types, customer data and channel etc.

Presentation Layer—The ability to update or champion/challenge the presentation layer, based on user testing recommendations, metrics, or feedback.

Pagination and Sorting—The ability to paginate results or data to minimize the amount of data that is consumed by the end user. Includes the control to select how many results the end user wants in view per page and the ability to sort a column of data within a table.

Page Print—The ability for an end user to print any page presented to them, in any channel.

Parameter Management—The ability to pass parameter values (e.g. Tracker code, voucher code, product ID) within a link and see it being passed through from the beginning to the end.

Multi language support/language toggle—The ability to change the language on a page by switching to another language in a drop-down menu or 'toggling' back and forth from one language to another.

State Management—Ability to hold various parameters needed to define a journey (e.g. channel, country, product, etc.) within a 'Global State' to be held and passed into and through the journey User Preferences—Ability for screens to keep front-end display user preferences such as remembering last view, pagination configuration, and sort order of columns.

Cookie Database—Screens utilize a Cookie Database for storage and retrieval of information for authenticated and non-authenticated users that visit the websites, across domains and across Group sites to support personalization of content based on rule sets and customer preferences Define Fields—Add, remove, move fields or update field label text. The ability to move fields across blocks, from one data block to another. The ability to manage all field labels for both language and regional differences.

Hide/Show Field—The ability to hide/show fields that have already been part of pre-defined data block, portlet. The ability to enable conditional show-hide of fields on a screen such that a particular field is hidden in the form, and if the condition is met or value entered by the user, hidden field is displayed. The ability to define the logic/condition to enable/disable conditional Presentation Layer—The ability to update or champion/challenge the presentation layer, based on user testing recommendations, metrics, or feedback.

Pre-fill Field—The ability to automatically populate/copy the contents from one data field to another, based on a particular condition. The ability to show or hide the field when it is pre-filled. The ability to define certain pre-filled fields as 'read-only' so it is not editable by the end user. The ability to mask certain pre-filled fields to hide part of the data. The ability to pre-fill data fields based on information that we already hold on the customer in the host system or another data store.

Field Syntax Validation Rules—Provide ready to use validation that can be enabled or disabled. Ability to define validation rules or bypass validation rules.

Real Time Field Validation Setting—The ability to turn on/off the FE syntax validation as the user enters information (checkmarks) and to rely solely on the server side validation.

Cross Field Validation Setting—Ability to compare the values entered into two or more fields in a flow to see if their contents can be considered valid in combination.

Multi-Level List Selector Field—The ability to define multi-level list for a field. Depending on the selection on the first list, the values in the other dependent lists would be dynamically populated.

Read/Write Data—The front-end will also have the ability to retrieve data (read) from a back-end data store or host system and will also have the ability to write data away to a back-end data store or host system upon a page submit.

BDE (Business Development Environment)—BDE is the primary content management user tool. It provides templates that allow users to make updates to pages, screens, content and communications without the need of IT programming resources but with proper user controls.

Communications Content Management—Within the BDE there is a dedicated work area where practitioners can build, assemble and develop ICCM communications using document fragments, pre-designed templates and custom data capture forms. Users can build ICCM content across delivery channels, in multiple languages and also reuse fragments, images, headers and footers.

Content Deployment—Provides the ability to deploy changes directly to pre-production or production environments. This improves the time to market for a variety of content changes and reduces the IT support staff required to manage frequent business changes.

Channel Page and Assembly—The ability to define the information architecture and individual pages to make up an entire channel, site or microsite.

Page Template Development—Ability to develop page template used to format content and to ensure consistent presentation Page Navigation Development—Ability to develop page navigation which typically comprises of top level tabs, left hand navigation, in page tabs and links within a function or page or right hand supporting content.

Content Spots—Ability to manage content spots within or outside of a function via properties files or JSP that are business deployable.

Portlet Preferences—Configuration points per function that can be managed and located within the individual portlets, which are managed by content managers via the BDE.

Preview Capability—The ability to preview changes within the BDE or local environment without a dependency on an SDE (or SAT/UAT) content deployment.

Exemplary Process level controls may include, for example, but are not limited to:

Ability to move pages around in the flow or processes within pages around the page (including ability to do this conditionally depending on what has previously occurred in the process)

Ability to conditionally control the product related data required, depending on the product selected or customer segment (e.g. Premier vs. PFS customers)

Ability to define the next page displayed after submission, saving or cancellation Ability to connect to a communication system Ability to create links to open documents in different formats for printing (e.g. PDF, Word, HTML, etc.)

Ability to display a warning if a user attempts to abandon an application

Ability to integrate other UI components (e.g. multi-level lists, product calculators, Captcha, etc.) to any milestone or step within a milestone.

Ability to preview any changes before they are deployed and be able to test and live prove them before they are deployed Ability to save journeys that have been created Ability to integrate with existing websites Ability to quickly revert to a previously deployed journey when required (if, for example, a newly deployed journey is not working as well as a previously deployed one)

Ability to construct multiple account opening customer journeys for a single product and to be able to run these concurrently in production, with the ability to direct differing volumes of incoming traffic amongst the journeys. This allows for "test and learn" tactics to be employed to quickly compare how the journeys are performing against each other Ability to print the blank application form for customer to complete, which can dynamically change as the customer journey is amended (e.g., for CMB)

Fields that are configured to be hidden in the Internet version of a form or not added to the Internet version of a form may be configured to be visible on the Staff channel The Tools menu is to be accessible by staff on all account opening pages. The entity can configure the tools within the menus.

Generally, the front end framework capabilities provide the ability to tailor prospect, customer and staff screens with the content and functionality required for step-by-step journey process flows. Particularly preferred journey management capabilities are those to: Add content to a page; Move Step Order in a Flow/Journey (the ability to change the order of portal pages within a journey or the order of portal steps within a journey); Move Field within/across step (the ability to move a single or block of fields within a step or to a different step); Branch Points in a Journey (the ability for the business to design dynamic page flow on the basis of decisions made by the user, either by setting up a different set of pages or by a single page with dynamic content that would render the appropriate content depending on a rule); Add a link within a portlet (the ability to add a link within a portlet to define the page navigation flow); Add a new unit-of-work as a sub flow, without impact on the business logic of existing unit-of-work (the ability to configure the screen flow to skip or add one or more screens and reach any screen directly using one of the following controls: Hyperlink, Button, Radio button, Check box, or Image Button); and Champion Flow/Journey Configuration (the ability to navigate from portlet to portlet within a single step, build journey by merging journey, merging available/existing journeys into a new journey, or integrate new journey into existing journey).

The Business is able to make any of these changes at any time (24/7, 365 days a year) and deploy them within a Business maintainable, specified time period of the changes being made. This applies to customer and staff channels equally.

In some embodiments, a check may be performed in the account opening system that checks the data collected against that required by the host system. If all data is present and correct and the application process is complete and approved, then the account opening system will send the data to the host system to open the account. If there is any discrepancy in the data between that held in the account opening system and that required in the host system, the data will not be sent to the host system and the application will be dropped into the queue for manual follow-up and correction. This will prevent complex system rules from having to be built directly into the account opening system. However, if this situation has occurred, an alert should be immediately sent to the Business user/team responsible for the configuration, so that the error in the front end configuration can be immediately corrected to prevent every single application that follows from dropping into the queue for manual follow up.

An example scenario may be in considering product options available in a host system for a selected product, for instance a check account. The underlying host system will control what product options are applicable to the check account. For example, the following product options may be available in the host system: Overdraft protection; Check Book; ATM/Debit Card. When the Business configures the application form screens for product option selection for the Checking account product, they must ensure the options displayed to the user match the above options, as this is what the host system will be expecting in the data it is sent for an account to be opened successfully. If a mistake is made and, for example, the Check Book option was omitted in error from the front end screen, then it would not match the product options the host system was expecting, and would drop out into a queue for business follow up rather than go to the host system, where an account creation might otherwise fail. If this happened, an alert may notify the Business that something is wrong with the user experience that has been created that needs attention.

During the account opening process, the acknowledgement page shows the assigned account number for approved and completed applications (for all channels). EAN (external account number) and IBAN (interne banking AN) support and/or the BIC (Bank Identifier Code) may be required. In some embodiments, it is also possible for an entity not to display an account number to the customer at the product level (e.g., a site may not want to show a credit card number at this stage).

For opening new term deposit accounts, the term duration, indicative term interest rate and indicative term maturity preferably date together with the term currency and amount may be displayed to the customer (wherein the flow is entity configurable). The actual term interest rate and term start and maturity date may be booked at the time when the account is actually opened.

System content refers to static text and/or graphics (e.g. marketing banners).

In a similar way, the Business has the ability to create, maintain and delete static text that is or can be displayed by the system, as well as the ability to create, maintain or delete any graphics that are or can be displayed. The Business should be able to make any of these changes at any time (24/7/365) and be able to deploy them within a Business maintainable, specified time period of the changes being made. Again, this preferably applies to customer and staff channels equally.

Preferably, the staff that are able to use these editing functions are strictly controlled by entitlements (this applies to both the application form and system content functions). In some embodiments, the system may support a Business model whereby a central, regional or global team may control the content being created and deployed around the group, so that cost can be centralized and best practice can be shared across the group. Therefore, the staff involved would preferably have entitlements that allowed them to create and maintain customer journeys for other entities around the region or group, as well as being able to preview and deploy the changes quickly to those entities.

Save and Retrieve Applications

This section describes specifications related to enabling an application for a new product to be saved at any point during the application process and retrieved at a later time for completion. It may be possible to save and retrieve the same application more than once.

This functionality is preferably delivered seamlessly cross-channel. For example: A customer begins an application for a checking account on-line but realizes they need assistance from a member of the staff. The customer will be able to save the application and either walk into a branch or phone a call center, where a staff member will be able to retrieve the application and continue the account opening process.

A 'journey ID' may be created when the application is created and when the application is retrieved this journey ID can be referenced to allow the user to continue with the journey originally started. New un-started journeys could change based on results of test and learn scenarios.

Save Application. This process is available across all channels, although this option may or may not be available on all screens. For instance if there is a screen that asks out of wallet questions to a customer, it may not be appropriate to save the application at this point due to fraud considerations. Where enabled, the system clearly displays an option, allowing a user (customer or staff member) to save the application at the point which they have reached. There may be different scenarios for new and existing customers when saving.

Each application may be assigned a unique application reference number (e.g., where multiple products are applied for, the reference number may be assigned to the application, not to each product within the application), which can be used when retrieving the application at a later date, amongst other retrieval methods. If the customer applies for two of the same product, each application may be given a unique reference number. The format of the reference number given when an applicant saves an application should be in a consistent format as the reference number given to Joint applicants.

Previous pages the user has already completed have preferably been validated as they move between pages. For example, for a 5 page application wherein the user saves on page 3: Pages 1 and 2 have already been validated as the user moved to page 3. Pages 3 to 5 will be validated when a user retrieves and continues the application.

There is preferably a minimum set of data defined to support credential creation.

In some embodiments, the save functionality may be turned on/off at channel level. If the save button is 'hidden', the system will always save the data regardless of channel.

Figure 31:
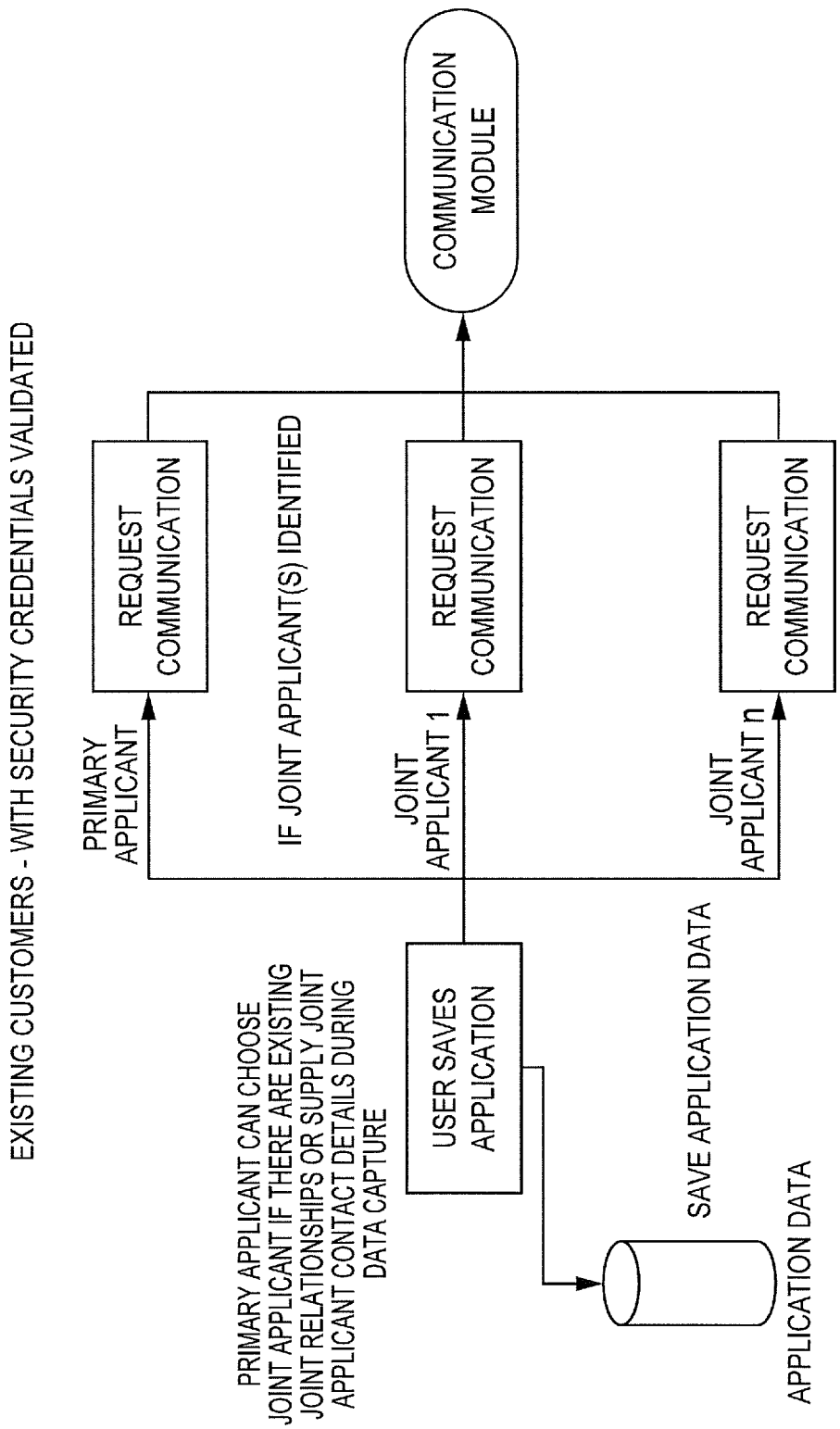
FIGS. 31-33 are flow diagrams illustrating exemplary scenarios for Save Application functionality for existing customers with/without security credentials validated, and new customers, respectively.

Scenario 1—Existing Customers (PFS/CMB) applying with security credentials confirmed. FIG. 31 shows a schematic of this scenario.

When an application for an existing customer with their security credentials confirmed is saved by a user (customer or staff), the information that has been entered to this point will be captured and saved. The system will check the customer's profile or the application to see if there is an e-mail address present. If there isn't, the user will be given the option of entering the customer's e-mail address.

If an e-mail address is present at the time of saving, the product details and the unique application reference number for the application will be sent through the COMMS module to the customer, as a reminder that they have an incomplete application outstanding, with details of how to retrieve and continue with their application. The time period after which a chaser communication is sent is configurable at entity and product level. In addition, an entity can define if any 'grace' period for completing an application should be from the date of the original initiation of the application, or the date of the last update.

Alternatively, if no e-mail address is available, the details of the application and retrieval methods will be sent to the customer, using their preferred communication method.

Communications may be compiled and issued to customers through the Communications Module.

In the case of a joint application, the subsequent applicant(s) application details will also be linked to their customer record(s) and a communication will be issued to them in a similar way to that described above for the first applicant. However, the first applicant will not receive a copy of any communication issued to the joint applicant(s).

The system will display the unique application reference number to the user(s) as confirmation. The reference number will be the same for all joint parties, as the application is the same application.

A lead will be generated in the sales system in order that uncompleted applications can be followed up at a later time, if they remain unfinished. Any update/completion of the application (either by the customer or CSR), will automatically update the lead (in some embodiments, there is only one lead per product per application per customer). The Sales Solutions team can pre-define the attributes that will be populated as part of the lead, and will be in line with existing lead systems.

Where an existing customer is logging on, if that customer has previously opted for a 'physical' keyboard (e.g., a CSR has updated the preference on behalf of the customer), this preference should be recognized and the physical keyboard should be displayed to the customer.

Figure 32:
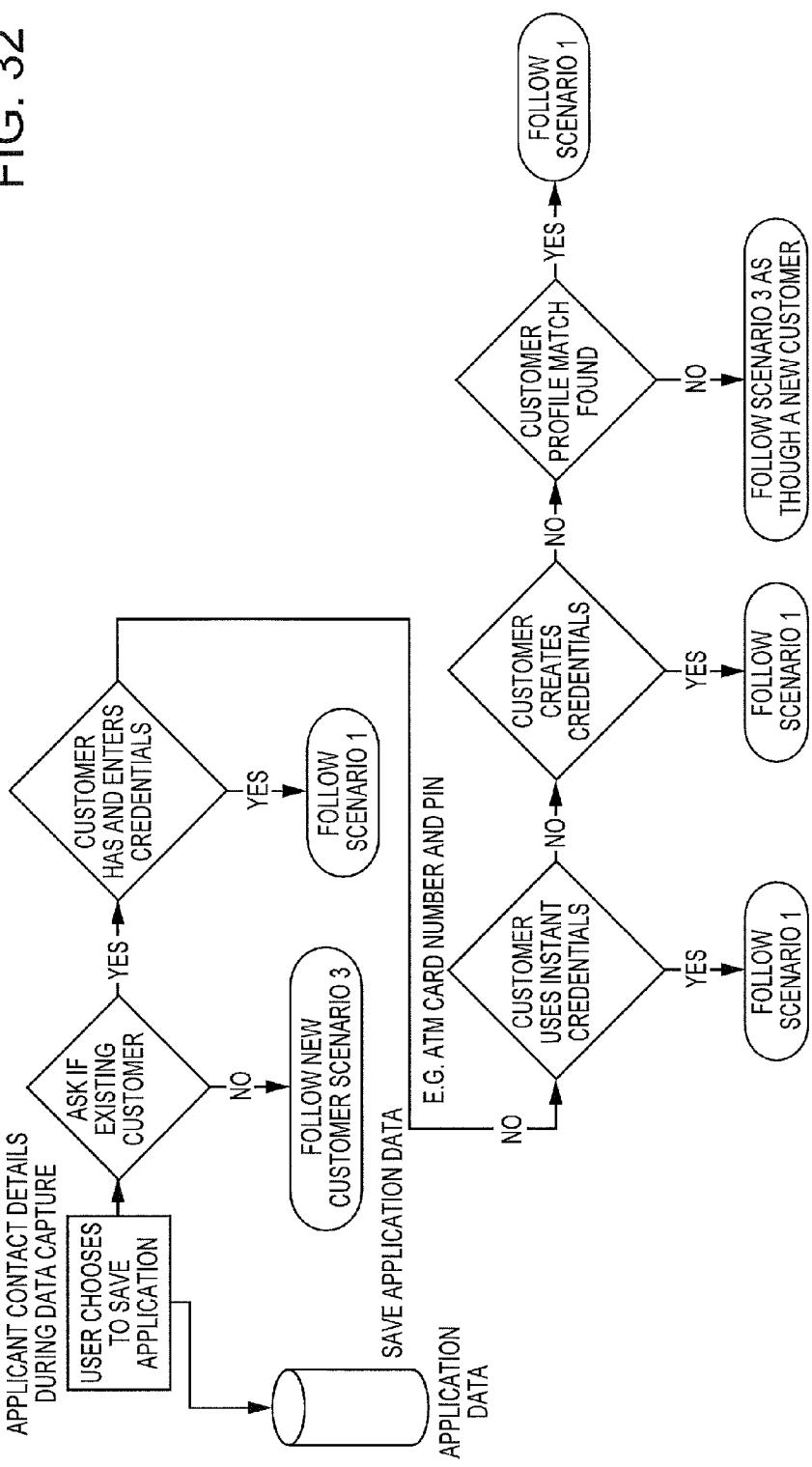

Scenario 2—Existing Customers (PFS/CMB) applying without security credentials. This scenario is depicted in FIG. 32.

If a customer wants to save an application and they haven't confirmed their security credentials, they will be asked if they are an existing customer and given the opportunity to provide and validate their security credentials, if they have any, at the time of saving.

The scenario is if the customer wants to apply and does not have a log-in, the Business would like to provide the ability to generate instant credentials with, for example, the customer's ATM card number and PIN, which would bring in the customer profile.

If they are an existing customer and take this option, the save of the application will take place similarly to scenario 1.

If the customer is an existing customer and they do not already have security credentials set up or are unable to provide an ATM card number or PIN (or other information), when the application data is saved, the customer will be presented with the option of creating security credentials to link to their profile at that time, similar to a new to bank customer but this would have to be supported by a robust profile merge process, so that the existing customer did not end up with two customer profiles. If the customer chooses to do this, the save of the application will take place similarly to scenario 1.

If the existing customer declines all these options along the journey and still saves the application, the system will be required to check to see if the customer is an existing customer by matching the data entered against the customer profile records held. Entities can define which data should be checked again the customer profile records held.

If a unique match is found assuming the applicant has proven he is who he claims to be (and not before), similar to scenario 1, if an e-mail address is present on the customer profile, the product details and the unique application reference number (application reference number ID) for the application will be sent by e-mail to the customer, as a reminder that they have an incomplete application outstanding, with details of how to retrieve and continue with their application.

Alternatively, similar to scenario 1, if no e-mail address is available, the details of the application and retrieval methods will be sent to the customer, using their preferred communication method. The process will continue the same as scenario 1 from this point.

In addition, if a match is found, the application should be linked to the customer profile to prevent a duplicate customer profile from being created.

Figure 33:
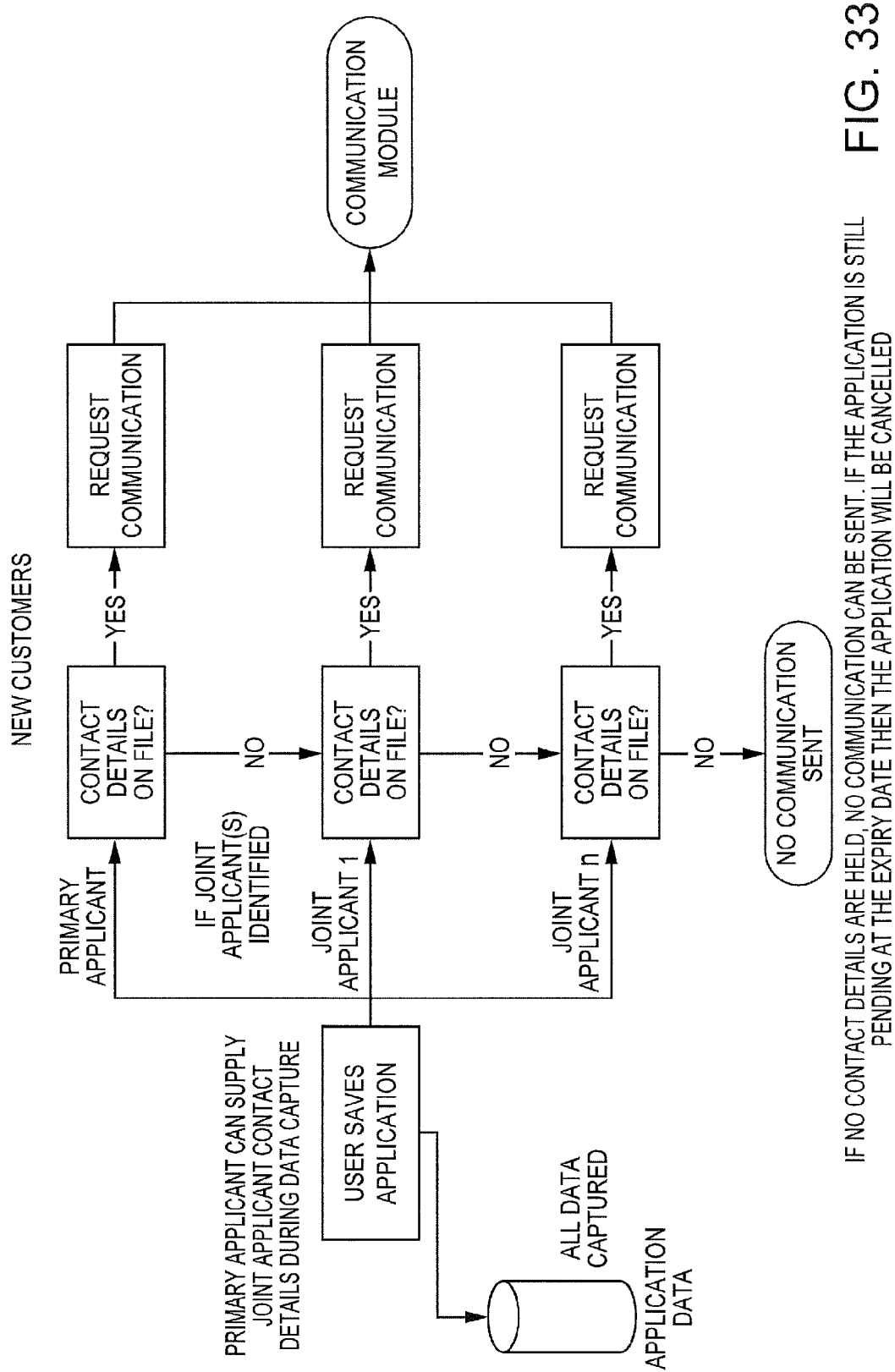

Scenario 3—New Customers. This scenario is depicted in FIG. 33.

When an application for a new customer is saved by a user (customer or staff), the information that has been entered to this point will be captured and saved. In this scenario, if the customer initiates a new application, providing a customer profile was created for the customer from the first application, there should be a data pre-fill of known details. Even if a profile is not created, this is all kept in the application database for re-use. The customer profile and record may vary by entity.

If the customer has not provided an e-mail address up to this point of the data capture, the user will be given the opportunity to capture the customer's e-mail address.

If an e-mail address is provided, a request will be sent to the Communications Module for an e-mail to be sent to the customer as a reminder that they have an incomplete application outstanding, with details of how to retrieve and continue with their application.

Alternatively, if the new customer has supplied contact information other than an e-mail address as part of the data capture, a request will be issued to the Communications Module to send a reminder with details of how to retrieve and continue with their application.

If this is a joint application from two or more new customers, the process will be repeated for each new customer that has been identified by the primary applicant.

The system will display the unique application reference number to the user(s) as confirmation. The reference number will be the same for all joint parties, as the application is the same application.

A lead will be generated in the sales system in order that uncompleted applications can be followed up at a later time, if they remain unfinished.

A 'potential' customer record should be created either when a customer saves an application (as they can only save if a minimum amount of data has been entered) or when an application is completed.

Where the primary party is setting up a joint account, the information to be provided about the second party is entity definable and should be in line with existing local back office systems regarding minimum information required to create a 'potential' customer record (e.g., name, DOB, email address and ID).

Figure 34:
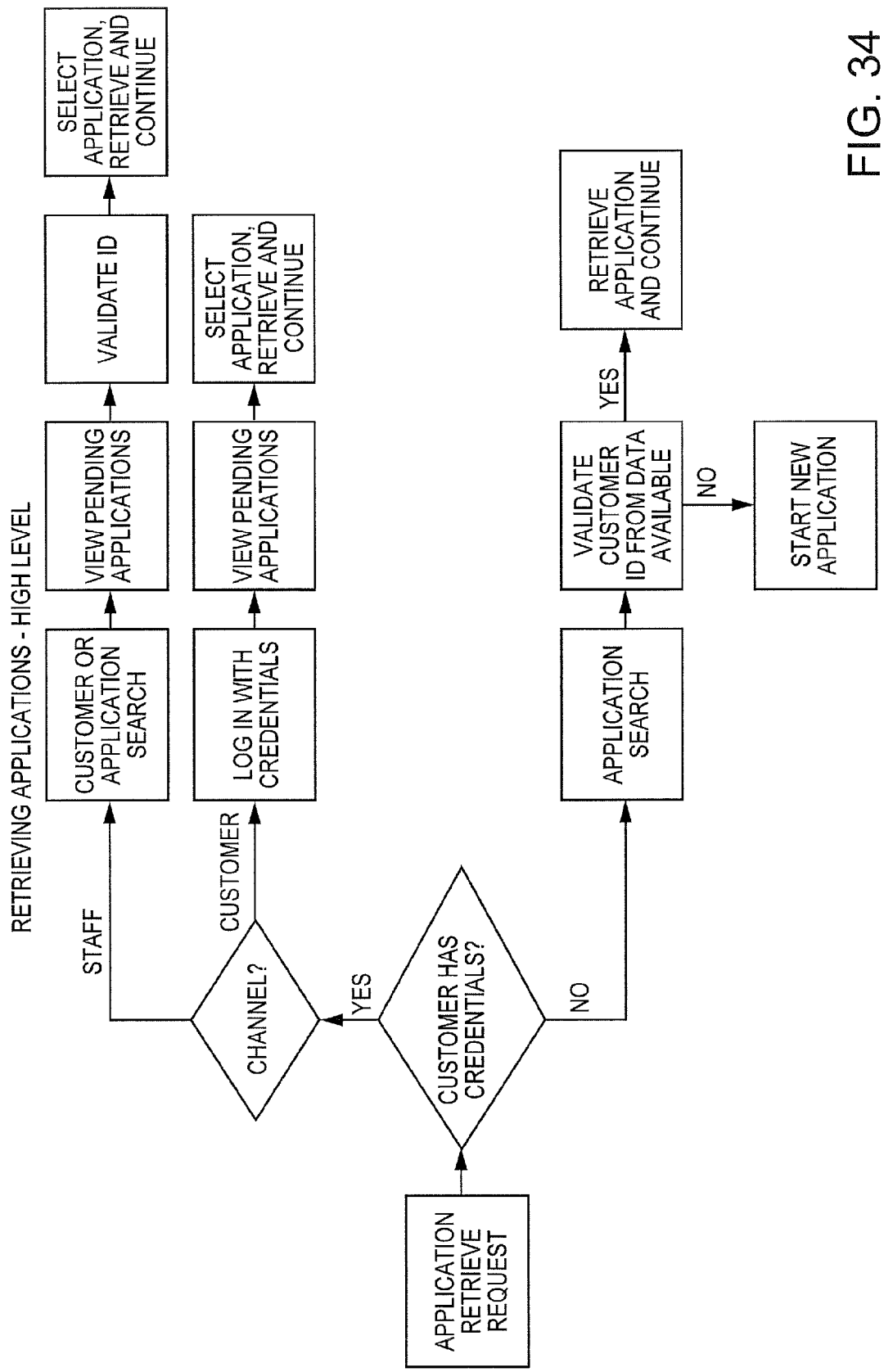
FIG. 34 is an exemplary diagram illustrating the Retrieve Application process.

Retrieve Application. FIG. 34 is an exemplary diagram illustrating the Retrieve Application process. In some embodiments, for Save and Retrieve, the customer and staff channel customer journeys are configured identically, so that the retrieved application is consistently presented to whichever user is actioning it and the data remaining for capture is set.

Each orchestrated process preferably has a unique process ID, which is linked to the application so that when the application is retrieved, the system can pick up the same process it was originally following. This prevents issues that could occur, for example if a customer journey for a particular product is changed between the time the application was saved and the time it is retrieved.

For example, a customer saves an application having completed only the Gather Application Data and Funding Milestones, which have been put in the journey as the first two data capture items. The customer journey is then changed to put these milestones' data capture at the end and, for example, Terms and Conditions and Configure Product are moved before them. This would potentially cause problems on retrieval if the system moved to the new process as some of the data capture that has already been completed would come later in the flow. Hence any application that is saved will preferably retain its original process and see it to conclusion.

This provision should also assist call center staff that may be servicing more than one entity with the possibility that different entities have different customer journeys. By matching the process ID to the application, the system can present the correct flow to the staff on an application by application basis.

After the application is complete, when a customer returns to PIB there is preferably a link to any documentation needed (e.g., signature card, T&C, etc.), or various communications, or a return to the online summary screen for X days (entity definable).

Preferably applications can be retrieved through any channel, regardless of which channel the application was started and saved on, to provide a seamless service to the customer. How the application is retrieved may depend on the type of customer, the channel they are using to retrieve and continue the application, and whether they have security credentials.

In some embodiments, if an application record is locked by a user (e.g., the application is currently open and being used by a customer or staff member), then another user will be prevented from accessing the same application record at the same time. Only when the first user has released the record will another user be able to access it.

Identity Authentication. This section relates to what a user is able to see when they retrieve a previously saved application. Where a customer can prove their identity by use of security credentials in a customer channel (self service) or by passing identity checks in a staff channel, they may to retrieve an application and review and amend previously entered data if required (e.g., following the same validation rules as apply to editable data fields and not read only fields).

There may be certain exceptions. For example, the customer experience may be set up so that the customer does not actually see any of the data of the application (e.g., the "One Click Buy" scenario), so in this case the opportunity to review or amend data will not be presented.

Another exemplary exception may be "new to bank" customers who have already initiated the Validate Identity milestone before the application was saved. In some embodiments, to prevent potential reverse engineering scenarios and fraud, where an application is retrieved for a new customer and the Validate Identity milestone has started (even if not complete), the customer will not be able to view or change previously entered data and may only continue with the rest of the application from the point of save.

If the customer is an existing customer and has not established online security credentials, they may be given the option of creating internet banking credentials and are then able to access the saved application. Alternatively, they may use a staff channel to retrieve the application and pass through the identity checks relevant to that channel. If the existing customer cannot pass identity checks through a staff channel, then procedures outside the AO process flow may be utilized.

The following sections describe exemplary application retrieval scenarios:

Scenario 1—Existing Customers—Internet Channel with or without security credentials. Existing customers who log onto internet banking with their security credentials can view outstanding applications through their internet session.

Existing customers without internet banking credentials are preferably able to 'immediately register' with predetermined identification (e.g., ATM card number and PIN). They may then continue the same process detailed for existing customers who already have credentials set up.

Otherwise, existing customers without security credentials will need to go through the full application like a new customer would (scenario 3 or 4), but with a robust profile merge process in place, so that the customer doesn't end up with duplicate profiles. Preferably, the system ensures that a duplicate profile is not created for an existing customer. For example, even when a customer may not have identified themselves as an existing customer (for whatever reason), if they actually are an existing customer, the system ensures use of their existing profile and does not create a duplicate one.

In some embodiments, where an existing customer has credentials and has been validated using them (e.g., logged onto internet banking), the application may be shown alongside existing accounts that are open, with the status shown next to it.

For example, when a customer is logged onto internet banking they might usually see their existing accounts along with the current balance of those accounts as follows:

| Account | Balance |
|---|---|
| Checking Account | $956.89 CR |
| Savings Account | $12,147.34 CR |

In some embodiments, the system may provide a new section under the existing accounts, called Applications in Progress (or other business maintainable text), with details of the product applied for and the status of the application, for example as follows:

| Existing Accounts | |
|---|---|
| Account | Balance |
| Checking Account | $956.89 CR |
| Savings Account | $12,147.34 CR |
| Applications in Progress | |
| Account | Status |
| Credit Card | Application Saved |

If there is still a customer action outstanding on the application (e.g., some data to be captured, terms and conditions not yet accepted, etc.), then there may be an option available for each pending application that will take the customer directly back into the application at the appropriate point, if selected.

If the application is pending but not awaiting a customer action, the customer may see the status (e.g., application in progress, etc.) but there will be no option to take them back into the application.

Once an application is retrieved, the process may continue the same as if it had not been saved in the first place and the customer will be returned to the same point in the application as where it was saved.

However, as the customer identity has been validated in this scenario, the customer is preferably able to review and amend previously entered data (before the save) as well as complete the rest of the data required to complete the application.

In some embodiments, if it is a joint account and all are existing customers with internet banking credentials, any of the joint applicants can retrieve their own application details (and only their own) by this method. Logging into internet banking is enough to satisfy the Validate Identity milestone in this scenario.

The primary applicant will have provided the joint applicant(s) details during the Gather Application Data milestone, which will link the application to the joint applicant(s).

Rules about how the joint applicant's data is presented or captured may be specified in the Gather Application Data milestone.

If any of the customers are new customers in a joint application, then if the new customer is using the internet to access the application then scenario 3 below will apply.

If there is still an open sales lead (as was generated in the Save process), then it is preferably updated automatically once the application has been completed.

Scenario 2—Existing Customers—Staff Channel. The functionality described here relates to a customer-facing staff maintenance function rather than the back office staff maintenance functions.

If the application is for an existing customer and they make contact through a staff channel to retrieve and continue with an application, the staff member can retrieve the application through search options such as the customer search function (as described for the Gather Application Data milestone).

The staff member may be able to verify the customer identity as indicated in the Validate Identity milestone requirements document.

Similar to the customer channel in scenario 1, if the customer identity is validated, the staff channel will display an Applications in Progress section, with an option to select the application for retrieval.

Alternatively, the staff member could search by application rather than customer. This search is a search of the application database, using whatever information the customer can supply. This information may include details such as the unique application reference number, name, e-mail address, postal code, etc. The data items that can be used in this search are preferably controlled by the Business in the application builder functionality being provided, so could vary from entity to entity. Any potential matches found in the application search will be presented to the staff member to aid in further establishing which one is for the correct customer and the correct application.

The staff member will again be required to validate the customer identity before continuing and retrieving the application. If the customer identity is validated, the staff member will be given the option to select an application from the search results, which will result in the application being opened at the point where it was saved. If the customer cannot pass identity checks through a staff channel, then alternative procedures for dealing with this may be utilized.

Once an application is retrieved, the process will continue the same as if it had not been saved in the first place and the staff member will be returned to the same point in the application as where it was saved. The staff member will be able to view the entire application. The staff member will be able to amend previously saved data, if required.

One exception to this scenario may exist for new to bank customers. If the application has already initiated the Validate Identity milestone, then previously captured details cannot be reviewed or amended during the application phase to help prevent reverse engineering and fraud and only data not yet captured will be presented to the staff member for capture.

In the new to bank customer case described, any changes required to previously captured data (e.g. personal details) will be available to change after the account is opened (account servicing).

If it is a joint account and all applicants are existing customers then any customer will be able ask the staff member to retrieve their own application details (and only their own).

The primary applicant will have provided the joint applicant(s) details during the Gather Application Data milestone, which will link the application to the joint applicant(s). Any rules about how joint applicant's data is presented or captured are specified in the Gather Application Data milestone.

If any of the customers are new customers in a joint application, then if the new customer is using the a staff channel to access the application then scenario 4 below will apply.

If there is still an open sales lead (as was generated in the Save process), then it will be updated automatically once the application has been completed.

Scenario 3—New Customers—Customer Channel (self service). As previously mentioned, if a new to bank customer retrieves an application, if that application had already initiated the Validate Identity milestone before it was saved, then the customer will not be able to amend any previously entered data and will only be able to pick up the application from the point of save onwards.

If the Validate Identity milestone has not been initiated, the customer will be able to review and amend data previously entered before the application was saved.

If this is a joint application and all applicants are new customers, then any customer can retrieve their own application details (and only their own) by the prescribed validation process and continue with their own part of the application.

The primary applicant will have provided the joint applicant(s) details during the Gather Application Data milestone, which will link the application to the joint applicant(s).

Any rules about how joint applicant's data is presented or captured are specified in the Gather Application Data milestone.

If there is still an open sales lead (as was generated in the Save process), then it will be updated automatically once the application has been completed.

There are certain systems that may have limitations as far as the proposed joint account opening process is concerned (e.g., Core Banking)—e.g., sole account first then appending the secondary profile. An option may be provided to open the account only after data is gathered for all applicants in a joint relationship. In the meantime a customer record for the prospect/new customer can be opened for all parties, until such time that the process is complete, at which time the joint account should be opened, along with each customer profile. An account number will be displayed where configured by the entity.

Scenario 4—New Customers—Staff Channel. The functionality described here relates to a customer-facing staff maintenance function rather than the back office staff maintenance functions. If a new customer contacts a staff channel to retrieve the application, the staff member will attempt to locate the application by using the application search functionality, as described in scenario 2.

Depending on the profile creation for new customers, there may or may not be an existing customer record for the new customer at this stage, so it may or may not be possible for the staff member to perform a customer profile search.

Any potential matches found in the application search will be presented to the staff member to aid in further establishing which one is for the correct customer and the correct application. Additional validation checks may be performed at this stage.

The staff member will be given the option to select an application from the search results, which will result in the application being opened at the point where it was saved.

As previously mentioned, if the application retrieved is for a new to bank customer, if that application had already initiated the Validate Identity milestone before it was saved, then the staff member will not be able to amend any previously entered data and will only be able to pick up the application from the point of save onwards.

If the Validate Identity milestone has not been initiated, the staff member will be able to review and amend data previously entered before the application was saved. The staff member will then be able to satisfy the Validate Identity milestone for the staff channel, if the customer can meet the requirements, even if the application was started in a different channel.

If this is a joint application and all applicants are new customers, then any customer can ask the staff member to retrieve their own application details (and only their own) by the prescribed validation process and continue with their own part of the application.

The primary applicant will have provided the joint applicant(s) details during the Gather Application Data milestone, which will link the application to the joint applicant(s).

Any rules about how joint applicant's data is presented or captured are covered in the Gather Application Data milestone.

During this process the staff member will be have the ability to see the details of all applicants that are linked to the application, although will not disclose this information to the customer they are currently dealing with, depending on local data protection regulations.

This is part of how the user experience will be set up by the local entity.

If there is still an open sales lead (as was generated in the Save process), then it will be updated automatically once the application has been completed.

Turn On/Off Save Option. Not all entities around the group may wish to allow the user (customer or staff) to have the Save functionality. An entity can configure the save option at channel level as well as entity level. Preferably, the system provides a Business customizable option to add the Save option to the presentation layer as deemed appropriate. However, in some embodiments, the Retrieve functionality will always exist, as any applications that have been saved either intentionally or by the "save in place" method described below, could at some point need retrieving for further action.

"Save in Place". In addition to giving the physical option for a user to save an application at appropriate points, that the system itself may save application information during the course of the account opening process. Information may be saved field by field, data grouping by data grouping. or page by page, according to system design.

System saves mean that if anything untoward happens during the application process (e.g., a system crash), some of the data entered will already be on file. In addition to personal data, the system may also store milestone information, user information (e.g., for a staff user, store their User ID), date and timestamp, etc.

This could also be the case where an interaction with a third party system fails (e.g., a third party system might be down when the system sends a request to it). Where there is, for example, a system failure (e.g., as part of AO), provided there is a defined set of data known at that stage, a lead should still be created and the application saved.

If a milestone cannot complete because it cannot get the information from a third party system, the user (customer or staff member) is still allowed to continue with the application, but the particular milestone where the failure occurs (e.g., validate identity, decision, fulfilment, etc.) may be held in a pending status until the third party system can be accessed.

Overall the application will also remain pended by default, as at least one of the milestones will be pending.

Ideally, if the customer is already identified and an e-mail address is held for them, if there is an untoward occurrence of this nature, then the application identifier and details on how to retrieve the application for continuance will be emailed to the customer.

Similarly, if there was no e-mail address present but the customer's mailing address had been saved, then a follow up letter will be sent, again with the application identifier and details of how to retrieve the application for continuance.

In both of these scenarios, the Business preferably has a maintainable parameter that allows them to set the number of days that will elapse before a reminder communication is sent. This parameter could indicate that an immediate communication is sent, as well as an elapsed time period.

After this period has elapsed (or immediately), the system will check if there has been any further action taken on the application and will issue a request to the communications module to issue the follow up communication.

The content of the communication may be controlled by the local entity through the Communications module.

If a user abandons an application themselves, this could be accidental or deliberate. If this happens, the user may be shown a message asking them whether they meant to exit the application or not and, if not, the system will take the user back into the application.

If the user indicates they did mean to cancel, then the Business may desire a mini survey to be presented, asking if the user would like additional assistance (e.g., have a staff member call them) and the reasons why they decided to abandon.

In cases where the user has abandoned and does not wish to continue with the application, no follow-up communication is issued in relation to the application, although the data for the application may still be saved for analysis purposes.

In addition, a sale lead is preferably generated for future follow-up.

The Save Application option may be available for customer selection based on entity configuration (business without IT intervention). The configuration is made at the field level, where an entity decides which fields must be completed (and validated correct) prior to the Save Application option becoming available. The eligibility criteria can be set for each product. All entered application data should be saved when a user selects "Save Application" (or similar). Partially completed pages will be saved providing that inputs pass both in-line and page validation. When a user exits the application using an "exit application" button (or similar) there should be a check to determine whether the application is in a position to be saved. There are two checks that should be made sequentially:

Has the user completed "Save Application" eligibility criteria?—In some embodiments, the save application option becomes valid only when the user has correctly completed all fields specified (by the entity for that product application) as being essential prior to the save becoming available. If the user has correctly completed these fields, a second check should be made. If the user has not correctly completed these fields then transport the user to an entity-defined destination page. The assumption is that essential customer information for saving an application has been collected and saved, either by the system automatically or by the customer intentionally.

Has the user saved any data since last save?—The system now checks to see whether the user has made any changes to any fields since the last time the application was saved. If the user has never saved and has also passed the eligibility criteria or the user has made changes since the last save was made, then the system should present the ability to save. If the user has saved the application and has made no changes to the application form then transport the user to an entity-defined destination page.

Applications saved in this manner are preferably available for retrieval through entity-defined question/responses that uses data from the saved application." will not use CAM to retrieve applications i.e. essential information such as Tax ID number or entity definable data fields. This is only applicable to new customers. Wherever existing customers hold CAM credentials, such credentials should be used. For existing customers who do not have CAM credentials, they will be forced to create CAM credentials. These scenarios are only applicable to the online channel.

The system may also provide an Auto Save and Retrieve process (save in place), wherein all data input is saved in real-time. The entity can configure (without IT intervention) which fields must be completed (and validated as correct) before retrieval is possible and the save option is available to the user.

Applications saved in this manner may be available for retrieval through an entity-defined question/response that uses data from the saved application. In some embodiments (e.g., for new customers/existing customers who do not hold CAM credentials) "save in place" may not use CAM to retrieve applications (e.g., essential information such as Tax ID number or entity definable data fields). However, wherever existing customers hold CAM credentials, such credentials should be used to retrieve the application.

Upon selection of the save option the user may be presented with a reference number and also with instructions on how to retrieve the application.

There is no "save upon exit" process for Auto Save and Retrieve as the application is saved in real-time.

Rates and Fees. As a general rule, the rates and fees for a product that are in place at the time an application is submitted will apply. In other words there is no "rain-checking" rates or fees that were in place at the time an application was saved.

For instance, a customer may be attracted by a savings account interest rate offer they see on the interne and begin an application for an account. At some point during the application they decide to save and suspend the application. At a later time, they decide to retrieve the application and open the account but the interest rate has changed. The interest rate that is in effect at the time the application is submitted and the account is activated is the interest rate they will be given and not the interest rate in effect at the time they originally saved the application (if it was different). This will apply to any rates and fees that any product attracts.

Certain exceptions may exist. For example, it may be that a marketing department may wish to retrieve (without any service impacts) any pending applications for a certain product and contact all those applicants who haven't returned to an application to complete it after a set period of time and offer them an introductory offer to entice them back to complete the application. This could be done by a technical process to retrieve qualifying data from the application database so it can be used in various fashions (dialer list, email list, etc.). An entity should be able to configure the search criteria for retrieving applications.

In this case, there will need to be the ability to retrieve groups of such applications and record against them that the customer has been contacted with an offer, with details of what the offer is and how long the offer invitation applies for.

If a customer completes an application within this time period, then the offer rate/fee will be applied to the account. An entity may wish to bulk offer customers who haven't completed applications they have saved—that is, they may offer better rates/fees to entice the customer to come back and complete the application. Certain users (e.g., in marketing/sales) would be allowed to choose a bulk set of incomplete applications and rate/fee information to those applications (e.g., send a communication advising of the new rate/fee or a reminder that the offer will be expiring), which may or may not have an introductory or expiry period. If a customer comes back under this scenario, the offer rate and fee would have to be applied if the customer had completed the application in the time period the offer lasted for.

Application Ageing and Expiry. The Business has the ability to schedule and configure when chaser/follow-up communications are sent to a customer, where an application has been saved (either intentionally using the save option or if it has happened behind the scenes using auto save and retrieve) and the customer has not returned to complete the application.

This involves integration with the Communications Module and requests for communication may be issued as and when required, based on how the Business has set up the chaser schedule.

As part of this, the Business has the ability to set a period in days (since application was saved) after which a pending application is considered expired, if the customer has not returned to complete the application during this time. For new-to-bank customers any CAM credentials must become invalid upon expiration of all pending applications for that customer.

These parameters may be required at a product level, so that they can be set for all applications for the same product type.

If an application still remains pending at the expiry date, the application status is changed to cancelled. The customer profile may be updated to reflect a cancelled application.

Application Archiving. The Business has the ability to set a time period in days after which applications will be archived from the account opening system and this information (if required by an entity) can be displayed to a user. This is a business maintainable parameter.

At the time of archival, the customer profile needs to be updated and relevant information such as T&C elements may be stored, and other items relating to profile and usage and even scores for validation engines, business risk, should be maintained—preferably on the customer profile.

In addition, for those who do not become customers, the Business may want to keep applicant information for fraud monitoring purposes, etc.

The system provides the ability for retrieving archived applications in case of a future need for audit purposes, legal or compliance purposes. This may be a point in time re-creation of the application—that is, the data exactly as it was when the application was archived regardless of whether any customer information has changed in the meantime. Whilst there is no requirement for real-time retrieval, such information could be retrieved, for example, within 24 hours.

Pause and Resume

Similar to Save and Retrieve, Pause and Resume functionality may be applied to any process and particularly those processes that involve staff interaction (e.g., entitlements check, decision fraud verification). Pause and Resume may be useful, for example, for an address or business details change for a commercial account that would require additional verification by a Relationship Manager, or follow-up contact based on an online interaction with a Financial Planning simulator.

In some embodiments, the high level process flow for this function involves the following components: Front End (to capture the request either in staff or online channel), Entitlements (for the authorization requirements needed to approve a details change or authenticate the user), CPS (for the Business Process flow and state management of the request), QMS (for the staff work item routed to the appropriate RM or sales staff), and in some cases Decision Engine DFS (if Fraud checks are required) and/or Communications (if additional notifications to the customer are required).

One exemplary Pause and Resume process flow could be as follows: Process begins/FE data capture (Pause); Entitlements check (Resume); Decision Fraud Verification (Pause); CPS/QMS route to staff for approval (Resume).

Activate Account

This section describes the activating of an account, once the rest of the account opening process is completed. There is a distinction that is made herein between booking (opening) and activating an account.

For some entities, an account may be opened but may not activated until all the steps involved in satisfying the account opening criteria are met. For example, a credit card account may be opened but is not activated until the customer received the card and takes an action to activate it (e.g., phones a call center). However, not all entities may be able to have this two stage process for opening and activating accounts due to system limitations and an account is active as soon as it is opened.

Therefore, the Business preferably has flexibility to allow for both options, which means that in entities with a one stage process, the account cannot be opened until all milestones have reached a successful point. This does not necessarily mean that they have completed successfully, but the item outstanding may not be sufficient to stop the account from being opened. For example, in the U.S., some of the product options, such as instance interne or telephone banking credentials, cannot be configured until after the account is opened.

For entities that allow activation at a later time to the opening of the account, the account can be opened before all milestones are completed but the account cannot become active until all milestones have reached a successful point. For instance, an account may be considered opened at the end of a customer's online application but may not be activated if they still have an off-line action to complete (e.g., the submission of a wet signature, which may be required for local regulatory compliance).

By allocating a status to an application, the system may determine when an account can be opened, activated or both.

The Business has the flexibility to set rules that the system can use to determine when an account can be opened, activated or both, depending on the statuses of the milestones.

Application Status. The account opening system will need to manage the status of an application.

In some embodiments, at the highest level there are four application statuses that may apply to any application. These are: Approved, Pending, Cancelled or Declined Approved and Declined are self explanatory. Pending refers to all the applications where at a given point in time, there are milestones outstanding that are required to complete before a final outcome of an application can be determined.

Below these application statuses, there are the milestone level statuses which are the statuses assigned to the various milestones within an application.

The system preferably tracks all eight milestones and change their statuses accordingly during the application lifecycle, as milestones are initiated, progressed, and completed. For instance, the system could be awaiting the funding milestone to complete, but could also be awaiting the terms and conditions milestone to complete.

Users have the ability to manually update the milestone statuses as the application progresses.

In some embodiments, each milestone has one of four statuses: Not Started, In Progress, Completed or Failed.

In some embodiments, the joint first applicant is able to retrieve an application and view the status of each joint applicant party in the joint application process (but not the data related to the joint applicants). This is also applicable to CMB.

The Business has the flexibility to set rules based on product type, channel and customer type that will determine when an account can be opened, activated or both, depending on the combination of the eight milestone statuses. For instance, it may be possible to activate an account only if all milestones are in the Complete status or some entities (e.g., as in the U.S. example given previously), may allow an account to be opened and activated whilst Configure Product is still in progress (so that interne banking and telephone banking can be done after the account is activated).

For entities that allow the two stage opening and activating of the account this flexibility will allow them to set which milestones statuses have to be achieved to allow an account to be opened and which statuses then have to be achieved to allow activation to follow.

In some embodiments, the system provides an Application in Progress tracker. Existing customers (including newly created customers) with product applications in progress are presented the status of the applications/products when they log on. In the event that one product within an application has been opened successfully the user sees the products within the application that are still in progress.

Approving Applications. To illustrate this process, two example scenarios are provided in which two different entities are approving applications. These are just two of many possible combinations.

Example Scenario 1—Entity A, One Stage Open and Activate Account Process. Entity A has a system limitation that means that an account has to be opened and activated in the same stage. However, they do not require all milestones to be in the Complete status in order for the account to be opened and activated. By allowing them to set the rules for when an account can be opened based on the milestone statuses, this will be possible. So a potential set of rules for Entity A might be, in order to open and activate an account, as shown in Table 5.

TABLE 5

| Milestone | Status required to Open Account | Status required to Activate Account |
| --- | --- | --- |
| Gather Application Data | Must be Completed | Must be Completed |
| Product Selection | Must be Completed | Must be Completed |

TABLE 5-continued

| Milestone | Status required to Open Account | Status required to Activate Account |
|---|---|---|
| Configure Product | Can be Not Started or In Progress | Can be Not Started or In Progress |
| Funding | Can be In Progress, Completed or Failed | Can be In Progress, Completed or Failed |
| Validate Identity | Must be Completed | Must be Completed |
| Decision | Must be Completed | Must be Completed |
| Terms and Conditions | Must be Completed | Must be Completed |
| Fulfilment | Can be Not Started, In Progress, Completed or Failed | Can be Not Started, In Progress, Completed or Failed |

This is only an example, not a prescribed set of rules. These rules are defined by the entity. Entity A will have had the ability to set up the above rules, which the system would then use to determine when an account could be activated. As Entity A is running a one stage open and activate process, the rules for opening the account and activating the account are the same. Entity A's business practices and system limitations means that Configure Product, Funding and Fulfilment milestones do not have to have completed in order to open and activate the account, and can be completed after the event. Funding or Fulfilment can even have failed and the account could still be opened and activated, as they are not dependencies on being able to open an account (for instance if the customer provided another account to fund from which had insufficient funds for the funding request, the account could still be activated and Entity A would just inform the customer that the funding had failed and request further funding details). The entity can control when the account opening system would attempt to create and activate the account on their back-end system by setting these rules.

Example Scenario 2—Entity B, Two Stage Open and Activate Account Process. Entity B has an entirely different way of handling the opening and activating of accounts and allowed an account to be opened but not activated. They may wish to set up the rules entirely differently from Entity A. As Entity B is running a two stage open and activate account process, there is no reliance on the rules for opening the account to be the same as the rules for the activation. Hence their rules may be as shown in Table 6.

TABLE 6

| Milestone | Status required to Open Account | Status required to Activate Account |
|---|---|---|
| Gather Application Data | Must be Completed | Must be Completed |
| Product Selection | Must be Completed | Must be Completed |
| Configure Product | Must be Completed | Must be Completed |
| Funding | Can be In Progress, Completed or Failed | Can be In Progress, Completed or Failed |
| Validate Identity | Must be Completed | Must be Completed |
| Decision | Must be Completed | Must be Completed |
| Terms and Conditions | Can be In Progress or Completed | Must be Completed |
| Fulfilment | Can be Not Started, In Progress, Completed or Failed | Must be Completed |

So Entity B may have a different set of rules to Entity A for opening an account but also may have a different set of rules to activate an account than those to open an account. A set up like this allows the Business to control how and when they open and activate accounts, and gives maximum flexibility in how they run their account opening process.

These are just two examples of potentially many rules combinations that different entities may wish to employ.

Declining Applications. The previous two examples described the "happy paths" of two processes for Entities A and B, where if the rules shown are met, the applications are approved and the accounts are ultimately activated. Naturally not all applications will follow a "happy path" and applications may also be declined or pended while awaiting action(s) to be completed.

In the same way that the Business may set rules for approving applications and activating accounts, they may also set rules to determine when an application will be declined. However, this is not likely to be a combination of all eight milestones statuses, as only certain milestones will drive a decline decision, namely Terms and Conditions, Validate Identity and Decision. In some embodiments, if any of these three milestones have the status Failed, then an application will be declined. However, these rules are set by the Business, so this may not always be the case, or the Business may wish to add other conditions that cause a decline to occur.

Pended Applications. In addition to approving and declining applications, there will be occasions when an approval or decline cannot take place because an action (or actions) needs to be completed before a milestone can move to the status required to cause an approval or decline based on the rules set by the Business.

The system will still use the same set of rules as defined by the Business as mentioned in the Example Scenarios.

To illustrate this consider the rules in Example Scenario 1 for Entity A, shown in Table 7.

TABLE 7

| Milestone | Status required to Open Account | Status required to Activate Account |
|---|---|---|
| Gather Application Data | Must be Completed | Must be Completed |
| Product Selection | Must be Completed | Must be Completed |
| Configure Product | Can be Not Started or In Progress | Can be Not Started or In Progress |
| Funding | Can be In Progress, Completed or Failed | Can be In Progress, Completed or Failed |
| Validate Identity | Must be Completed | Must be Completed |
| Decision | Must be Completed | Must be Completed |
| Terms and Conditions | Must be Completed | Must be Completed |
| Fulfilment | Can be Not Started, In Progress, Completed or Failed | Can be Not Started, In Progress, Completed or Failed |

As described previously, as Entity A has to open and activate the accounts at the same time, the rules in both columns are the same. However, at any point in time after the application is started, if the combination of rules listed above is not met, then the account will not be opened or activated. As long as the relevant milestones that cause a decline have not failed, then at all other times the application would be considered a pending application.

For instance, in this example, if the Terms and Conditions, the Validate Identity and Decision milestones were all Not Started or In Progress, based on the rules set by Entity A, the account could not be opened and activated, so would be considered pending.

There are many other combinations where an application for Entity A could not be opened and thus would be considered pended. The point is that by allowing the Business the flexibility to set these rules, the system allows the Business to have complete control over when applications can be approved, declined, or pended.

Application Status Descriptors. In order for staff to be able to progress or work on pended applications, it is important that it is clear what the reasons for the pended status are (it might be one reason or multiple reasons depending on how many milestones have yet to complete).

Therefore within each milestone there are preferably reasons or descriptors associated to the milestone when it is pending and where there is an action that is required.

The Business has the flexibility to be able to set up descriptors and associate them to milestones to show when an action is required.

For instance, the Terms and Conditions milestone may be in progress, as the terms and conditions have been presented to the customer. But an entity may have a legal requirement that the terms and conditions must be accepted with a wet signature. So when this milestone starts, the milestone status would be In Progress and not until the signed terms and conditions were received would a staff member be able to update the status to Completed (or Failed if they were not received).

In this case, the Business has the ability to add a descriptor to the milestone status, such as "Terms and Conditions awaited" (the actual text of the descriptor will be Business maintainable), so that anyone who queried why the application was pending would be able to tell easily.

This would apply to all milestones, as it is feasible and probable that a pending application has more than one milestone in a status that means the application is pending and hence there would be more than one descriptor indicating why an application was pending.

So for instance, at the same time the terms and conditions were awaited, the validate identity and decision milestones might be In Progress because they are waiting on information (e.g., identity documents) from the customer. In this case each milestone would have a descriptor (Business defined) stating why it was pending, so more than one could co-exist at the same time.

In addition, where the account opening system is referencing third party systems (e.g., to validate identity, to get a credit score, etc.), when the third party system sends the information back there will often be reason codes, relevant information, reason for decisions, etc. in the response. To aid the staff member who wants to action the pended application, for example, the third party information that comes back is preferably associated to the related milestone and is available to the staff member to understand the reason for the response from the third party.

It may be that entities use their own referral reasoning systems. The account opening system does not necessarily replace these systems; they may co-exist, but account opening still provides its own queuing application out of the box.

Local entity practice may dictate the continued use of any local systems in parallel with the account opening system.

Where possible, integration is required so that any local entity system can also pass their reason codes, descriptions, etc. back to the account opening system to link to the related milestone.

Checking Application Status. A user may wish to check how an application is progressing. The system provides the ability for a user to query the application status.

For existing customers who are logged into internet banking with their credentials, this is the same as in Save and Retrieve, Scenario 1, so the customer will see the applications in progress through their internet banking session.

For new customers who have login credentials set up, they will be able to log in and see the same application status checker. If a new customer cannot log in, the status checker function will not be made available.

All staff will be able to see the status and entitlements will control whether they are able to do anything with the application other than view it.

For all customers it may not be appropriate to show certain descriptors (e.g., referred for Fraud Check), so entitlements may control if they can see the actual status or if a default term (e.g. "In Progress") is shown.

In some embodiments, if the application is pending because a decision is awaited and there is a usual time frame where the decision might be expected, then this time period is displayed to the customer. This can be controlled by the entity when they are designing their customer experiences, to ensure they include this information when relevant.

It is entity definable as to how long the application status (when approved) is displayed for. The same applies for a declined application.

Booking/Activating Accounts. As mentioned previously in this section, the account opening system may support scenarios where entities book and activate accounts in one step or in two different steps.

In some embodiments, for those entities with the one stage process, the user (customer or staff member) is able to see and use the account immediately (through internet banking, telephone banking, branches, etc.).

In some embodiments, for those entities with a two step process, once an account is booked, the user (customer or staff member) may be able to see the account immediately (through internet banking, telephone banking, branches, etc.), but the account cannot be used until such time as it is activated.

Customer Relationship Management

This section describes generally the cross-sales requirements for account opening. There may be various points during an account opening process where the Business may wish to interact with the customer to offer other products or services. These may be associated services, for example a checkbook or overdraft protection on a checking account, or they may be an entirely different product, for example, offering a credit card if the customer has opened a checking account. In addition the Business may wish to set criteria that enable the system to pre-approve customers for certain products, which can be offered during any interaction with the customer.

This area of functionality may be developed in conjunction with Sales Solutions. Abilities the Business may utilize from the Sales Solution side include ability to determine which products and product options are appropriate for cross sale, by customer type, customer segment, etc.; ability to facilitate real-time calculations to determine if a competing product suits the customer needs better than the one selected (e.g., line of credit instead of overdraft); and ability to identify and present appropriate cross-sell, up-sell and down-sell opportunities.

Pre-Sales. Pre-sales covers all the activities that can take place in the sales process before the customer has decided to purchase a product. This includes things like product calculators, comparators, etc. These types of items may be developed by Sales Solutions, and used as plug-ins to the account opening process. If a customer uses such a plug in, they will be able to navigate directly to the relevant product application from the plug in function and any relevant data they entered into the plug-in will be carried across into the product application.

Cross Sell/Up-Sell/Down-Sell. The system is flexible enough so that it can determine, based on configurable business rules, appropriate products for the customer based on the data it has available at the time.

In some embodiments, analysis of the data and the determining of which products can be offered (i.e. the rules), may fall under the scope of the Sales Solution team. However, the account opening system preferably interacts with the Sales Solution decisioning at various points in a product application process. The system may, for example, send a request to the Sales Solution decisioning function to determine additional or alternative products and receive the details back to present to the customer.

The points at where this may take place should be flexible as some Business sites may wish to cross-sell at the start of an application process and some may wish to cross sell later in the application process.

The flexibility for the Business to determine where they would like to use these "hooks" allows the Business to use the "test and learn" tactics, which may help optimize the sales process and increase conversions.

When the customer chooses to apply for an additional or alternative product, which may be in addition to or instead of the original product, the system asks for only the additional data required to open the new product. Fields that are consistent between the application for the original product and the application for the new product should not be presented to the customer. The additional fields can either be presented on a single page or on multiple pages.

The entity has the ability to define without IT intervention the number of additional and alternate offers that are presented for each product. In some embodiments, the default number is zero.

Customer Contact History. In some embodiments, during the account opening process, any contact with a customer is recorded in a customer contact history function. This record may include, for example, information about date and time of contact, channel used (e.g., internet, call center, branch), reason for contact, and notes related to the contact. This function may also exist outside of account opening.

Some of these connections may take place via the Communications Module, which receives requests from the account opening system to send out customer communication at various integration points.

In some embodiments, any activity related to customer contact during account opening is recorded including, for example, staff discussions with customers.

In some embodiments, the system may also record automatically when an application status is allocated or changed by either a customer, member of staff, or an automated system process or third party input along with notes as to the reason why it has changed.

Whether this is considered as part of customer contact history or a separate application history function depends on the system design.

Pricing. Pricing covers the consideration of how a product is priced in relation to other factors. For example: Should the bank offer better rates/lower fees if a customer has more products with them? Do different customer segments invite different product fees and charges? There are a number of factors that can affect what price is offered to a customer for any given product.

In some embodiments, the data that is captured in the account opening process, known data if it is an existing customer, and the product data may all be fed into a decisioning engine (e.g., SMG3) to determine the appropriate pricing that will be offered.

Referral Program. In some embodiments, the account opening system facilitates a customer referral and rewards program (e.g., an existing customer can refer people to open accounts with the bank and receive credit or reward for doing so). Customers may be asked when they are opening an account if they have been referred by someone else (and some way of uniquely identifying that customer), so that when the account is activated, the credit or reward on offer can be applied to the correct, referring customer.

Campaign and Lead Tracking. The system provides the ability to create an open lead after a logged on customer has selected a campaign (e.g., Individual Solution/Generic Ad/Random Ad/CMS campaign). After the customer has clicked on the campaign, a message may be sent to the host system to create an open lead.

In some embodiments, the open lead entails the following: CRMS "result type" confirms that customer has expressed interest in this product; the open lead record deactivates Individual Solutions for this product; and new lead is routed according to entity configuration (business without IT intervention) for that specific product (e.g., branch, RM).

The system provides two options to close campaign leads: manual and automatic.

In some embodiments, the system also provides the ability to update leads. In other words, the system will update a newly created lead at any stage of the customer journey as defined by the entity such as the following:

Selected any of the options presented in the page ('Yes please', 'No thanks', 'Tell me later')

Selects the 'Apply' option in a product page

Selects to save a partially completed application form

Submits an application form online

The system may validate the new contact result type to ensure that the lead is only updated if the result type is different from the previous one (e.g., if the initial contact result type is "IS Response" while the second one is "Application Initiated").

The system provides the ability to include the actual CAM level of the customer in the lead record whenever a lead is updated/created. This customer CAM level information may be used by the business users for campaign tracking purposes.

The system may display appropriate actionable options on any page. The following are configurable by the entity (business without IT intervention):

Display different actionable options on any page

Display the actionable options horizontally or vertically

Decide on the number of options to be displayed on a specific page (e.g. 3 options on Credit Card product page, 2 options on Loans page)

Display the number of options and type of information required for a specific option depending on the CAM level of the customer In some embodiments, there may be multiple leads for the same product type. A user can select to open more than one instance of a product type. In this case there will be a unique lead for each instance of the product.

The entity may configure whether or not a lead is created for the second applicant (on the sole profile) as part of a joint application (as well as on the first applicant).

The system provides for independent tracking of leads. Each lead generated from a multiproduct application is preferably available independently and is tracked independently. Each may contain a reference to the application reference number. Rejected and dropped/skipped products may also be tracked. In addition, the entity can configure whether appropriate checking (including white list, black list, watch list) will be performed for each of the joint and primary and secondary applicants, authorized users, and guarantors.

Application Management

This section describes how product applications may be managed if the application is not able to complete in a straight through process and, hence, requires some manual intervention.

Account Opening preferably enables as many applications as possible to be processed automatically and have the accounts booked immediately in the back end account systems. However it may be that not every account opening application may be opened automatically for a variety of reasons, for example if the checking of third party credit bureau is unable to determine whether a customer is a good risk or not to the bank.

Therefore, where the system is unable to determine automatically whether it can approve or decline a product application (e.g., if a signed copy of the Terms and Conditions was required and not received yet), there is a mechanism whereby the product application can be made available for action by a member of staff.

Outstanding applications may be managed by milestone status, and staff may review the outstanding applications and change application details and product/milestone level statuses based on their additional analysis and entitlements.

In some embodiments, a database may hold the details of applications, which can be manipulated by users. The manipulation may be done using queries that various users can run over the database, with locally configurable pre-defined queries.

The creation of pre-defined queries is preferably entity configurable; some examples are:
   Verification: Applications that have mismatch and/or missing information,
   Manual review: Applications that require judgmental underwriting
   Fraud: Applications that are suspected of Fraud and require verification prior to approval
   Duplicate Review: applications where applicant may already have maximum number of allowed credit cards (will vary by portfolio)
   Error: Applications purposely have this status for reasons such as sensitive name or special handling (Panic Policy)
   Overridden Application: Applications that have been overridden (rates and fees/decision)

The pre-defined queries may allow, for instance, a user to view only applications with a certain milestone status, e.g. Terms and Conditions in Progress (with a corresponding descriptor, e.g. terms and conditions awaited), etc. and make changes to those milestone statuses as required to progress the application. The system may also allow searching on other criteria, relating for example to application or customer details data.

In some embodiments, for staff, there may be entitlement restrictions as to which staff member has access to modify applications with a certain type of status (e.g., only staff who are allowed to clear fraud checks can modify the specific milestone of applications referred for the Validate Identity milestone). This may include entitlements that allow some staff to view but not edit versus the ability to view and edit.

Preferably, the entitlements options are Business configurable, so that the Business can set up and manage the entitlements themselves.

In some embodiments, customers are only able to view their own applications.

In some embodiments, the Business may be able to set up and save commonly used queries to save staff time when using the system. However, staff may also be able to define and save any personal query they wish, which they can either make public for other users to use or can keep private for their own personal use.

When a list of query results is displayed, the user can select the product application they are interested in, which will then be automatically displayed on screen to the user for further action.

The Business has the ability to attach flags to an application to immediately indicate that an application requires urgent attention.

Returned query results may be sorted by date in descending order (e.g., oldest application to appear at the top of the list). The filtering of the results should be business configurable. Flexibility is in place to allow users to filter the display of the query results.

Taking the Validate Identity milestone again as an example: If a Validate Identity check comes back and requires a fraud check (e.g., customer address is not the same, customer comes up as deceased, etc.), then this item would require immediate attention by a staff member. This application should therefore be flagged as such, so that staff members could immediately filter on such items to see what requires their focus (similar to the functionality a Quality Center system provides).

In some embodiments, all the data fields are made available and the application can be configured by an administrative person and the user to include only the data items required in the query. Filter rules can then be set up personally by a user and saved individually against their user profile or can be made available for wider public use. This allows a user to pre-define and share commonly used filters.

Status assignments may be triggered by certain events which may or may not be initiated by a user. Overall application status can be updated dynamically based on the outcome of the previous step.

As described previously, local entities may have their own existing solution for handling pending applications. The local entities may still wish to use their current systems to check the reasons for pending, but in order to progress the application the milestone status should be updated in the account opening system. This may provide the opportunity for an integration point between the account opening system and the local system (e.g., when cleared in local system, it may clear automatically in the account opening system), which would be a local enhancement and not part of the core account opening system.

Data for the purpose of MI/Audit reporting can be retrieved/stored as applications are assigned to status and/or acted upon, including status changes made by staff members, or automated or third party changes.

In some embodiments, staff users may add free-format notes to the application at any time while preventing users from modifying historic notes. Notes should be entered, dated, user stamped and easily viewable by staff. The business preferably has the ability to define the prioritization of the notes to be displayed to the users (e.g., in cases of production issues when customers are inquiring on the application).

Entitled users may override the application/milestone status determined by the application processing engine. Entities have the ability to configure the reason codes/description for override(s).

The system provides the capability for integration with other queuing systems that exist within the entity.

Staff should be able view the application/milestone status history as part of the application. If required, business can restrict users to view the decision/status history based on entitlements.

Once the user has selected an application from the query results list and finished working on an application, the system should automatically display the next available application form (there should be a background refresh and the system should only display applications that are not being worked on by another user) the query result list, while providing an option to return to the search list. Alternatively the user can return to the original query results list and select an application from the list (again only available applications will be displayed).

Preferably, staff members have access to a summary detailing the statuses of the various milestones, status for the overall application, and the application itself. Through the summary, the staff should then be able to have access to the various section of the application and make changes to details/status as necessary via links, etc.

In some embodiments, the system may provide integration with the customer session where applicable. The system should not prompt for search if customer session has already been established. For example, if a staff has been assisting a customer (via Call Center/Branch channel) with a previous query thereby already within an existing customer session, should the staff need to maintain/review the application(s) status(es), the system should display the application(s). If more than one application has been found, the system should allow the staff to select the intended application from the result list.

Preferably, the system prevents editing of an application that is accessed by another user. In such a case, only read rights would be permitted, with a status indicating that it is being worked on currently.

In some embodiments, there may be an entity configurable timeout function (warning before the actual timeout where the user can continue or end the session) within the application management system.

Regarding searching for applications, the options for filtering are maintainable by the Business, so that rules and queries can be pre-defined, personalized and saved to allow quicker searching. For example: Show all savings account applications between 1 Jan. 2011 and 10 Jan. 2011 for new customers through the interne channel that are awaiting identification documentation to be submitted.

Searching preferably includes the ability to group search for customers where the same situation or rule applies (e.g., find all customers who failed a certain milestone, find all customers who haven't responded with a certain time period, etc.).

In addition, the system provides the ability to take the same action on a group of people—for example, to send the same communication to the group, to re-run validation checks on the group of customers should the validation system have been down when they sent their applications, etc. This ability extends to bulk maintenances of the milestone statuses (e.g., find all customers who failed the validate identity milestone and update the milestone).

Customer Communications

This section describes customer communications within the account opening process, including communication content and generation, as well as all communication delivery to a customer including terms and conditions and disclosures. Customer communication is an important part of the overall account opening process.

In some embodiments, the system provides a centralized customer communications module, also referred to as the Integrated Customer Communication Module (ICCM). The ICCM may comprise, for example, a template repository, document storage, and communication history storage. In some embodiments, the ICCM draws on a separate contents repository. Where there are integration points with a specific milestone where customer communication is required, these are described in the section for that milestone.

Preferably, ICCM functions as a single source for templates and content for merging communications to customers, provides straight through processing of customer communication, and eliminates need for each individual system to develop its own communication solution.

ICCM handles the outbound communication to customers. In various embodiments, it can: interface with various product/service systems or data stores to receive communication requests and data input; render document in pre-defined format in real-time or in batch; provide output that can be delivered through multiple delivery channels, including Internet, E-mail, SMS, Phone (outbound dialler), Print, Fax, ATM, Kiosk, and Secure Messages, when required; store documents and communication records with appropriate access controls; and enable customers to receive communication in their language of choice, via their preferred delivery channel(s), when they need it.

In some embodiments, ICCM can be considered as being composed of three main segments: Communication Request Router, Template and Document Management Tools, and User Interfaces. The Communication Request Router accepts communications requests from Bank systems and local systems and routes those requests to the appropriate channel for distribution. Requests may contain information regarding what documents are to be sent, dynamic data required to generate new documents, document formats, and/or delivery channels and the data required by the delivery channels (if not provided, then ICCM retrieves it from appropriate systems). The Template Management tool is used to create and maintain templates used in generation of documents in formats needed by the channels. The Document Management tool is used in the creation and storage of documents. User interfaces allow users to set and manage communication; access, retrieve and view documents; view communication history; and view metrics and run reports (may be provided by the work stream handling metrics functionality).

Figure 35:
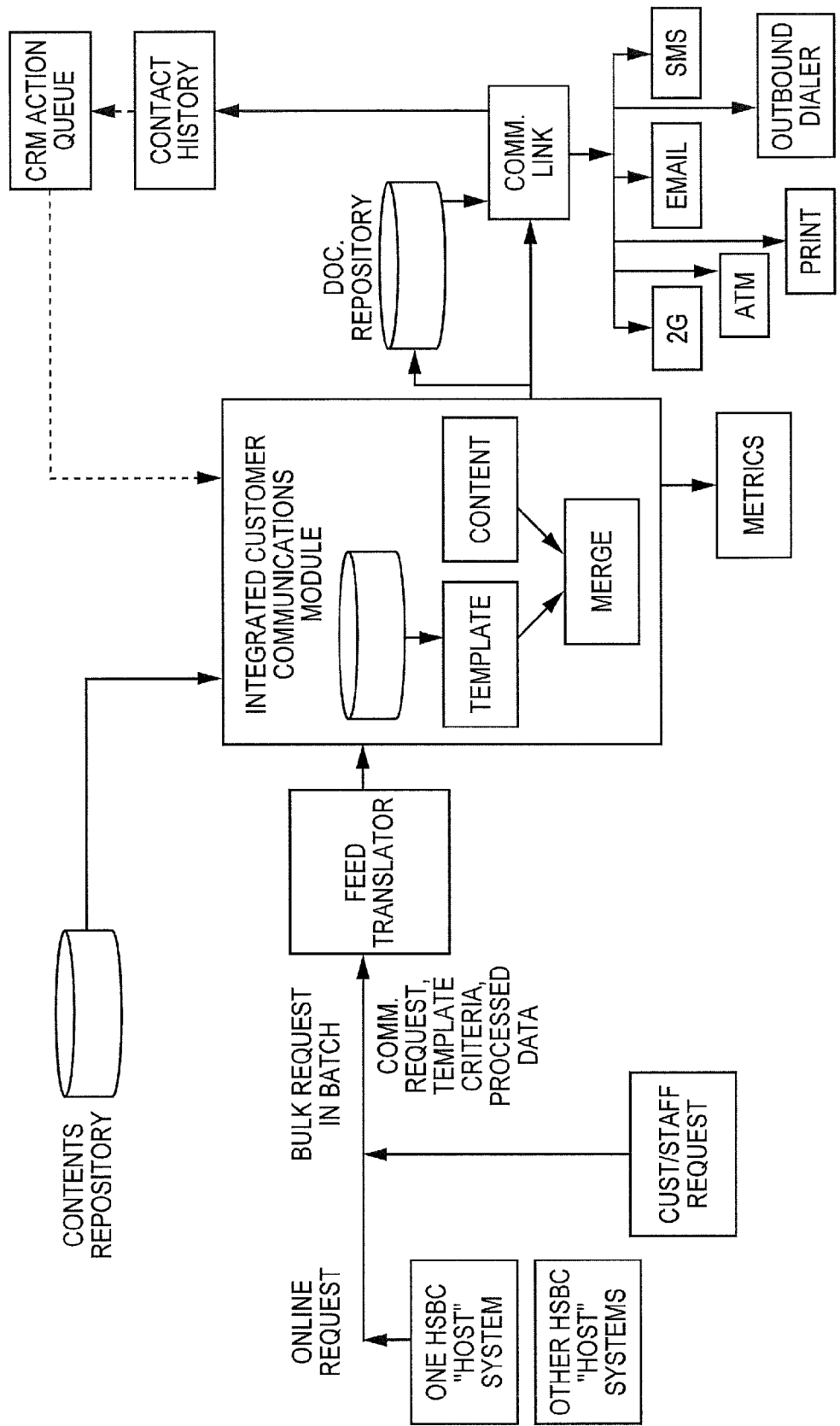
FIG. 35 shows exemplary outbound customer communication processes.

FIG. 35 provides a simplified view of the main flow of the outbound customer communication processes.

In some embodiments, host systems such as HUB or processes such as Account Opening (AO) may send individual communication requests or bulk communication requests in batch to ICCM. Requests may also be made by staff or customer. In addition, ICCM may receive requests via CRM Action Queue. The requests may be for new documents or existing documents or a combination of both. Sometimes, a previous communication may be requested again, to be sent either to the same address or additional addresses. For new documents, ICCM is provided the template IDs/criteria and the processed data (dynamic data) to produce required documents. The communication request also includes the delivery channels and the addresses to which the communication is to be delivered. A feed translator converts the communication request and the data associated with it into a format understandable to ICCM. ICCM produces the documents by merging the templates, which contain static data, together with the dynamic data provided by the requester and contents such as logos, barcodes, etc. from a Contents repository.

The produced documents are stored in a permanent storage such as OnDemand. In addition, they are transformed into the required formats and provided to the delivery channels via a communication link. In regards to existing documents, they are retrieved from the storage rather than produced again, transformed into the required formats and delivered. In order to enable performance monitoring, anticipation of potential problems and identification of opportunities for performance improvement, ICCM will record metrics data.

Figure 36:
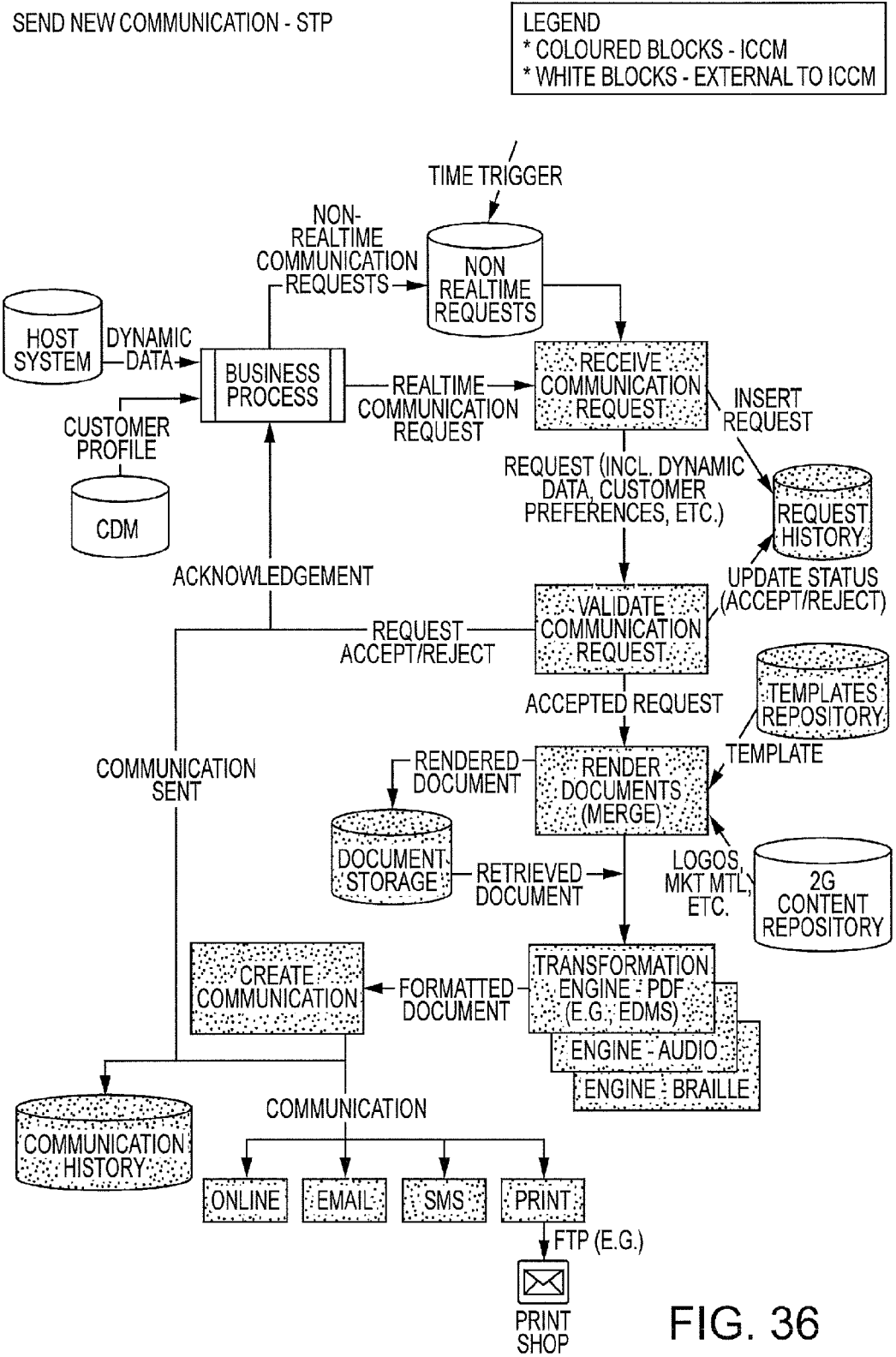
FIGS. 36-37 are exemplary process diagrams for Send New Communication (Straight Through Processing) and Create/Modify Template functions.
Figure 37:
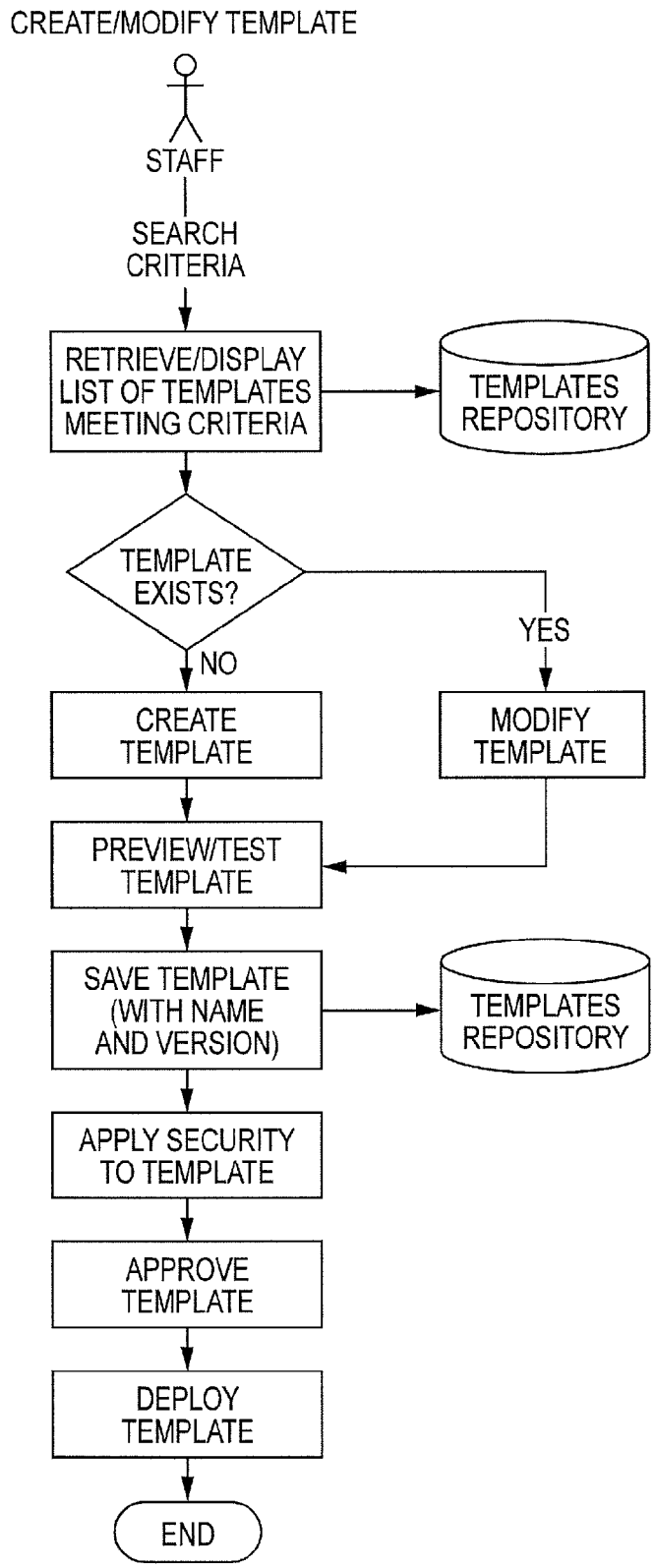

FIGS. 36 and 37 are exemplary process diagrams for Send New Communication (Straight Through Processing) and Create/Modify Template functions. The AO process has the flexibility to easily update information about templates (template ID) when changes are made to a template and the modified template is stored as a new version with a new ID so that it may send the appropriate template ID to ICCM. The format in which dynamic data is sent by the AO process to ICCM should also be flexible. AO should send this data in a format (e.g., in XML) so that ICCM is able to recognize each data element and merge it at the right places. It should not be necessary to send the data in a predefined specific order as this reduces the flexibility to respond to changes.

ICCM is not a rules engine nor a workflow engine or CRM or a scheduler for CRM Action Queue. ICCM may have one or more of the following limitations: Authentication and authorization may be handled by a separate system; however, they are pre-requisites for accessing ICCM. ICCM will not store customer preferences (such as preferred channel of communication). ICCM will not develop functionality such as audit trail or entitlements; rather it will use available functionality. Text received as part of the data from the requesting process/system (e.g., transaction narratives in a statement) will not be translated to a different language by ICCM. Communication scheduling and follow up is preferably performed by CRM. Consequently, CRM will cancel/override previously issued communication requests before issuing the request to ICCM.

In some embodiments, ICCM will not process data (e.g., calculations such as determination of balance, ratios, etc. for each transaction or as of a certain date) for the requesting process/system. It will be provided the data to be merged in the template by the requesting process/system, the criteria for selecting the template and the content (like logos), the addresses to which the communication is to be sent, security level of the communication, etc. ICCM will, however, calculate the totals/sub-totals for a group of rows for a column.

Business configurable processes preferably ensure that more than one communication to the same recipient and address to be delivered by the same method within a short time are not issued, and that they are combined together into one before a request is made to ICCM. ICCM may or may not have the ability to group multiple communications into one.

For joint (or CMB) applications the entity can define whether the first applicant only should be sent the advice, or whether additional applicants should also be sent the advice (e.g., FCAC disclosure requirements for joint account holders in Canada).

The entity may also define whether an advice is issued to the customer when an application is saved. If enabled, the advice will preferably contain the reference number of the application. This advice should be made available via the customer's preferred delivery methods, including postal mail.

Where the customer has provided an incorrect email address in error and the notification fails, the system may try and contact the customer using another method (if details are held). For every email failure, there is preferably a 'bounce-back' report to alert the entity to the fact that the email has failed (e.g., may be incorrect and need updating).

In some embodiments, the AO process may utilize certain existing functionality in the communication module, including communication methods with customer (e.g., e-mail, PDF, fax, etc.) as well as business maintenance of document templates.

The entity can define whether a reminder communication is to be sent via the customer's preferred method after a predetermined number of days when a customer has saved an application and not returned to complete the application. The number of days after which reminders are issued is configurable by the entity at the product level (business without IT intervention). The reminder should contain the application reference number and other information necessary for customers to continue with the application (e.g., link in reminder e-mail).

Terms and conditions for each product (as applicable) may be made available to the customer via preferred delivery methods, including postal mail.

The system allows application details to be sent to the customer via the preferred method (including postal mail) regardless of the decision at the product level. Account numbers should be shown for approved and opened accounts, while the application reference number should be available where application contains product(s) that were rejected, pending, or referred.

Product details for cross-sell and up/down sell should also be made available to customers via the preferred methods, including postal mail.

Contact history is preferably updated whenever a communication is sent to a customer.

Communication Requests. ICCM is able to receive outbound customer communication requests from the various business processes of Group, generate/retrieve necessary documents/messages and deliver them as requested. Communication may be requested by a business process such as Account Opening, a Staff user, or a Customer user. Requested documents may be new and have to be produced, or may existing and have to be retrieved from storage (and if necessary reprinted).

Together with the communication request, the requesting process should provide the following (but not limited to) information:
 a. Template(s) (criteria for template selection or template IDs) to be used for generating the communication
 b. Entity for which the communication is to be sent
 c. Channel(s) to be delivered to as well as addresses
 d. Date and time for delivery
 e. Despatch Code,
  i. To be used by the print shop to indicate how the printed communication is to be delivered, e.g., mail, courier, recorded delivery, registered post, etc.
  ii. Should be configurable at entity level
 f. Security level of communication
  i. For example:
   1) Communication may be encrypted or not encrypted
   2) Attached document in an email may require password for opening it
   3) Instead of attaching a document, the email may contain a link ii. How the security of communication is to be handled should be specified by the Business Design team and may be defined based on the Security Framework,
g. Data to enable selection of logos, etc. such as entity name, customer type (Premier), etc.
h. Dynamic data that is to be merged with template's static data. Examples of dynamic data include:
  i. Customer Preferences (including but not limited to) from the customer profile:
    1) Language: For certain documents such as tax receipts (W2 in U.S., T4 in Canada), they may only be in country's official language(s)
    2) Preferred channels; if no preference, default channel
    3) Preferred format (including Braille, audio, etc.)
  ii. Customer data (e.g., customer number, name, addresses for communication)
  iii. Product data (e.g., list of selected product options) Several product attributes may be needed such as product, sub-product, product type, and product brand. Example—credit card, HSBC Cash or Fly, Platinum, HSBC Premier
  iv. Arrangement data (e.g., account number and name, maturity date and instructions for a term product)
  v. Transaction data (e.g., interest applied to a loan account, charges)
Communication Processing/Modes. ICCM can process the communication requests in real time, at a later specified date and time, or at a later date within a reasonable period for the delivery channel (this "reasonable period" may be pre-defined by the business).

The business can specify the duration/tolerance for each of the modes (e.g., "Real time" may not necessarily signify instantaneous, but rather within the next X minutes maximum).

The requests can be processed in batch, including a batch of one. These communication modes will need to be provided by the requesting process as the business managing the process will know best the urgency of communication. Preferably, the business can pre-define the mode/urgency for the different types of standard communication. If the actual mode for a particular communication is to be different from the pre-defined, a staff user would need to modify it for that communication.

In preferred embodiments, ICCM can merge one or more of the following: Static text in a template; Dynamic data received from requesting process; Marketing material from a content repository (e.g., Teamsite); and Other contents such as logos and product files that can be sent to printer, storage and communication channels.

Communication Methods. Communications may be sent to the customer at various stages throughout the account opening process. The communication is preferably issued by the customer's preferred method, if one is held. Where no customer preference is held, each site preferably has the ability to set a default method (or order of methods) of customer communication from the available options.

In some embodiments, the communication methods include, but are not limited to: Mail, E-mail, Secure Message (via interne), SMS messages, Phone (outbound dialer), Print/Download, Fax, ATM, Kiosk.

ICCM should be able to inform the print shops what inserts (if any) are to be included in any communication (e.g., advertising pamphlets, processed checks, etc.).

The communication may be issued in real-time or scheduled for production in an overnight batch process.

If a duplicate copy or issue request of any communication is required, this is preferably easily accessible to the user. All communications may be listed in the application profile so that they can be seen by the user, with dates and content. When viewing communications to a customer, the user should be able to see communications relating to different areas (e.g., Account Opening, Servicing etc.).

A communication may be issued through multiple channels at the same time and to multiple recipients, if necessary.

The system provides the ability to re-send a communication to the same channel as originally issued and extend the capability to include other channels at the same time.

ICCM can provide the delivery channels: (1) the rendered documents or the documents retrieved from storage; and (2) customer preferences and other relevant information (received from the requesting process) in order to enable delivery of documents (e.g., via preferred channels, to specified addresses, in specified number of copies, with specified level of security, and processing mode).

ICCM should be able to interface with any required group system or process (e.g., Account Opening module, CRM Action Queue, Content Repository, Delivery channels) as well as many local and global back-end systems. ICCM can handle common file formats including but not limited to flat files, XML, MQ protocol, etc.

Preferably, ICCM has integration points between the end delivery systems (Dialogue, Iris, Kana, local systems) and the content repository solution to ensure that the delivery systems get what is needed in order to produce the communication (e.g., HTML is needed for web and email, PDF needed for document display, 160 characters needed for SMS, etc.). In some cases, there may be limitations to the size of the communication or number of documents that can be included in (e.g., a customer may not be able to receive an email of more than 10 MB). Similarly, there may be limitations on the SMS text message size or the envelope size for mail.

In some embodiments, communication through multiple channels may be required, and provided by the system. For example, it may be that an instant communication is provided to an applicant in real-time (e.g., by email), but the Bank is legally obligated to provide a follow-up via mail. This could occur for pending applications where additional information is needed from the customer or for terms and conditions. For another example is in the U.S., where Cards statements are available to customers for review online in PDF versions even if paper copies are sent to a home address. This allows the customer to have an audit trail of their last 12 months of statements available to them even if they did not select the paperless statements offering.

If more than one communication for the same recipient is identified and it is being delivered by the same method, the communications are preferably grouped together into one communication, unless the communication is of a legal or compliance nature and a business rule disallows this functionality.

Communications may also be grouped by legal entity where multiple legal entities exist in a country or region, and correct logos may be added where required (e.g., direct versus premier versus CMB, etc).

Preferably, all communications issued are logged in a customer contact history function.

Communication Content. The system provides the Business with the ability to create, preview, maintain, and delete communication templates for different delivery channels, including the ability to define what data items are included in the communication and the source(s) of this data. This may include for instance, a preview facility, so that when a template is created or changed, the actual image of that template can be viewed in full to ensure that the output is as intended.

The templates are customizable in any language the Business wishes to use and may allow more than one language in the same template (e.g., address in Chinese, text in English). The templates provide the ability to tailor content (e.g., logos, graphics, etc.). The templates can be retrieved on demand when a request is received from the account opening system. The templates are preferably easily searchable to prevent duplicate templates from being created.

Available formats include, but are not limited to: PDF, HTML, plain text, Braille, large fonts, and audio (for visually impaired). The system provides the ability to store a template in one format (e.g., Word, PDF, etc.), but be able to convert or display it in multiple formats (e.g., Word, PDF, HTML, etc.). In some embodiments, ICCM may sent the document to one or more engines in order to convert them into the desired formats.

The data required to complete the communication may be retrieved from the underlying product or service system and integrated with the template before the communication is issued.

ICCM is able to create documents from templates. Entitlements may control who has access to create, maintain and delete communication templates. Documents may be created by Staff, or Business process. Documents may, for example, be of free format; contain a combination of static and dynamic data; contain only static data; contain contents such as logos, marketing messages, barcodes, etc.

Where an application has been declined, entities can pre-define a number of reasons for the decline, and may choose to include this reason in the decision notification. Likewise where a application has been accepted, the notification can be configured to advise the customer of the next steps. An entity can decide whether a generic or a specific reason is displayed for the decline.

Templates. ICCM provides the ability to create, preview, maintain and delete document templates for different delivery channels and in languages that the Business uses.

Staff should be able to create, modify and deploy templates in real-time and online and in reasonable time. In some embodiments, only staff users with appropriate entitlements can create/modify/delete/deploy templates. Different templates may have different entitlements. For example, access to free format letter templates or those where the static data can be modified may have a more restricted access than those which cannot be changed at all. Templates may also include those for free format letters. There should be strict access control to free format letter templates.

With the preview facility, the staff user can view in full the actual image of document that would be generated from the template in order to ensure that the output is as intended before sending it to delivery. This is particularly useful when a template is created or modified as well as when a staff user is modifying the template contents temporarily for a particular communication.

Templates are maintainable at region/country/entity level. Templates should be standard across countries to the extent possible. Preferably, differences should be to comply with external regulations rather than internal differences in the Group.

The system provides the ability to copy a template and modify copied version to create a similar but different template, as well as to version the templates as they may evolve over time. Preferably, there is an entity-definable Change Management process to create/modify/delete templates. Templates should be easily searchable in order to prevent duplicate templates from being created. Template names should be simple and intuitive.

Templates are able to contain the following (but are not limited to these examples):
  a. Static data that cannot be changed
  b. Static data that can be manually changed by a staff user
  c. Space where a user can manually add data
  d. Space where supplied dynamic data can be inserted
  e. Default data which would be replaced if data is provided by the calling process or used if data is not provided
  f. Expandable areas which can be filled by dynamic data; if such data is not supplied, the rendered document should not show blank space. A template may contain such areas at multiple places. E.g., different marketing messages may appear in a composite statement at different places corresponding to the products whose information is being shown. (A composite statement in HUB provides portfolio summary and transaction statements of the various accounts held by a customer).
  g. Tables that may be repeated for unspecified number of times in a document; the number of repetitions can vary from one document to another Templates have the ability to merge supplied dynamic data at the specified locations, and can incorporate specified logos, graphics, etc. They can contain more than one language (e.g., address in French, text in Chinese), can handle single and double byte languages (e.g., Cyrillic character sets, diacritics, etc.), and can handle languages such as Arabic, which are read and written right to left. Templates can also comply with Islamic Finance requirements.

Templates can handle formatting of data, such as amounts and dates, based on country and language. They can also handle grouping of data and calculation of totals, sub-totals, average, etc. by groups.

Templates can generate documents that include text, images and graphics, both colored and black and white. It is possible to highlight selected text (e.g., portion of a row, alternate rows or alternate narratives covering more than one row). The rendered document can contain bar code (printable and includable in files such as PDF).

Users can, for example, use different types and sizes of fonts and format the text (e.g., bold, italics, underlined, etc.). The rendered document should be printable on Multiple size stationery; Pre-printed or plain paper; One or both sides of the paper (single sided, duplex).

ICCM provides the ability to customize a template for a particular communication so that allowable part of its content can be modified depending upon the situation, without changing the original template. Templates are retrievable for modification on demand by a staff user within a process such as the Account Opening process.

A staff user may, for example, retrieve a template and modify/delete a defined part of its static data and/or add new data in defined areas in it before submitting it to ICCM for processing. The original template should remain unchanged. The staff user should be able to write in the local language when modifying text for a particular communication. Only staff with appropriate entitlement should be able to customize templates. In the Audit Trail/Communication History, it may be indicated that the original template was customized for the particular communication and who customized it.

Document Repository. ICCM has the ability to store the electronic documents generated by it in a central repository for the entity. Local storage (e.g., in a staff's computer) and physical storage are not supported. In preferred embodiments, all documents produced by ICCM are stored. Only one copy per version will be stored regardless of the number of times it is delivered.

One of the main objectives of business is to minimize the cost of document storage which could be achieved by not storing selected documents. The benefit of not storing documents must be weighed against the cost of recreating documents that were not stored. Further, it may be worthwhile to store the documents for a certain period of time in case they have to be re-sent. Therefore, cost efficiency may be best achieved by specifying the retention period of the documents rather than not storing the documents at all.

The electronic documents are preferably stored and indexed such that they are easily retrievable based upon specified criteria.

The maximum period for the storage of the documents and when to transfer the documents from primary to secondary storage should be determined at country level since regulations vary from country to country. However, in some embodiments, a minimum period of 7 years can be assumed. Furthermore, the requirement for maximum storage period may vary from document to document. For example, some documents may need to be maintained permanently, some others for the lifetime of the account. Therefore, ICCM should handle the maximum storage period at document level.

Document Retrieval. ICCM has the ability to retrieve and provide documents based upon specified criteria. If only a single document meets the criteria, it will provide that document. If several documents meet the criteria, it may, for example, provide a list of the documents together with descriptive data (e.g., document name, date, customer number, etc.) as well as their hyperlinks so that the desired document may be selected and retrieved.

Requests for document retrieval can be from a staff, a process, or a customer. For a staff or customer, a user interface is provided for the user to specify the document identity or search criteria as well as the format in which the document is desired. In the case of search criteria, if multiple documents match the criteria, a list should be displayed from which the user can select the desired document.

A process should specify the document format and document identity or search criteria without a user interface. For STP, the process should specify the exact document identity. In the case of search criteria, similar to the scenario of staff or customer, if multiple documents match the criteria, a list should be displayed from which the user can select the desired document. In this case, a user interface is provided to display the list and document.

Communication History. A record is preferably kept of each and every communication that is issued to a customer through ICCM, including date, time, channel, and content, and stored for a length of time determined by the entity.

The history is preferably easily accessible by Business users in order to help address any enquiries that may arise as a result of the issue of the communication and may also be visible to the customer as described previously.

The history may be searched, for example by customer, communication type, channel issued and/or date issued, to allow the Business user to narrow down the communication items they wish to view.

Communication Retrieval. ICCM has the ability to retrieve and provide communication records based upon specified criteria. If only a single communication record meets the criteria, it will provide that record. If several communication records meet the criteria, it may, for example, provide a list of the records together with descriptive data (e.g., communication name, date, customer number, etc.) as well as their hyperlinks so that the desired communication record may be selected and retrieved.

Requests for communication record retrieval can be from a staff or a process or a customer. Customer history should be robust enough to allow many users to access simultaneously. For example, branch and call center staff in multiple locations can access and perform look-ups on customer communication history in a reasonable timeframe.

Triggers/Alerts. At various points during the application process, there may be a need to automatically issue a communication to a customer, based on a trigger event or alert. The business may configure the events/actions that trigger communications to the customer.

The account opening system may automatically raise a trigger or alert, based on an event that has taken place (e.g., when a milestone status changes), to the Communications Module, requesting that a communication be sent. For instance, if an application has been pending for a certain number of days, a chaser communication may be required, at various, pre-determined and repeated intervals. Another example is if the customer has indicated during the application that they will fund by check but the check hasn't arrived after a certain time period. This is preferably an automated process (to send the communication request) initiated from the account opening system directly to the ICCM.

Thus, the Business also preferably has the ability to set up rules surrounding when these triggers will occur, parameterized so they can choose what type of communication will be sent when an event occurs (e.g., send after n days pending, send when an application status changes, etc.). This could apply to both outbound and inbound customer communications. An example of an inbound scenario could be a situation in which a check to fund the account was awaited by the customer and it arrives—once the application status is updated to show the arrival of the check, an entity may want to automatically send a receipt or confirmation.

In some embodiments, these types of triggers or alerts fall into three categories:

Automated—Request automatically triggered, communication automatically compiled and issued Semi-Automated—Where a manual review process is required but when completed, the communication is automatically triggered Manual—where staff can choose to manually request, compile and send a communication. In this case, there is a requirement to have pre-built templates available to staff, which the staff can modify in required before issuing In addition, in some embodiments, a Virtual Agent program can be developed in CPS in order to trigger customer communications based on criteria for in-flight processes. For example, to trigger a communication to all customers whose process status equals a particular value after a configurable number of days, CPS would run a periodic job against the criteria and then assemble a batch request with all the qualifying customers and send it to the Communications component for delivery.

Another example would be for CPS to evaluate any deposit account application that requires funding in order to board the account and send a funding chaser email after 5 days in order to remind the customer to fund the account. CPS would run a periodic virtual agent (most likely on a daily basis) to gather all those customers who qualify and include them in a batch file sent to the Communications component, along with the customer's delivery address and preferred delivery channel details. The batch file may also contain other qualifying criteria for other communications for that day.

The Communications component can process these requests and compose and deliver the communications to the customer. The process can repeat accordingly in an automated fashion as part of normal daily operations.

Cancelling a Communication. The system preferably provides the ability to cancel a communication if it has been issued in error (e.g., if a customer has been declined for an account in error but it is then decided that they should have been approved).

There are may be two scenarios in this case, depending on whether the communication has been requested as an immediate real-time item or whether it has been sent to a future batch process.

Where a communication has been requested real-time, it is unlikely that the communication can be stopped from being issued to a customer. In this situation, there is the ability to issue a follow-up communication that references the first, stating that the first was sent in error.

The management of the content of any communications (including these follow-up communications) may be managed within the communications module.

Where the communication has been sent to a future batch process (e.g., overnight), it is possible to intercept this communication before it is issued. There are two ways this interception could occur. Firstly, the user should be able to locate the communication against the application profile and have the ability to cancel the communication before it is issued. Secondly, the system itself should be able to determine that it needs to send the communication based on the last action taken on the application. For example, if a decline communication has been requested but later on the same day (but before the batch runs) for the same application an approval communication was issued, the communication module should automatically cancel the decline communication and issue the approval communication instead.

The Business has the ability to set rules that link different types of communication together, so that the communications module knows which communication can be cancelled should a linked communication be issued later before the batch is processed.

Metrics. Metrics are preferably captured and stored for the customer communication process, for example for: Process Analysis; Performance Analysis; Cost Management; Service Level Agreement (SLA) Management; and/or Capacity and Volume Planning. Metrics can enable prediction of potential problems sufficiently in advance to allow timely corrective action as well as for identifying opportunities for improvement. The metrics should be analyzed and their implications reported to appropriate individuals at an appropriate frequency.

ICCM can report quantity of customer communications by date, channel (email, letter, SMS, etc.), and template ID. Regarding e-mail, ICCM can report how many e-mails were delivered, bounced, opened, etc.

Management Information (MI)/Surveys

This section describes the MI Metrics, Audit, Logging and Survey specifications for account opening. The area of MI is important to the Business in helping to understand how the account opening process is working and, how, by changing parameters in the process, effects may be seen in sales conversions, application abandonments, etc. Audit and logging are related more to the historical data being captured in relation to product applications. Surveys cover how data is reviewed to see how the application process is working, be it customer questionnaires or reasons for application abandonment.

Management Information provides the business with a single version of the truth through both a set of pre-developed out of the box core reports and the capability to access all logged data for ad-hoc data analysis. Core reports place the ability to drill through the data based on a range of dimensions directly in the hands of the business to understand performance based on combinations of customer type, channel and journey. Importantly, core reports have the flexibility to integrate new data values without IT involvement. In some embodiments, ad-hoc data analysis harnesses Cognos tooling to support core reports by empowering the business users with access to all data.

Data Logging provides the collection and cleansing of the management information from the other source components. Data logging includes both classic counts and also additional data required to provide a full end to end and multi channel view of the customer experience, marketing activity and sales process. Critically the data logging design looks to provide flexibility to log new 'values' against existing 'attributes' to move with the configuration of other components with minimal IT involvement. For example an additional value of ATM in the attribute of channel can be collected and cleansed seamlessly without IT intervention.

An Event Emitter may provide a consistent and configurable vehicle for capturing event data from various sources and 'sending' to various destination systems. This function is preferably business user managed through an appropriate GUI, enabling the business to actively manage what data gets logged to where and when Multiple journeys can be built side-by-side with variations such as test treatments, page layouts, branding, journey length or page navigation elements. Using different journey IDs, configuration IDs, content IDs or CPS test treatment codes, variations in journeys can be tracked by Metrics in order to see what impact the variations had on end-to-end performance. Differences in Journeys can be triggered by channel, product, proposition, country or other attributes or can be introduced randomly in order to perform an A/B test with all else equal.

In some embodiments, within a customer journey, this data is logged and fed out of the account opening system, but the customer is not transferred out of the customer journey at any stage.

In some embodiments, to allow complete flexibility of metrics analysis to the Business, all application related data is extracted for MI purposes.

The Business has the ability to define, run, and store queries over the data and extract the results into reports, so pre-defined reports do not necessarily need to be created.

For example, when a mini survey has been the presented and the user has selected to proceed, application form data will be saved for Staff User retrieval. If a previous save exists, the save on mini survey will overwrite/append to the existing save. No validation will take place. There will be no request to set up CAM credentials. There will be no email sent to the customer. It should be noted that the survey is presented based on entity specifications.

There are two distinct areas to consider in terms on the MI requirements for the account opening system, Non-Operational MI and Operational MI.

Non-Operational MI. In some embodiments, the areas covered by Non-Operational MI are Sales Journey Tracking, Process Tracking, and Customer-Level Tracking. In some embodiments, a tracking ID provides the capability to generate and assign unique tracking codes to various customer touch points and marketing efforts. The tracking ID is captured at the customer contact and retained throughout the subsequent journey to provide the business with visibility into the effectiveness of our marketing efforts and customer journeys. Tracking ID functionality preferably includes a full database build and business interface to generate and assign the unique tracking codes on an as needed basis, with no IT involvement.

Sales Journey Tracking. This area covers the aggregating of anonymous data related to journey tracking and trending. At this level it is purely anonymous data relating to numbers passing through and is not at an individual customer level.

Preferably, data is collected that shows how sales journeys progress, where they stop, conversion rates, time on page, etc. This is often referred to as the "Sales Funnel", where there are various stages of a sales journey defined and where it is important to be able to track how many people are entering and exiting each stage of the process. Tracking and collecting this data enables the Business to determine which customer journeys produce the best sales results, supporting the "test and learn" capabilities of the system.

By using "promo-codes" the Business can also monitor marketing campaigns for effectiveness and return on investment. A promo code can be entered by both a customer and a user in the branch CSR. For the branch and call center channels, any MI/audit trail associated with that promo/account opening should have a record of the user's name (e.g., picked up automatically by the system).

In some embodiments, "promo-codes" are historically linked with an application called Web Trends, which can track things like where customers are initially coming to the bank from (to determine how they arrived), average time spent on a page, pages where abandonments occur, number of visitors, journeys made, how many convert to sales, etc.—i.e., how people are using the system.

In some embodiments, the system provides a tagging capability for staff channels as well, to track how staff channel interactions are performing against the traditional sales funnel.

The Business can view and interrogate this data in real-time, so that they can respond quickly and make changes, if they spot a potential problem area in a customer journey, allowing them to compare journeys against each other.

Data acquired can preferably break down the results by channel, product type, customer type and milestone or component level.

In some embodiments, any "promo-code" type data that is captured (from any channel) as part of this process is passed through the entire account opening process and is ultimately passed to the back-end host systems to be stored against any new account that is opened to allow for the whole sales journey data to be tracked and be meaningful.

The "promo-code" may also drive certain product features, prices or attributes, which may impact the behavior of the application (e.g., marketing campaigns may offer introductory pricing).

Information that may be important to the Business may include, but is not limited to: volumes (hourly/daily/weekly/monthly/annually, page visits, landing page visits, originating pages (e.g., where navigated from), by product/product group, by channel, by currency, by customer type, length of time in the application, length of time on a page, etc.).

The following are exemplary specific account opening metrics: Sales Journeys, Portlets Hit, Number of Applications pending/abandoned, Number of Accounts opened/activated, Amount of applications requiring referral (and reasons for referral), Conversion Rates, Error Rates.

The following are more in-depth analytics functions that may, in some embodiments, require more in-depth analysis outside of the account opening arena: Response rates/success of marketing campaigns, Profitability of opened accounts, Customer acquisition costs, Cost per $000 acquired, Milestone specific data, Account opening processing time per account type.

Process Tracking. This area covers the data relating to process management and improvement. This is data that can detail, for example, average time for a milestone component to complete, average time to move from one milestone component to another, time it takes for an application to complete end-to-end, where abandonments occur more frequently, etc.

This enables the Business to employ the "test and learn" tactics to see what effect changing the process has on these types of statistics and to help spot potential problems areas that need addressing. For instance, if a particular milestone or component within a milestone always takes a long time to complete, the data could pinpoint this and the Business could think of a different approach, deploy it and compare if there is an improvement.

Customer-Level Tracking. This relates to the logging of key events that the customer undertakes during the account opening process.

In some embodiments, each time a customer completes a part of the process, this event is logged against their record so that the Business can see how an application to open an account progressed at an individual customer level.

For example, Application Statuses that a customer journey passes through may be tracked and time-stamped when the changes in Application Status occur at the customer level.

If there were large number of abandonments at a particular part of the process, for example, this may indicate something wrong at that point, which may need addressing.

Operational MI. In some embodiments, the areas covered by Operational MI are: Operational Performance, Operational Management, Save and Retrieve, Audit and Compliance, and Communications.

Operational Performance. This area covers data that is related to short term performance statistics. These statistics may relate, for example, to the performance of the queuing system within the account opening system, by which applications can be filtered by application status, so that staff can work through and clear outstanding applications.

By milestone or task, data may be acquired that measures how these applications are progressed and cleared. Exemplary areas of interest for statistics gathering may include, but are not limited to: Volumes of applications received in the queue that require action; Time taken to clear an action; Reasons applications are appearing in the queue (e.g. which application status, where in the process has the referral come from, etc.); Queue activity by individual staff members or by department/team; Sales MI for individual staff members or by department/team.

Operational Management. This area covers data that relates to the hands-on, day-to-day operational and resource management issues. This data may help the Business understand what applications are hitting the queue, in order that the Operations managers can ensure they have the right resource in the right place at the right time.

In various embodiments, this may include:

Ability to query account opening queue data over different time periods (e.g. hourly, daily, weekly, monthly)

Volumes being referred, reason for referral, and from which milestone component the referral originated from Data to track trends related to busiest times of day, busiest teams, busiest staff Ability to use data to determine if an area is deficient in resource at any given time and allocate other resource to assist (may involve giving temporary entitlements to staff to cover areas they do not normally cover)

Ability to monitor Service Level Agreements to ensure that applications are being cleared within the allotted timescales.

Ability to collect data that ties staff performance to sales targets (performance management)

Ability to monitor the different types of product and report how many products are being opened by channel, the propensity to apply for certain products through certain channels, etc. This is preferably at a system level, department level, agent level and channel Save and Retrieve. Preferably, information is collected that shows how the save and retrieve functionality is being used. This includes data showing how save and retrieve is being utilized and accepted by customers.

In some embodiments data is collected that can be queried by Business users, in one or more of the following areas:

Volumes being saved (including number of times the same application is saved)

Volumes being retrieved (including the number of time the same application is retrieved)

How long elapses between the save and retrieve stages

How many applications remain uncompleted after a retrieve has been completed

Number of saves per each milestone component (maybe if a couple of components showed a large number of saves it might point to an issue with the component)

Data of saves/retrieves by customer type, product type, channel

Data related to channel switches between the save and the retrieve stages (e.g. saved on internet, retrieved through call center, etc.)

Data related to application aging

Audit and Compliance. In some embodiments, an audit may be performed of applications received and details of actions that have taken place during the application lifecycle. This should be in line with audit requirements for existing account opening systems and should contain all relevant information.

Audit and Compliance teams may not need instant and continuous access to this type of data, but need to be able to pull it on demand when required, so preferably this data is kept on an on-going basis.

Communication. In some embodiments, data related to the Communications Module linked to the account opening system may be tracked. This may include, for example: maintaining an audit trail of a communication chain for follow up in case of issues (history); data related to process, performance and cost (e.g., how long does it take to issue communication, how many issued by each method, cost per method of communication, etc.); and monitoring of Service Level Agreements in terms of how quickly communication is issued against the targets. The Business can define and run queries specifically related to communication data.

Surveys. Surveys in this context refer to analysis the Business may wish to carry out in relation to the application process itself, rather than any analysis of other MI or metrics. These may include, for example, customer satisfaction and recommendation surveys. Such information may enable the Business to understand the application process to see if it can be improved upon.

A survey building function may or may not part of the account opening system. Either way, the Business can build surveys outside of account opening, which can then be "plugged" into the process at the point the Business wishes to place it. In some embodiments, this type of survey is placed at the end of an application process so as not to distract the customer away from opening the account.

Some examples of the type of survey the Business may wish to use are: Application Abandonment Surveys—what are the reasons applications being abandoned?; and Post Application Surveys—consulting the customer to appraise the account opening process.

However, with the ability to plug in surveys built outside of the account opening system, any customizable survey could be added as required, as long as data from the application can be passed into the survey (e.g., promo-code, application ID, product type, etc.).

Where surveys are included in the account opening process, all the data related to the survey is preferably stored and available to the Business to define, run, and store queries to drive reporting.

This data is preferably captured at an individual customer level, so that there is a direct link to applicants for any potential follow up, but may also allow aggregation to understand trends by customer type, product, channel, etc.

For example, if a customer provides comments (good or bad) about the process and is happy for the bank to contact them to discuss further, details may be captured at the individual level to allow this to happen. As a by-product, this process will also capture customer type, product, and channel information thus allowing trending analysis.

This data allows in depth analysis of the application process to see where improvement might be made. In addition, with the flexibility of the system and milestone components, the Business can easily test new scenarios based on the feedback of such surveys.

Queuing and Work Presentment

Queuing and Work Presentment empowers frontline staff to be able to view and manage the status of a service request even if it is being fulfilled in another part of the world. The organization is thus enabled to segment and serve customers according to a defined segmentation strategy by utilizing country-level customer and product segments. Regional practitioners can add/maintain/delete work queues with minimal IT engagement. Local and global users can resolve, fail, close, pend, prioritize, update, sort, transfer, assign, age or assign reason codes to work items.

The Queuing and Work Presentment component provides the capabilities for queuing and manual processing of work managed by back-office staff who access the queues and resolve the work items. The invention provides the ability for local frontline staff to manage and resolve process exceptions within a global system.

Manual processes can be standardized across the Group (e.g., lowering overall costs) and managed in centers of excellence. This can, for example, reduce the need for highly skilled or specialized staff to perform certain tasks and allow for measurement of processes and results that can then be tested and optimized via removal and/or re-engineering. Further, centers of excellence can monitor and manage workflow, efficiency and quality by utilizing various operational reports such as activity reports, hourly queue volume reports and location/unit activity reports.

Add/maintain/delete work queues maintenance is preferably completed by practitioners with minimal IT engagement. Examples include:

- Reason Code Configuration—Ability to create/define response to reason codes (e.g. create work items whenever reason code 123 is triggered)
- Resolution Code Configuration—Ability to create/define resolution codes
- Trigger work items during the journey—Ability to trigger work items during the journey and create them in QMS once the journey is completed and submitted
- Work Item Maintenance—Ability to resolve, fail, close, pend, prioritize, update, sort, transfer, assign, age or assign reason codes to work items. Users can also enter work item notes.
- Configure work item priority—Ability to assign a priority to a work item. Ability to define interdependency among work items so that an unfinished critical work item prevents other work items from being pushed to staff until complete.
- View Work Item List—Work Item list can be viewed from Staff Dashboard, App Maintenance page and App Overview page. List can be sorted by the column headers.
- Work Item Search—Ability for user to search for work items. Search results can be sorted, include pagination and provide the ability to select work item from the results. Search criteria—associated applicant's first and last name, Application ID, Work Item ID
- View work item detail—Ability to view work items details, regardless of status and user entitlements. Details included: Work Item ID, Associated application ID, Queue name, Product, Priority of the work item, Urgency level, Associated reason code and description, Existing user action history/comments, Date/time last modified
- Work item duplicate check—Duplicate check to ensure that the same work item triggered by the same service/reason is not triggered more than once for an applicant.

The Queuing and Work Presentment component includes a maintenance tool to provide the ability for staff to resolve, edit or 'work' in-flight applications or process flow items that require human intervention, such as:

- Application Overview—Consolidation of application maintenance, Queuing, and application history into an "Application Overview" page that presents all the details of an application
- Maintain Application Data—Ability to maintain Account Opening (AO) application data, including Material Data (organized by links), and save the changes made (Material Data is entity-configurable)
- Maintain Application Step Status—Ability to maintain application step status on a per product by applicant basis (Validate Identity and T&C only)
- Maintain Decision Status—Ability to maintain product decision status (to denied)
- Cancel Product—Ability to cancel a product within an application
- Cancel Application—Ability to cancel an application (by canceling all products individually within that application)
- Application Search—The ability to search within both Application Search and QMS for multiple search criteria. Users can show/hide search results, view applicant lists, view application lists or create new applications from the search page. Application Search also includes the ability to perform wildcard searches.
- View Application History—Ability to capture systemically and view all captured Application History
- View Application Notes—Ability to view and capture Application Notes (but not maintain after capture)
- Attach Document ID—Ability to attach one or more document identifiers (Document ID) to the application
- Disable Communications—Ability to enable/disable communications on a per applicant basis
- Add applicants—Ability to begin an un-started journey for additional applicants in a multi-applicant application
- Resume a saved journey—Ability to continue a saved user journey
- View To-Dos—Ability to view To-Do items for an AO application Queuing and Work Presentment also provides local data capabilities, manual processing, document attachment and reporting. These capabilities include:

- View local entity data/scores—Ability to support storage of local entity data such as credit bureau scores (Entity to define how the data may be re-used e.g. in a re-decision)
- Display local entity data—Ability to display the local entity data is supported in Application Maintenance (Entity work required to define the display formatting)
- Time zone recognition—Ability for QMS to record and present time in entity's local time zone
- Present Funding Status—Presentment of funding status in the funding portlet
- Connect documents to work items—Ability to associate applicant documents to a work item.
- Re-decisions—A re-decision can be triggered manually or automatically when decision-related work items are resolved
- Process Resuming—When all work items associated with a service are resolved/closed/failed, the associated process/macro service can be re-run automatically or automated process can be disabled depending on the work item configuration.
- Manual product denial—The ability to decline a product automatically and close remaining work items where a critical work item status has been changed to "failed"
- QMS reporting—Real time operations reports will be provided: Activity Report, Hourly Queue Volume Report, Location/Unit Activity Report Staff Facing Maintenance Certain maintenance functions are part of the account opening process, which allow staff members to perform duties required to move the process forward. This section describes the back-office staff-facing maintenance functionality related to account opening, but does not consider any staff maintenance functions outside of account opening or any maintenance required post account activation.

Maintain Milestone Status/Application Details. This functionality relates to the milestone status and the queues that take referred product applications for staff to review.

The aim of account opening is that as many accounts as possible will be opened automatically, without the need for any staff intervention. However, as described previously, in some embodiments this is not possible for all applications and so some may have to be referred to staff members for manual action.

The staff members should be able to change the milestone status/application details in order that the application can be progressed. For instance, if the application has been referred because the Validate Identity milestone is pending (e.g., for a fraud review), when the fraud review is complete, the staff member responsible may maintain the status of the milestone that is awaiting this review to take place, so that its status can be changed to Completed or Failed.

Whenever a milestone status is updated, the system can automatically re-assess the milestone statuses that exist at that time to see if the rules set by the Business now mean the application can be approved, is to be declined, or still has other milestones in a pending state that still require action.

In some embodiments, if the system assesses that the application can now be approved, the system will automatically submit the application details to the host system to open the account.

If it declined, the system may automatically issue a request for a communication to be sent to the customer to the communications module, if the customer experience created specifies it.

If the application remains pending because there are other milestones outstanding, then there is no further action to take at this time, other than to clear the other milestones when possible.

Another example could be if a customer requests an application that is cancelled.

This ability to clear an application status may be required, for example, if the status is 'Awaiting T&C acceptance' and the customer accepts (e.g., they send in a signed copy of the T&C acceptance); then the entitled staff member should have the ability to mark this action as cleared.

The user also has the option to add free format notes to the application at any time.

Each status change may be logged, so that a date and time stamp and user details are recorded against each status change to allow tracking of application time-scales and any areas where delays may be occurring. This data can feed into the MI and audit section.

In some embodiments, if there are not and the application is now ready, the system will trigger the next step of the account opening process automatically.

In some embodiments, local entities may have their own existing solution for handling pending applications. The local entities may still wish to use their current systems to check the reasons for pending, but in order to progress the application, the milestone status should be updated in the account opening system.

This may provide the opportunity for an integration point between the account opening system and the local system (e.g., when cleared in local system, a milestone could clear automatically in the account opening system). In some embodiments, this could be a local enhancement and not part of the core account opening system.

In various embodiments, staff can access/maintain all product(s) within the application by searching with a single reference number, and/or maintain an overall Application status, as well as product-level milestone status(es)/details, as defined by the Business.

The level of access at which the user is allowed to maintain overall application status or milestone level status or application data may be governed by the user's entitlements.

In certain embodiments, milestone status that is blank or 'Not Started' can also be maintained by an entitled user.

In some embodiments, the system may provide an option to 'Cancel' a pending application. 'Cancel' can be viewed as an overall application status.

In some embodiments, an application with a 'Cancelled' state can be 'reinstated' within a grace period defined by the entity. During this grace period, all application details/milestone status should be retained to avoid re-inputting the application details should the application be reactivated.

In some embodiments, a 'Cancelled' application is only allowed to be 'reinstated' within the grace period (entity definable) by a member of staff (not a customer). However, a record should be kept that an application has been attempted but cancelled.

When an entitled user performed an override of core elements like rates, the system optionally provides the ability for a notification to be sent to the supervisor of the override. The supervisor should also be enabled to perform a query for the types of overrides.

Maintain Milestone Statuses. An exemplary list of applicable milestone statuses valid through the lifecycle of an application is given above in connection with activating an account. There may be occasions where this list needs revising to capture new application statuses. In one or more preferred embodiments, the Business has the ability to add new milestone statuses to this list and have them immediately available in the system.

Maintain System Reference Data. Reference data refers to the static items of data that the system requires in order to complete certain tasks.

As used herein, any reference to Business maintainable parameters (e.g. to determine the expiry date of an application) refers to system reference data.

The system provides the Business the ability to maintain any account opening system reference data that may be used in the system. Thus, any static parameters that the system uses to drive account opening functionality may be editable by entitled Business users.

Entitlements

This section describes the entitlement ('rights/limits') considerations for account opening. Entitlements refers to the area of functionality that decides which users (customers, prospects, or staff) can access which screens, information or functions. This allows control over the information that any user can access at any given time. Users move through ID&V (User ID, Password, Security Questions, etc.) and access functions based on entitlements.

Entitlements reduces both risk and cost by consolidating access control into one global system. Entitlements can prevent fraud and data breach, and can enable role standardization across the organization. Together, Entitlements and ID&V create a framework to support the organization's compliance with security, privacy, and/or data loss requirements, while still allowing users to access appropriate functionality.

The Business preferably has the ability to set and maintain entitlements to functionality, for example by:
  User
  User type (staff or customer)
  User group (maybe a certain team has access to certain functionality)
  User role (e.g. manager, team leader, etc.)
  Product type (maybe only certain staff can sell and open certain products e.g. licensed financial planning managers)
  Channel
  Customer group/segment Field (maybe only certain staff or teams can action certain referred application statuses e.g. fraud checks)

Within the staff members, there may also be the need to only allow access to certain functions to certain staff (e.g., someone releasing payments should not be able to also complete the fraud checks due to the potential audit implications).

In addition the system provides the ability to restrict the data that may be viewed as an application is progressed. For instance, in Mexico, as an application progresses it may be passed from department to department. In preferred embodiments, the system provides the ability to prevent staff in other departments from viewing the data or decisions that have gone before.

Considerations for entitlements may include, but are not limited to, one or more of the following:
- Permission to use certain functionality
- Permission to access/view certain fields
- User has edit or read only access
- Different entitlements when deployed in different channels
- Personal customers vs. CMB customers (maybe split even further, e.g. Premier PFS vs. PFS)
- Staff vs. Customer
- Who will administer the access rights?
- Classes/groups of user
- Approval of transactions (dual authorization may be required). Entities should have the ability to decide which functions are dual and which are sole control.
- Transaction Limits
- Pricing Overrides (e.g. for certain entities, haggling about the price is part of the account opening process)
- Additional users outside of the Bank, such merchants, who may require access
- Restrict account opening based on product, channel, customer type
- Languages available for screen display
- Ability to create, maintain and delete individual users, user groups (e.g. department level) and roles (e.g. manager, team leader, supervisor, etc.)
- Ability to allocate users to user groups or roles
- Ability to control rights management of individual users, user groups or roles (e.g. read only or edit access)
- Ability to run reports that detail who has access to what (at User, User Group and Role levels), and audit reports detailing when any changes to entitlements have been made
- The ability to support or block data sharing across entities, business units and countries, where allowed
- Ability to restrict access to data and/or functionality by third parties who are acting on behalf of the Bank (e.g. where a call center is outsourced but to the customer, it appears to be Bank staff)
- General Entitlement System Capabilities include:
- Security Policy Decisioning and Enforcement—This feature enforces the user's entitlements and constraints at portal, page and field level for staff and customers.
- Obligation Enforcement (Data Masking, Truncation, Data Replacement)—Enables entities to mask or obscure certain data items depending on a staff member or customer's roles.
- Union of Staff and Customer—This feature ensures both the customers' and staff members' entitlements are enforced during any staff on-behalf-of-customer action.
- Dynamic Segregation of Duty—This feature prevents users completing certain combinations of tasks that are open to fraud—e.g. preventing the same user creating from creating and authorizing a payment.
- Role and Permission Based Access Control—Allows for both role based control (where permissions are assigned to roles and roles assigned to people) and permission based control (where permissions are assigned directly to people).
- Constraint Conflict Management—Manages conflicts where permission with conflicting constraint value is being associated with the user.
- Service Level, Product Level and Arrangement Level Entitlement Assignment Configuration—This feature enables entities to configure which customer permissions should apply at service, product and assignment (account) level.
- Entitlements FE Admin/Servicing Screens provide generic FE screens/portlets for any proposition for customer and staff to manage customer entitlements (permissions and constraints/limits at relationship and account level) and staff role constraints/limits. The User Interface is driven by underlying entitlement configuration which supports entity customization. The User Interface is configurable by business. Entitlements capabilities may include, for example: Search, view, add and modify customer role access; Copy access from customer role or user; Delete customer role; Multi authorization and signature group set-up; Signature group assignment; Permission Assignment (Customer); Constraint Management (Staff and Customer).

Appointment Diaries

Some countries may optionally allow a user to book appointments online for a customer to meet with staff, during the account opening process, where a follow-up action may be required. This is not limited to an appointment face-to-face, but could involve appointments for meeting by any channel where this facility exists.

The user (customer or staff member) may be given the option (or could be instructed to if an appointment is mandatory for certain products) during an application to schedule an appointment for a customer to talk to a member of staff about their account opening application. This could be an appointment to further discuss details about the application or to provide further documentation that is required to support the application and any regulations surrounding proof of identity.

In some embodiments, this functionality may use an interface from the account opening system to one or more local appointment booking systems, which allow the user to book an appointment in those systems as part of the application process.

The handling of that appointment after it is booked may then be performed by the local system. There may or may not be management of appointments (other than the initial scheduling) within the account opening functionality.

The Business should have the flexibility to add this functionality to the user experience wherever they require it, with the ability to move it around if it proves it would be better in another part of the account opening process.

Online Help

The account opening system is simple and intuitive to use, and the need for user manuals is eliminated where possible. However, help support may be needed, and so in some embodiments field context help is provided to ease the application process as it is running. Context help can be on three levels: page level, processes (portlets), level and field level. Field level may also include interactive components such as URLs and buttons. Entities can also define different help text depending on channel and/or field.

Context Sensitive Help. For certain pages, processes (portlets), and data fields presented in the application, it may not always be obvious what is expected of the user, or the user may have a different interpretation of what is being asked. Context sensitive help for data fields may also include selections within groups of available options (e.g., drop down lists, radio button groups, etc.), URL links, and buttons. Any help text is preferably locally editable for language and experience needs.

The Business has the ability to define and deploy context sensitive help that will be displayed to the user as they are progressing through the application. This may include, for example, the maintaining of help text (creating, amending, deleting) and the ability to deploy any newly maintained help text into the system within a Business maintainable, specified time period. This may not be required for every data field, so the Business should also have the ability to choose which page process fields or selections this is required for. For example, when the user moves the mouse over a page heading, sub heading field (field name or help icon after field) or selection, then the help text for that field may be displayed immediately to the user.

Other Options. There may be other options available that are provided outside of the account opening system that may also allow for online help, which may in some embodiments be leveraged in the customer experience for account opening. In such cases, the account opening application form configuration tool can pull them into the account opening screens. Exemplary options in this category include: Click for Call Back; Click to Chat (instant messenger chat); Contact Us; and Co-browsing capability (e.g., a member of staff can allow a customer to share their interne session with them in order to view the application and guide them through the process).

Post Booking Review

In some cases, additional signoffs or reviews may be necessary based on the customer's responses to certain questions. For example, if the customer's answers flag them as being SCC, a sign-off from Fraud or compliance may be required following the account being booked. This means the application will be put in a status to be worked by some select area in the organization.

In addition, certain funding options may require the customer to perform actions outside of the account opening process in order to fund. In these cases, actual funding may not be a requirement for the milestone to complete and the account to book—for example, the applicant saying a check is in the mail may be good enough.

After the account books, the system provides the ability for notifications to be set up in order to remind the customer to complete the funding portion of the application. The notification system should be aware of whether or not the funding has occurred. For example, if the customer is online and decides to fund by mailing a check, the account would book with no initial funding and the customer would be responsible for sending in the check. In some embodiments, if the check is not received, a process using analytics may monitor recently booked accounts at $0 balance and trigger the communications module to send a reminder. The account opening system may or may not actively manage funding status for paper checks mailed in or direct deposit/payroll deposit.

AO Integration

Internet Banking Site(s). In some embodiments, the Account Opening Process is an end-to-end process, with a single entry point and a single exit point. Exemplary entry/exit points are described in the user journey activity diagrams/use cases.

In some embodiments, the e-sales process within Account Opening is a generic process that caters to applications (using the Web Application Builder) for PFS and CMB customers. The applications can be customized to support Savings, Current, Term Deposits, Credit Cards, in varying degrees of STP. Local entities may need to tailor the e-sales process at the time of implementation to suit local product types and integration into back-office.

For customers navigating via a Public website at CAM 0, the customer is preferably re-directed to the Account Opening process based on the Product selection—that is, if the underlying product selected is supported. In some embodiments, a Multiple Entry Points (MEPS) feature is supported for existing internet customers browsing at CAM 0 and then making an application.

Single Click Buy: In some embodiments, within the drop down list for "Open New Account" or "Open New Term Deposit" (e.g., Single Click Buy), if there are any PFS products/currency in the local entity that cannot be accommodated by the Account Opening process of the current invention, one or more existing account opening processes may continue. Similarly, within the drop down list for "Open New Term Deposit" (e.g., Single Click Buy), if there are any CMB products/currency in the local entity that cannot be accommodated by the Account Opening process of the current invention, one or more existing account opening processes may continue. In addition, within the drop down list for "Open New Account" or "Open New Investment" (e.g., Single Click Buy), if there are any Amanah products/currency in the local entity that cannot be accommodated by the Account Opening process of the current invention, one or more existing account opening processes may continue.

Accounts that are "Opened and Activated" via the Account Opening Process may be reported in a month-end overall MI report for the internet channel.

Branch Channel. In some embodiments, HFE supports Account Opening for Demand Deposits (Savings and Current Accounts). Products/currencies/Customer Groups that are supported by the Account opening process may use this function on HFE.

Call Center. Within the drop down list for "Open Account" (i.e. Single Click Buy), if there are any Term Deposit products/currency/customer group in the local entity that cannot be accommodated by the Account Opening process of the current invention, one or more existing account opening processes may continue.

In some embodiments, certain predetermined Call Center application functions may also be used by branch users, in order to converge capabilities onto a common Staff Channel infrastructure.

In Session Data

In preferred embodiments, the account opening system allows users to personalize specific pages and allows Business to track information related to authenticated and non-authenticated customers. This may enhance the ability to cross sell through the Sales Tools/Modules (e.g., SCM) in use. This feature may be available, for example, for Internet Banking customers (PFS and Retail CMB) as well as non-authenticated users that visit the Public Websites/brochureware sites.

Features may include, but are not limited to: Ability for a user to customize specific pages or account views (e.g., set default page, hide/show account information, brand my session); Update and maintain all relevant user session data; Ability to track existing and new customers who visit specified Bank website(s); Enhance Sales Tool to utilize stored data. Benefits of these features may include enhanced customer segmentation and reporting, increased cross and up sell, and enhanced customer experience.

Examples of in session data use include the following:

Unique key Generation. A first time user visits the website and browses two pages, Insurance and Credit Card. A unique key is generated and the interest level of both the page is recorded in a domain cookie and a database. The unique key generated should remain the same every time a customer visits the website from the same PC.

Identify and Retrieve from cookie. A CAM 0 user returns to the website. The customer is identified based on the unique identifier in stored in the domain cookie and data history is retrieved to aid in displaying relevant content.

Identify and Retrieve from DB. When a CAM 0 customer returns, the system checks for a domain cookie on the user's PC. If a domain cookie is not available, the system searches the database with the unique number and retrieves data about the user's page visits and any other information. The system then updates the domain cookie and the database cookie with the latest information (e.g., page visits, personalization, profile info, etc).

Domain cookie exists. When a CAM 20/30 customer logs in, the system checks for a domain cookie on the user's PC. The system associates the unique ID with a Customer Identification Number/Business Internet Banking Identification Number (CIN/BIBID) and updates the domain cookie and the database. The system then updates the domain cookie and the database cookie with the latest information (e.g., page visits, personalization, profile info, etc).

Domain cookie does not exist. When a CAM 20/30 customer logs in, the system checks for a domain cookie on the user's PC. If a cookie is not found, the system searches the database with the unique number. The system associates the unique ID with a CIN/BIBID and updates the domain cookie and the database. The system then updates the domain cookie and the database cookie with the latest information (e.g., page visits, personalization, profile info, etc).

No Domain cookie and no DB cookie. When a CAM 20/30 customer logs in, the system checks for a domain cookie on the user's PC. If a cookie is not found, the system searches the database with the unique number. If the database also cannot find a corresponding record, the system creates a domain cookie and a database cookie with the unique identifier and the CIN/BIBID. The system then updates the domain cookie and the database cookie with the latest information (e.g., page visits, personalization, profile info, etc).

Applications to access cookies from multiple domains. When a customer browses the Bank's AO website, the browsing experience may be cached in either a domain cookie on the PC or in a database. Then, when the customer browses the Bank's general website, the AO website cookie should be retrievable to aid in displaying relevant content. The system updates the respective domain cookies with the behaviors of the respective websites.

The database for in session data stores all required data. The data should be accessible to any front-end application or Sales Tools. Fields/data to be cached should be configurable and updateable by Business in easy steps. For example, the number of days to for the application to expire should be configurable. Data should be deleted from the database automatically after the "expiry days" have passed.

Additional Specifications

Customer Database. Preferably, the system uses a single group standard customer database. In some embodiments, the customer database that all software is certified against is CDU. However, not all countries necessarily use CDU. In some embodiments, the account opening system may provide a standard interface (certified for CDU) for submitting and receiving customer data. For any country that is not using CDU, there may be a degree of regional IT customization required. For existing customers, who have passed through the identification and verification checks, if they apply for a new product, all of their existing data is preferably available automatically during the application process and any application forms that are presented to the customer will automatically be pre-filled with any of the existing data held in the customer database. As previously mentioned, it is feasible that for existing customers an entity may not wish to display the existing data to the customer (e.g. in the "One Click Buy" scenario), but the data is preferably present in the background and is attached to the application.

Security. In some embodiments, there is a mechanism to authenticate a user for log in so that only legitimate people can submit applications and inquire on their status. New customers (or existing customers without credentials) may, for example, create their own credentials online, which can be used immediately to access their newly opened Account or to view their saved applications.

ID&V provides the capability to support username, password and token based validation of identity on return visits of customers and non-customers. ID&V system capabilities include: Single Sign On (user signs on once and this login applies to all navigation across services the organization's platform); OTP One Time Password (user accesses system with a single-use password); Device ID (ability to use vendor solution in order to identify the customer or customer's device of access, e.g., 41st Parameter); and Transaction Signing. In a function protected by Transaction Data Signing, the customer enters details about the transaction (for example the last 6 digits of a destination account number) in to the OTP device (e.g., the Vasco DP270) which then generates a unique transaction authorization code which is specific to that transaction and the customer's OTP device. This code is entered back in to the channel and only if the correct code is received by our servers will the transaction proceed.

Security standards may be set globally with less interpretation required by local security teams, but standards can be amended to meet local regulatory requirements, individual entity threat/risk landscape, etc.

Capacity. The capacity of what the account opening system can handle is preferably in line with a standard interne proposition found in the industry/best practices in terms of the following items: Expected Transaction Rate (e.g., for one bank U.S. cards alone handled 27 million card applications in 2007), Expected Transaction Peak Rate (maximum expected), Expected number of users (customers and staff), Data Storage required, and Robust Service Level Agreements. When considering the number of users, this includes both customers accessing the system via customer channels and staff users accessing the system via staff channels, as they can all be accessing the system at the same time.

Availability, Support, Reliability. Preferably, the system is available 24 hours a day, 7 days a week, 365 days a year. Each function supplied is able to perform as designed at all times.

As described above, the product application may be saved as it is being captured, so in the exceptional case of, say, a power failure, when the user resumes the application, data already entered and saved will not need re-keying.

Site Adaptation. Due to regional requirements (e.g., local language, compliance and regulatory issues, etc.) some degree of local customization may be required to the "out-of-the-box" software if a site has any special requirements. Any regional best practices are preferably incorporated into the system.

National Language Support (NLS). In some embodiments, the system supports local languages of different sites in addition to English language. This support may include, for example:
- Ability to capture, store and display data for all languages and character sets belonging to those languages (e.g. double-byte character sets, Cyrillic character sets, diacritics, etc.)
- Support for display of screens, field labels, error messages, help text, etc in the user's preferred language (e.g. French, English, Chinese in Canada)
- Support for the user to be offered and be able to toggle between supported languages
- Ability to support at least 2 languages concurrently, one of which should not necessarily be English. For instance the system may support 2 languages concurrently but one of them has to be English. However a country such as Algeria has French and Arabic as spoken and/or legal communication languages, so requires 2 languages other than English.
- Ability to generate communication in a customer's preferred language with the ability to include more than 1 language per communication (e.g. address in English, text in Chinese or, as in the Algeria example from above, the legal signed copy of a terms and conditions is required in Arabic but a French version might also be supplied to aid the customer's understanding of what they are signing)—preferably covered by the communications work stream
- Ability to capture a customer's name in local (2nd) language (e.g. required by Asia Pacific and Middle Eastern countries) and indicate which name should be used (This is an additional name field—so the customer profile may have two name fields, one in English (for example) and one in Chinese (for example)
- All content should be externalized, so that the Business can make any changes and apply them, without the need to engage IT resources to complete Usability. In some embodiments, the system supports system requirements that require compliance with accessibility and disability laws (e.g., providing bigger font size options for customers who may have vision impairments, etc.). However, as accessibility/disability laws may vary from country to country, during the local implementations it may be necessary to audit the core system to ensure it complies with any local regulations surrounding accessibility (e.g., section 503 standards in the U.S., Disability Discrimination Act in the UK, etc.). This preferably extends to communication materials that could be required, for example, in Braille, large print or audio.

Other. In various embodiments, additional functionality of the account opening system may include one or more of the following:

JSP files are preferably editable by the entity without IT intervention and without code deployment to make the JSPs live.

The entity may configure (without IT intervention) whether each application form requires secure access. The entity may disable browser auto complete features for any application form.

In some embodiments, Web Analytics (e.g., Web Trends) and MI logging are supported.

The application preferably provides a facility to validate/check the validations applied and the backend database communication implemented without deploying the forms into a production/UAT/Test environment. The application also preferably provides a facility to generate separate reports for validation applied to individual fields and backend database implementation.

The entity may configure (without IT intervention) whether the data held in session for application forms is cleared on exit of the application form.

The loading time for the application/form should be within the set time limits. The application tool is preferably able to fully load a form for display in the designer within a specified time (e.g., X seconds) during the peak access period. All graphics and text of the designers fully load in under X seconds during the peak access period. Output forms without graphics and without custom validations also fully load on a page in under X seconds during the peak access period. If the application is using CAPTCHA within the form, the response time from the CAPTCHA server should be well within the set turnaround time Preferably, the application provides a sample backend implementation for host database; provides the facility to customize the backend communication to the host database as per the business needs; and provides a common implementation approach that facilitates the business to connect to the database of choice.

Architecture Specifications

System Architecture

The system architecture supporting the Account Opening process is described below. This section covers component and operational models, security, data architecture, and services architecture. These system architecture models define the system design in terms of functional and physical models and by showing the placement of the IT solution on platforms. Technical detail is provided, for example regarding software and hardware, application structure, network infrastructure, system management, and environments.

Figure 38:
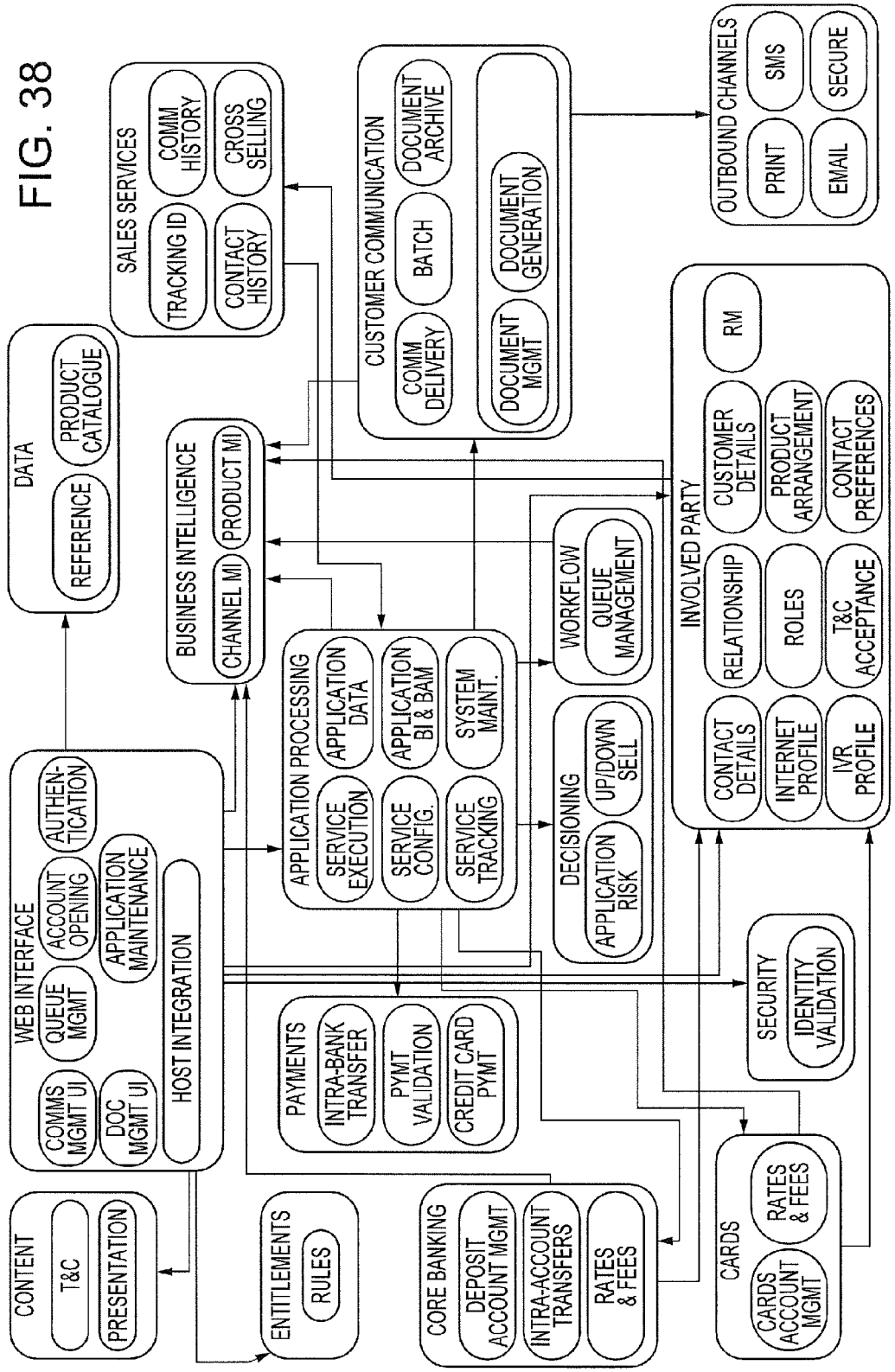
FIG. 38 is a diagram showing an exemplary architecture of the Account Opening System according to some embodiments.

FIG. 38 depicts the high-level functionality that is included in the Account Opening invention. This is the target functional break-down, subsequent figures will illustrate the break-down.

Table 8 provides a summary of the functions provided by the various logical components in the Account Opening system, grouped by functional area.

TABLE 8

| Logical Component | Description |
|---|---|
| Content | |
| Terms and Conditions | If used, Static content used to build Terms and Conditions for a customer. T&C's can be universal, product or customer based (also may include T&C's specific to a delivery channel - Phone Banking or Internet) |

TABLE 8-continued

| Logical Component | Description |
|---|---|
| Presentation | The content used to build the presentation view to the customer or agent |

Entitlements

| | |
|---|---|
| Rules | Defines how a user may use the Account Opening system |

Core Banking

| | |
|---|---|
| Deposit Account Management | Owns the creation, transaction processing, and maintenance of deposit accounts - including Term Deposits, Checking, Saving accounts. Provides ability to configure options for a supported product. |
| Rates and Fees | Define the rates and fees that will apply for a given product. These rates/fees may be specific to the customer and their relationship with the Bank. |
| Intra-Account Transfers | Supports the movement of funds from one HSBC deposit account to another |

Cards

| | |
|---|---|
| Cards Account Management | Support the creation and maintenance of Card related accounts - including ATM/Debit and Credit cards. |
| Rates and Fees | Define the rates and fees that will apply for a given product. These rates/fees may be specific to the customer and their relationship with the Bank. |

Web Interface

| | |
|---|---|
| Communications Management UI | The user interface to maintain communication preferences |
| Document Management UI | The user interface for maintaining documents |
| Account Opening Application | The user interface to support Account Opening activities for customers and staff |
| Maintenance | The user interface to support the maintenance of Account Opening applications |
| Authentication | The user interface to allow a customer/agent to authenticate themselves into the AO System. |
| Queue Management UI | The user interface for maintaining work items in the Queue Management System |

Payments

| | |
|---|---|
| Payments Validation | Validation of a payment, including verifying the debit/credit sources |
| Credit Card Payments | The ability to debit internal credit card accounts as a means of funding new accounts |
| Intra-Account Transfers | Supports the movement of funds from one HSBC account to another |

Security

| | |
|---|---|
| Identity Validation | Validating the identity of a new/existing customer. |

Data

| | |
|---|---|
| Reference | Common data that is used by multiple channels, and systems. Examples include currency codes, country tables. |
| Product Catalogue | Maintain the metadata associated with a product - rates, fees, attributes, etc. |

Business Intelligence

| | |
|---|---|
| Channel MI | Capture of business intelligence data from front-end and non-product system applications |
| Product MI | Capture of business intelligence data from product systems. |

Sales Services

| | |
|---|---|
| Contact History | Capture significant contacts between the Bank and customers. |
| Cross Selling | The ability to sell a customer products similar to the ones they have selected. |
| Communication History | Storage of customer communications history |

TABLE 8-continued

| Logical Component | Description |
|---|---|
| Tracking ID | Storage of a product identifier (previously known as promo code) from the local channel application for end to end product traceability |

Application Processing

| | |
|---|---|
| Service Execution | APe will expose numerous Macro Business Services required to open an account. These Macro Services will be the entry point into Ape, they will have access to Save and Retrieve Application Data, and they will execute the Macro Service via any number of Sub-Services per the Service Configuration tables. |
| Service Configuration | Includes Service Rules that define the entry criteria for a Macro Service. Enables multiple execution paths for different Macro Services, application types and conditions. |
| Service Tracking | Includes the logging of all activity related to the application, and maintains the state of the application and products within the application. |
| Application Data | The data that is either entered by the customer or the system as a result of completing an account opening process. The data is similar to what would be entered onto a paper-application form |
| Application BI and Business Activity Monitoring (BAM) | Application BI will be generated via regular feeds from the Service Tracking tables. BAM will provide the ability to understand what is happening within the AO System - including the ability to retrieve statistics on the number of in-flight applications, saved applications, etc |
| System Maintenance | Provides the functions necessary for general system housekeeping and administration. Provides application archiving, aging, expiry logic. |

Decisioning

| | |
|---|---|
| Application Risk | Before offering a product to a customer/prospect, the bank will evaluate the risk that the application has. This can involve reviewing the customer details, and the product they have selected. |
| Up/Down Sell | As a result of an application decision, the bank may wish to provide the customer with a product that is either higher or lower than the product they had selected. This ability is tied to an application decision. |

Workflow

| | |
|---|---|
| Queue Management | Supports non-STP activities with AO. Examples include fraud checks that are to be completed by bank agents; follow-ups that require customers to submit signed documents, etc. |

Involved Party

| | |
|---|---|
| Contact Details | The details on how the bank will contact the customer |
| Customer Details | Details on the customer |
| Relationship | Link between customers i.e. no business need to understand the details, e.g.: Husband/Wife. |
| Contact Preferences | How the bank should contact the customer - such as only after 5pm on Friday. How alerts triggered by a product system should be delivered. (Alerts are de-scoped from AO 1.2) |
| Terms and Conditions Acceptance | Used to capture the acceptance of Terms and Conditions with the bank. These can be used in subsequent AO applications to ensure customers are not requested to sign something they already have completed. |
| Phone Banking (IVR) Profile | The details around a Phone Banking profile - including available accounts, limits, etc |
| Internet Banking Profile | The details around an Internet Banking profile - including available accounts, limits, etc |

TABLE 8-continued

| Logical Component | Description |
|---|---|
| Product Arrangement | Link between customer and arrangements which have with bank |
| Role | Link to customer that business needs to understand the detail, e.g. guarantor, beneficiary |
| Relationship Manager | Assign an RM to the customer |
| Customer Communications | |
| Communication Delivery | The delivery method for communication |
| Document Management | Manage documents, retrieve from archive, generate, etc. |
| Document Generation | Creating documents from templates and dynamic data |
| Document Transformation | |
| Document Archive | Long-term archive for documents |
| Outbound Channels | |
| Print | Ability to print generated documents |
| SMS | Delivery of communications via SMS channel |
| e-Mail | Delivery of communications via e-mail channel |

Figure 39:
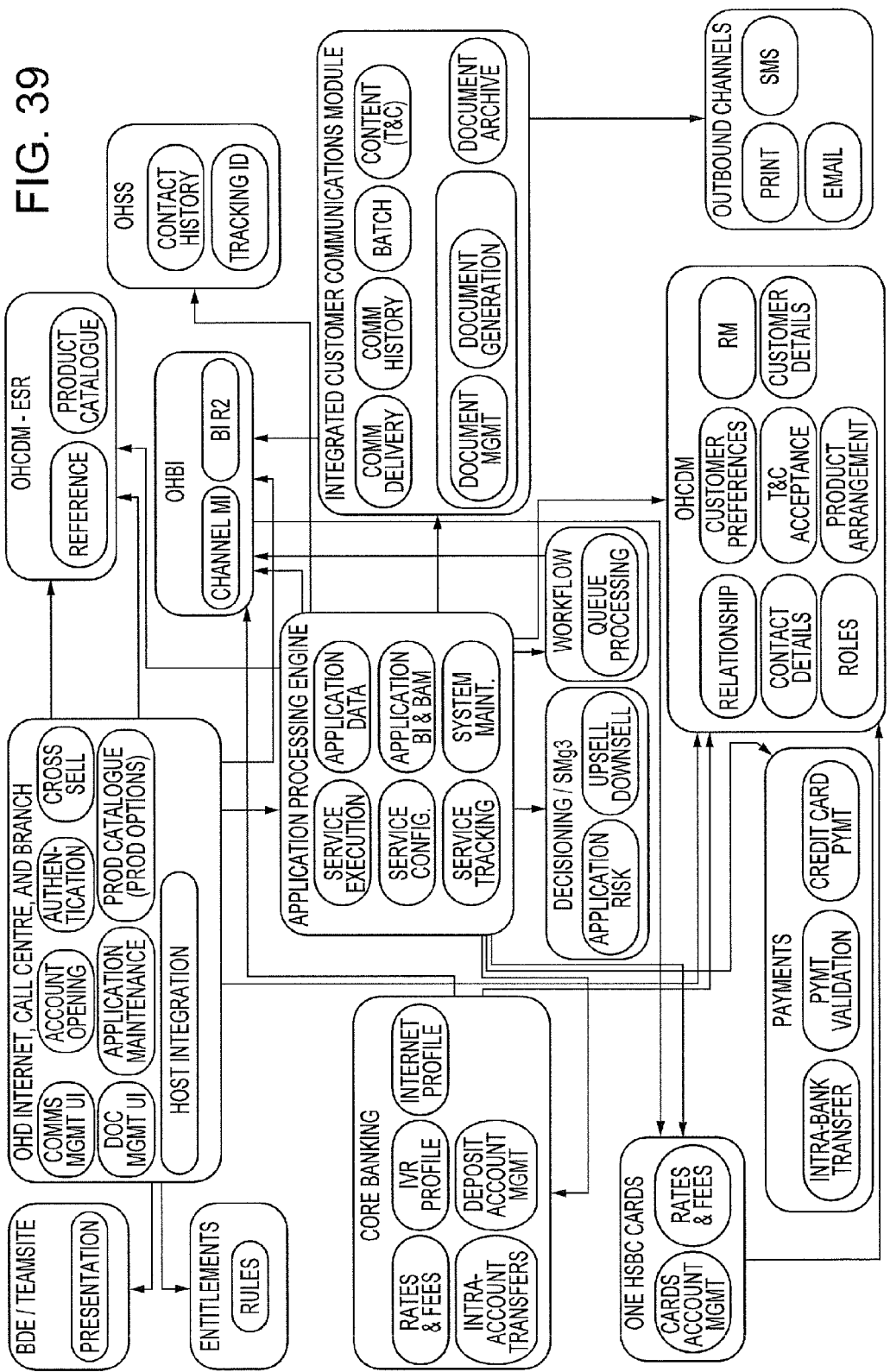
FIG. 39 is a diagram showing an exemplary physical architecture of the Account Opening System.

Based on the logical architecture break-down, an exemplary physical architecture of the Account Opening System is shown in FIG. 39. The system is based on components. This physical architecture is one example of a possible architecture; locations of certain functional areas may vary, and in some cases the system architecture may bear stronger resemblance to the logical view than shown in this figure. For example, in some embodiments, Service Profiles (Internet, Phone Banking) may reside in current host systems instead of the CDM, Communication History may be provided by ICCM (instead of Sales Services), and Product Catalog (Product Options) may be provided by FE configuration files or local entity systems.

Account Opening User Interface

The Account Opening front-end captures customer application data and provides flexibility in creating the User Interface (UI) aspects for the Account Opening customer journey, which are decoupled from the underlying business processes. Flexibility is provided through linking together the Account Opening components and externalizing business controlled view elements without the business being required to know the technical implementation of the underlying business processes. Accordingly, the present invention advantageously decouples the front-end interface and/or user journey from the underlying business processes.

Figure 40:
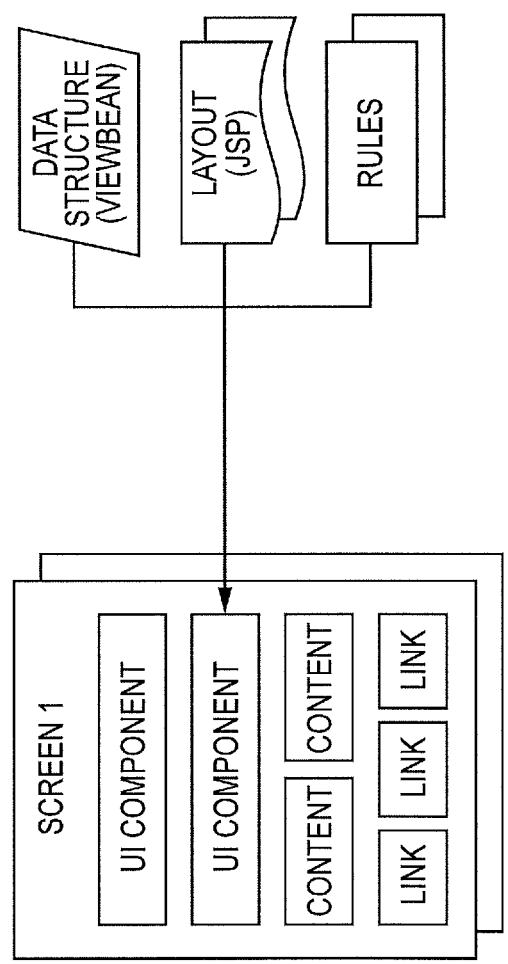
FIG. 40 shows an exemplary logical view of the front end (FE or F/E) user interface (UI).

FIG. 40 shows an exemplary logical view of the front end (FE) user interface (UI). As shown in FIG. 40, to provide flexibility on the user interface, the Account Opening components contain screens composed of UI components, content, and links. The UI Component is further broken down into Data Structures, layout (including attributes such as 'read-only'), and validation rules (for individual fields within that UI component). The Content section allows for business-defined content, and the Links allow the user to perform actions. The view components may be deployable as content using the BDE.

Support for multiple UI flows is provided, allowing the Business to monitor (e.g., through BI) the effectiveness of the Account Opening journeys. Once a journey has been started for a given application, it remains the same for the life of the application. This should remain the same for applications in all supported channel so there are operational impacts of keeping the Channel configurations aligned.

The majority of interactions from the Account Opening Front-End (FE) will be with the APe application which supports the account opening lifecycle. Exceptions to this may include, for example, retrieval of existing customer data, communication history retrieval/re-send, and work-item updates (QMS).

In some embodiments, the Account Opening Front-End is a Portal application, for example, written against the R2DS for Java Framework. Presentation layer (UI) components may be written, for example, using Java.

Figure 41:
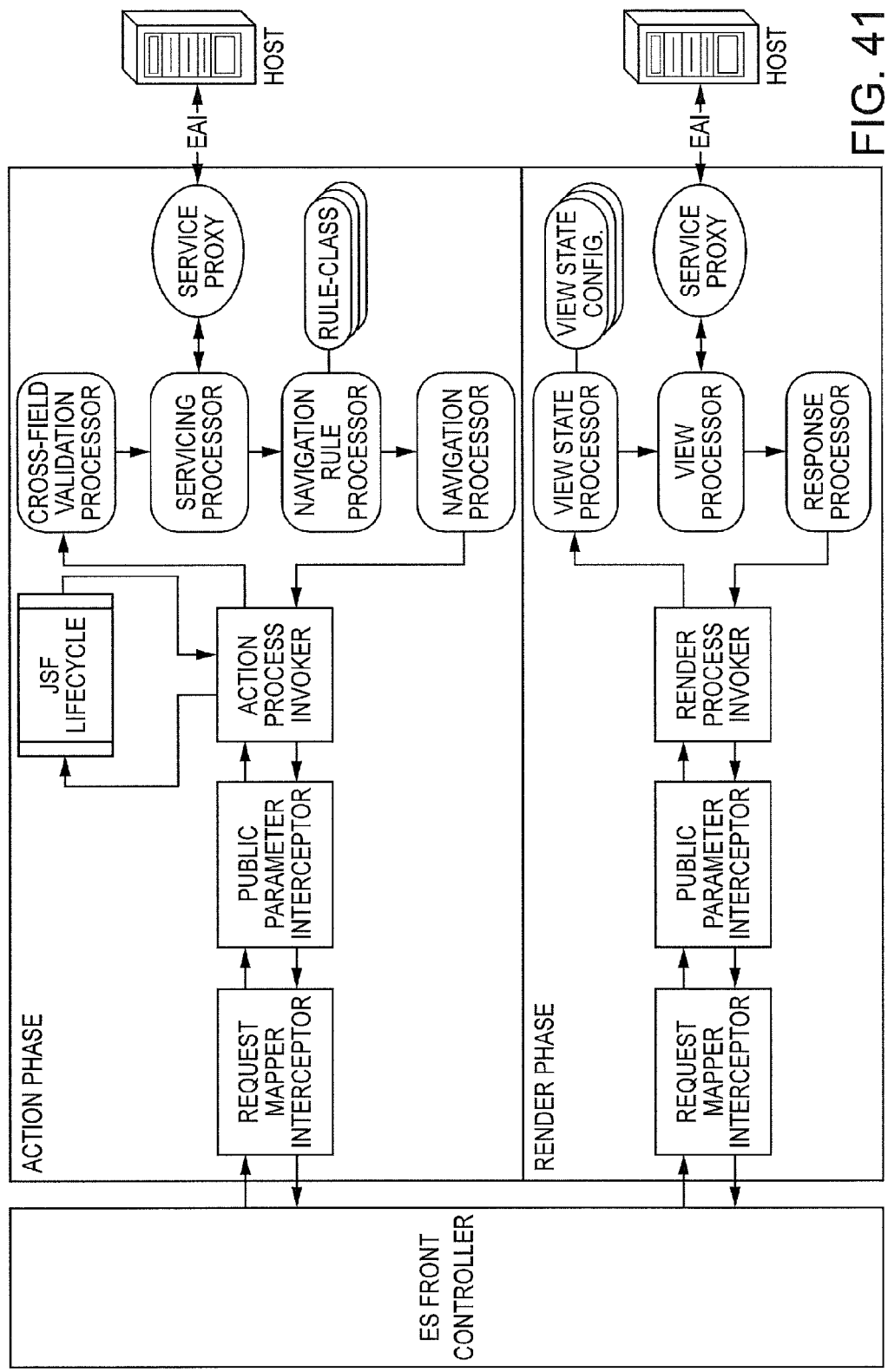
FIG. 41 illustrates an exemplary physical architecture of the front end according to some embodiments.

FIG. 41 illustrates an exemplary physical architecture of the Front-End according to some embodiments. A generic Action/Render phase is shown. The Service Proxy is the exit point from the FE to the host systems, of which APe is a focus.

To facilitate a flexible user journey, the Account Opening FE solution is broken into multiple portlets. These can then be chained together to create the desired journey. Flexibility is provided through linking together and/or chaining the multiple portlets and externalizing business controlled view elements without the business being required to know the technical implementation of the underlying business processes. Accordingly, in some embodiments of the invention, the front-end interface and/or user journey is decoupled from the underlying business processes using, for example, the chaining of multiple portlets.

Figure 42:
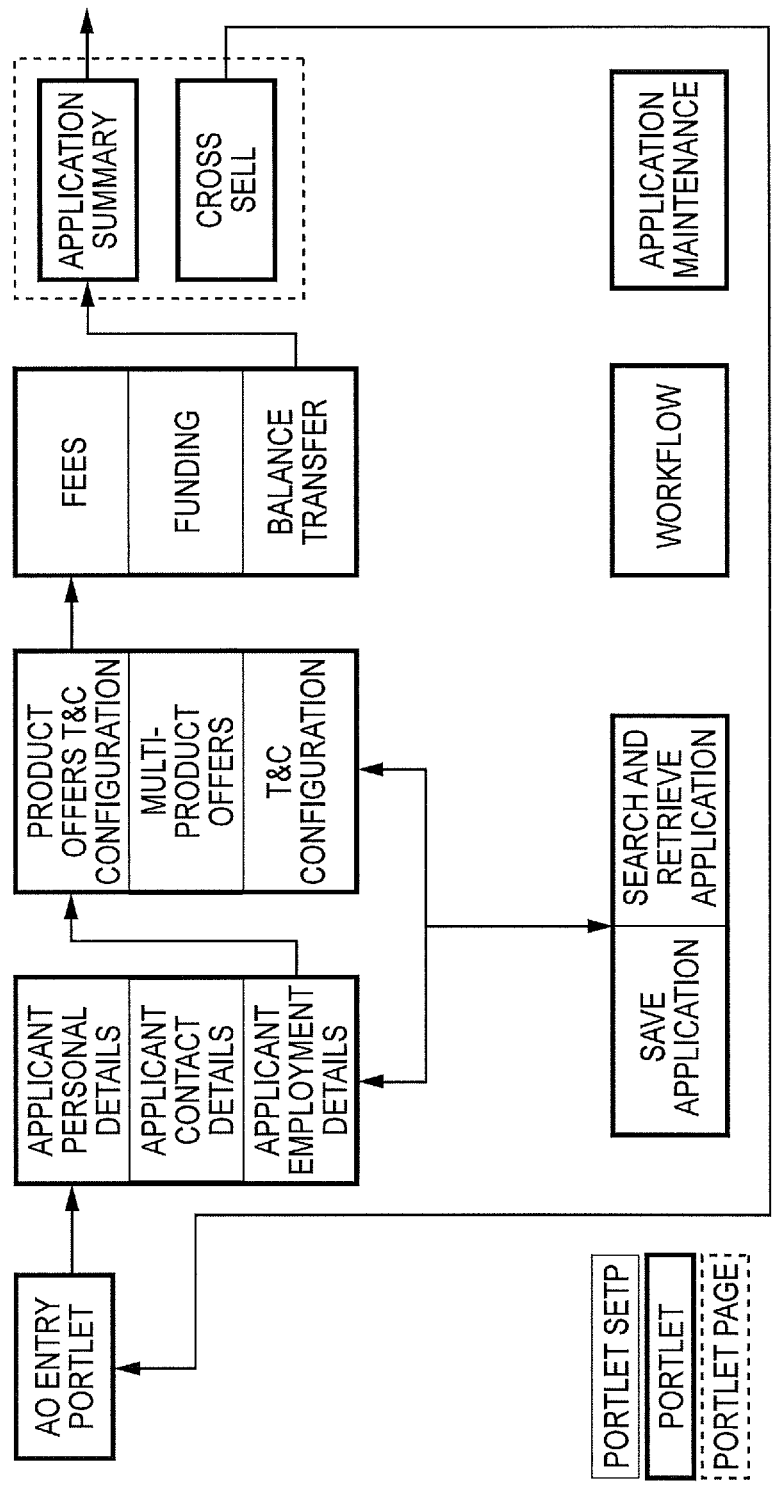
FIG. 42 is an exemplary diagram of front end portlets that may be chained together in various ways to create a flexible user journey.

FIG. 42 is an exemplary diagram of front end portlets that may be chained together in various ways to create a flexible user journey. In some embodiments, there are there are nine (9) Portlets, with the break-down as shown.

In some embodiments, a Public Parameter Interceptor enables collaboration of multiple portlets within a single portal instance. A declared parameter is passed to other portlets that declare the same parameter. The parameter is injected into the work-context, also via configuration, for the portlet to use. AO may use this mechanism to accept input data, such as entity ID, channel ID, staff ID (optional), customer ID (optional), one or more product ID and promo-code, from other components. AO internally may publish application ID and applicant ID to coordinate activities between portlets specific to AO. This interceptor is used in the action chain to receive values published by other portlets.

Figure 43:
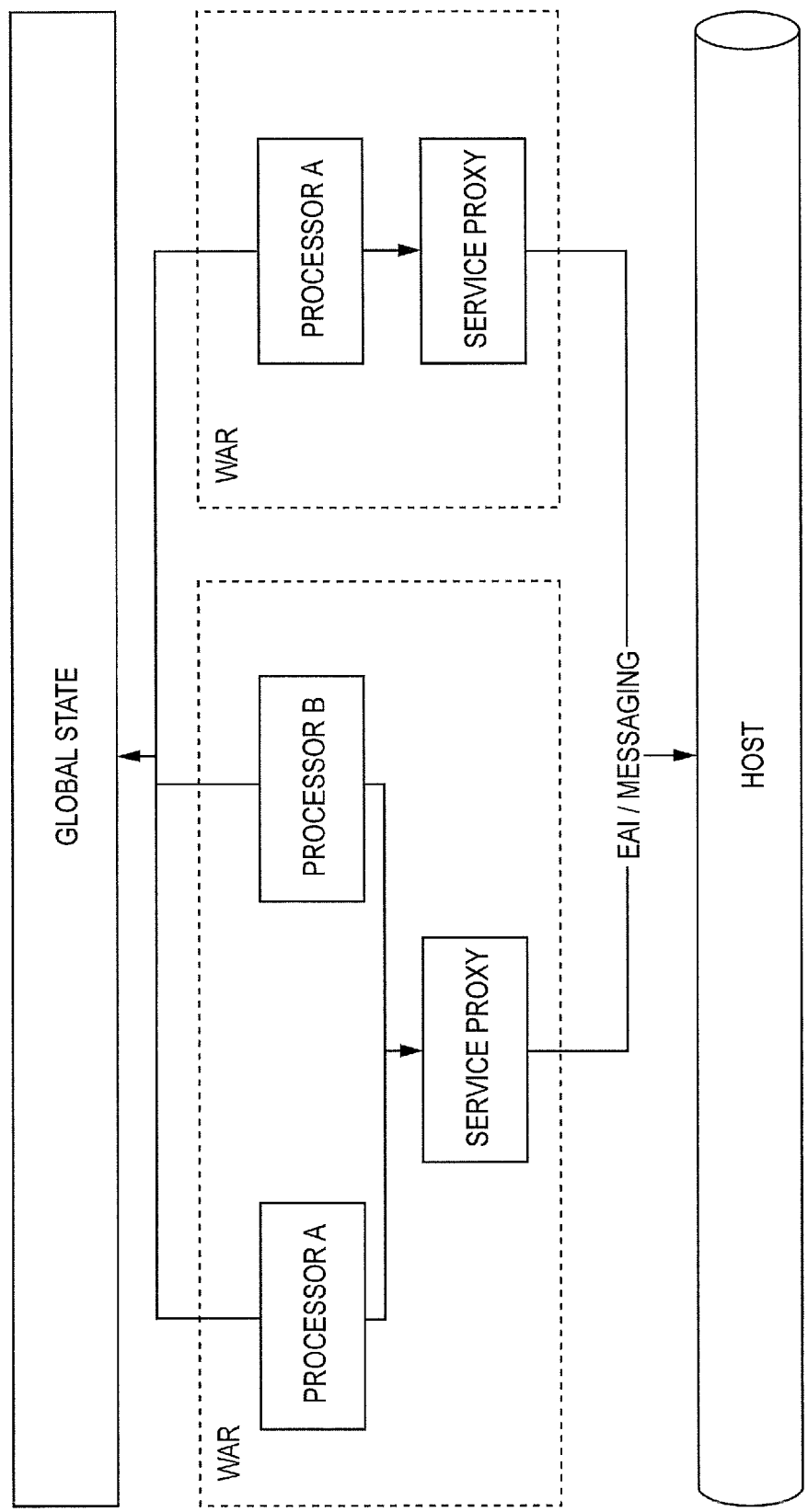
FIG. 43 is an exemplary diagram of a public parameter interceptor that enables collaboration of multiple portlets within a single portal.

This Interceptor allows data to be passed into Global State, as shown in FIG. 43.

In some embodiments, a Navigation Rule Processor supports user journey flexibility within Account Opening. A configuration file defines the screen flow across different portlets, including branching logic.

Figure 44:
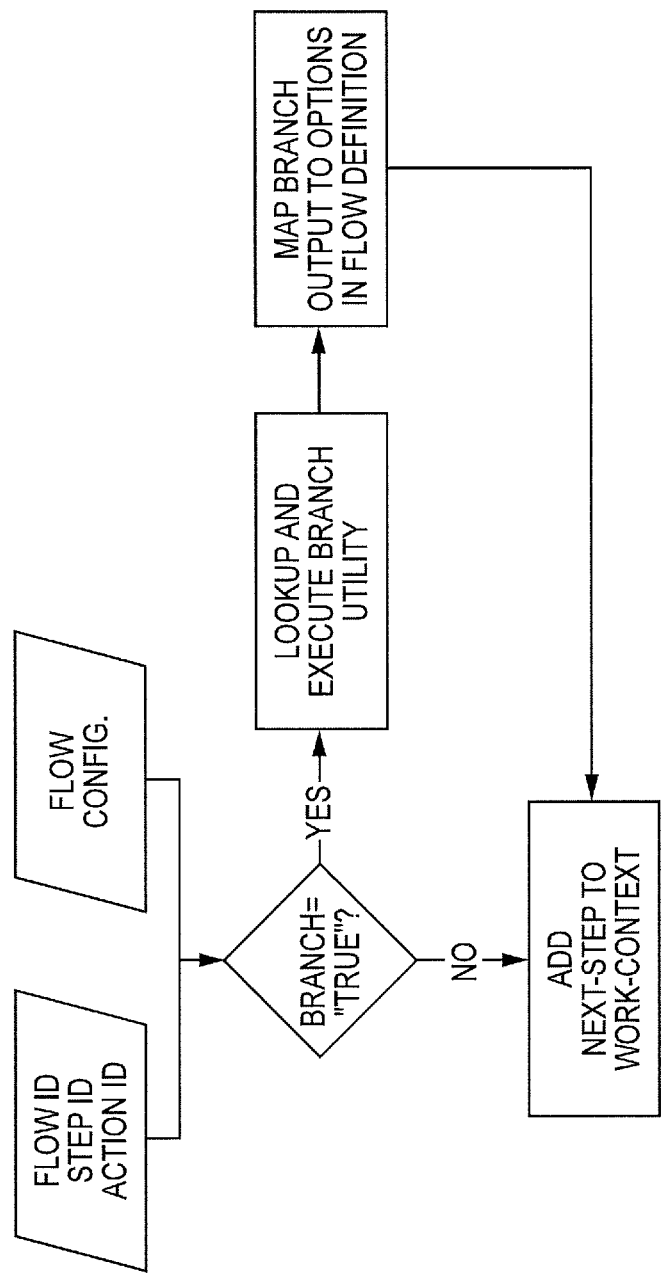
FIG. 44 is an exemplary diagram of a navigation rule processor logic.

FIG. 44 is an exemplary diagram of a navigation rule processor logic. As shown, the navigation rule processor receives the flow ID, step ID and action ID as the input and uses this input to map to the definition in the flow configuration. If a branch is defined, the processor loads the corresponding branch utility to resolve the next-step; otherwise, the next-step mapped directly to the action is added to work-context.

A branch utility is a simple Java class conforming to a simple interface. These may be pre-build Java classes based on various business rules that are used in AO, for example for evaluating a service invocation result, such as application accepted or declined, and evaluating input data that are relevant to UI journey. In some embodiments, these classes may be isolated from other general rules, which are implemented in the processors or services, to allow a consolidated configuration for the UI journey.

Cooperative portlet (Wiring) is used to support the transition from one portlet to another. Each account opening portlet will declare a web services description language (WSDL), similar to the following example, as a target portlet.

A portlet that wishes to navigate to another portlet must also declare a WSDL as a source portlet. This portlet also requires the navigation processor to trigger the screen transition from one portlet to the other.

Figure 45:
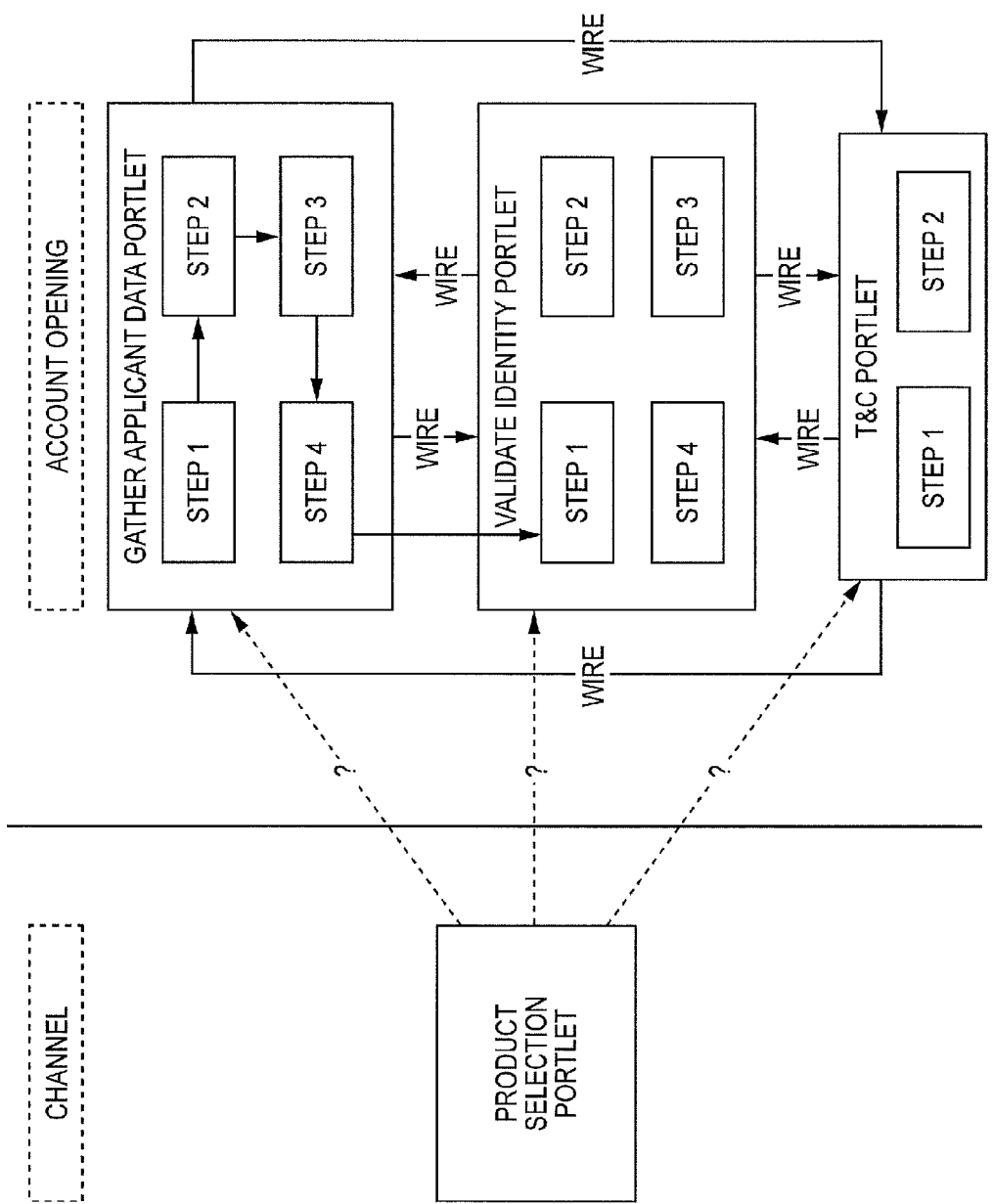
FIG. 45 is an exemplary diagram showing communication between portlets, including, for example, a Product Selection portlet on the channel side and Gather Application Data, Validate Identity, and Terms and Conditions portlets on the account opening side.

FIG. 45 is an exemplary diagram of communication between portlets. In this diagram, there is the Product Selection Portlet on the channel side and three portlets—Gather Applicant Data, Validate Identity and T&C—on the account opening side. As shown in the diagram, all portlets within account opening may be wired to each other. This provides the flexibility to move from a portlet to any other portlet within account opening. The initiating portlet will send the flow ID and step ID as wired parameters to the target portlet. The target portlet will use the parameters to display the relevant screen (step) to the user. Screen (Step) navigation within a portlet will be handled using the flow configuration described previously.

Application Processing

Figure 46:
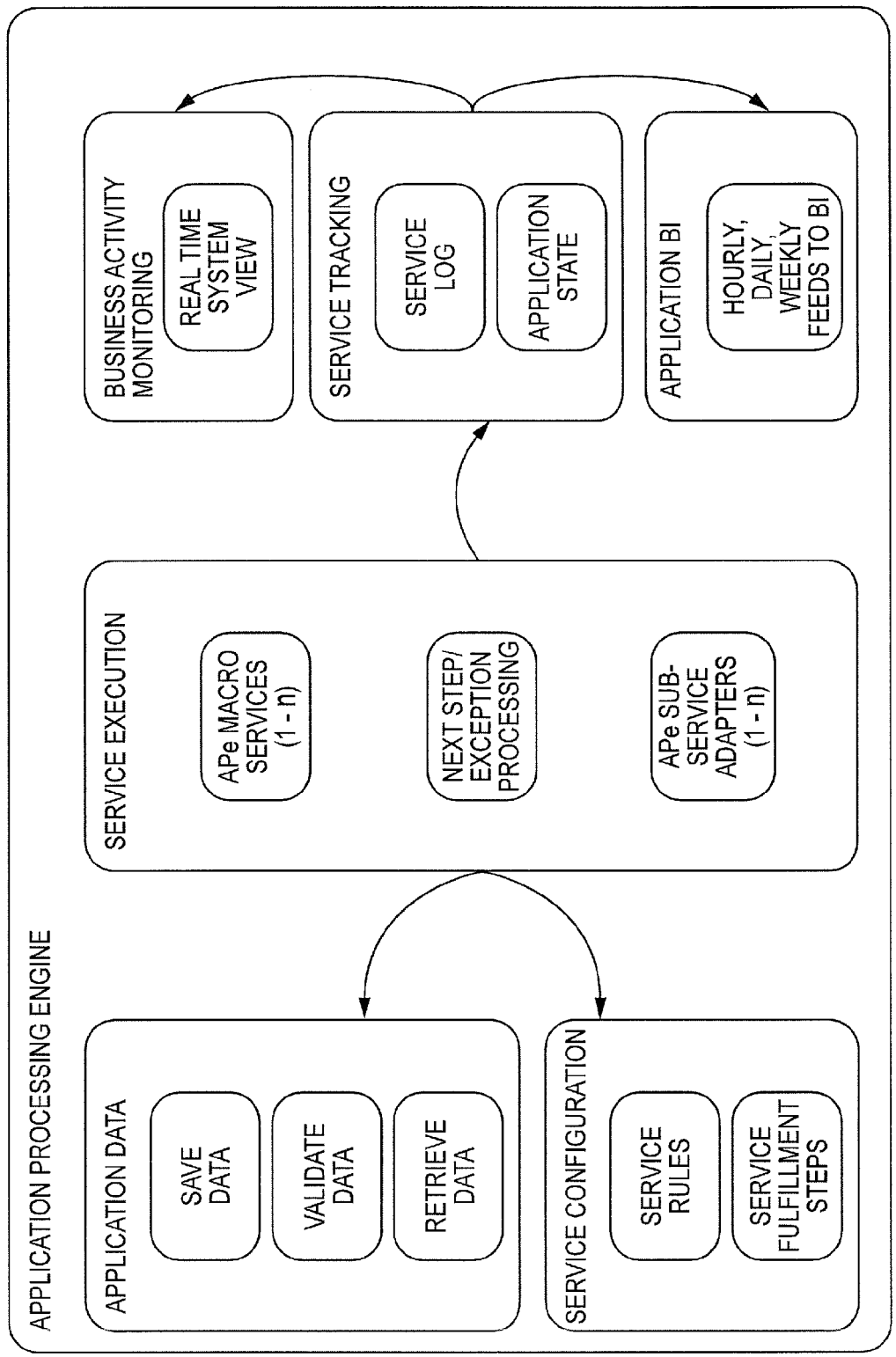
FIG. 46 shows an exemplary logical diagram of the Application Processing Engine (APe).

The Application Processing Engine (APe) provides a common application processing engine for processing the necessary customer information from both internal and external sources and analyzes the data to arrive at a set of decisions that offer the customer the right products at the right time. APe exposes the Macro Business Service operations required to open an account, and can execute any number of sub-services to fulfill each Macro Service operation. APe is the system of record for the application data, and knows the status and steps involved in processing the application. An exemplary logical diagram of APe is shown in FIG. 46.

APe provides tracking of business processes and an business view of all application statuses. In addition, daily BI extracts may be provided to track historic activity.

All macro service operations store any passed data in the application data store maintaining the system of record.

Each macro service operation call will consult the service rules to then call the sub services required. This is configurable by the entity. APe may be delivered with sub services for core interfaces (e.g., CDM Customer Data Management). Each entity can author their own sub services.

Figure 47:
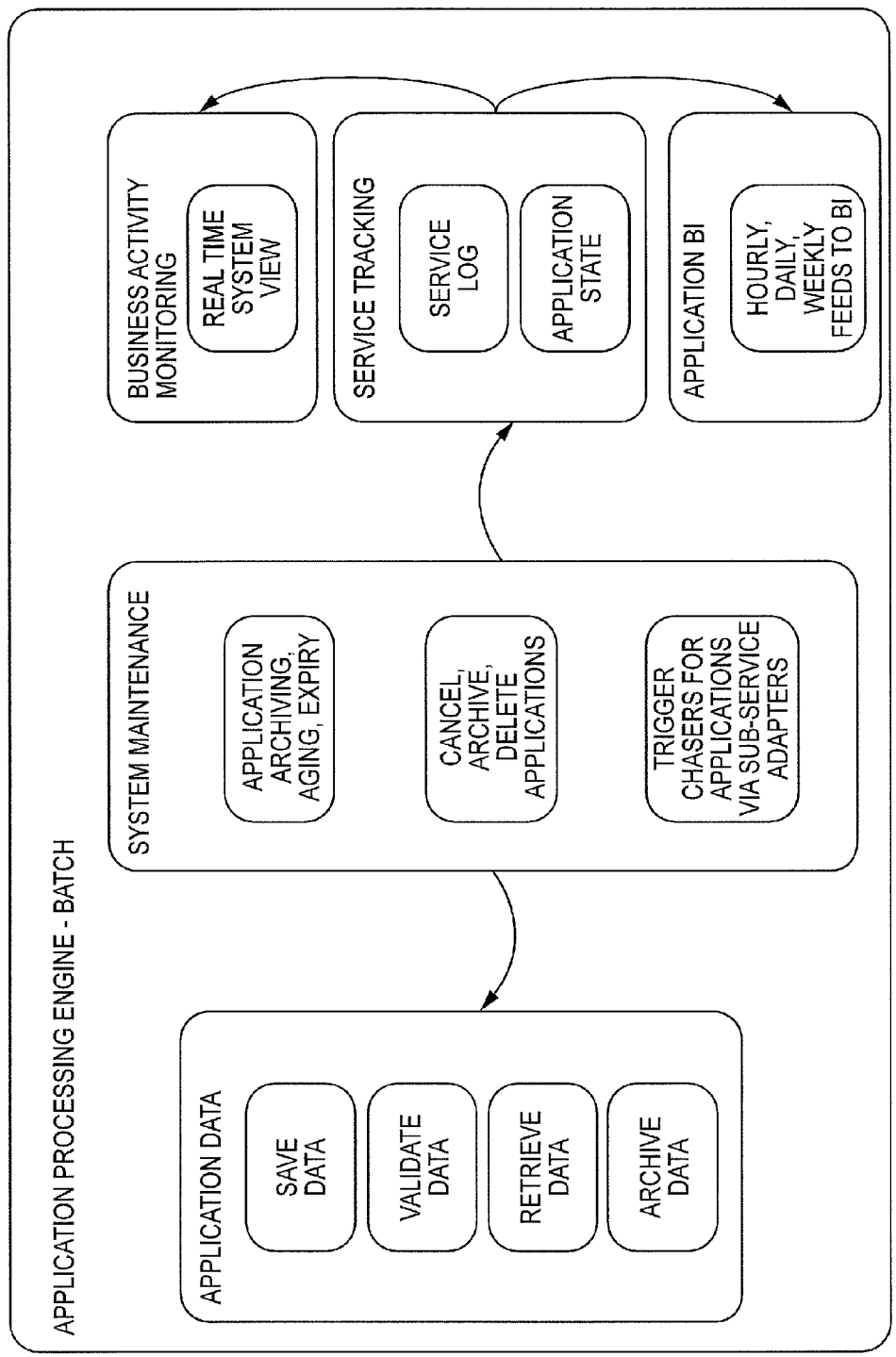
FIG. 47 shows exemplary logical functions for a batch process, which identifies applications pending for an extended period and triggers entity required activities.

If an application is resident within APe for an extended period or an application is at a persistent pending state a batch process may identify the applications and trigger entity required activities. These can include prompts to queue management or calls to the communications system. Exemplary logical functions for this batch operation are shown in FIG. 47.

For applications submitted by new-to-bank customers (or on their behalf by Call Center staff), APe determines when it is appropriate to create a customer record in CDM. For Account Opening, preferably no customer records are created on the local host customer systems until time of account boarding. Information on existing customers can be provided to APe as part of the application details.

Applications are explicitly saved each time APe is called. APe allows for applications to be retrieved using specified application data. APe also permits a search (which may be intended for internal users only) operation to be actioned to search for existing applications to continue the application process. Thus APe allows for suspending applications and restarting at a later point. APe has no dependency on the interface channel.

In some embodiments, APe is a mainframe application written in CICS/COBOL (Customer Information Control System/COmmon Business-Oriented Language). All service operations into APe utilize R2DS for COBOL infrastructure on the mainframe (preferably following GSS Global Sales Services standards). Database storage may be through standard DB2 on the mainframe.

Figure 48:
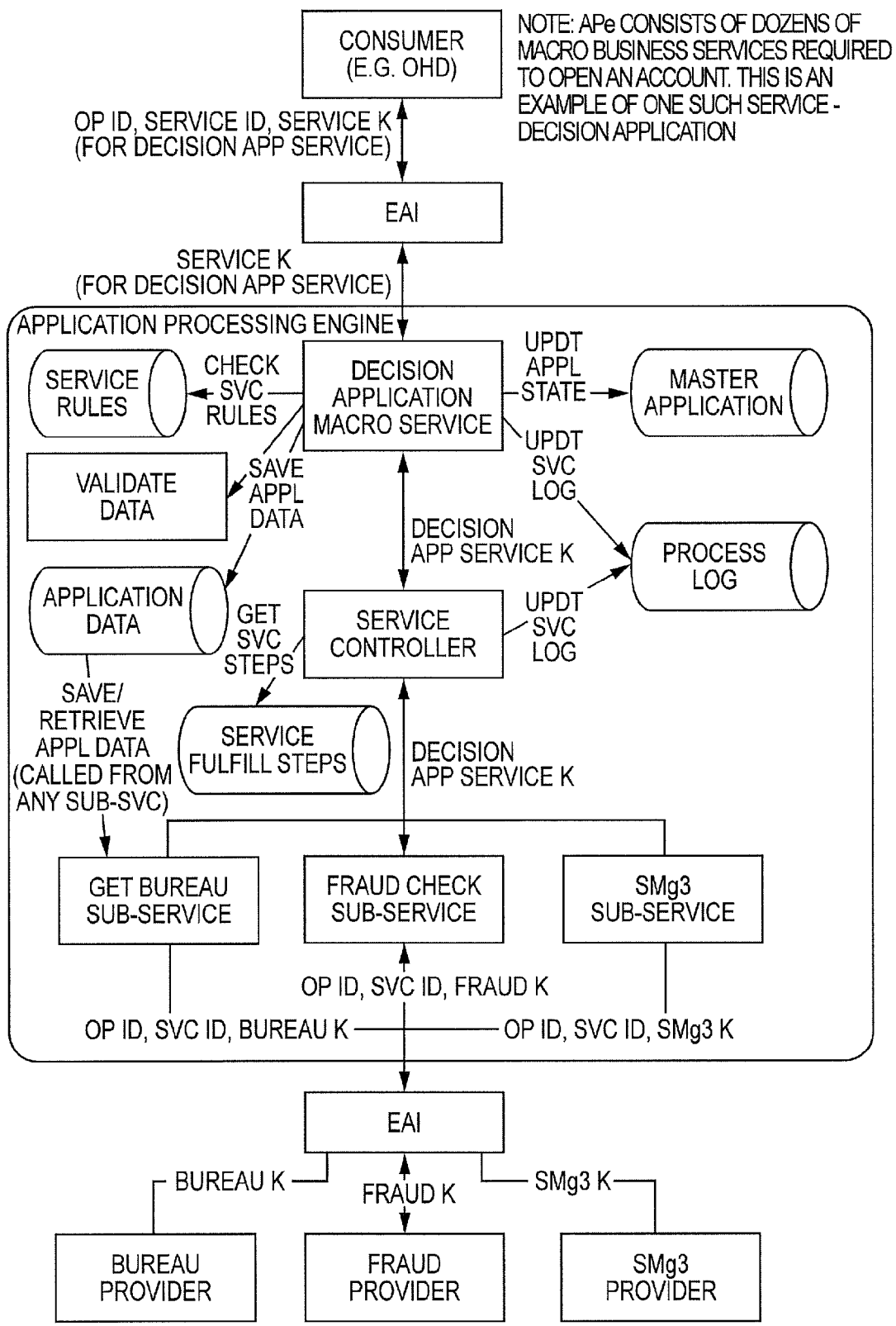
FIG. 48 shows an exemplary physical architecture for APe.

FIG. 48 shows an exemplary physical architecture for APe.

Each sub-service operation is preferably a separate COBOL program. Each program will call an external service operation to fulfill a necessary macro service operation. An example of this is the "Retrieve IP details" call for existing customers. The relevant macro service will be called by the instantiating application (most likely the web front-end). The service controller will then call the sub-service which constructs the appropriate CDM service operation call to retrieve the details as the given service operation dictates. The sub-service will then store the data into the application data store and this data will then be passed back to the macro service operation which will then fulfill its service contract to the calling application.

Cards

Credit cards are an integral delivery of the Account Opening invention. In addition, the ability to order ATM/debit cards is also provided. For both of these, the Cards product system is leveraged.

Requests to add a customer, account, and/or embosser records in Cards may be initiated through APe. Creation of a card will return the new account number.

To continue supporting legacy applications, the Cards services can also be used to create customer records within Cards when CDM is not present.

Figure 49:
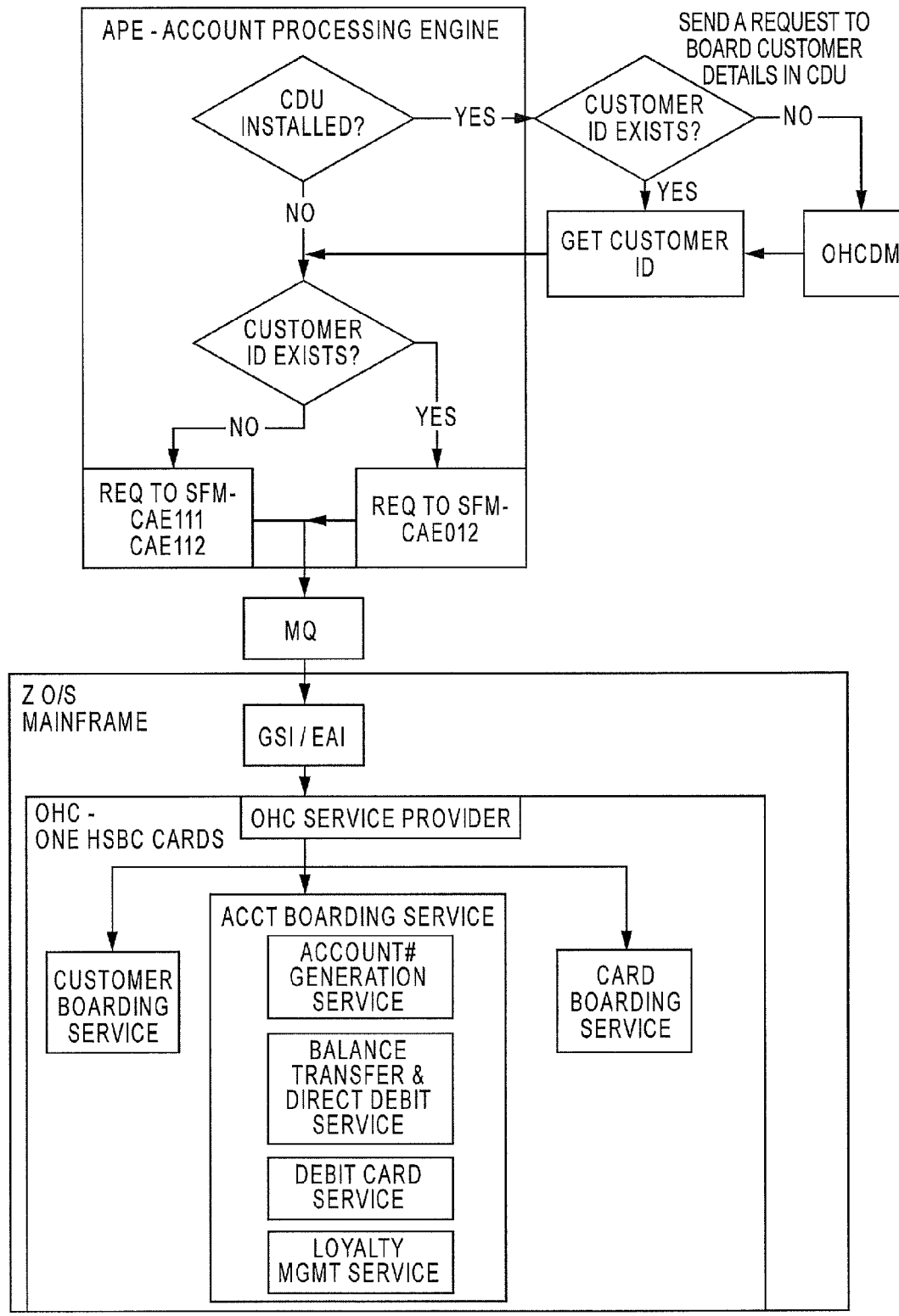
FIG. 49 is an exemplary illustration of a Cards product system.

An exemplary illustration of a Cards product system is shown in FIG. 49.

Core Banking

The core deposit account receivable system is Core Banking. Core Banking is used to create accounts, and may provide some funding capabilities. As used herein, Core Banking refers to a generic system to support deposit accounts. In some cases, specific reference may be made to SWH (Software House) Core Banking, One HSBC (OH) Core Banking, or entity solutions such as RPS (Retail Processing System).

In some embodiments, SWH Core Banking (HUB) provides customer data services with CDM-like interfaces. Details about deployment variations and synchronization of customer data with CDM, are provided.

Specific to the SWHCB implementation, a new channel agnostic Host Adapter Handler may provide services to OH Distribution (OHD). Internally this Handler will interact with mostly existing SWHCB capabilities, and non-SWHCB sites will preferably implement similar functionality.

Reference Data/Product Data

Reference and product data are often stored in various locations within an overall system, leading to duplication of data and potential of some data-stores becoming out of date. Preferably, Reference and Product data are standardized in the Account Opening system, allowing a common maintainable source for data.

In some embodiments, a CDM Enterprise Standard Reference (ESR) is the primary repository for Reference Data for Account Opening. The interface to this data (e.g., for retrieving and caching reference and product data) may be provided by R2DS in Java and/or COBOL spaces.

Within Account Opening, Reference Data is used to represent static values that are used by multiple systems, such as Currency lists. It may also define basic Product Details and/or product catalog data.

Figure 50:
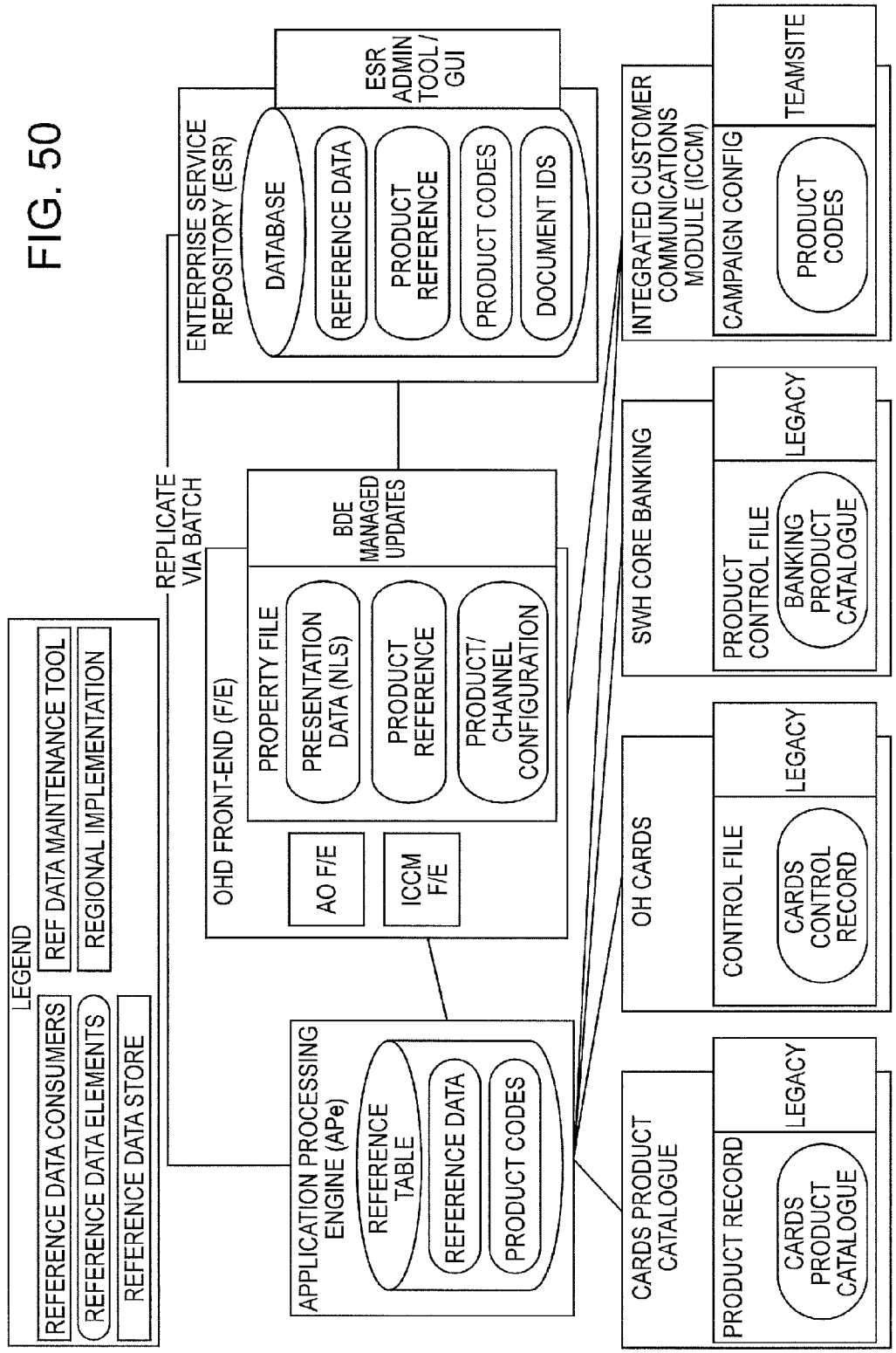
FIG. 50 is an exemplary diagram illustrating use of Reference/Product data.

A sample implementation and interfaces to product data may involve data held in both the ESR and in flat files (FE configuration). FIG. 50 is an exemplary diagram illustrating use of Reference/Product data. The FE design utilizes a Reference Data API that shields the FE code from the ultimate source of the reference data. In some embodiments, there may not be a real-time link between APe and the ESR.

Business Intelligence

Figure 51:
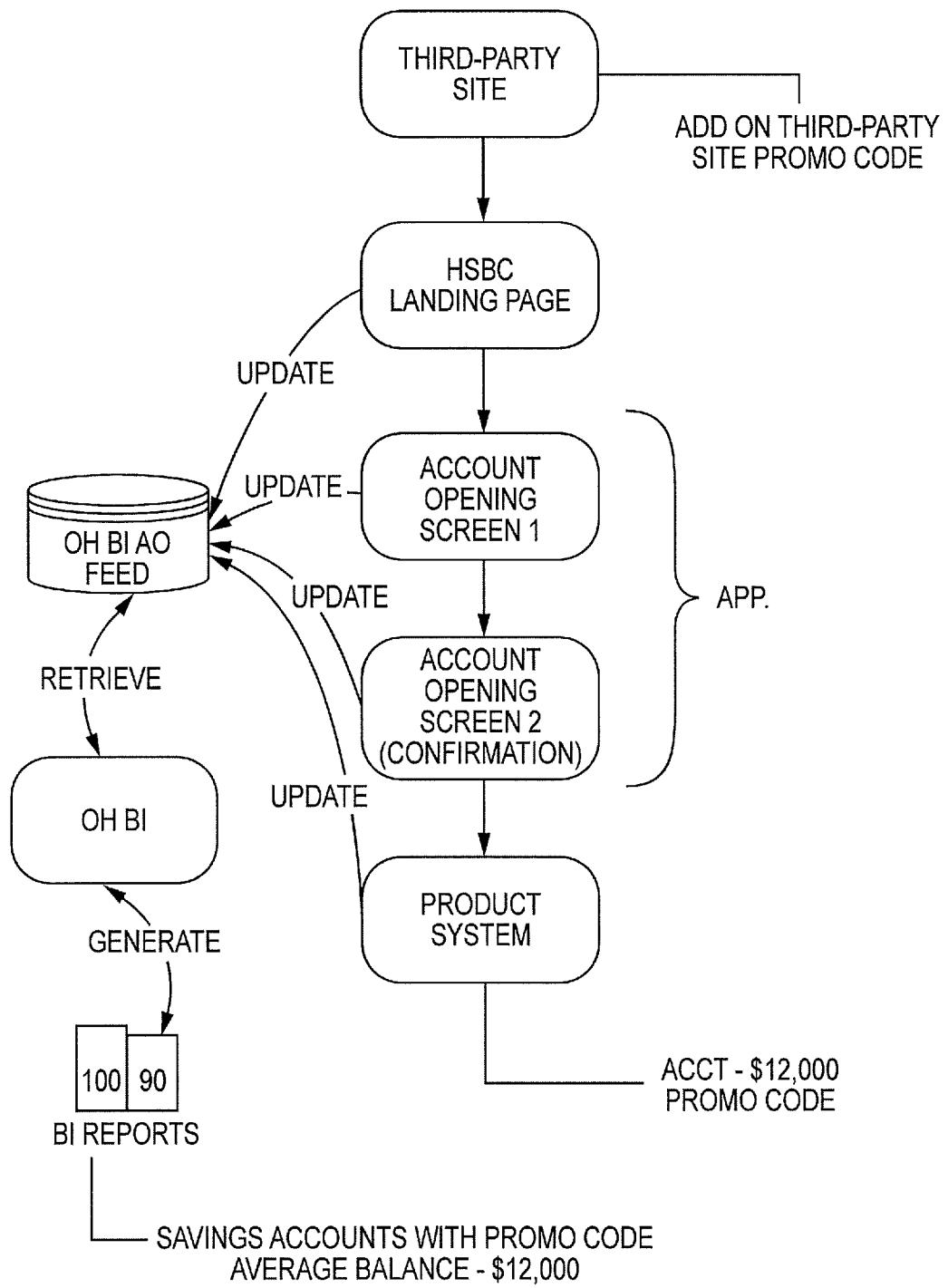
FIGS. 51-53 are exemplary diagrams illustrating use of Business Intelligence (BI) systems.
Figure 52:
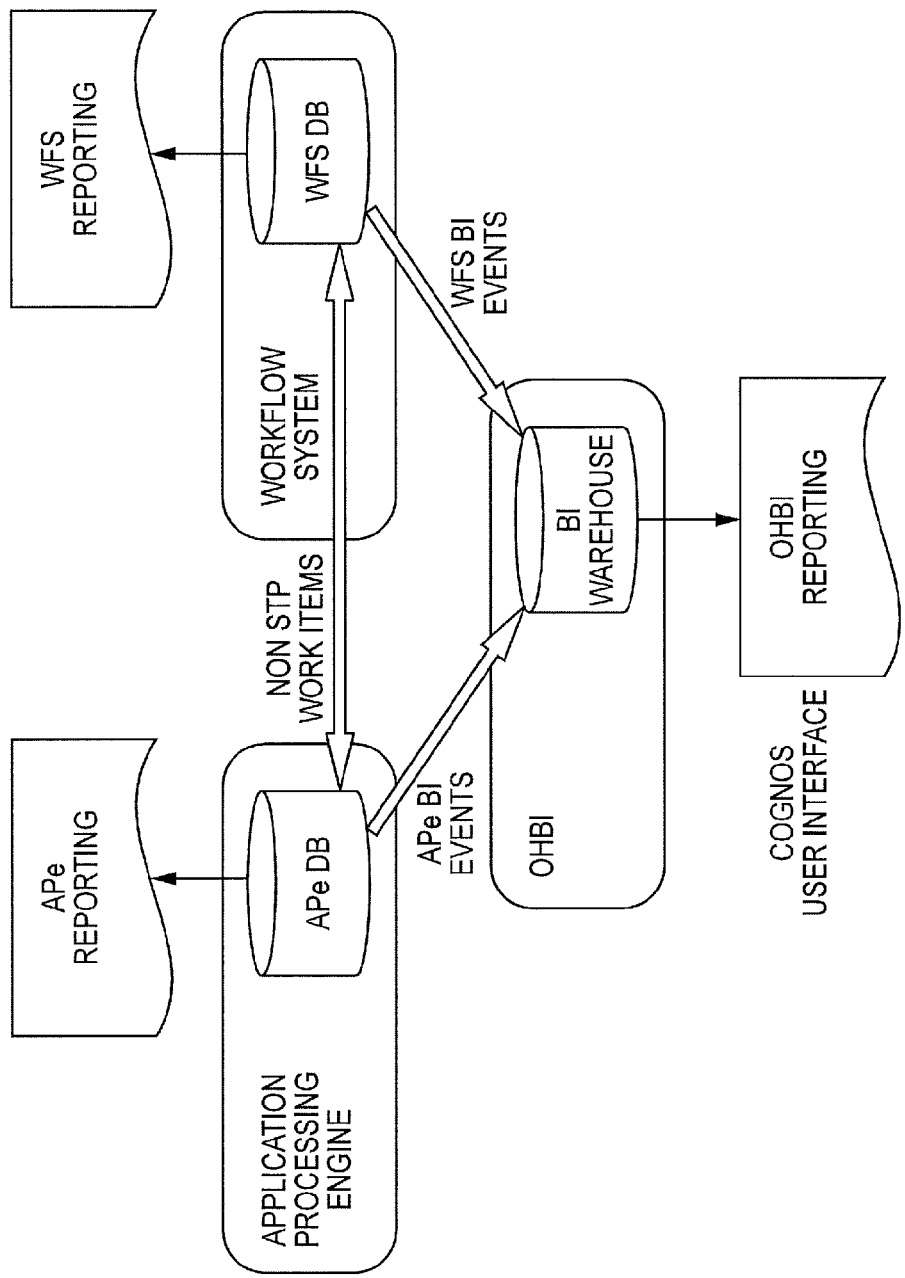
Figure 53:
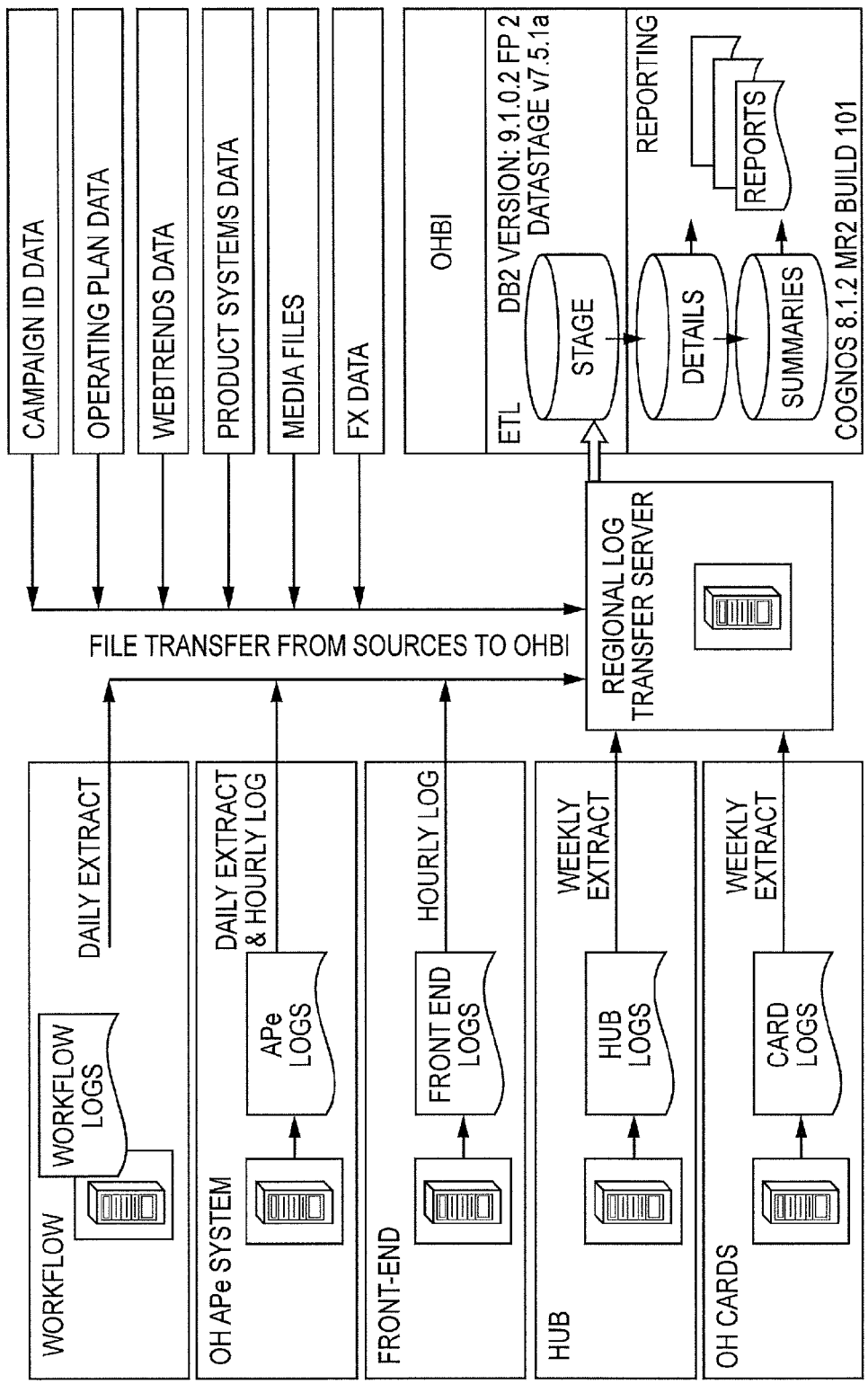

An important aspect of Account Opening as disclosed herein is an understanding the effectiveness of the account opening process. To achieve this, BI systems may be employed to support both Customer and Staff channels, including data feeds to BI and capturing of customer experience activities (e.g., using WebTrends). FIGS. 51-53 are exemplary diagrams illustrating use of Business Intelligence (BI) systems.

To increase the amount of Account Opening that is "out-of-the-box", BI may define data feeds specific for AO, as well as the necessary reports to review this data. The purpose for the AO specific feed is to allow the Account Opening metrics to be utilized, for example, by a site that does not yet have a full BI solution in place. Local entities may have varying data structures and MI solutions that would impact the ability to easily plug in AO related BI details.

Figure 54:
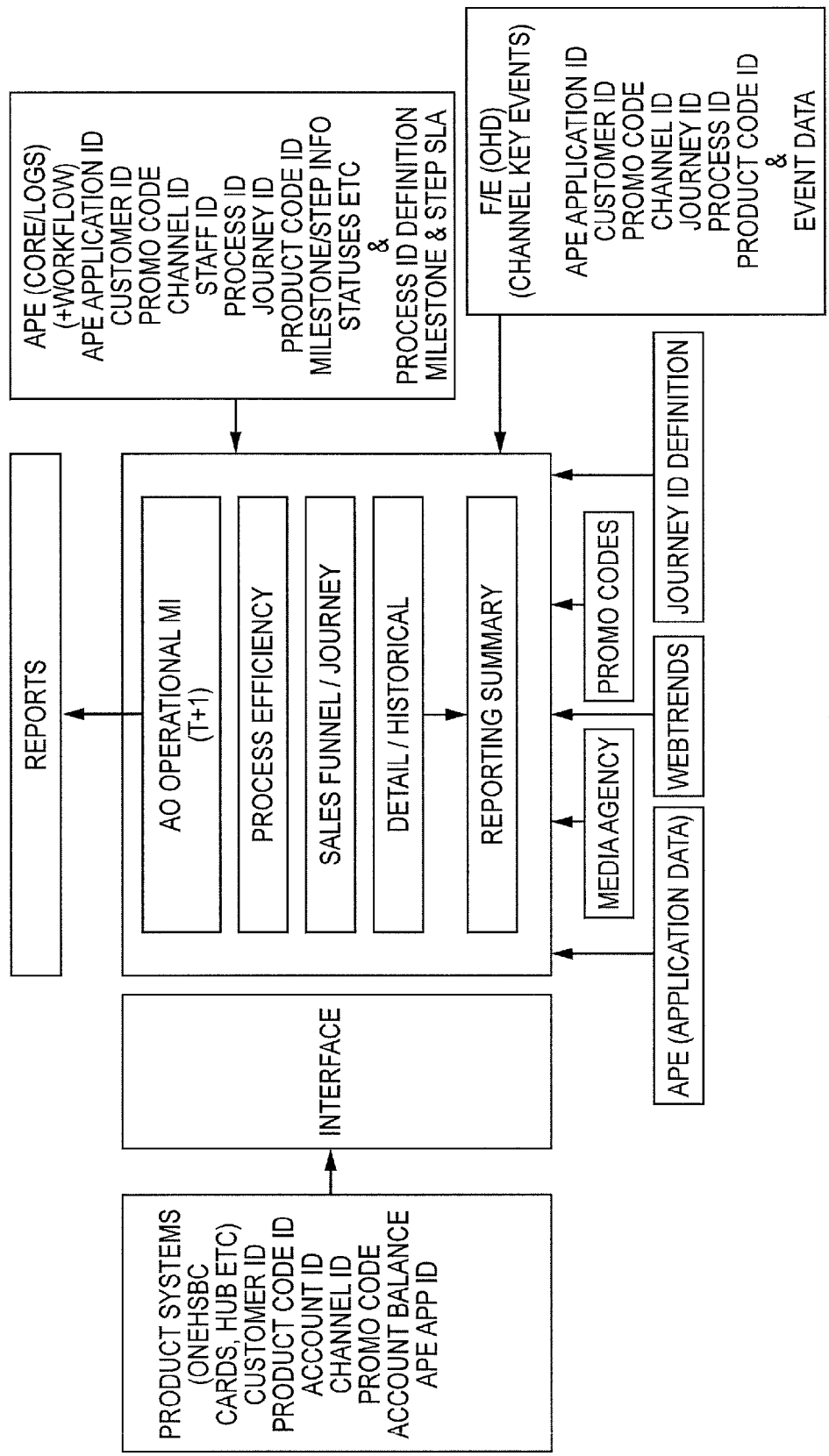
FIG. 54 is an exemplary diagram illustrating Management Information (MI) data elements sourced from multiple components within AO.

To be able to provide an overall view of the effectiveness of the account opening process, MI data may be sourced from multiple components within Account Opening. This may include, for example, the data elements shown in FIG. 54. Feeds from product systems (Core Banking, Cards, ICCM, etc.) may be used to run reports against fund balances in accounts opened with AO.

Customer Communications

To streamline communications with the customer, the Integrated Customer Communications module (ICCM) acts as a layer between Account Opening (and other distribution and product components) and the communication systems.

The Customer Communications components receive requests for document generation, based on dynamic customer data as well as more static template data. Requests for out-going communication are also supported through multiple delivery channels (SMS, e-mail, print-shop, etc.). Templates are managed using BDE based content repositories.

Customer communication histories may also be stored within the Customer Communications space.

Figure 55:
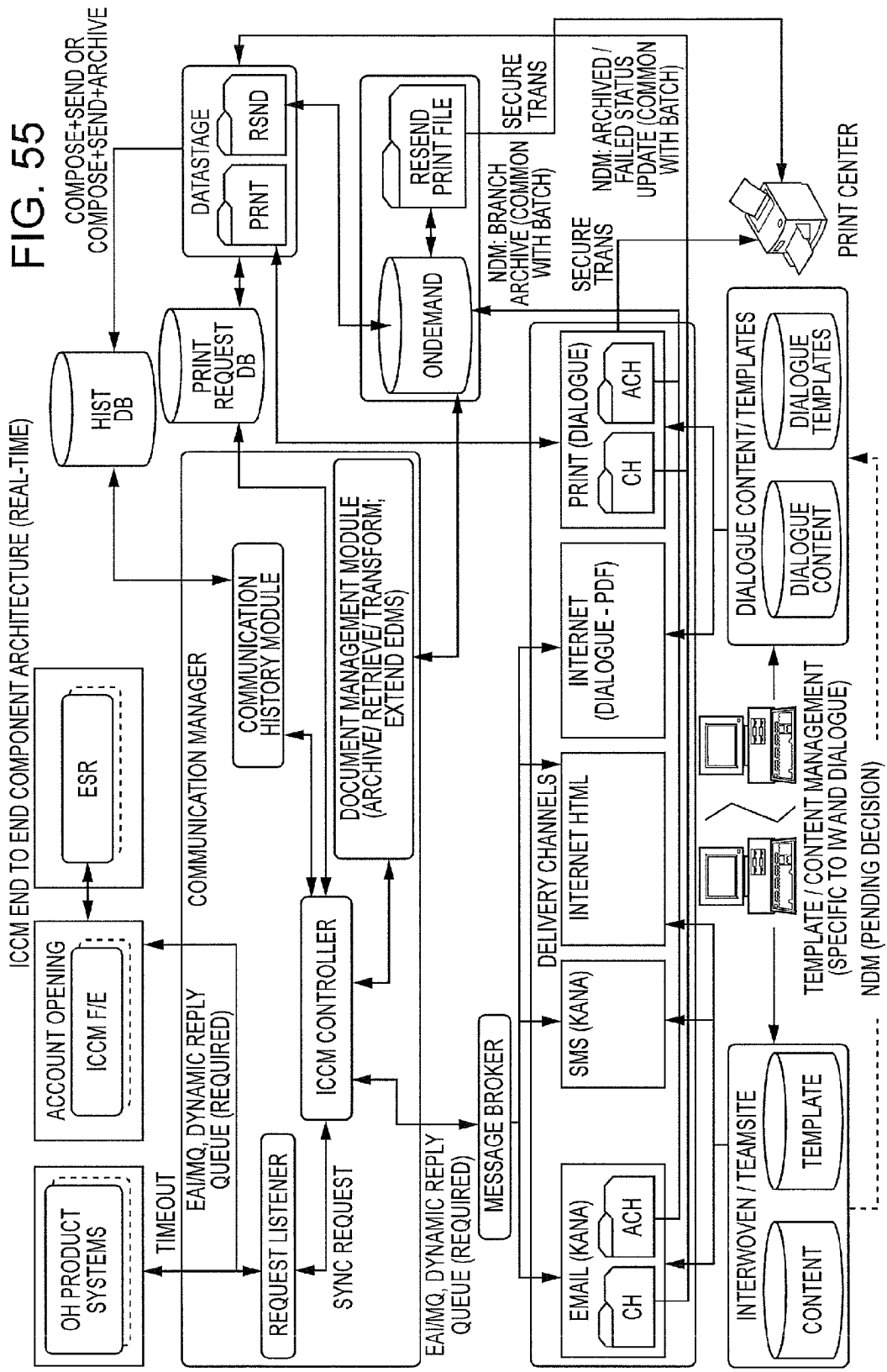
FIG. 55 is an exemplary real-time topology diagram of the Integrated Customer Communications Module (ICCM).

FIG. 55 is an exemplary real-time topology diagram of the Integrated Customer Communications Module (ICCM).

Figure 56:
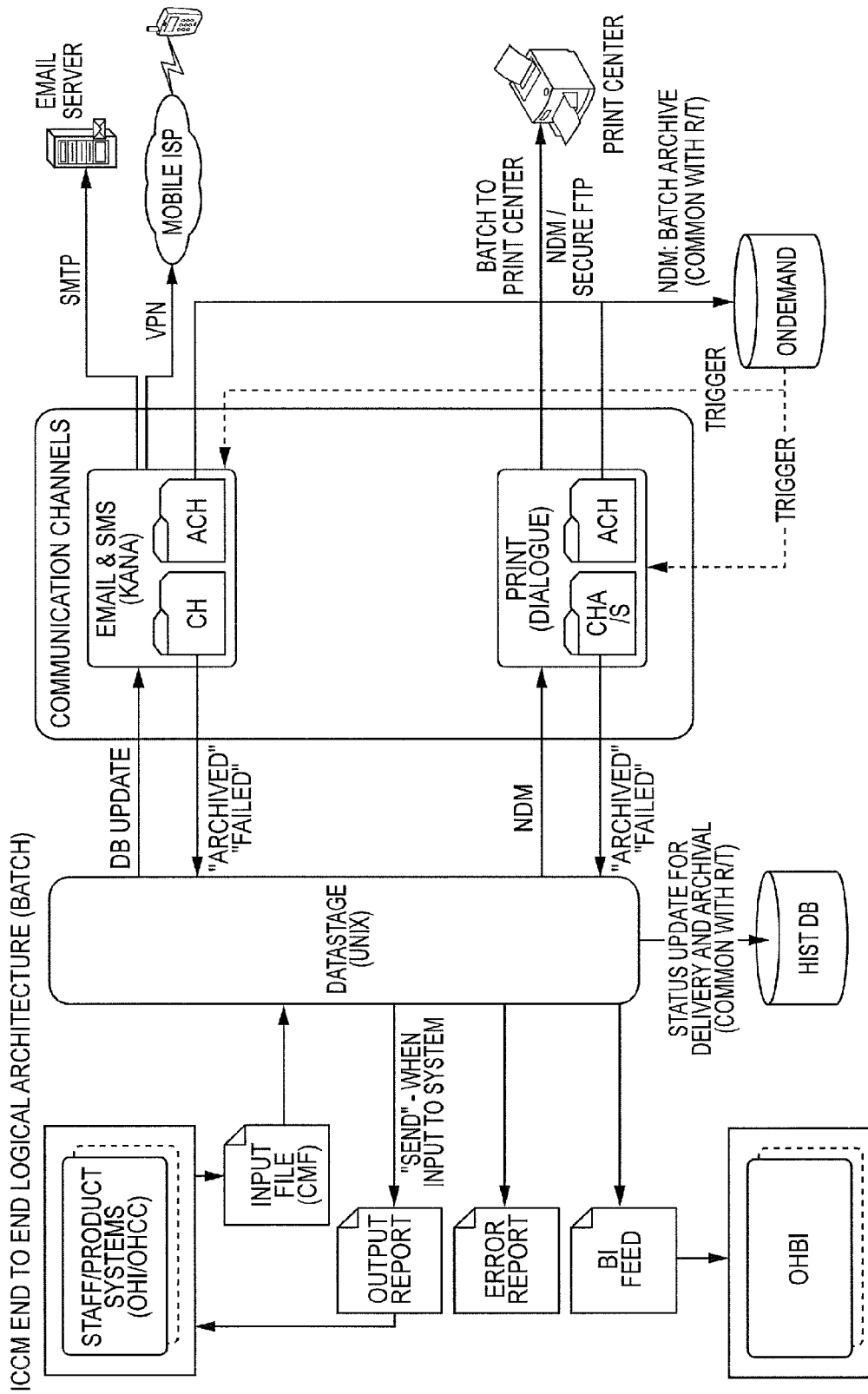
FIG. 56 is an exemplary illustration of the ICCM supporting batch processing.

FIG. 56 is an exemplary illustration of the ICCM supporting batch processing.

Queue Management

To support longer acting account opening processes, as well as to enable human (and non-human) intervention with the AO application, integration with queue management is provided with Account Opening.

The rules to define when an application should be put into queue management services (QMS) may be defined within APe. Work items may be created by APe within QMS based on reason codes. All management of user groups, queues and work assignments internally with QMS are preferably defined by QMS.

Workflow Services (WFS) supports on or more of: Queue Management, viewing queued transactions, transaction selection, transaction assignments based on queue assignments, entitlements, entity level tracking, monitoring work-in-progress, and escalation on time-bound criteria.

Figure 57:
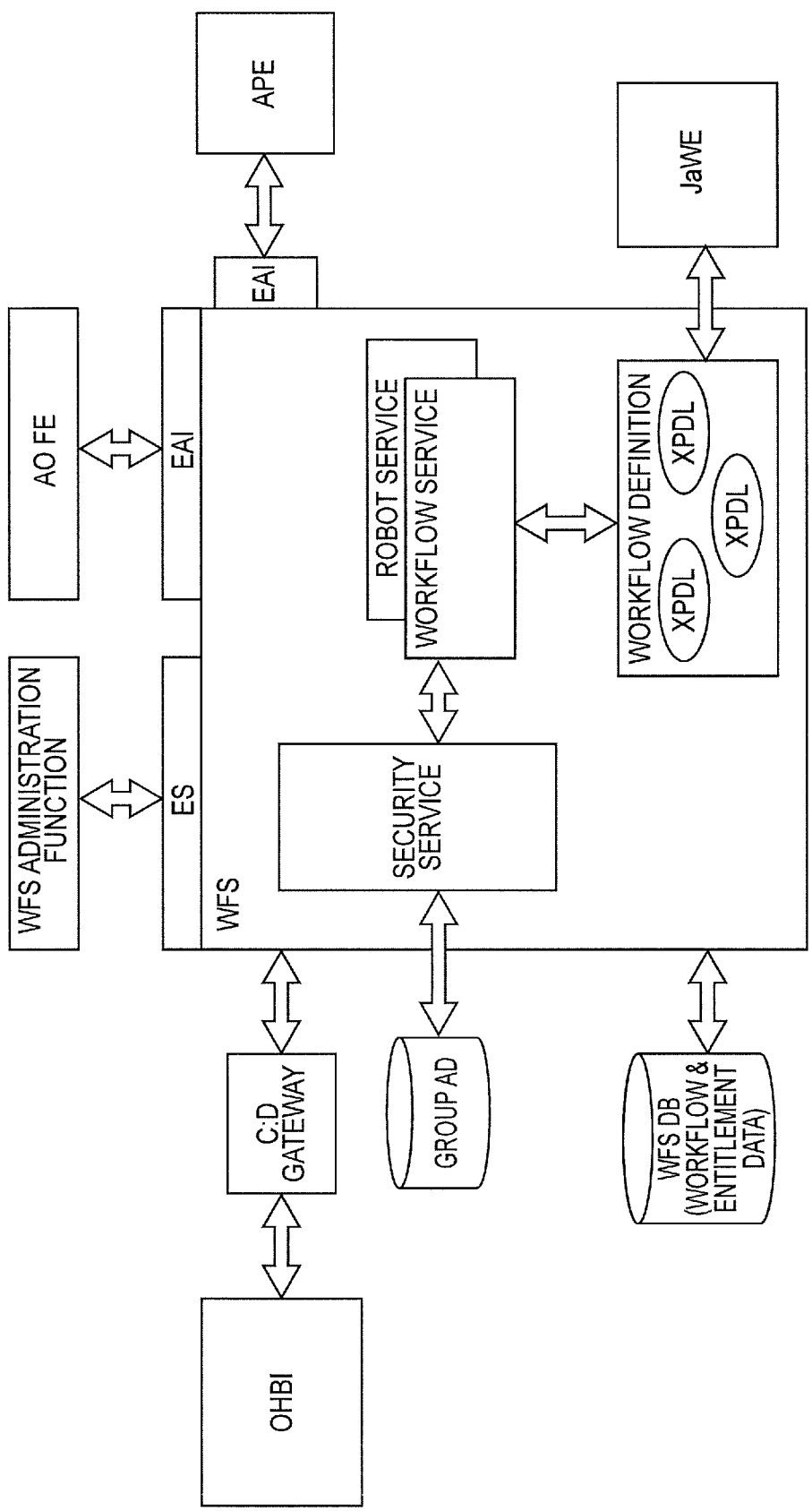
Figure 58:
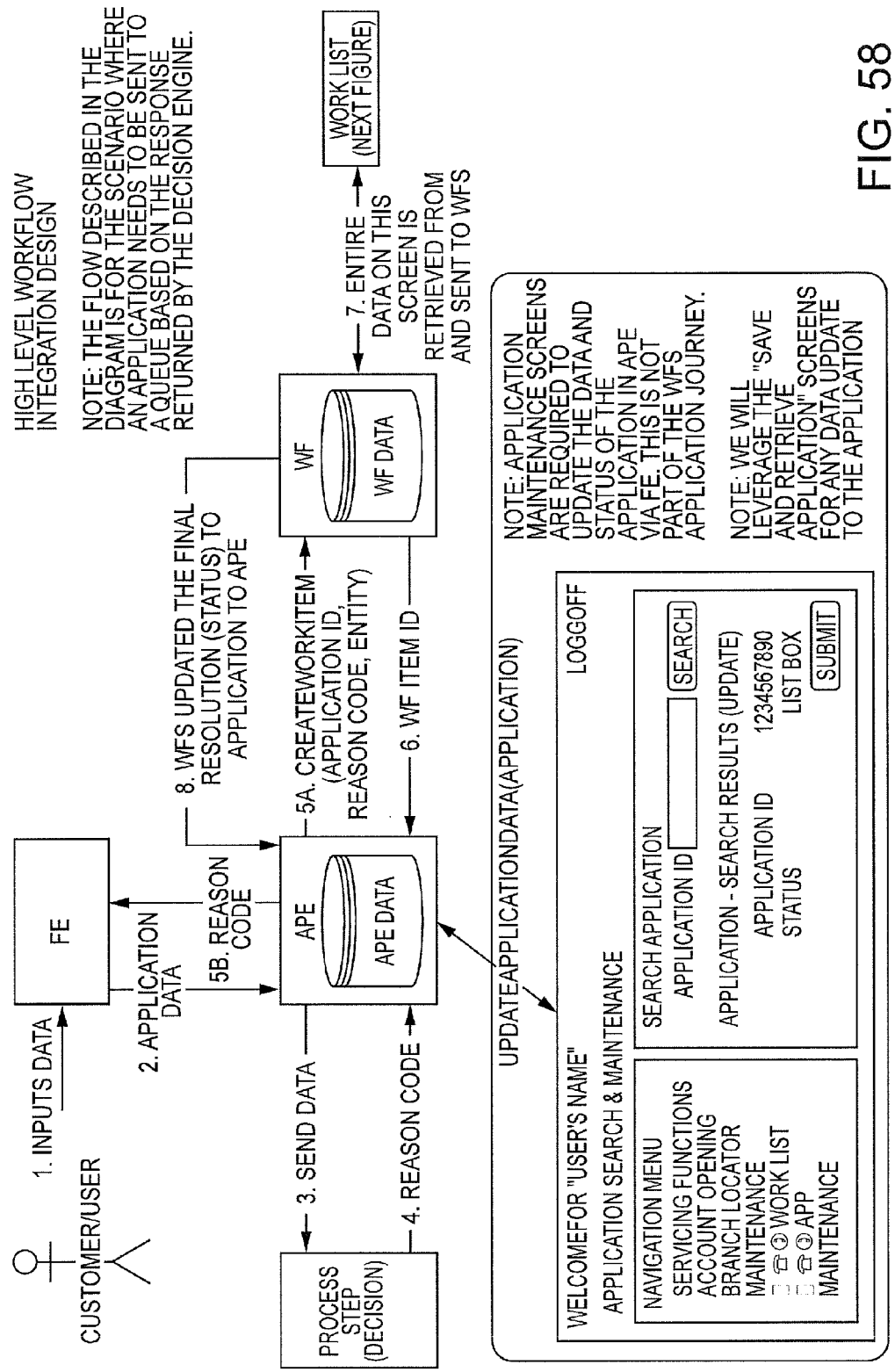

FIGS. 57-59 are exemplary diagrams of Queue Management System (QMS) and Workflow Services (WFS) integration.

Funding

Funding is an important part in ensuring that new customers utilize the account they have just opened. In various embodiments, the system provides for funding using: Cash/Paper Check; Electronic Debit from Bank Account (internal); Electronic Debit from Credit Card Account (internal); Cross-Currency Funding; and/or Balance Transfers. Funding of accounts may include global accounts.

Figure 60:
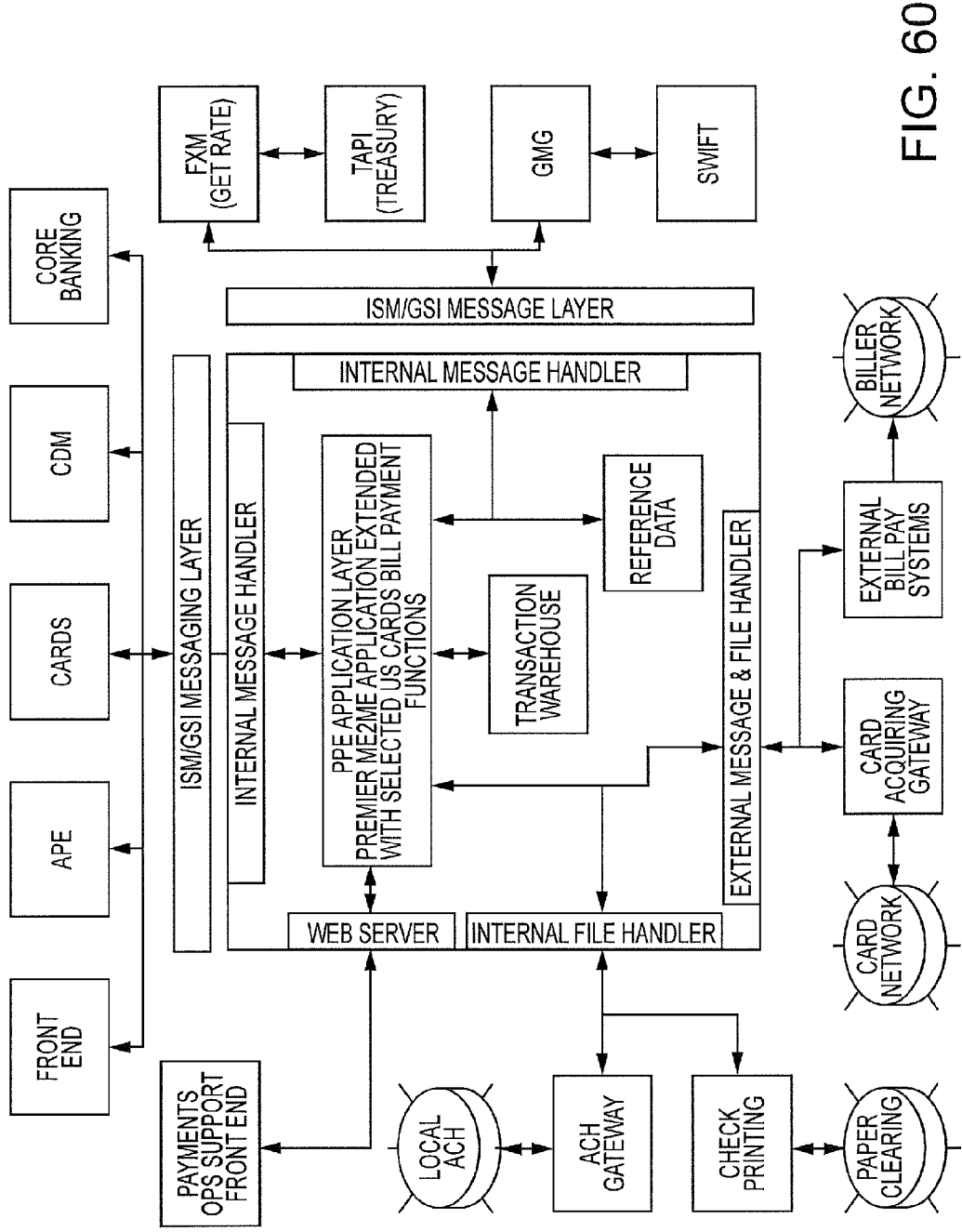
FIG. 60 is an exemplary diagram of Payment Processing Engine (PPE) interactions with the system to support Funding.

FIG. 60 is an exemplary diagram of the Payment Processing Engine (PPE) that supports this feature, showing the interactions required by the PPE. The Payment Processing Engine is the core of the Payments solution, and it is invoked by APe for executing the funding instructions.

Sales Services

Sales Services is a central set of sales, support and marketing services for the capture and management of customer interactions with the channels and the delivery of common information and relationship decisions across all channels.

This includes the management of any process, events, activities or tasks related the sale and marketing of products and services but not related to the fulfilment or management of those products and services. Also included are any processes, events, activities or tasks related to customer service that are not directly related to the management or servicing of a financial product.

In addition, interfaces may be developed against Sales Services to provide Contact History capabilities. Direct integration with the Sales Services Interaction Manager (IM) may be provided. A standard interface will be provided, so local sites using this feature will preferably integrate Sales Services into any legacy CRM/Sales Services host system they may have via appropriate adaptor services.

Involved Party

In some embodiments, the strategic source for Involved Party (Customer) details is the CDM (Customer Data Management) component. The system CDM can establish in a new way a jointly owned product with SWH Core Banking. The joint ownership of a product is defined by the association of a product arrangement to two or more involved parties in the system. A new type of address (the correspondence address) may be used to identify the address associated with this joint ownership. Within Account Opening, the CDU Involved Party ID (IP ID) is preferably used when referring to an Involved Party or Involved Party Role. As CDM is built to support regional capabilities, calls to retrieve Involved Party Details should provide details on the organization unit, group member (entity), and country code.

In some embodiments, the CDU IP ID has the following characteristics:

It is not globally unique; it is unique within an entity
It is a 30 character attribute
Prefix 00-05 is for Involved Party Roles
Prefix 20 is for Organization Units
Prefix 10 is for Organizations
Prefix 11-19 is for Individuals Application Overview The Account Opening system provides both customers and agents the ability to open new accounts with the Bank. To support this process AO provides required functions, or integrates with existing Channel features where available.

Channel Agnostic Functions. The system is built with the customer and Internet channel in mind, increasing the re-use of services and features across customer and staff facing applications.

Customer Creation. Customers can be created based on CDM service models, and can be created on CDM as part of core certification. The CDU IP ID may be used as the customer number for new customers; it has a mapping to the HUB DCN (domestic customer number).

Open New Account. Accounts may be opened to both Core Banking and Cards provider systems after the creation of a customer record in CDM. APe is responsible for linking these new accounts back to the customer's profile in CDM.

To support legacy co-existence, SWHCB customers may be created for both CB and Cards accounts (if not already available).

Configure Product Attributes. Product attributes such as how statements are delivered (e-statements or mail-outs) are applicable to both customer and staff channels.

Status of in-flight Applications. The status of an application is maintained within APe.

Funding of New Accounts. Within Account Opening, all funding activities will be posted to the Payment Processing Engine, with the exception of cash or paper check. In some embodiments, there may be direct integration with Branch or Teller functionality.

Customer Maintenance. An existing customer has the ability to edit pre-filled application data, and this may be passed to APe. At a configurable point in the process flow the revised data may be updated to CDM. It is up to local entity to define the rules around host customer maintenance.

Customer Communication. Customer communications may be sent through the ICCM module, with certain exceptions such as Cards. In some embodiments, the secure PIN mail-out for Core Banking will not use ICCM.

Customer Facing Functions. The system is built with the customer and Internet channel in mind, increasing the re-use of services and features across customer and staff facing applications. All channel agnostic functions listed above are available to the customers.

Staff Facing Functions. The staff features for AO preferably include all of the customer functions, as well as additional functions such as the following, provided only for bank agents and staff.

Maintain Application. Application Maintenance enables back-office, branch and call center staff users to track and resolve work-items associated with customer's product application(s). In addition, Application Maintenance provides ability for staff users to update customer application data and over-ride certain milestone statuses related to the product application.

Maintain Communications. This function enables a staff user to view communications, re-send a communication, or trigger a communication. In addition, communication templates can be maintained by entitled staff users.

Maintain Reference Data. This function enables a staff user to maintain reference data. In some embodiments, reference data may be maintained in multiple locations, such as the ESR, host systems, and the Front-End. Maintenance methods may be as shown in Table 9. However, preferably the reference data is stored in common source.

TABLE 9

| Reference Data Store | Maintenance Method |
|---|---|
| ESR | Maintained by Business or IT Users via ESR Admin Tool (GUI) |
| F/E Property File | Maintained by Business or IT Users via BDE |
| Host Systems | Maintained by Business or IT Users via Legacy User Interfaces |

Architecture Decisions

In various embodiments, the system architecture of the present invention is designed to meet one or more of the following criteria:

APe will duplicate data at point of application from other systems as it has to maintain an enduring application system of record.

The front-end will always call APe using predefined service contracts.

The front-end will use standard 2G technology (e.g., WP, BDE, etc.) and specifically will be built using R2DS for Java.

The front-end user journey will be decoupled from the underlying business process provided by APe.

APe will run on the mainframe in CICS/COBOL.

APe will track and execute processes but it is not a holistic Business Process Management system.

The front-end will have control over what screens and sub-flows are to be displayed at any point in time.

APe will call other systems using fixed format messaging/service contracts only.

The actions (sub services) of an APe macro service operation are configurable.

APe will be built to support a regional deployment.

The front-end will be composed of several portlets that can be chained together to create the user journey. Flexibility is provided through linking together and/or chaining the multiple portlets and externalizing business controlled view elements without the business being required to know the technical implementation of the underlying business processes. Accordingly, in some embodiments of the invention, the front-end interface and/or user journey is decoupled from the underlying business processes using, for example, the chaining of multiple portlets.

The front-end will be built to support flexibility of look and feel, including adding/removing elements, content, and layout.

Local extension of core Account Opening data is provided by allowing additional space on all FE-Ape "save" and "retrieve" macro-services (e.g., not on execution macros).

The Involved Party ID within AO will be based on the GMR (group meta data repository/group data standard).

Data requirements will be based off of a predetermined AO Data Dictionary.

Reference data will be hosted on ESR.

Security Architecture

The Account Opening system is constructed to interact with standard and strategic security systems where appropriate.

In some embodiments, users accessing AO may be authenticated through existing legacy applications prior to Account Opening. This will happen prior to Account Opening being invoked. Account Opening itself will evaluate the staff or customer ID that may be passed via an SSO Single Sign On token for Internet users or via URL parameter passing for Staff channel users.

In some embodiments, communications with host systems are built with host-trust behavior, with no specific security tokens or other mechanisms to authenticate the request at the host. The provided staff or customer ID will be passed into AO, and also passed to any host system that is invoked by AO.

In some embodiments, R2DS Entitlements may provide out-of-the-box entitlements at a macro level (e.g., Portal Page, navigation), and define a file based solution to provide micro entitlements.

Existing entitlement solutions may be used to control access to most of the Account Opening components, as indicated below.

ICCM: Teamsite used to deploy configuration and maintain communication templates Queue Management: Existing queue entitlements solution provided by QMS; OH Distribution screens entitled using R2DS Entitlements Decision Service: Existing entitlements solution APe: No tooling provided; Access restricted by standard mainframe control rights FE: Code/content deployed using BDE CDM: Reference data updated using ESR user interface BI: Existing report access control In some embodiments, no channel integration is provided with Account Opening. Access to Account Opening may depend in part upon the application that entities deploy AO to. This could be, for example, an existing staff/customer application.

Encryption is preferably used as part of the PIN Generation and transmission capabilities of AO. The Retrieval Code used for Save and Retrieval preferably uses a hashing solution for storage with clear-text for transmission.

Operational Architecture

Time-Out Handling

Preferably, Account Opening makes use of standard Infrastructure methods for handling system latencies that exceed operational thresholds.

For example, the FE as a consumer should contact APe as its provider, and should not continue to wait for a response in the event that APe is down, or non-responsive.

There are two aspects, one which is in control of the application and one that is set by the overarching infrastructure. A Message Queue (MQ) message expiry time may be set by the regional ITO team to ensure overall response timeouts are controlled within the infrastructure.

A WAIT time may be set by the consumer applications to determine how long they will wait for a response from any given provider. The value itself may be set, for example, using standard JMS/JNDI (Java Message Service/Java Naming and Directory Interface) configuration on the WAS/WPS (Websphere Application Server/Websphere Portal Server) platforms.

Similar settings may also be set within R2DS4C to control responses from the underlying host/fulfilment systems.

Exact timeout settings for an implementation of Account Opening will ultimately depend on the entity business process and system flows.

Error Handling

Figure 61:
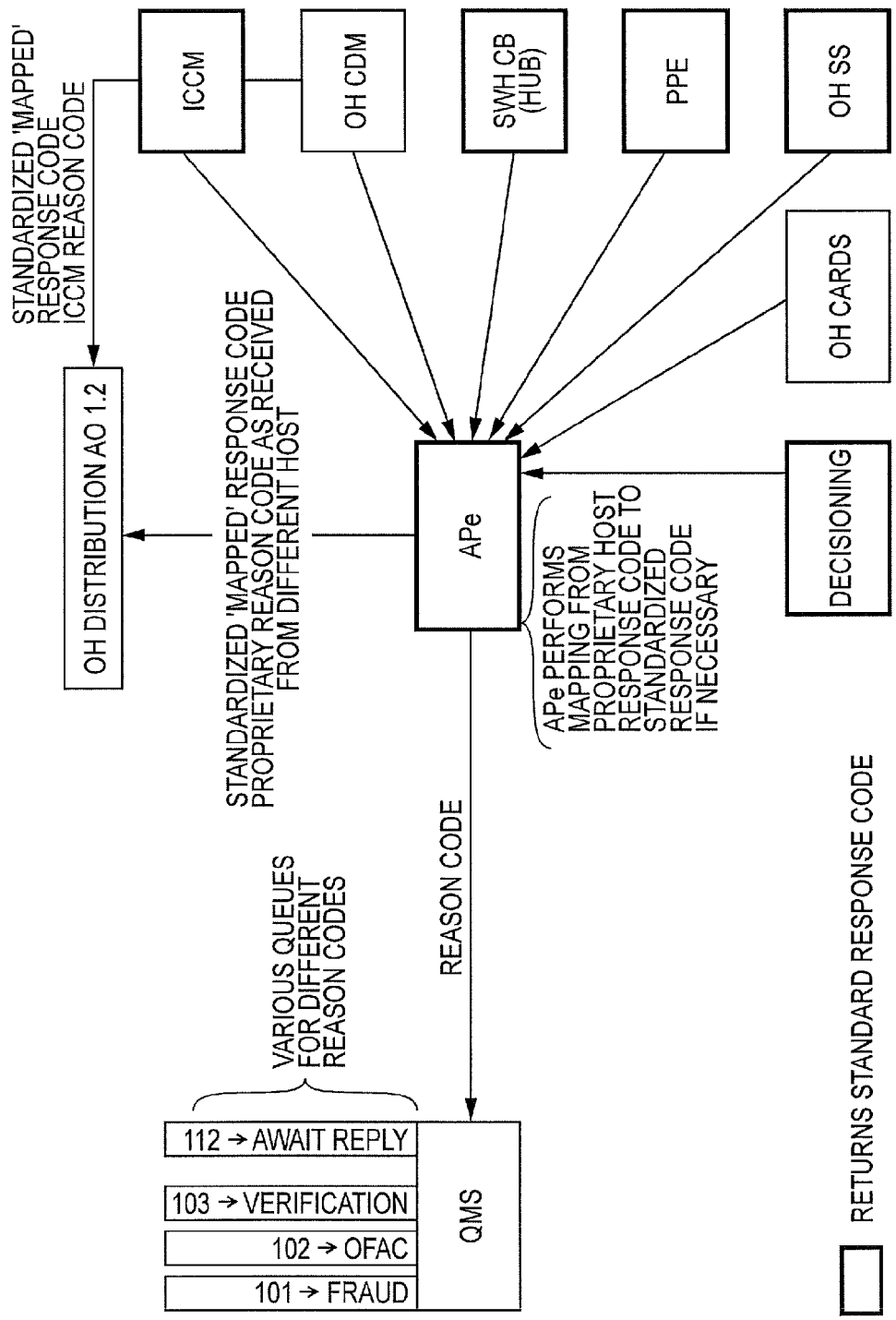
FIG. 61 is an exemplary diagram illustrating the Error Handling process.

FIG. 61 is an exemplary diagram illustrating the Error Handling process.

Services may be called by messages, and in response messages there are attributes to state the success/failure of service call as follows:

Response Code: states success or failure of call. It also shows the severity of the error.

Reason Code: expresses the extra information about the error, the area of error, the reason of failure, or warning information.

Tracking Code: provides a code that can pin-point the error in the Host system's error logs (if provided)

Different service providers may have different Response and Reason Codes. AO should uniquely react to different provider's Response/Reason codes. For this purpose, APe plays an important role to unify the codes.

Table 10 lists exemplary standardized response codes. In ideal situation, all back-ends should return these codes as a result of service calls.

TABLE 10

| Response Code | Description |
| --- | --- |
| 000 | Success |
|  | Continue to next component in flow |
| 004 | Warning |
|  | Continue to next component, and either show the warning to the user or log it |
| 008 | Host Validation Errors |
|  | The user is expected to be able to recover from this error if they modify their data input. |
| 016 | Fatal Error |
|  | Throw user to the Application Error page. |

As mentioned before, different service providers may return their proprietary reason codes upon errors. These reason codes will be passed from APe to AO FE without change. AO FE will display the appropriate message to user based on the received Reason code.

The error handling process is described in the following example: APe calls one or a few Micro Services. The response returns back from the called micro service, APe receives a non "000" Response Code. The Reason Code(s) will now be reviewed. APe will proceed to call next micro service, if any. APe will return Macro Service result which contains the standard Response Code, along with proprietary Reason Code. FE will proceed to next step, or display appropriate messages in case of errors/warnings.

Audit Logging

The AO framework can maintain traceability of user actions by logging this information against the User Action History table in APe. Outbound customer communications and interactions between Customer Service Representatives (CSRs/staff/agents) and customers are logged in the communication history and contact history tables, respectively.

Deployment View

Logical Deployment Diagrams

The diagrams described below illustrate a potential logical deployment view to the core Account Opening application. This view is based on the functional architecture and may change based on changes in design and coding.

Account Opening is developed using CDM as the master for customer data; however, this may not necessarily be the pattern used in all sites. Two logical deployment views are illustrated below.

Figure 62:
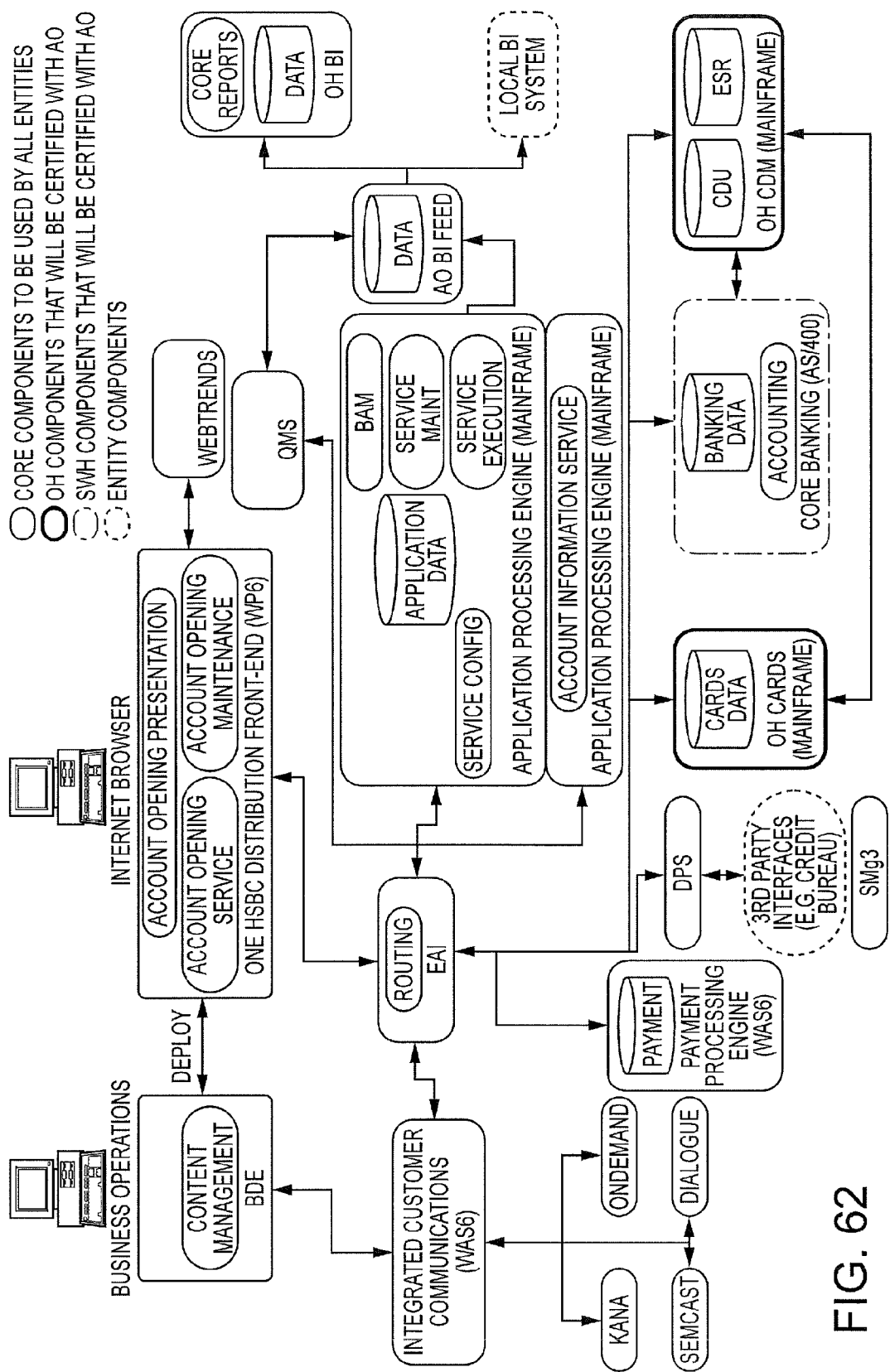
FIG. 62 is an exemplary logical deployment diagram for account opening, in which Customer Data Management (CDM) has primary responsibility for customer data.

FIG. 62 is an exemplary logical deployment diagram for account opening, in which Customer Data Management (CDM) has primary responsibility for customer data.

Figure 63:
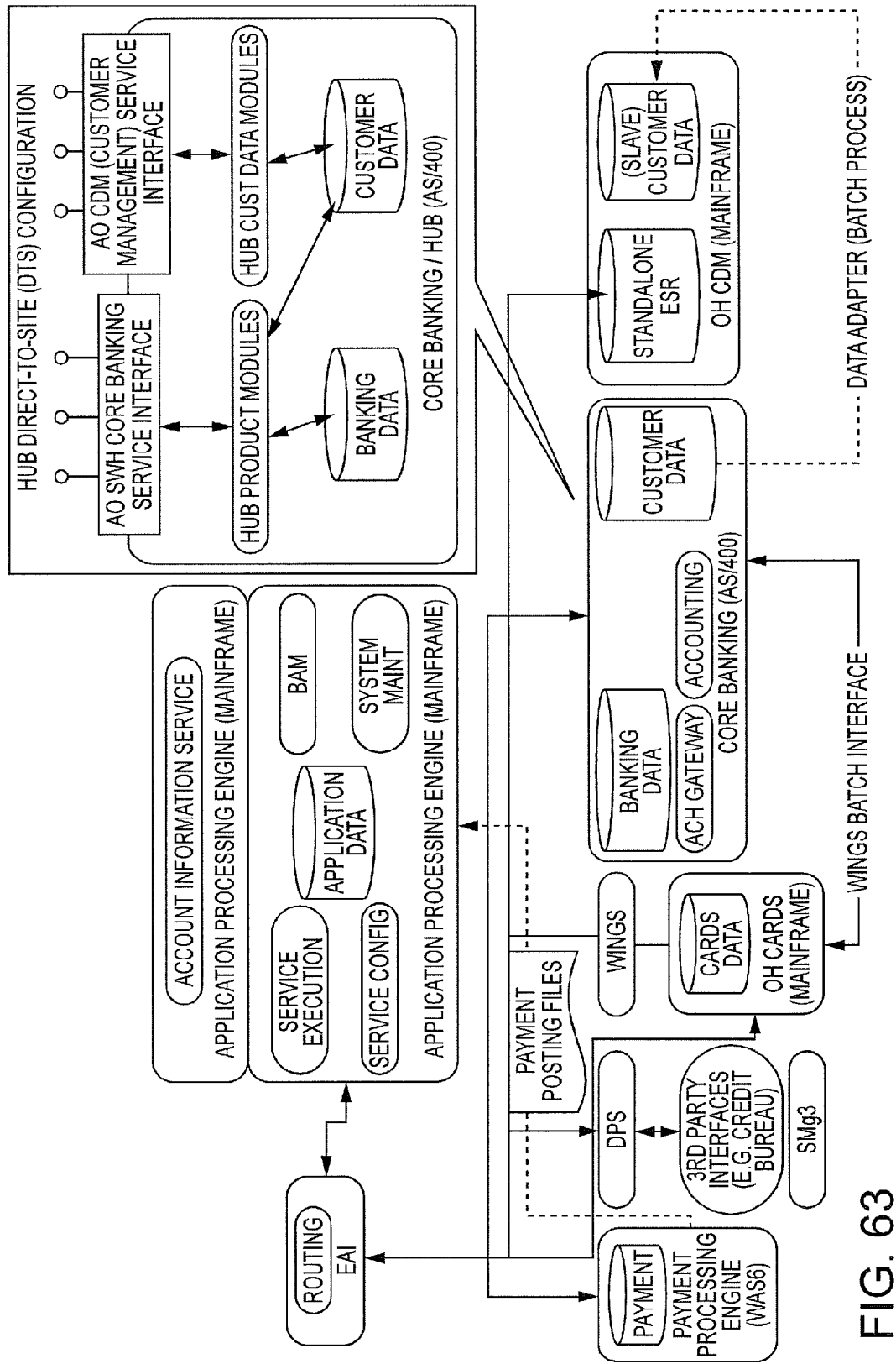
FIG. 63 is an exemplary diagram that is a variant of FIG. 62, showing an exemplary configuration in which HSBC Universal Banking (HUB) has primary responsibility for the customer data.

FIG. 63 is an exemplary diagram that is a variant of FIG. 62, showing an exemplary configuration in which Core Banking/HSBC Universal Banking (HUB) has primary responsibility for the customer data. This diagram is a variant to the deployment configuration shown in FIG. 62, also based on a SWH implementation. It depicts the HUB DTS (data transformation services) configuration under which HUB will act as the customer master. In the absence of the two way data bridge between HUB and CDM, this deployment pattern may be followed for HUB entities (e.g., until they can migrate to using CDM as the customer master).

Integration Architecture

To fulfill the requirements of customer acquisition, and account opening, Account Opening needs to integrate with a large number of systems, running on a variety of platforms—e.g., Java, AS/400, and Mainframe. In some cases, systems act as both service consumers and service providers.

Figure 64:
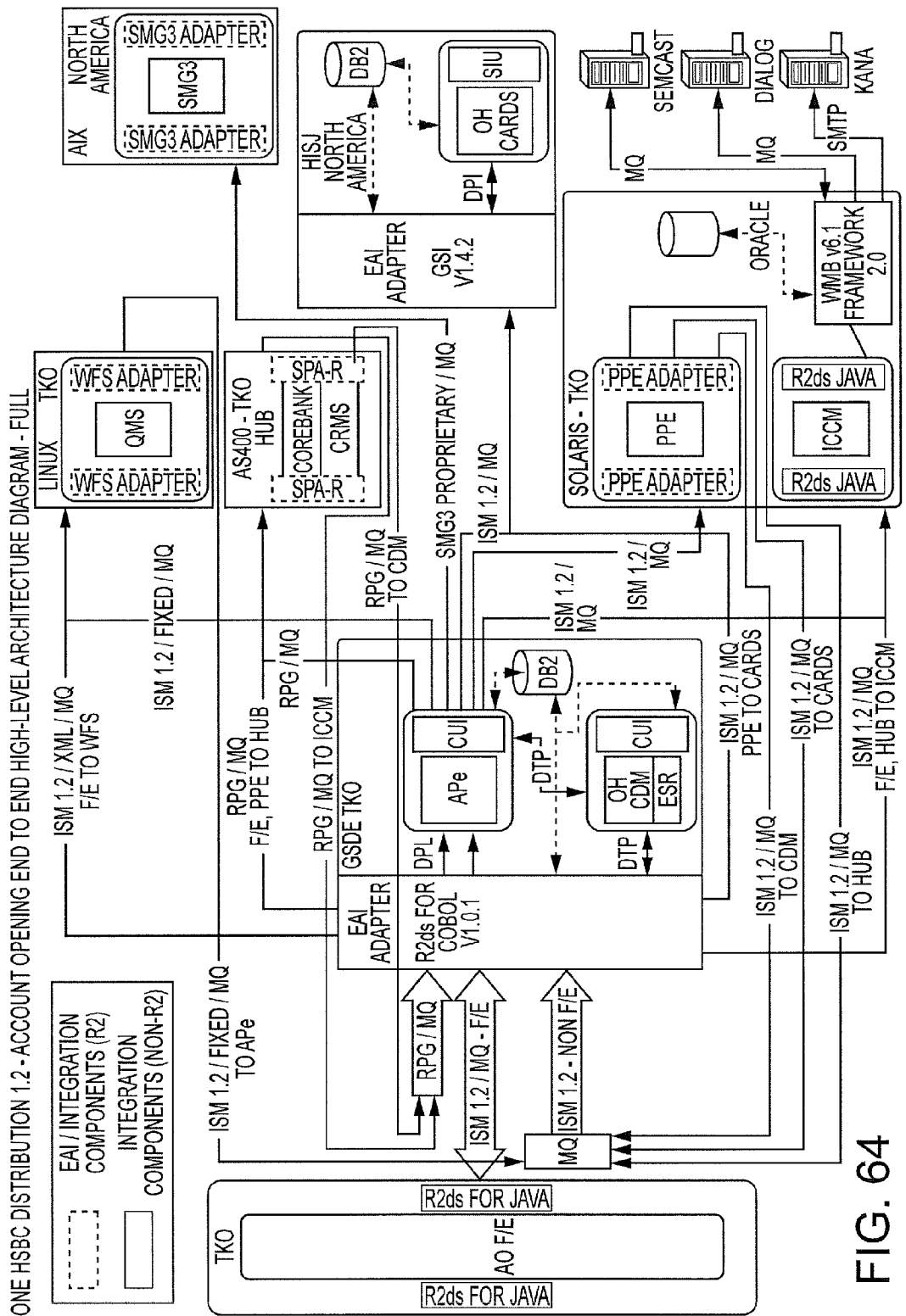
FIG. 64 shows an exemplary Enterprise Application Integration (EAI) architecture of the Account Opening system.

FIG. 64 shows an exemplary Enterprise Application Integration (EAI) architecture of the Account Opening system.

To support this integration, in some embodiments, AO implements a full EAI mediation pattern using R2DS for COBOL technologies, as shown in FIG. 64. Items shown in green on the diagram are the standard R2DS integration components. Items in red are non-R2 integration components, but where noted they do support integration with the standard ISM message envelope—this includes QMS, PPE, and ICCM. For these three components it would be possible to go direct from consumer to provider without using mediation.

Batch View

Figure 65:
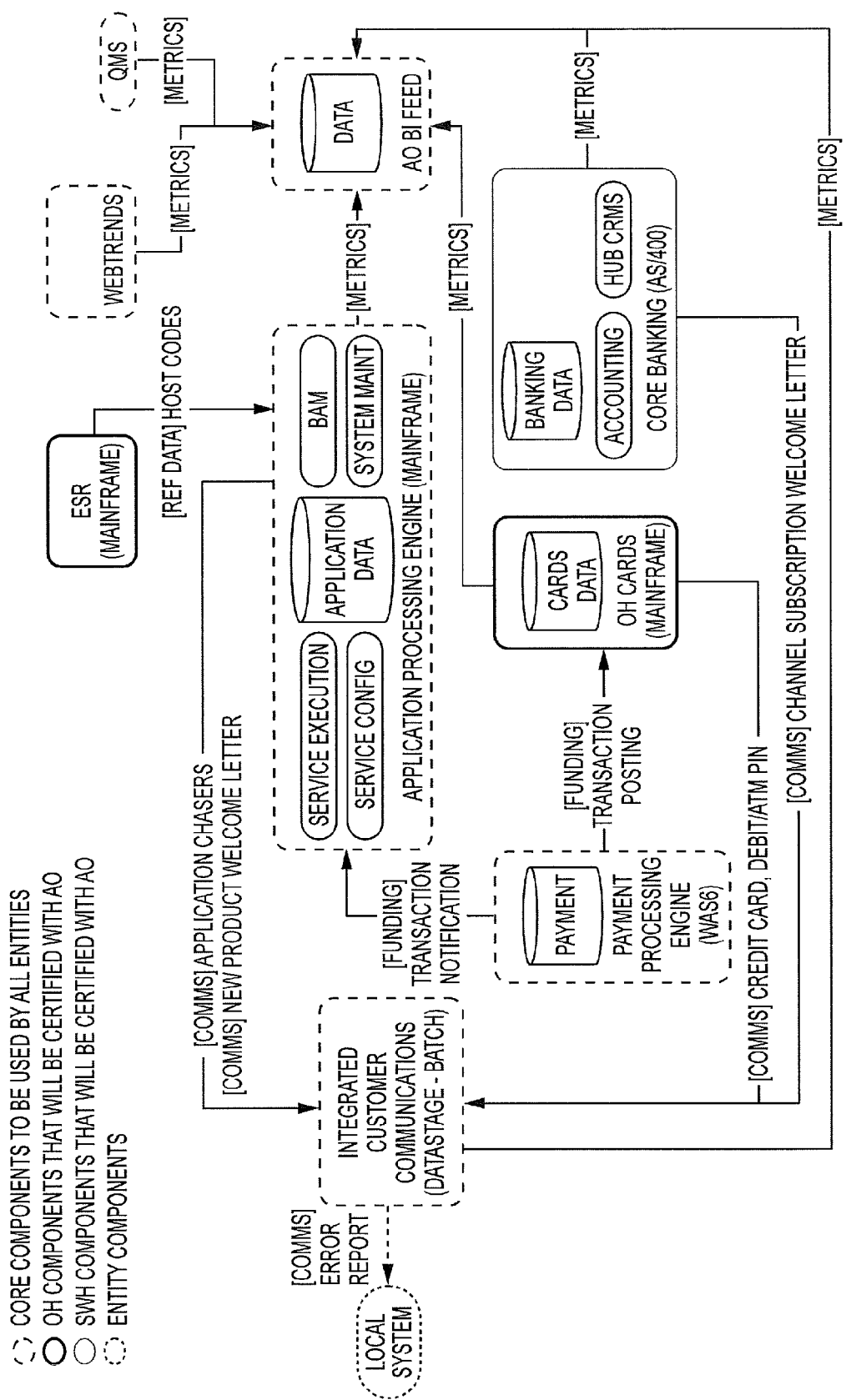
FIG. 65 illustrates exemplary batch links within Account Opening.

Several batch systems may be used in the overall AO system, although some may not be directly related to AO and may exist purely in existing product systems. The batch integration diagram in FIG. 65 illustrates exemplary dependencies. The diagram indicates various batch links that may be present in the system. The purpose and direction of the batch feed is indicated within the diagram.

In some embodiments, the batch feeds are as follows:
Application Processing Engine
Application Ageing
BI Feeds
Communication Triggers
Core Banking
ICCM
BI Feeds
Cards
Communication of Card PINs
BI Feeds
Sales Services
Extract of Contact History data
CDM
None
ICCM
Printing
BI Feeds
Payments Processing Engine
Transaction Posting to Cards
For indicating success/failure of posted transactions
BI
BI CPT daily (interface with SWHCB and Cards)
BI CM weekly (internal AO weekly summarization process)

Entity Extension View

Aside from the configurability of the solution, the Account Opening framework is built to support various types of entity extensions to meet local deployment needs. Some of the extension points supported by the framework include: user interface extensions, process extensions, data extensions, message extensions, and communication extensions.

Extension points for user interface extensions may include, for example, addition of new portlets in the front-end application, addition of new pages in the front-end application, addition of new data fields to front-end screens, and implementation of local exit to cross-server portlets (e.g., instant IB registration).

Extension points for process extensions may include, for example, implementation of local exit to manual processes (e.g., manual VI), and implementation of decision extensions.

Extension points for data extensions may include addition of new data fields in the front-end application (if UI related), addition of new data fields in the application processor (APe, BI), and addition of new data fields in the respective host systems (e.g., CDM, SWHCB, Cards, PPE, ICCM, BI).

Extension points for message extensions may include addition of new macro services in APe to support local functionality, addition of new services in host systems to support local functionality, and addition of new data fields in the designated local data section of a message.

Extension points for process extensions may include addition of new data fields to communication template, addition of new data fields to terms and conditions, and addition of new communication template (documents).

Further, host extensions for addition of new services and programs in host systems, may be supported.

Figure 66:
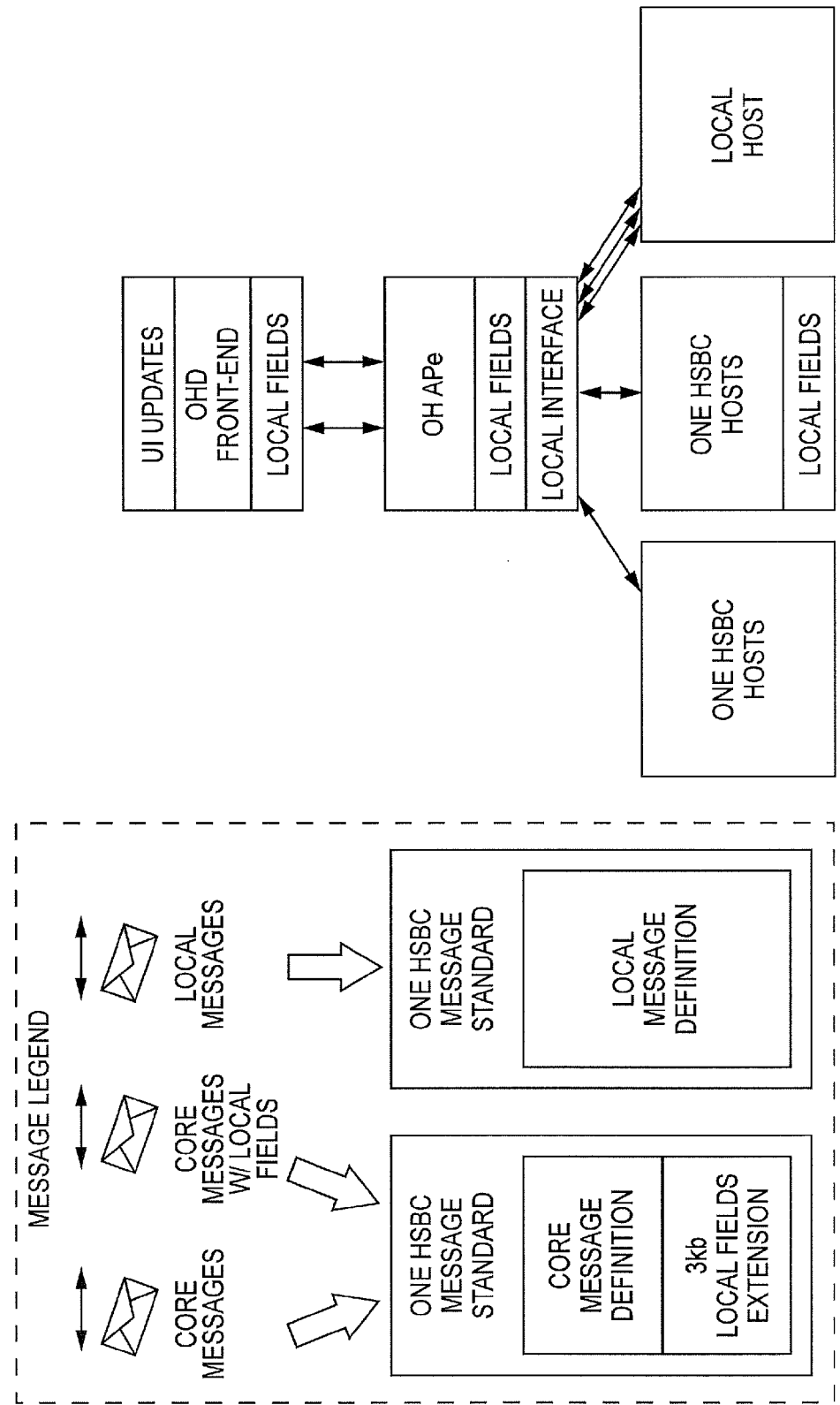
FIG. 66 illustrates various types of alternative entity extensions supported by the Account Opening system and process to meet local deployment needs.

FIG. 66 illustrates various types of alternative entity extensions supported by the Account Opening system and process to meet local deployment needs. The implementation of entity extension points may involve local development and integration, as new UI elements, message mapping, retrieval from within APe, and mapping to entity host systems is required.

Data View

This section describes the data propagation between applications and application components in order to deliver the business requirements. The information flow and security classification of the information may vary.

In some embodiments, data structures are based on a combination of the Data Dictionary and CDM (for IP related data items).

Account Opening touches many provider systems, each of which will hold data (customer, product, operational).

Data entities involved in the AO process may include, but are not limited to:

User, customers, accounts

Keys used for accessing major data entities (e.g. TPID, transaction ref numbers, etc.)

Session Data and User Profile

Data cleanup (including system logs) and recycling

Reference Data

Product Configuration Data

Archival of data

Figure 67:
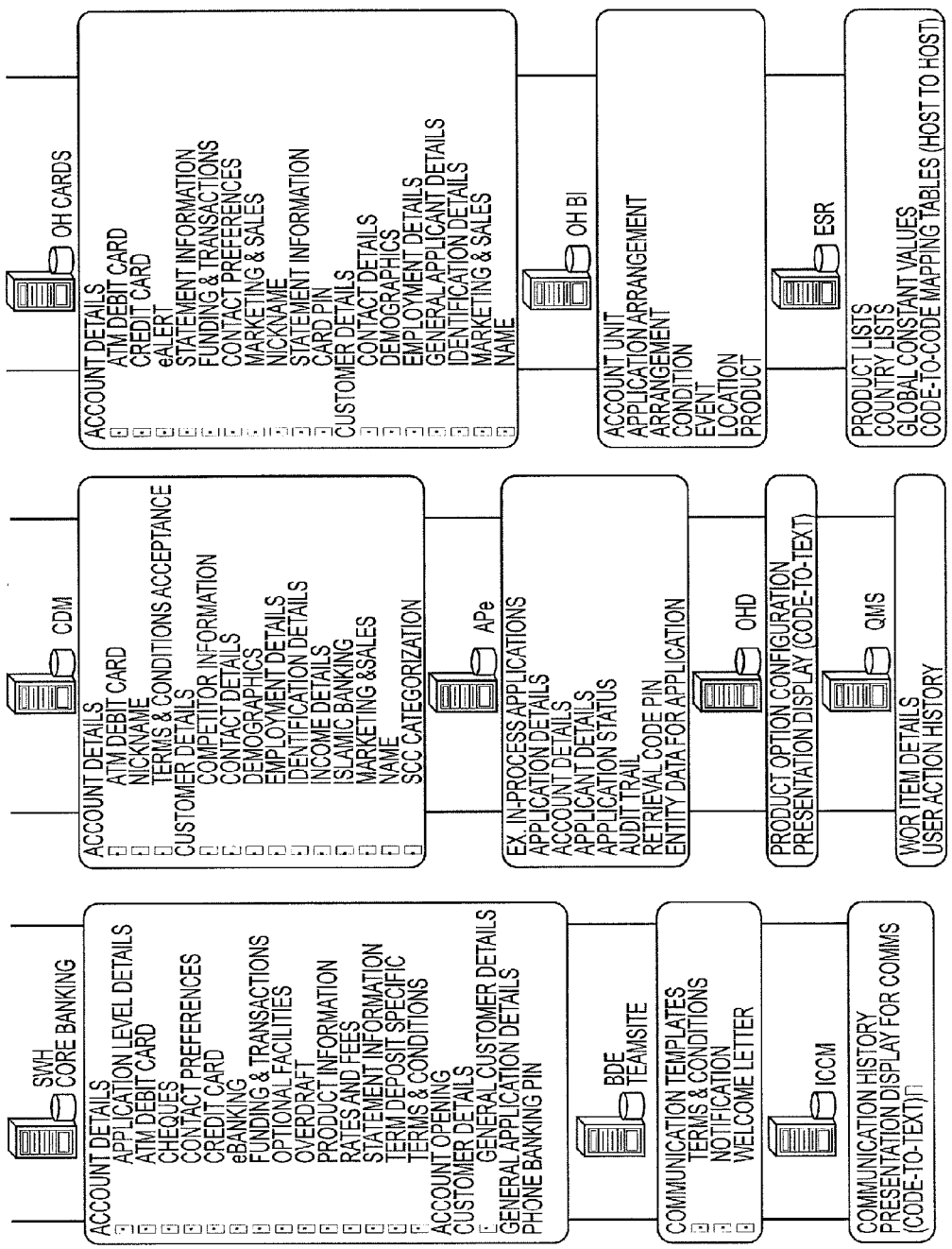
FIG. 67 is an exemplary data summary showing AO system interfaces with various Bank components.

To open an account, the AO system interfaces with many of the Bank's components. Along with this comes a distributed view of the data within the overall system, as shown in FIG. 67.

Figure 68:
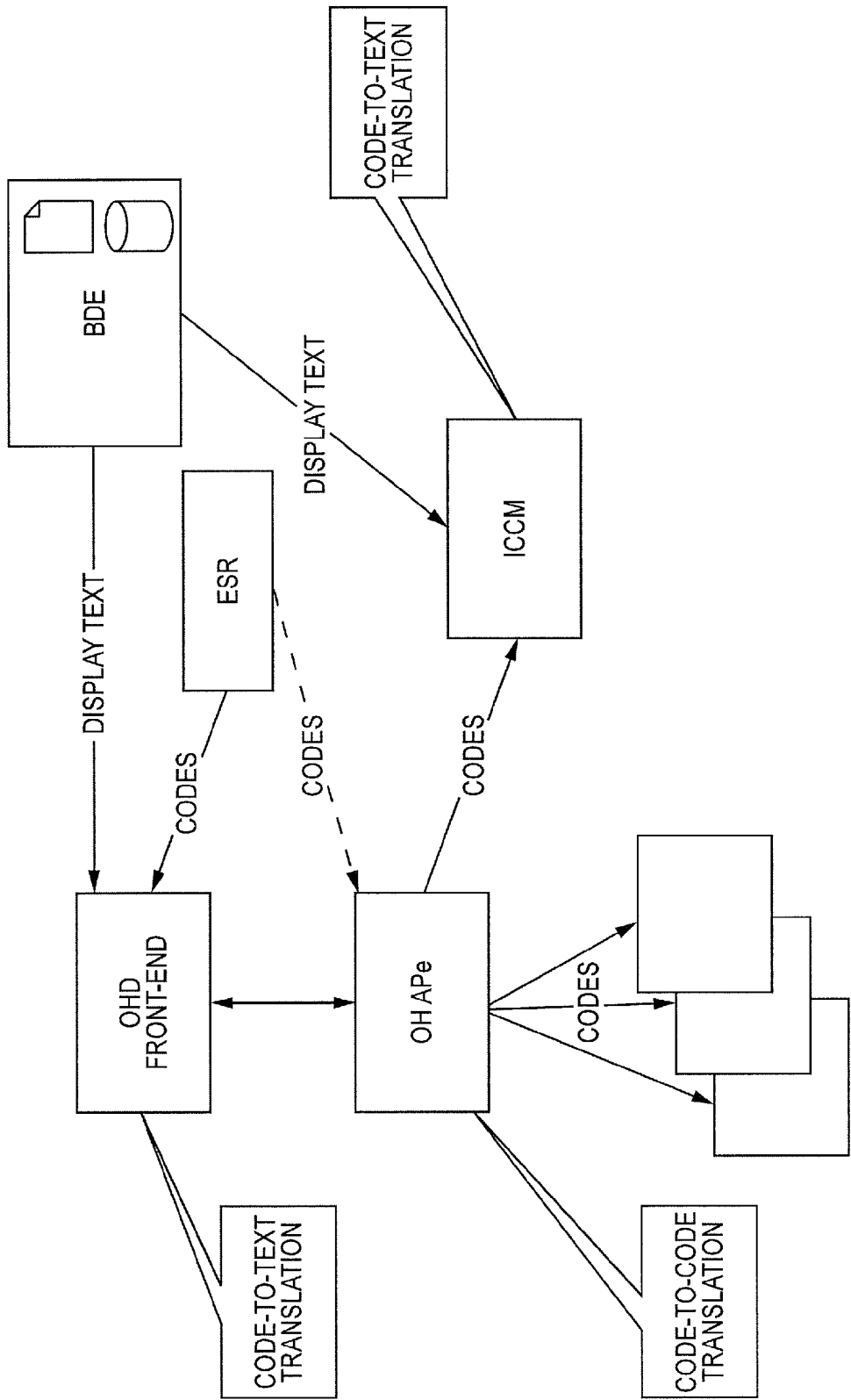
FIG. 68 illustrates an exemplary data manipulation process, in which codes are converted at the presentation layers (FE and ICCM components).

In some embodiments, the ESR is the strategic repository for reference data, and is used to retrieve all reference data lists, which will be returned as codes. Converting these codes for human consumption may be handled at the presentation layers—FE and the ICCM communication components—for example, as shown in FIG. 68.

Figure 69:
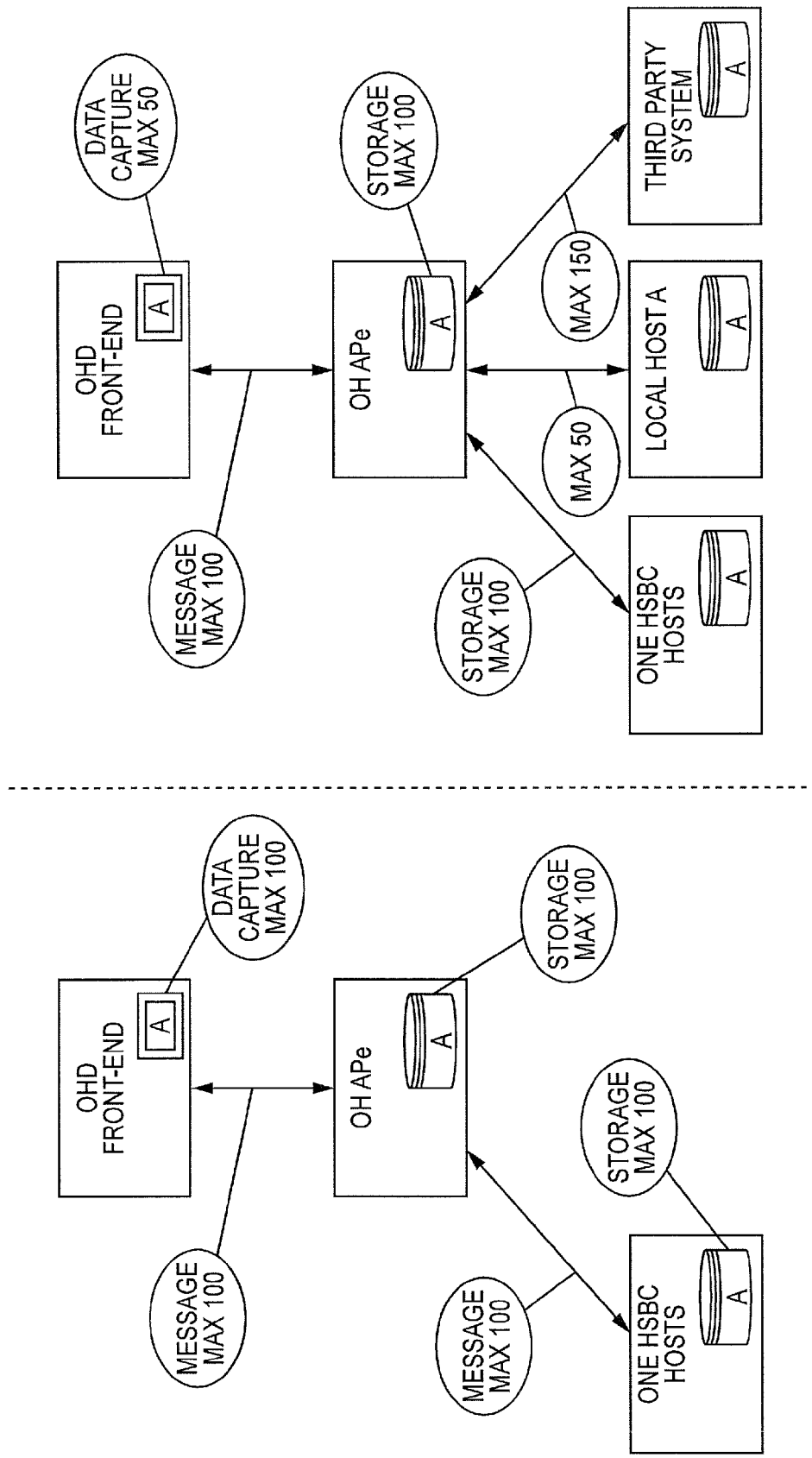
FIG. 69 is an exemplary diagram of the AO system supporting varying definitions of data, such as data field lengths. The left-hand side shows exemplary field sizes supported by the AO framework, while the right-hand side reflects a local entity implementation.
Figure 70B:
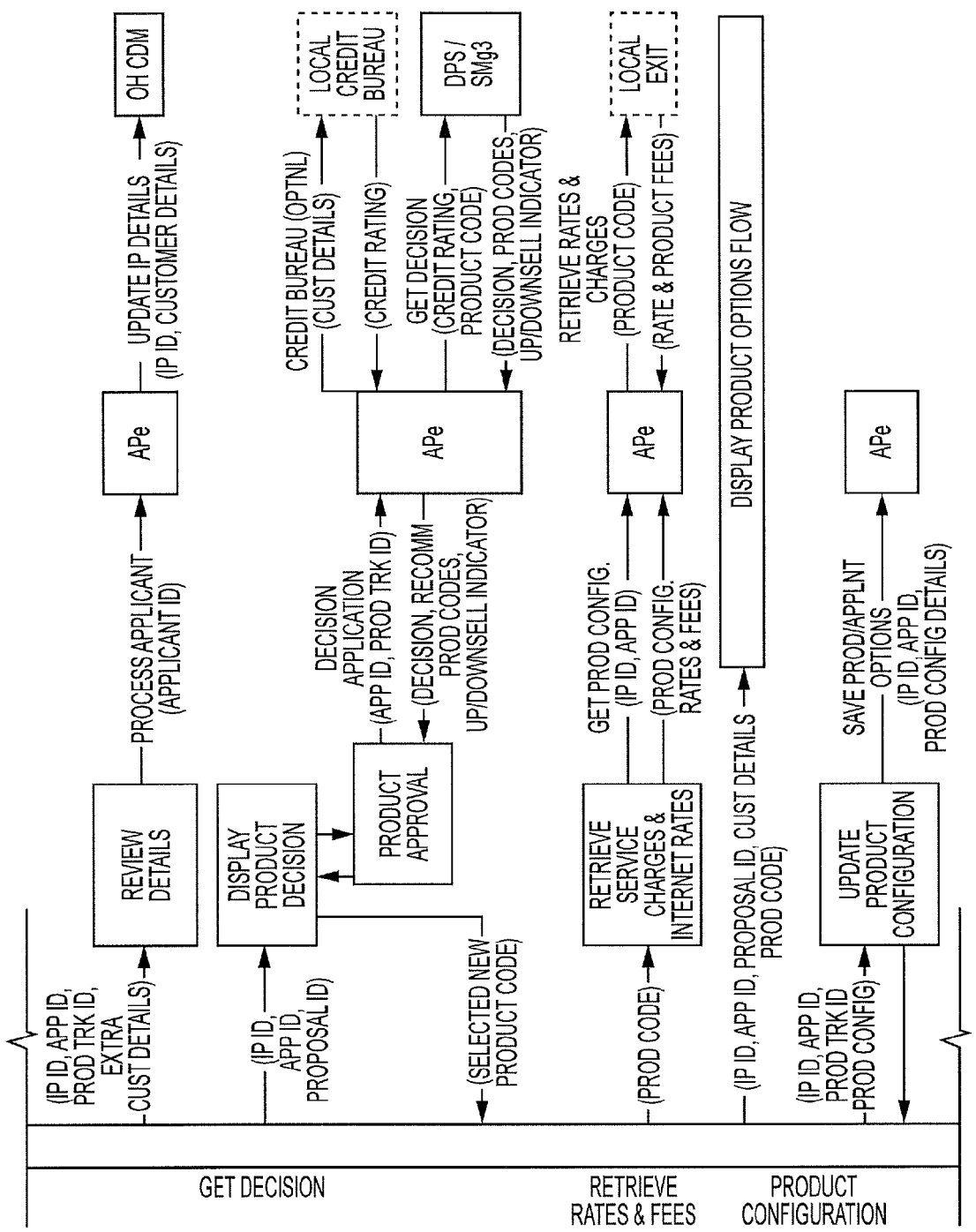
FIGS. 70-77 illustrate exemplary architecture use cases.
Figure 70C:
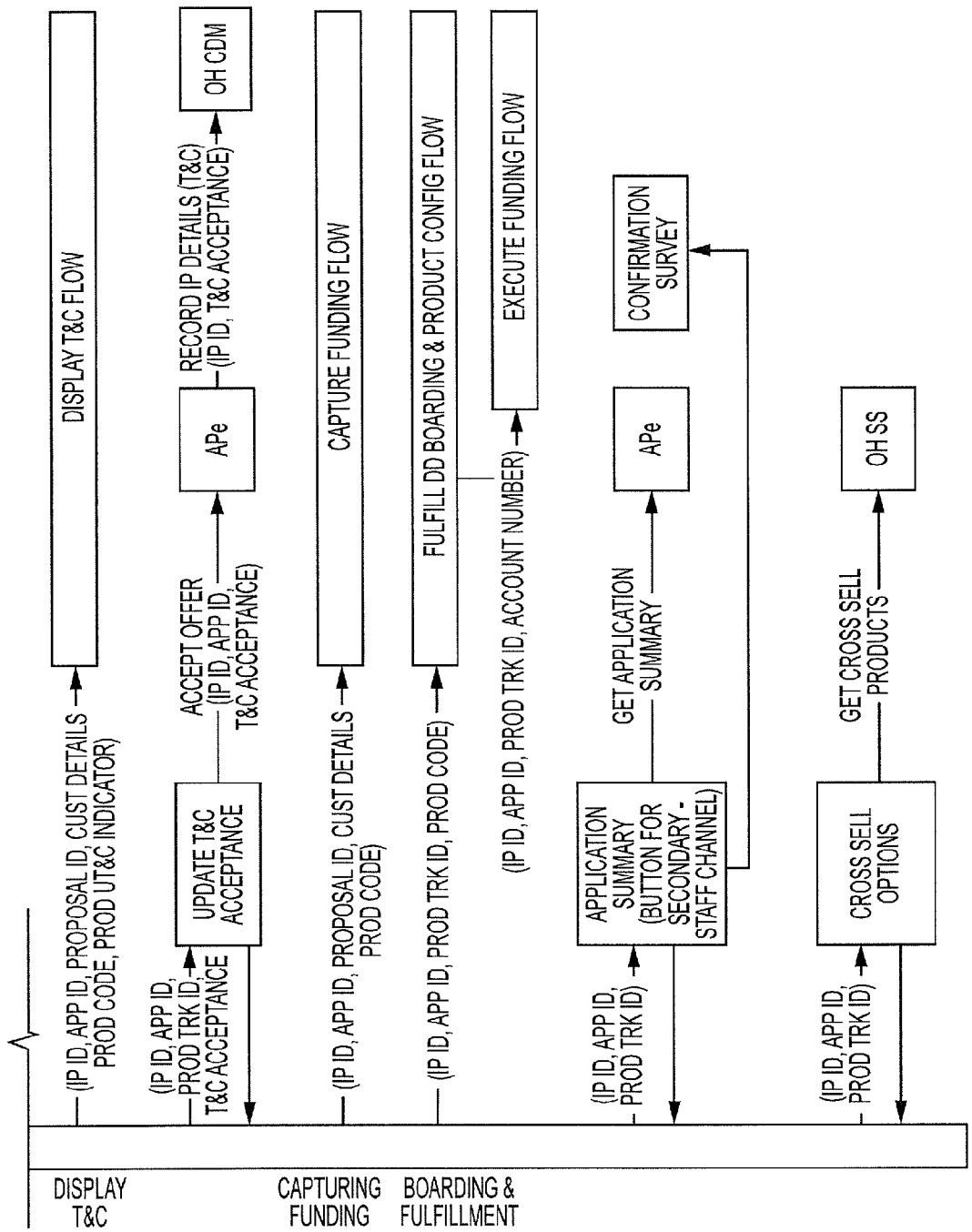
Figure 71B:
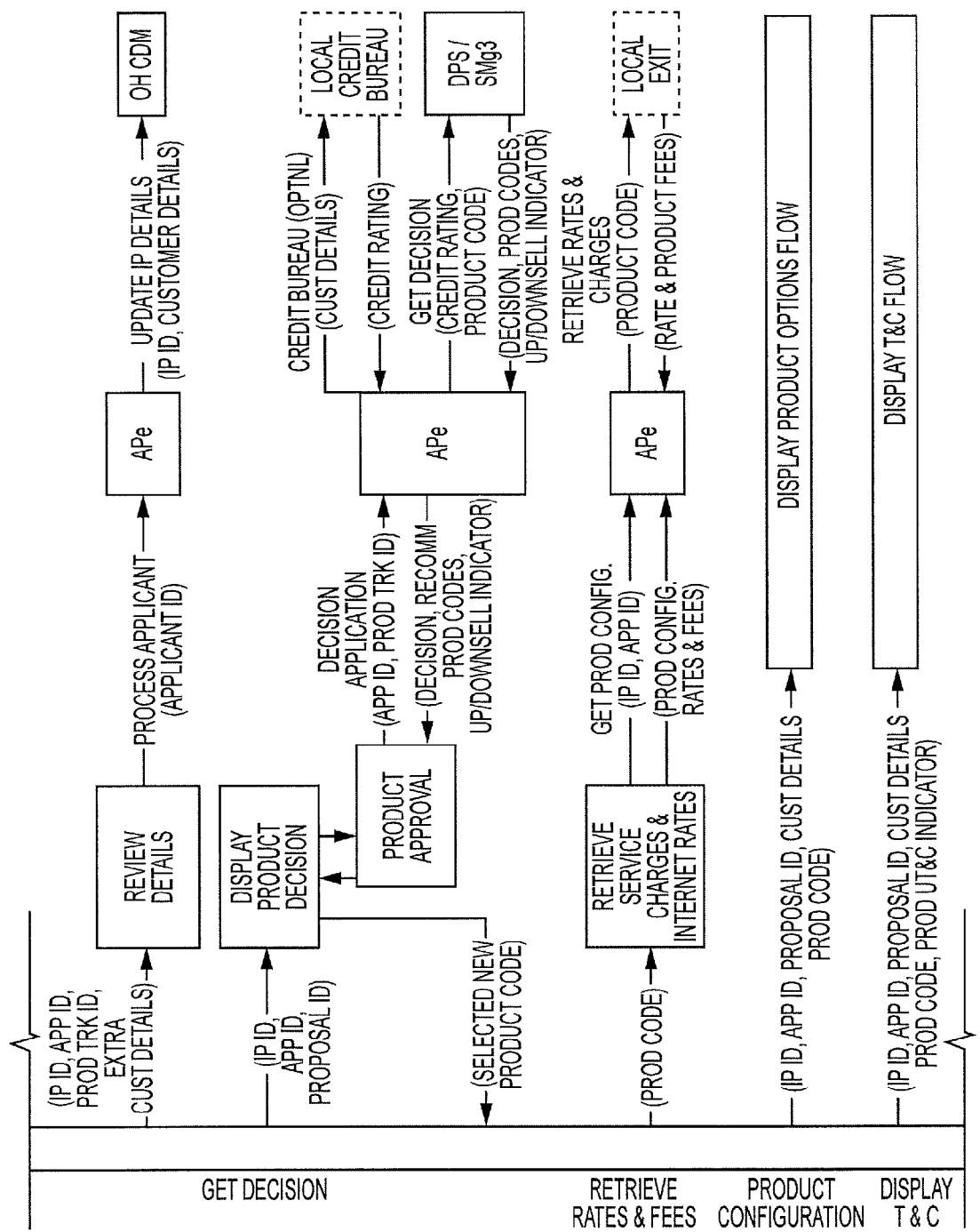
Figure 71C:
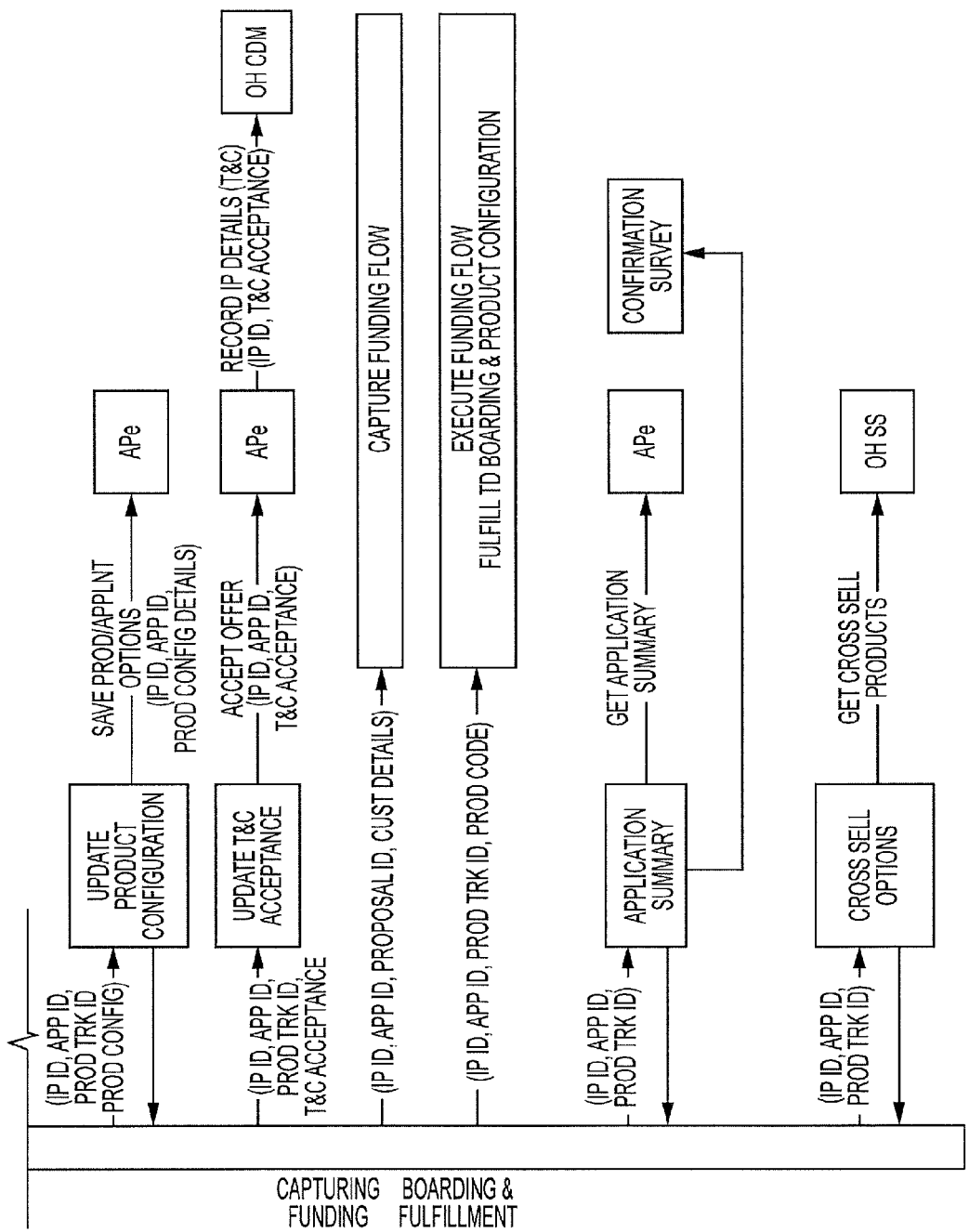
Figure 72B:
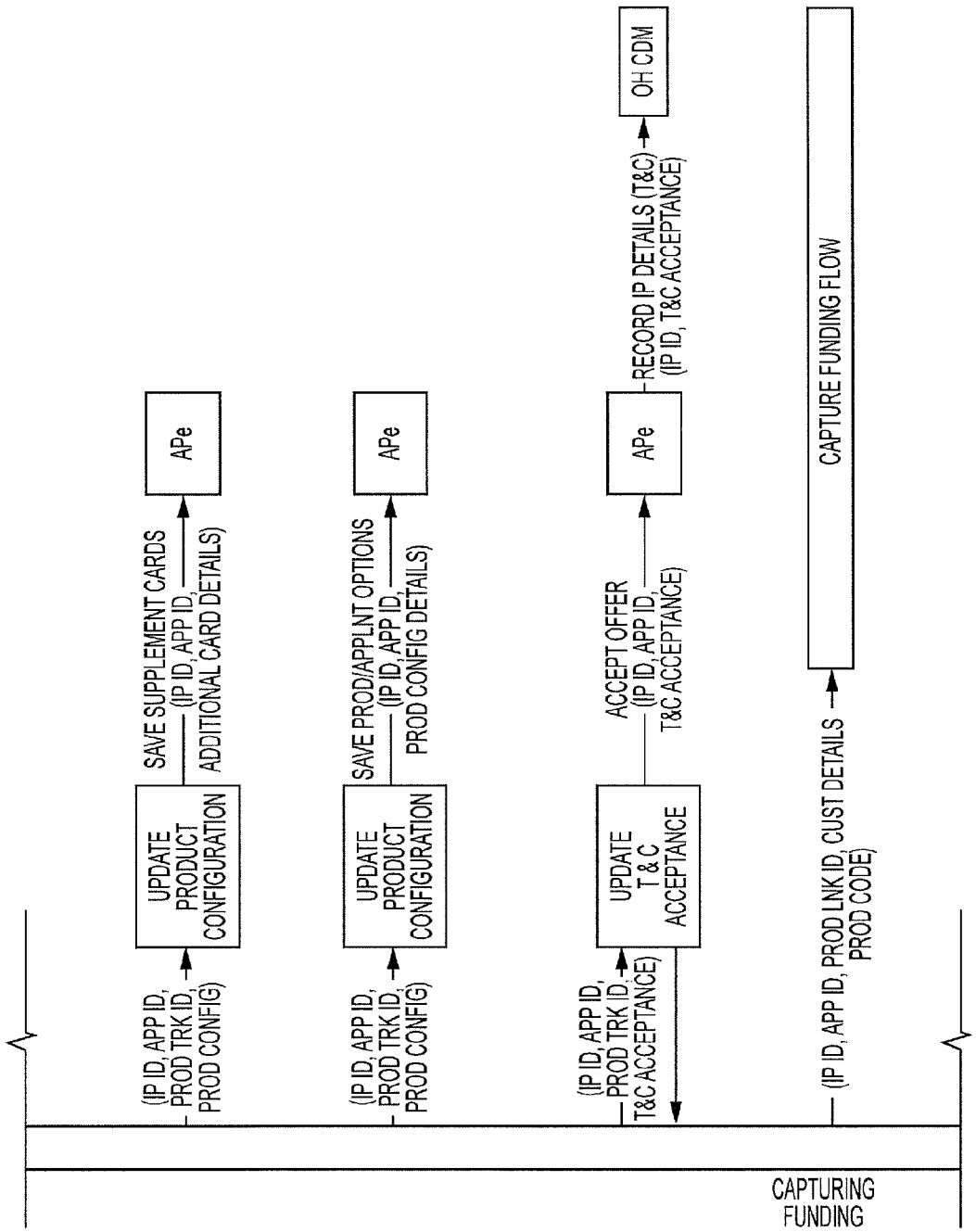
Figure 72C:
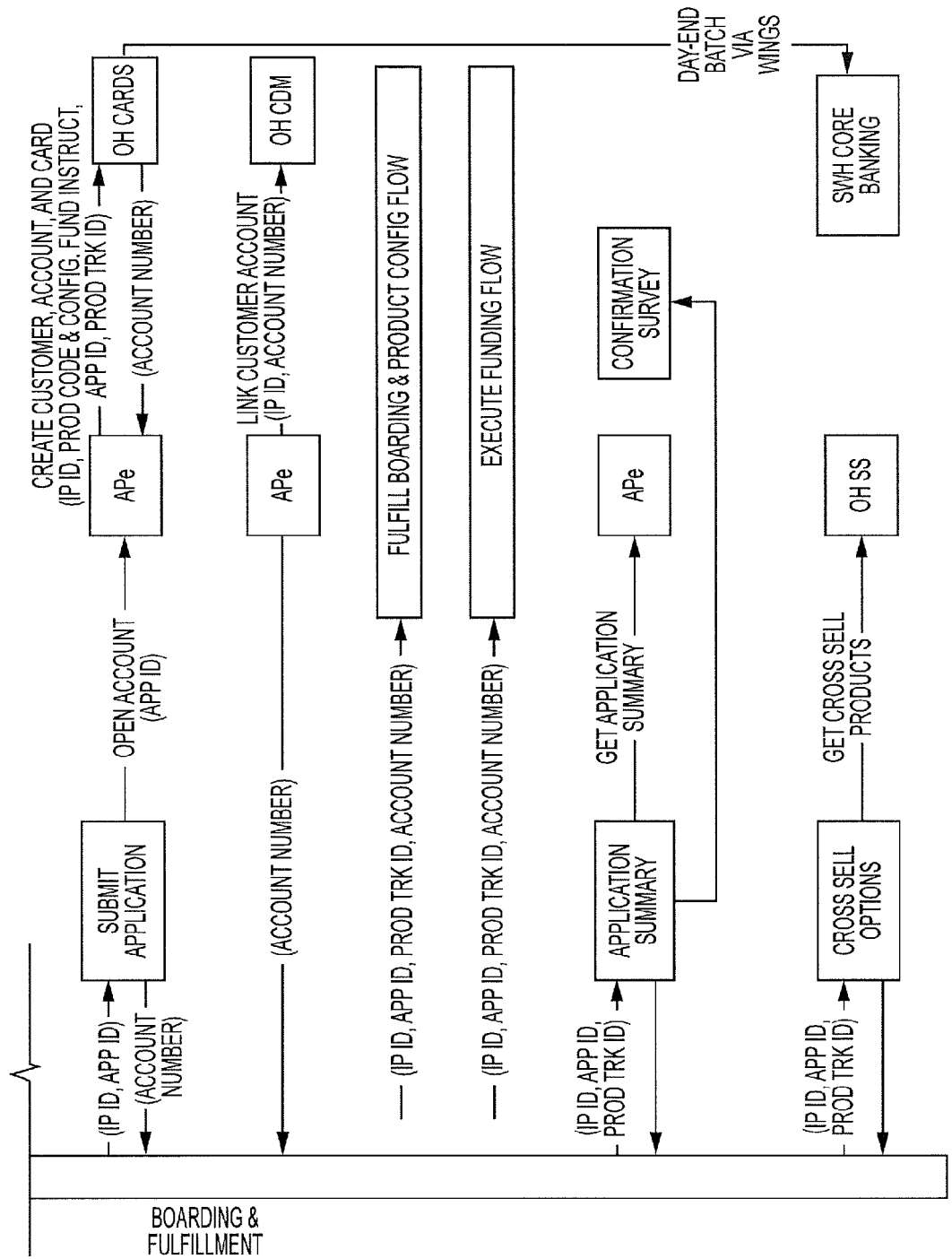
Figure 73B:
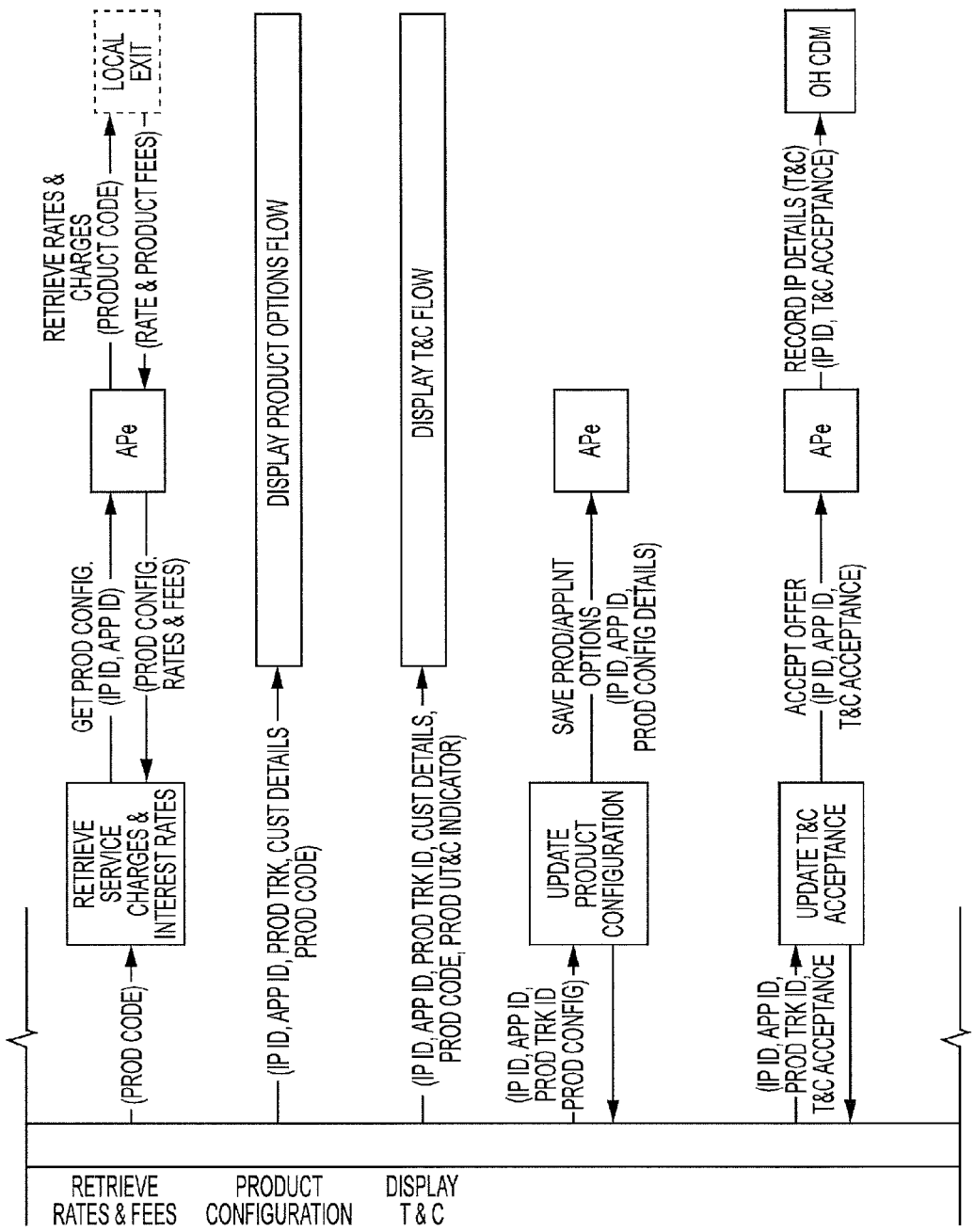
Figure 73C:
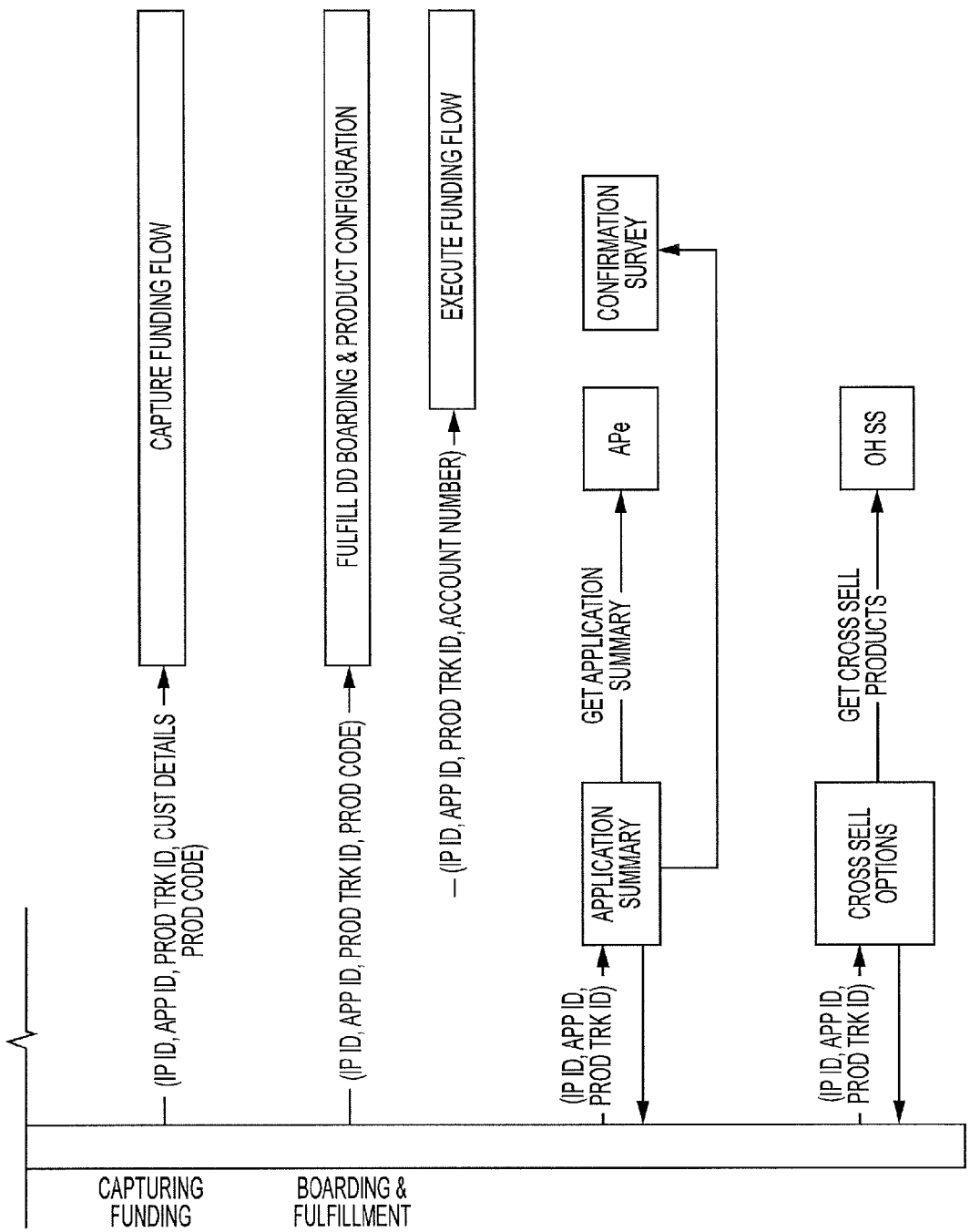
Figure 74B:
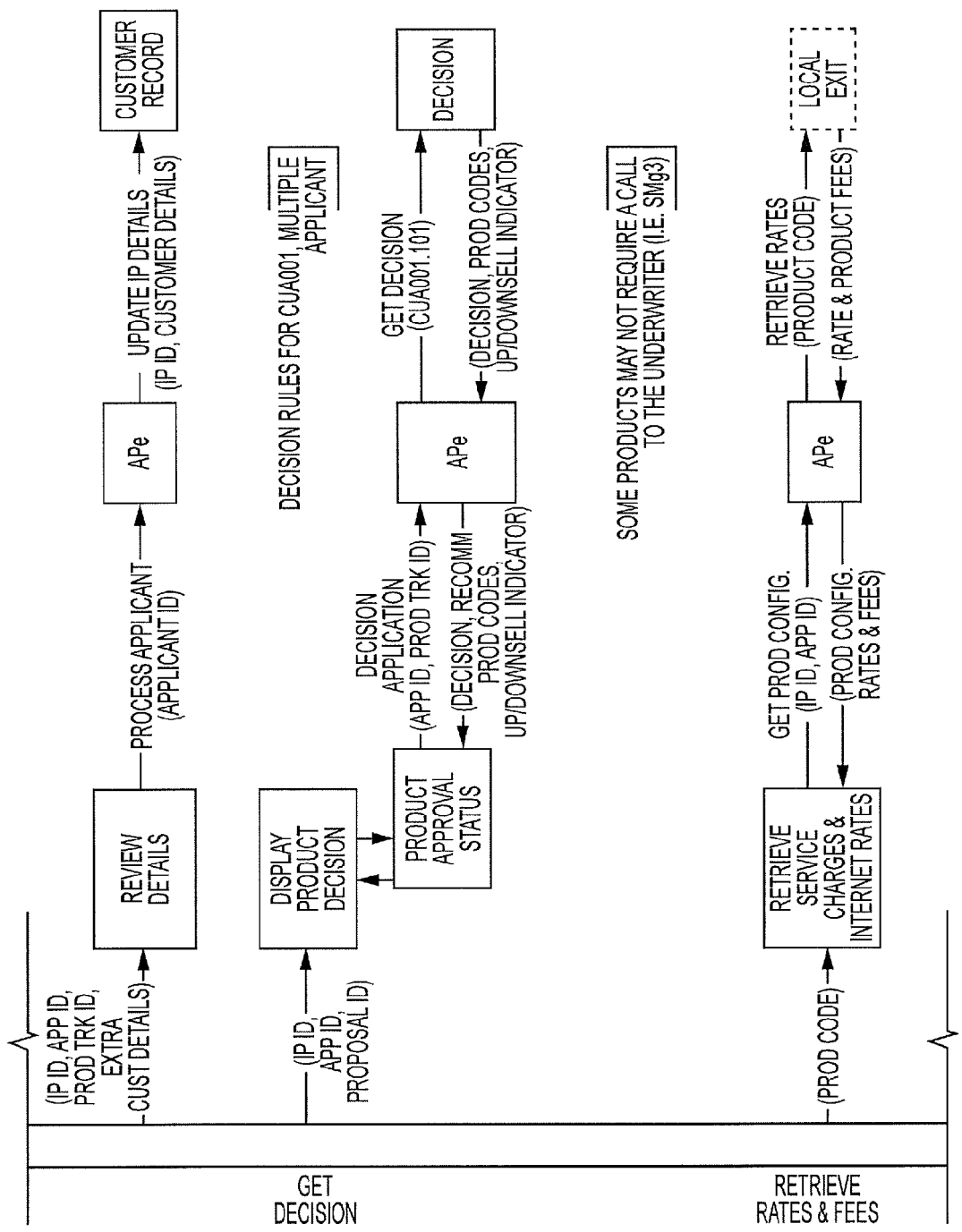
Figure 74C:
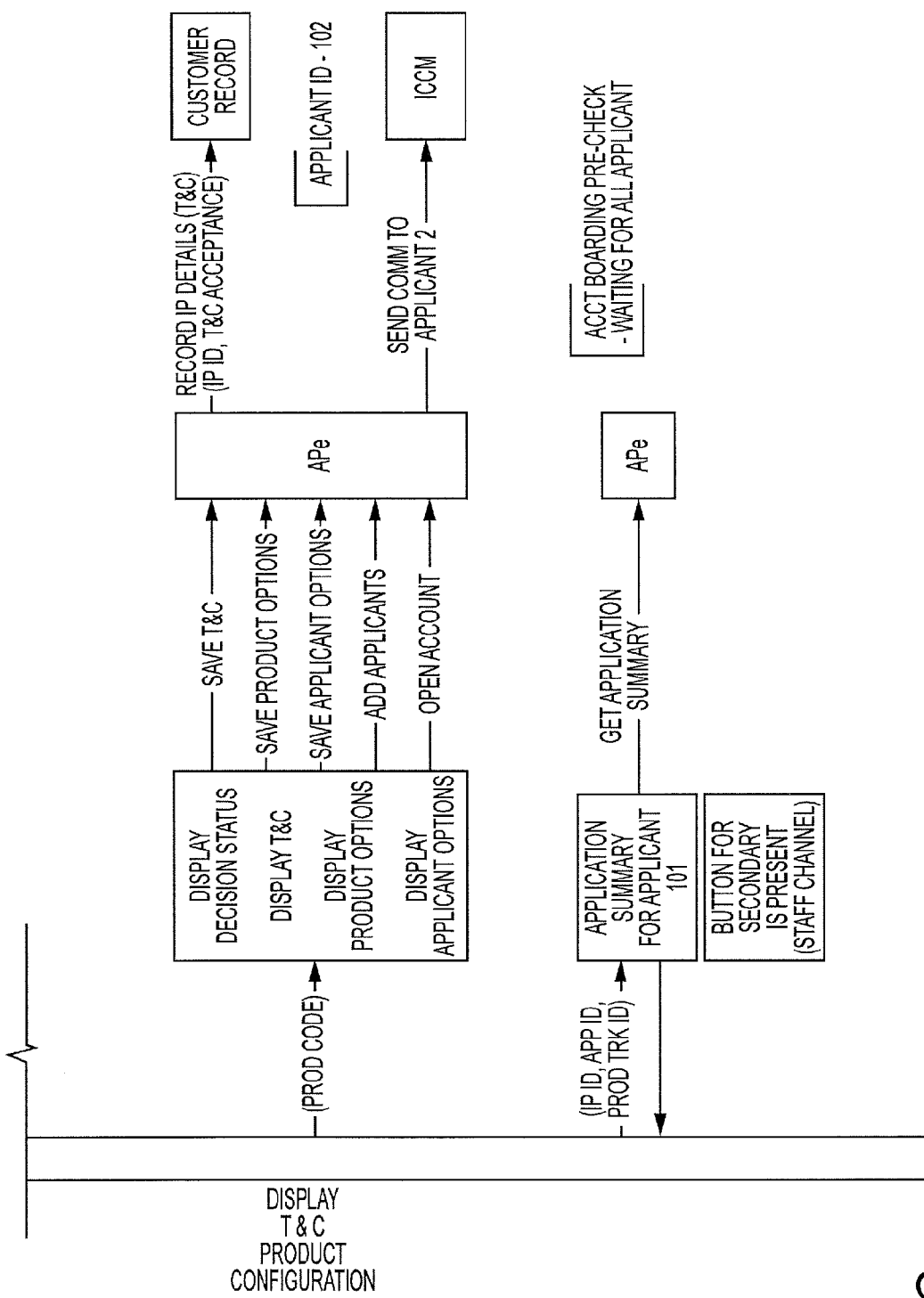
Figure 75B:
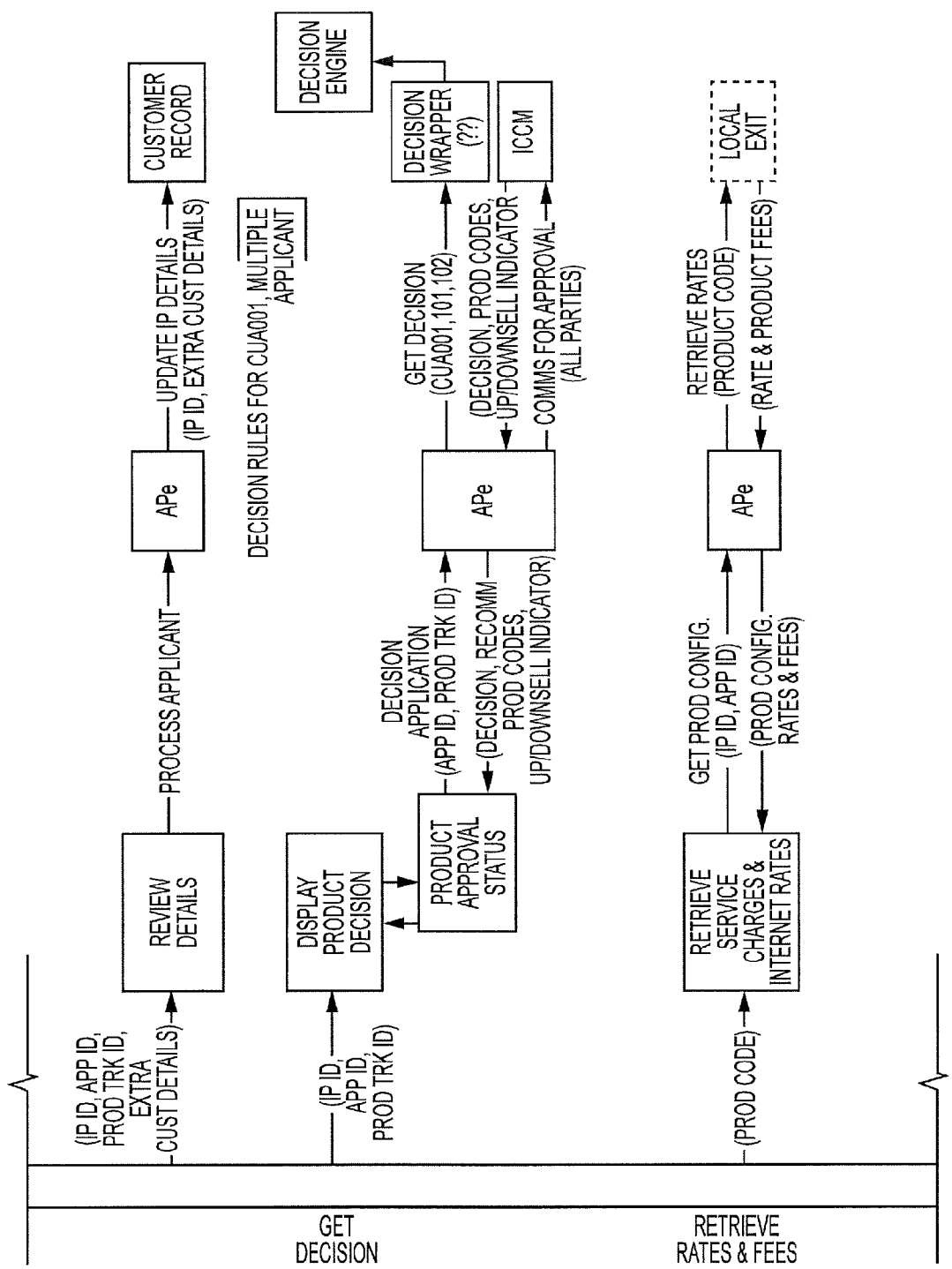
Figure 75C:
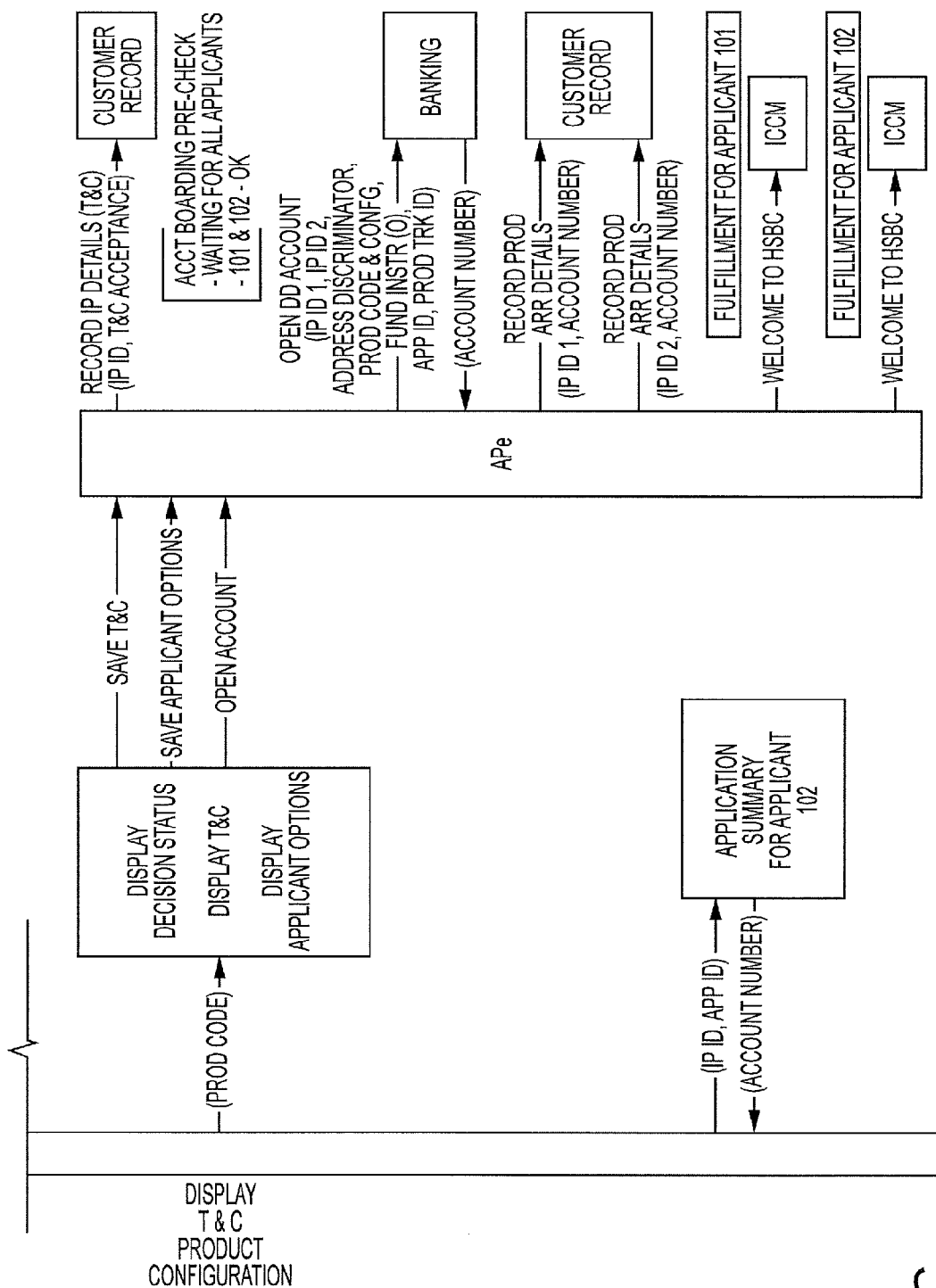
Figure 76:
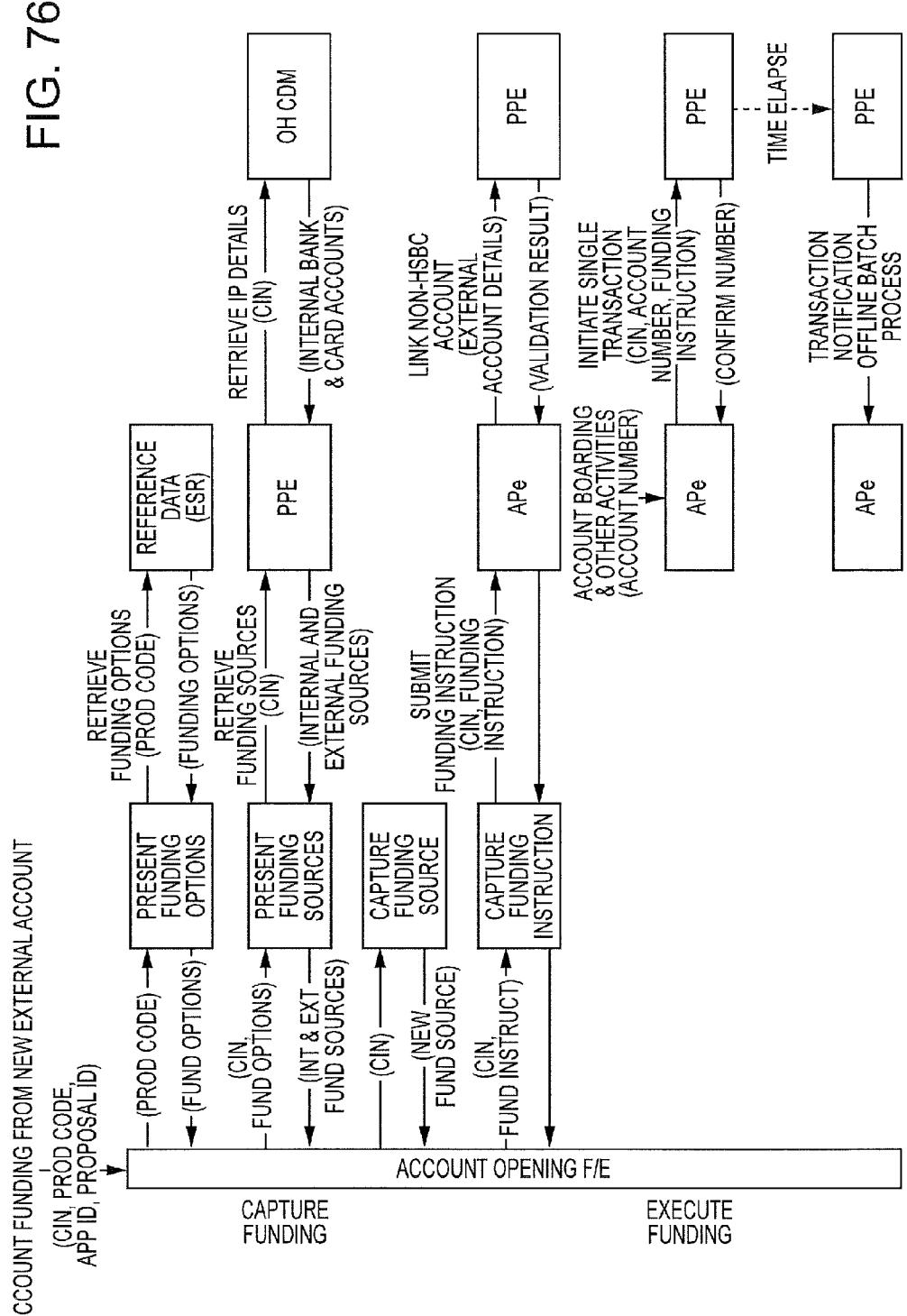
Figure 77:
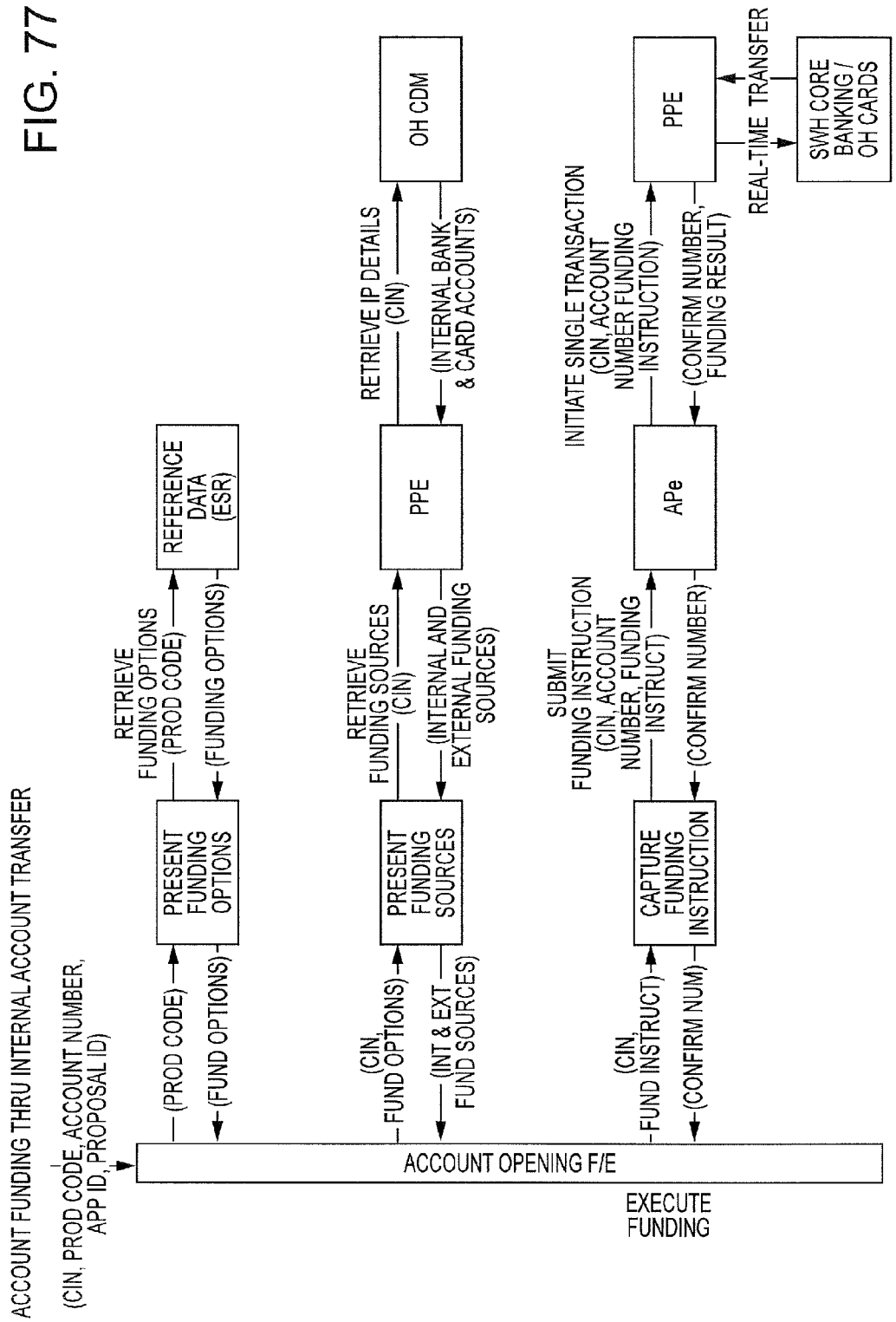

Given that AO interacts with multiple host systems, the capabilities of AO must support multiple definitions of data. Specifically the data field lengths may vary. In some embodiments, the AO field sizes are based on a combination of the target and maximum applicable field sizes. When not all systems support the strategic field size, the local entity preferably provides truncation closest to the source of the data at implementation time—limiting the size of captured data at the FE ensures the end-user cannot enter data that will be otherwise lost in the system. FIG. 69 is an exemplary diagram of the AO system supporting varying definitions of data, such as data field lengths, where the left-hand side is the target supported by the AO 'framework', while the right-hand side reflects a local entity implementation.

Use Cases

FIGS. 70-77 are architecture use cases illustrating exemplary end to end system interactions for various account opening scenarios.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

For example, the specific sequence of the above described process may be altered so that certain processes are conducted in parallel or independent, with other processes, to the extent that the processes are not dependent upon each other. Thus, the specific order of steps described herein are not to be considered implying a specific sequence of steps to perform the above described process. Other alterations or modifications of the above processes are also contemplated.

What is claimed is:

1. A computer system architecture decoupling the user interface from an underlying computer executed process for opening an account for a customer, comprising:

at least one computer system including at least one computer processor and at least one memory storing instructions executed by the computer system, the at least one computer system configured to include:

a front end user interface platform capturing application data, implemented by the at least one computer system and including at least one business interface receiving local business specifications for at least one of application data elements and account opening processes performed by predetermined application specific core systems and decoupled from the business interface;

an application processing platform implemented by the at least one computer system and accessing configurable business rules and comprising an application processing engine performing straight-through processing of the application data including managing the validation of the user, managing the configuring of at least one product, managing the assembling of terms and conditions relevant to the at least one product selected, managing the decisioning of the application, and transmitting the processed application data;

a customer communications module implemented by the at least one computer system and managing the generating and sending of customer communications documents;

a queue management system implemented by the at least one computer system and supporting queues on the application data outside of the straight-through processing;

a funding module comprising a payment processing engine executing at least one of an account funding instruction and a fee instruction; and a plurality of core systems comprising a customer data management system storing customer data, a decision engine decisioning the application, a cards product system supporting one or more card products, a core banking product system supporting deposit accounts, and a sales services system managing customer interactions, said plurality of core systems operatively communicating with said customer communications module via at least one core system interface protocol.

2. An end-to-end component based global computer system architecture decoupling the user interface from an underlying computer executed process, comprising:

at least one computer system including at least one computer processor and at least one memory storing instructions executed by the computer system, the at least one computer system configured to include:

a globally consistent front end user interface platform implemented by the at least one computer system and capturing application data and including at least one processing module defining at least one of application data elements and process flow instructions responsive to predetermined application specific core systems, and said globally consistent front end user interface platform decoupled from the predetermined application specific core systems;

a globally consistent application processing platform implemented by the at least one computer system and accessing configurable business rules and comprising an application processing engine processing the application data including managing the validation of the user, managing the configuring of at least one product, managing the assembling of terms and conditions relevant to the at least one product selected, managing the decisioning of the application, and transmitting the processed application data;

a globally consistent customer communications module implemented by the at least one computer system and managing the generating and sending of customer communications documents;

a globally consistent queue management system implemented by the at least one computer system and supporting queues processes that utilize the application data;

a globally consistent funding module comprising a payment processing engine executing at least one of an account funding instruction and a fee instruction; and a plurality of core systems comprising a customer data management system storing customer data, a decision engine decisioning the application, a cards product system supporting one or more card products, a core banking product system supporting deposit accounts, and a sales services system managing customer interactions, said plurality of core systems operatively communicating with said globally consistent customer communications module via at least one core system interface protocol.

3. An end-to-end component based global computer system architecture according to claim 2, wherein said globally consistent front end user interface platform provides the same process flow instructions responsive to the predetermined application specific core systems for the life of the application.

4. An end-to-end component based global computer system architecture according to claim 2, wherein said globally consistent front end user interface platform is segmented into multiple portlets that are chained together to create a configurable journey with respect to a predetermined application of at least one of the application specific core systems.

5. An end-to-end component based global computer system architecture according to claim 2, wherein said globally consistent front end user interface platform executes, in cooperation with said globally consistent application processing platform, the following use-cases comprising: present product; request statements; request ATM card; maintain involved party; validate identity through third party systems; validate identity; accept terms and conditions; execute funding; retrieve and action decision; save application; retrieve application; search application; open account; activate account; archive application; and maintain application.

6. An end-to-end component based global computer system architecture according to claim 2, further comprising user interfaces including components, content, and links, wherein the components are further broken down into data structures, layout including attributes, view components, links and validation rules for individual fields within the component, and wherein the content provides defined content, the links enable the user to perform actions, and the view components are deployable as the content, and wherein said globally consistent front end user interface platform provides flexibility when interfacing with the user interface.

7. An end-to-end component based global computer system architecture according to claim 2, wherein said globally consistent application processing platform including the application processing engine processes application data received from both internal and external sources, packages at least a part of the application data and transmits the packaged data to a decisioning system, and analyzes the application data to generate a set of decisions.

8. An end-to-end component based global computer system architecture according to claim 2, wherein said globally consistent application processing platform including the application processing engine tracks the application processes, provides a status of all applications, and tracks historic activity.

9. An end-to-end component based global computer system architecture according to claim 2, wherein said globally consistent application processing platform including the application processing engine executes the following processes:

saves the applications each time the application processing engine is called;

enables the applications to be retrieved using predetermined application data;

enables a search operation to be initiated to search for existing applications to continue the application process;

enables the suspending of the applications and restarting of the applications; and interfaces with the applications without being dependent on application specific interfaces.

10. An end-to-end component based global computer system architecture according to claim 2, wherein said globally consistent application processing platform controls the application processes, centrally tracks the application processes, centrally stores the application data, and interfaces with supporting systems and queue management.

11. An end-to-end component based global computer system architecture according to claim 2, wherein said globally consistent application processing platform centrally stores the application data including reference data comprising static values used by at least one of said plurality of core systems.

12. An end-to-end component based global computer system architecture according to claim 2, wherein said application processing engine interacts with sub-system applications in their native form, without being dependent on application-specific interfaces.

13. An end-to-end component based global computer system architecture according to claim 2, wherein said globally consistent application processing platform including the application processing engine performs at least one of the following functions comprising: duplicate data at point of application from one or more sub-systems to maintain an enduring application system of record; call other systems using fixed format messaging or service contracts; perform business configurable actions as part of a macro service operation; perform macro services based on one or more of entity ID, channel ID, product group ID, and business process ID; transmit an application ID, reason code, and entity ID to the queue management system; and initiate request to add one or more customer, account, or embosser records in the cards product system.

14. An end-to-end component based global computer system architecture according to claim 2, wherein said globally consistent application processing platform including the application processing engine comprises one or more of the following capabilities: application and product breakdown; determine or designate statuses; at least one of up sell, down sell, and cross sell; bundle product applications; multi-product applications; multi-party applications; single applications; service configuration; entity extension; progress logging; support; reports; and system maintenance.

15. An end-to-end component based global computer system architecture according to claim 2, wherein said globally consistent application processing platform including the application processing engine:

automatically maintains the state of the application and products within the application;

enables the application process to be paused and resumed; and enables the application to be saved and retrieved in the same or a different channel to continue the application process.

16. An end-to-end component based global computer system architecture according to claim 2, wherein customer communications histories and pointers to application data including document ID, timestamp, and basic data elements are stored in the application processing platform, and templates are stored in a business development environment, for at least one of assembling and generating a customer communications document by the customer communications module.

17. An end-to-end component based global computer system architecture according to claim 2, further comprising business processes separate from screens and manageable by business staff, said business processes and screens configurable by the business in any order.

18. An end-to-end component based global computer system architecture according to claim 2, further comprising an automated agent running using background processes and interrogating systems enabling at least one of aging of applications off the global computer system and the queues, sending one or more customer communications, and escalating problems.

19. An end-to-end component based global computer system architecture according to claim 2, wherein said application processing engine further enables cross channel capability, enabling the application processes to be started, paused and restarted by a plurality of at least one of different users and processes.

20. A global computer system architecture decoupling the user interface from underlying business configurable computer executed processes, comprising:

at least one computer system including at least one computer processor and at least one memory storing instructions executed by the computer system, the at least one computer system configured to include:

a front end user interface platform implemented by the at least one computer system and capturing application data and providing a flexible and dynamic sequence of screens responsive to configurable business rules coded in application specific core systems separate from the screens and manageable by business staff, and said front end user interface platform decoupled from the application specific core systems;

an application processing platform implemented by the at least one computer system and containing the configurable business rules and comprising an application processing engine controlling the application processes, centrally tracking the application processes, centrally storing the application data, and coordinating the interaction of a plurality of core supporting systems including:

a customer communications module implemented by the at least one computer system and generating, managing, and delivering customer communications documents based on the application data and business configurable templates;

a customer data management system storing customer data;

a cards product system supporting one or more card products;

a core banking product system supporting deposit accounts;

a sales services system managing customer interactions; and a decision engine decisioning the application, said plurality of core systems operatively communicating with the application processing platform via at least one core system interface protocol without being dependent on application specific interfaces;

a queue management system supporting queues for exception processing; and a funding module comprising a payment processing engine executing at least one account funding, fee, or balance transfer instruction.

\* \* \* \* \*